Aug. 25, 1959 F. E. HAMILTON ET AL 2,901,166

DIGITAL COMPUTER

Filed Feb. 5, 1953 82 Sheets-Sheet 1

INVENTORS
FRANCIS E. HAMILTON
GEORGE V. HAWKINS
ROBERT E. LAWHEAD, JR.
ERNEST S. HUGHES, JR.
BY Charles P. Boberg
ATTORNEY

DIGITAL COMPUTER

Filed Feb. 5, 1953 82 Sheets-Sheet 2

INVENTORS
FRANCIS E. HAMILTON
GEORGE V. HAWKINS
ROBERT E. LAWHEAD, JR.
ERNEST S. HUGHES, JR.
BY Charles P. Boberg
ATTORNEY

DIGITAL COMPUTER

Filed Feb. 5, 1953 82 Sheets-Sheet 3

INVENTORS
FRANCIS E. HAMILTON
GEORGE V. HAWKINS
ROBERT E. LAWHEAD, JR.
ERNEST S. HUGHES, JR.
BY Charles P. Boberg
ATTORNEY INVENTORS
FRANCIS E. HAMILTON
GEORGE V. HAWKINS
ROBERT E. LAWHEAD, JR.
ERNEST S. HUGHES, JR.
BY Charles P. Boberg
ATTORNEY Aug. 25, 1959 F. E. HAMILTON ET AL 2,901,166

DIGITAL COMPUTER

Filed Feb. 5, 1953 82 Sheets-Sheet 5

INVENTORS
FRANCIS E. HAMILTON
GEORGE V. HAWKINS
ROBERT E. LAWHEAD JR.
ERNEST S. HUGHES JR.

BY Charles P. Boberg
ATTORNEY

DIGITAL COMPUTER

Filed Feb. 5, 1953 82 Sheets-Sheet 6

INVENTORS
FRANCIS E. HAMILTON
GEORGE V. HAWKINS
ROBERT E. LAWHEAD JR.
ERNEST S. HUGHES JR.
BY Charles P. Boberg
ATTORNEY Aug. 25, 1959 — F. E. HAMILTON ET AL — 2,901,166

DIGITAL COMPUTER

Filed Feb. 5, 1953 — 82 Sheets-Sheet 7

INVENTORS
FRANCIS E. HAMILTON
GEORGE V. HAWKINS
ROBERT E. LAWHEAD JR
ERNEST S. HUGHES JR.
BY Charles P. Boberg
ATTORNEY Aug. 25, 1959 F. E. HAMILTON ET AL 2,901,166

DIGITAL COMPUTER

Filed Feb. 5, 1953 82 Sheets-Sheet 8

INVENTORS
FRANCIS E. HAMILTON
GEORGE V. HAWKINS
ROBERT E. LAWHEAD JR.
ERNEST S. HUGHES JR.
BY Charles P. Boberg
ATTORNEY

FIG. 16

EXAMPLE 5:

MC = 0000022222
MP = 0000108829
PR = 2418398038

PR (MAX. 20 ORDERS); MP (MAX. 10 ORDERS); DG1-L = NO. OF SHIFTS

| | MP DIGIT HIGHEST ORDER | MP DIGIT 2ND HIGHEST ORDER | MC OPER. | LEFT SHIFT | DG11-U | DG10-U | DG9-U | DG8-U | DG7-U | DG6-U | DG5-U | DG4-U | DG3-U | DG2-U | DG1-U | DG11-L | DG10-L | DG9-L | DG8-L | DG7-L | DG6-L | DG5-L | DG4-L | DG3-L | DG2-L | DG1-L |
|---|---|---|---|---|---|---|---|---|---|---|---|---|---|---|---|---|---|---|---|---|---|---|---|---|---|---|
| A | 0 | BELOW 5 | 0 | YES | 0 | 0 | 0 | 0 | 0 | 1 | 0 | 8 | 8 | 2 | 9 | 0 | 0 | 0 | 0 | 0 | 0 | 0 | 0 | 0 | 0 | 0 |
| B | 0 | BELOW 5 | 0 | YES | 0 | 0 | 0 | 0 | 1 | 0 | 8 | 8 | 2 | 9 | 0 | 0 | 0 | 0 | 0 | 0 | 0 | 0 | 0 | 0 | 0 | 1 |
| C | 0 | BELOW 5 | 0 | YES | 0 | 0 | 0 | 1 | 0 | 8 | 8 | 2 | 9 | 0 | 0 | 0 | 0 | 0 | 0 | 0 | 0 | 0 | 0 | 0 | 0 | 2 |
| D | 0 | BELOW 5 | 0 | YES | 0 | 0 | 1 | 0 | 8 | 8 | 2 | 9 | 0 | 0 | 0 | 0 | 0 | 0 | 0 | 0 | 0 | 0 | 0 | 0 | 0 | 3 |
| E | 0 | BELOW 5 | 0 | YES | 0 | 1 | 0 | 8 | 8 | 2 | 9 | 0 | 0 | 0 | 0 | 0 | 0 | 0 | 0 | 0 | 0 | 0 | 0 | 0 | 0 | 4 |
| F | 1 | BELOW 5 | ADD | YES | 1 | 0 | 8 | 8 | 2 | 9 | 0 | 0 | 0 | 0 | 0 | 0 | 0 | 0 | 0 | 0 | 0 | 0 | 0 | 0 | 0 | 5 |
| G | 0 | ABOVE 5 | ADD | YES | 0 | 8 | 8 | 2 | 9 | 0 | 0 | 0 | 0 | 0 | 0 | 0 | 0 | 0 | 0 | 2 | 2 | 2 | 2 | 2 | 0 | 6 |
| H | 8 | ABOVE 5 | SUBT. | YES | 8 | 8 | 2 | 9 | 0 | 0 | 0 | 0 | 0 | 0 | 0 | 0 | 0 | 0 | 2 | 4 | 4 | 4 | 4 | 2 | 0 | 7 |
| J | 8 | BELOW 5 | SUBT. | NO | 8 | 2 | 9 | 0 | 0 | 0 | 0 | 0 | 0 | 0 | 0 | 0 | 0 | 2 | 4 | 2 | 2 | 1 | 9 | 8 | 0 | 8 |
| K | 9 | BELOW 5 | SUBT. | YES | 9 | 2 | 9 | 0 | 0 | 0 | 0 | 0 | 0 | 0 | 0 | 0 | 0 | 2 | 4 | 1 | 9 | 9 | 7 | 5 | 8 | 8 |
| L | 2 | ABOVE 5 | ADD | NO | 2 | 9 | 0 | 0 | 0 | 0 | 0 | 0 | 0 | 0 | 0 | 0 | 0 | 2 | 4 | 1 | 7 | 7 | 5 | 3 | 6 | 0 | 9 |
| M | 1 | ABOVE 5 | ADD | NO | 1 | 9 | 0 | 0 | 0 | 0 | 0 | 0 | 0 | 0 | 0 | 0 | 0 | 2 | 4 | 1 | 7 | 9 | 7 | 5 | 8 | 2 | 9 |
| N | 0 | ABOVE 5 | ADD | YES | 0 | 9 | 0 | 0 | 0 | 0 | 0 | 0 | 0 | 0 | 0 | 0 | 0 | 2 | 4 | 1 | 8 | 1 | 9 | 8 | 0 | 4 | 9 |
| P | 9 | NONE | SUBT. | NO | 9 | 0 | 0 | 0 | 0 | 0 | 0 | 0 | 0 | 0 | 0 | 0 | 2 | 4 | 1 | 8 | 4 | 2 | 0 | 2 | 6 | 0 | 0 |
| Q | 0 | NONE | END OPERATION | | 0 | 0 | 0 | 0 | 0 | 0 | 0 | 0 | 0 | 0 | 0 | 2 | 4 | 1 | 8 | 3 | 9 | 8 | 0 | 3 | 8 | 0 |

INVENTORS
FRANCIS E. HAMILTON
GEORGE V. HAWKINS
ROBERT E. LAWHEAD JR.
ERNEST S. HUGHES JR.
BY Charles P. Boberg
ATTORNEY INVENTORS
FRANCIS E. HAMILTON
GEORGE V. HAWKINS
ROBERT E. LAWHEAD JR
ERNEST S. HUGHES JR.
BY Charles P. Boberg
ATTORNEY Aug. 25, 1959 F. E. HAMILTON ET AL 2,901,166

DIGITAL COMPUTER

Filed Feb. 5, 1953 82 Sheets-Sheet 11

INVENTORS
FRANCIS E. HAMILTON
GEORGE V. HAWKINS
ROBERT E. LAWHEAD JR.
ERNEST S. HUGHES JR.

BY Charles P. Boberg
ATTORNEY

INVENTORS
FRANCIS E. HAMILTON
GEORGE V. HAWKINS
ROBERT E. LAWHEAD JR.
ERNEST S. HUGHES JR.
BY Charles P. Boberg
ATTORNEY INVENTORS
FRANCIS E. HAMILTON
GEORGE V. HAWKINS
ROBERT E. LAWHEAD JR.
ERNEST S. HUGHES JR.
BY Charles P. Boberg
ATTORNEY INVENTORS
FRANCIS E. HAMILTON
GEORGE V. HAWKINS
ROBERT E. LAWHEAD JR.
ERNEST S. HUGHES JR.
BY Charles P. Boberg
ATTORNEY Aug. 25, 1959 F. E. HAMILTON ET AL 2,901,166

DIGITAL COMPUTER

Filed Feb. 5, 1953 82 Sheets-Sheet 15

INVENTORS
FRANCIS E. HAMILTON
GEORGE V. HAWKINS
ROBERT E. LAWHEAD JR
ERNEST S. HUGHES JR

BY Charles P. Boberg
ATTORNEY

INVENTORS
FRANCIS E. HAMILTON
GEORGE V. HAWKINS
ROBERT E. LAWHEAD JR.
ERNEST S. HUGHES JR.
BY Charles P. Boberg
ATTORNEY INVENTORS
FRANCIS E. HAMILTON
GEORGE V. HAWKINS
ROBERT E. LAWHEAD JR.
ERNEST S. HUGHES JR.
BY Charles P. Boberg
ATTORNEY INVENTORS
FRANCIS E. HAMILTON
GEORGE V. HAWKINS
ROBERT E. LAWHEAD JR.
ERNEST S. HUGHES JR.
BY Charles P. Boberg
ATTORNEY INVENTORS
FRANCIS E. HAMILTON
GEORGE V. HAWKINS
ROBERT E. LAWHEAD JR.
ERNEST S. HUGHES JR.
BY Charles P. Bobery
ATTORNEY INVENTORS
FRANCIS E. HAMILTON
GEORGE V. HAWKINS
ROBERT E. LAWHEAD JR.
ERNEST S. HUGHES JR.
BY Charles P. Boberg
ATTORNEY INVENTORS
FRANCIS E. HAMILTON
GEORGE V. HAWKINS
ROBERT E. LAWHEAD JR.
ERNEST S. HUGHES JR.
BY Charles P. Boberg
ATTORNEY Aug. 25, 1959 F. E. HAMILTON ET AL 2,901,166

DIGITAL COMPUTER

Filed Feb. 5, 1953 82 Sheets-Sheet 22

INVENTORS
FRANCIS E. HAMILTON
GEORGE V. HAWKINS
ROBERT E. LAWHEAD JR.
ERNEST S. HUGHES JR.

BY Charles P. Boberg
ATTORNEY

INVENTORS
FRANCIS E. HAMILTON
GEORGE V. HAWKINS
ROBERT E. LAWHEAD JR.
ERNEST S. HUGHES JR.
BY Charles P. Boberg
ATTORNEY INVENTORS
FRANCIS E. HAMILTON
GEORGE V. HAWKINS
ROBERT E. LAWHEAD JR.
ERNEST S. HUGHES JR.
BY Charles P. Boberg
ATTORNEY Aug. 25, 1959 F. E. HAMILTON ET AL 2,901,166

DIGITAL COMPUTER

Filed Feb. 5, 1953 82 Sheets-Sheet 25

INVENTORS
FRANCIS E. HAMILTON
GEORGE V. HAWKINS
ROBERT E. LAWHEAD JR.
ERNEST S. HUGHES JR.
BY Charles P. Boberg
ATTORNEY INVENTORS
FRANCIS E. HAMILTON
GEORGE V. HAWKINS
ROBERT E. LAWHEAD JR.
ERNEST S. HUGHES JR.
BY Charles P. Boberg
ATTORNEY Aug. 25, 1959 F. E. HAMILTON ET AL 2,901,166

DIGITAL COMPUTER

Filed Feb. 5, 1953 82 Sheets-Sheet 27

INVENTORS
FRANCIS E. HAMILTON
GEORGE V. HAWKINS
ROBERT E. LAWHEAD JR.
ERNEST S. HUGHES JR.
BY Charles P. Boberg
ATTORNEY INVENTORS
FRANCIS E. HAMILTON
GEORGE V. HAWKINS
ROBERT E. LAWHEAD JR
ERNEST S. HUGHES JR.
BY Charles P. Boberg
ATTORNEY Aug. 25, 1959 F. E. HAMILTON ET AL 2,901,166

DIGITAL COMPUTER

Filed Feb. 5, 1953 82 Sheets-Sheet 29

INVENTORS
FRANCIS E. HAMILTON
GEORGE V. HAWKINS
ROBERT E. LAWHEAD JR.
ERNEST S. HUGHES JR.
BY Charles P. Boberg
ATTORNEY INVENTORS
FRANCIS E. HAMILTON
GEORGE V. HAWKINS
ROBERT E. LAWHEAD JR.
ERNEST S. HUGHES JR.
BY Charles P. Boberg
ATTORNEY Aug. 25, 1959 F. E. HAMILTON ET AL 2,901,166

DIGITAL COMPUTER

Filed Feb. 5, 1953 82 Sheets-Sheet 31

INVENTORS
FRANCIS E. HAMILTON
GEORGE V. HAWKINS
ROBERT E. LAWHEAD JR.
ERNEST S. HUGHES JR.
BY Charles P. Boberg
ATTORNEY INVENTORS
FRANCIS E. HAMILTON
GEORGE V. HAWKINS
ROBERT E. LAWHEAD JR.
ERNEST S. HUGHES JR.
BY
ATTORNEY INVENTORS
FRANCIS E. HAMILTON
GEORGE V. HAWKINS
ROBERT E. LAWHEAD JR.
ERNEST S. HUGHES JR.
BY Charles P. Boberg
ATTORNEY INVENTORS
FRANCIS E. HAMILTON
GEORGE V. HAWKINS
ROBERT E. LAWHEAD JR.
ERNEST S. HUGHES JR.
BY Charles P. Boberg
ATTORNEY Aug. 25, 1959 F. E. HAMILTON ET AL 2,901,166

DIGITAL COMPUTER

Filed Feb. 5, 1953 82 Sheets-Sheet 35

INVENTORS
FRANCIS E. HAMILTON
GEORGE V. HAWKINS
ROBERT E. LAWHEAD JR.
ERNEST S. HUGHES JR.
BY Charles P. Boberg
ATTORNEY INVENTORS
FRANCIS E. HAMILTON
GEORGE V. HAWKINS
ROBERT E. LAWHEAD JR.
ERNEST S. HUGHES JR.
BY Charles P. Boberg
ATTORNEY Aug. 25, 1959 F. E. HAMILTON ET AL 2,901,166

DIGITAL COMPUTER

Filed Feb. 5, 1953 82 Sheets-Sheet 37

INVENTORS
FRANCIS E. HAMILTON
GEORGE V. HAWKINS
ROBERT E. LAWHEAD JR.
ERNEST S. HUGHES JR.
BY Charles P. Boberg
ATTORNEY Aug. 25, 1959 F. E. HAMILTON ET AL 2,901,166

DIGITAL COMPUTER

Filed Feb. 5, 1953 82 Sheets-Sheet 38

INVENTORS
FRANCIS E. HAMILTON
GEORGE V. HAWKINS
ROBERT E. LAWHEAD JR.
ERNEST S. HUGHES JR.

BY Charles P. Boberg
ATTORNEY

INVENTORS
FRANCIS E. HAMILTON
GEORGE V. HAWKINS
ROBERT E. LAWHEAD JR.
ERNEST S. HUGHES JR.
BY Charles P. Boberg
ATTORNEY Aug. 25, 1959 F. E. HAMILTON ET AL 2,901,166

DIGITAL COMPUTER

Filed Feb. 5, 1953 82 Sheets-Sheet 40

INVENTORS
FRANCIS E. HAMILTON
GEORGE V. HAWKINS
ROBERT E. LAWHEAD JR.
ERNEST S. HUGHES JR.
BY Charles P. Boberg
ATTORNEY Aug. 25, 1959 F. E. HAMILTON ET AL 2,901,166

DIGITAL COMPUTER

Filed Feb. 5, 1953 82 Sheets-Sheet 41

INVENTORS
FRANCIS E. HAMILTON
GEORGE V. HAWKINS
ROBERT E. LAWHEAD JR.
ERNEST S. HUGHES JR.
BY Charles P. Boberg
ATTORNEY Aug. 25, 1959 F. E. HAMILTON ET AL 2,901,166

DIGITAL COMPUTER

Filed Feb. 5, 1953 82 Sheets-Sheet 42

INVENTORS
FRANCIS E. HAMILTON
GEORGE V. HAWKINS
ROBERT E LAWHEAD JR.
ERNEST S. HUGHES JR.
BY Charles P. Boberg
ATTORNEY INVENTORS
FRANCIS E. HAMILTON
GEORGE V. HAWKINS
ROBERT E. LAWHEAD JR.
ERNEST S. HUGHES JR.
BY Charles P. Boberg
ATTORNEY INVENTORS
FRANCIS E. HAMILTON
GEORGE V. HAWKINS
ROBERT E. LAWHEAD JR.
ERNEST S. HUGHES JR.
BY Charles P. Boberg
ATTORNEY INVENTORS
FRANCIS E. HAMILTON
GEORGE V. HAWKINS
ROBERT E. LAWHEAD JR.
ERNEST S. HUGHES JR.
BY Charles P. Boberg
ATTORNEY INVENTORS
FRANCIS E. HAMILTON
GEORGE V. HAWKINS
ROBERT E. LAWHEAD JR.
ERNEST S. HUGHES JR.
BY Charles P. Boberg
ATTORNEY INVENTORS
FRANCIS E. HAMILTON
GEORGE V. HAWKIN
ROBERT E. LAWHEAD JR.
ERNEST S. HUGHES JR.
BY Charles P. Boberg
ATTORNEY

DIGITAL COMPUTER

Filed Feb. 5, 1953 82 Sheets-Sheet 48

INVENTORS
FRANCIS E. HAMILTON
GEORGE V. HAWKINS
ROBERT E. LAWHEAD JR.
ERNEST S. HUGHES JR.
BY Charles P. Boberg
ATTORNEY INVENTORS
FRANCIS E. HAMILTON
GEORGE V. HAWKINS
ROBERT E. LAWHEAD JR.
ERNEST S. HUGHES JR.
BY Charles P. Boberg
ATTORNEY INVENTORS
FRANCIS E. HAMILTON
GEORGE V. HAWKINS
ROBERT E. LAWHEAD JR.
ERNEST S. HUGHES JR.
BY Charles P. Boberg
ATTORNEY Aug. 25, 1959 F. E. HAMILTON ET AL 2,901,166

DIGITAL COMPUTER

Filed Feb. 5, 1953 82 Sheets-Sheet 51

INVENTORS
FRANCIS E. HAMILTON
GEORGE V. HAWKINS
ROBERT E. LAWHEAD JR
ERNEST S. HUGHES JR.
BY Charles P. Boberg
ATTORNEY

ENTRY OF DISTRIBUTOR AND COMPUTER VALUES INTO ADDER

INVENTORS
FRANCIS E. HAMILTON
GEORGE V. HAWKINS
ROBERT E. LAWHEAD JR.
ERNEST S. HUGHES JR.
BY Charles P. Boberg
ATTORNEY

ADD TRUE 6 AND TRUE 3

INVENTORS
FRANCIS E. HAMILTON
GEORGE V. HAWKINS
ROBERT E. LAWHEAD JR.
ERNEST S. HUGHES JR.
BY Charles P. Boberg
ATTORNEY

ADD TRUE 2 AND TRUE 2

INVENTORS
FRANCIS E. HAMILTON
GEORGE V. HAWKINS
ROBERT E. LAWHEAD JR.
ERNEST S. HUGHES JR.
BY Charles P. Boberg
ATTORNEY Aug. 25, 1959 F. E. HAMILTON ET AL 2,901,166

DIGITAL COMPUTER

Filed Feb. 5, 1953 82 Sheets-Sheet 55

FIG. 52 ADD TRUE 3 AND TRUE 4

INVENTORS
FRANCIS E. HAMILTON
GEORGE V. HAWKINS
ROBERT E. LAWHEAD JR.
ERNEST S. HUGHES JR.

BY Charles P. Boberg
ATTORNEY

Aug. 25, 1959 F. E. HAMILTON ET AL 2,901,166

DIGITAL COMPUTER

Filed Feb. 5, 1953 82 Sheets-Sheet 56

ADD TRUE 8 AND TRUE 8

INVENTORS
FRANCIS E. HAMILTON
GEORGE V. HAWKINS
ROBERT E. LAWHEAD JR
ERNEST S. HUGHES JR.

BY Charles P. Boberg
ATTORNEY

ADD TRUE 4 AND TRUE 5 PLUS CARRY

INVENTORS
FRANCIS E. HAMILTON
GEORGE V. HAWKINS
ROBERT E. LAWHEAD JR.
ERNEST S. HUGHES JR.
BY Charles P. Boberg
ATTORNEY

ADD TRUE O AND TRUE O, PLUS CARRY OR NC

INVENTORS
FRANCIS E. HAMILTON
GEORGE V. HAWKINS
ROBERT E. LAWHEAD JR.
ERNEST S. HUGHES JR.
BY Charles P. Boberg
ATTORNEY Aug. 25, 1959

F. E. HAMILTON ET AL

DIGITAL COMPUTER 2,901,166

Filed Feb. 5, 1953

82 Sheets-Sheet 59

INVENTORS
FRANCIS E. HAMILTON
GEORGE V. HAWKINS
ROBERT E. LAWHEAD JR.
ERNEST S. HUGHES JR.

BY Charles P. Boberg
ATTORNEY

ADD TRUE 6 AND COMPLEMENT 2

INVENTORS
FRANCIS E. HAMILTON
GEORGE V. HAWKINS
ROBERT E. LAWHEAD JR.
ERNEST S. HUGHES JR

BY Charles P. Bobery
ATTORNEY

ADD TRUE 3 AND COMPLEMENT 1

INVENTORS
FRANCIS E. HAMILTON
GEORGE V. HAWKINS
ROBERT E. LAWHEAD JR.
ERNEST S. HUGHES JR.
BY Charles P. Boberg
ATTORNEY

ADD TRUE 2 AND COMPLEMENT 7

INVENTORS
FRANCIS E. HAMILTON
GEORGE V. HAWKINS
ROBERT E. LAWHEAD JR.
ERNEST S. HUGHES JR.
BY Charles P. Boberg
ATTORNEY

ADD TRUE O AND COMPLEMENT O
(WITH OR WITHOUT CARRY)

INVENTORS
FRANCIS E. HAMILTON
GEORGE V. HAWKINS
ROBERT E. LAWHEAD JR.
ERNEST S. HUGHES JR.
BY Charles P. Boberg
ATTORNEY

COMPUTER SIGN CONTROL
(ADD AND SUBTRACT)

INVENTORS
FRANCIS E. HAMILTON
GEORGE V. HAWKINS
ROBERT E. LAWHEAD JR.
ERNEST S. HUGHES JR.
BY Charles P. Boberg
ATTORNEY

COMPLEMENT ADJUST

INVENTORS
FRANCIS E. HAMILTON
GEORGE V. HAWKINS
ROBERT E. LAWHEAD JR.
ERNEST S. HUGHES JR.
BY Charles P. Boberg
ATTORNEY INVENTORS
FRANCIS E. HAMILTON
GEORGE V. HAWKINS
ROBERT E. LAWHEAD JR.
ERNEST S. HUGHES JR.
BY Charles P. Boberg
ATTORNEY

MULTIPLY - DIVIDE SIGN CONTROL

INVENTORS
FRANCIS E. HAMILTON
GEORGE V. HAWKINS
ROBERT E. LAWHEAD JR.
ERNEST S. HUGHES JR.
BY Charles P. Boberg
ATTORNEY INVENTORS
FRANCIS E. HAMILTON
GEORGE V. HAWKINS
ROBERT E. LAWHEAD JR.
ERNEST S. HUGHES JR.
BY Charles P. Boberg
ATTORNEY

MULTIPLICATION LEFT SHIFT

INVENTORS
FRANCIS E. HAMILTON
GEORGE V. HAWKINS
ROBERT E. LAWHEAD JR.
ERNEST S. HUGHES JR.
BY Charles P. Boberg
ATTORNEY

DIGITAL COMPUTER

Filed Feb. 5, 1953 82 Sheets-Sheet 70

INVENTORS
FRANCIS E. HAMILTON
GEORGE V. HAWKINS
ROBERT E. LAWHEAD JR.
ERNEST S. HUGHES JR.
BY Charles P. Boberg
ATTORNEY FIG. 67 MULTIPLICATION — ADD OR SUBTRACT MC
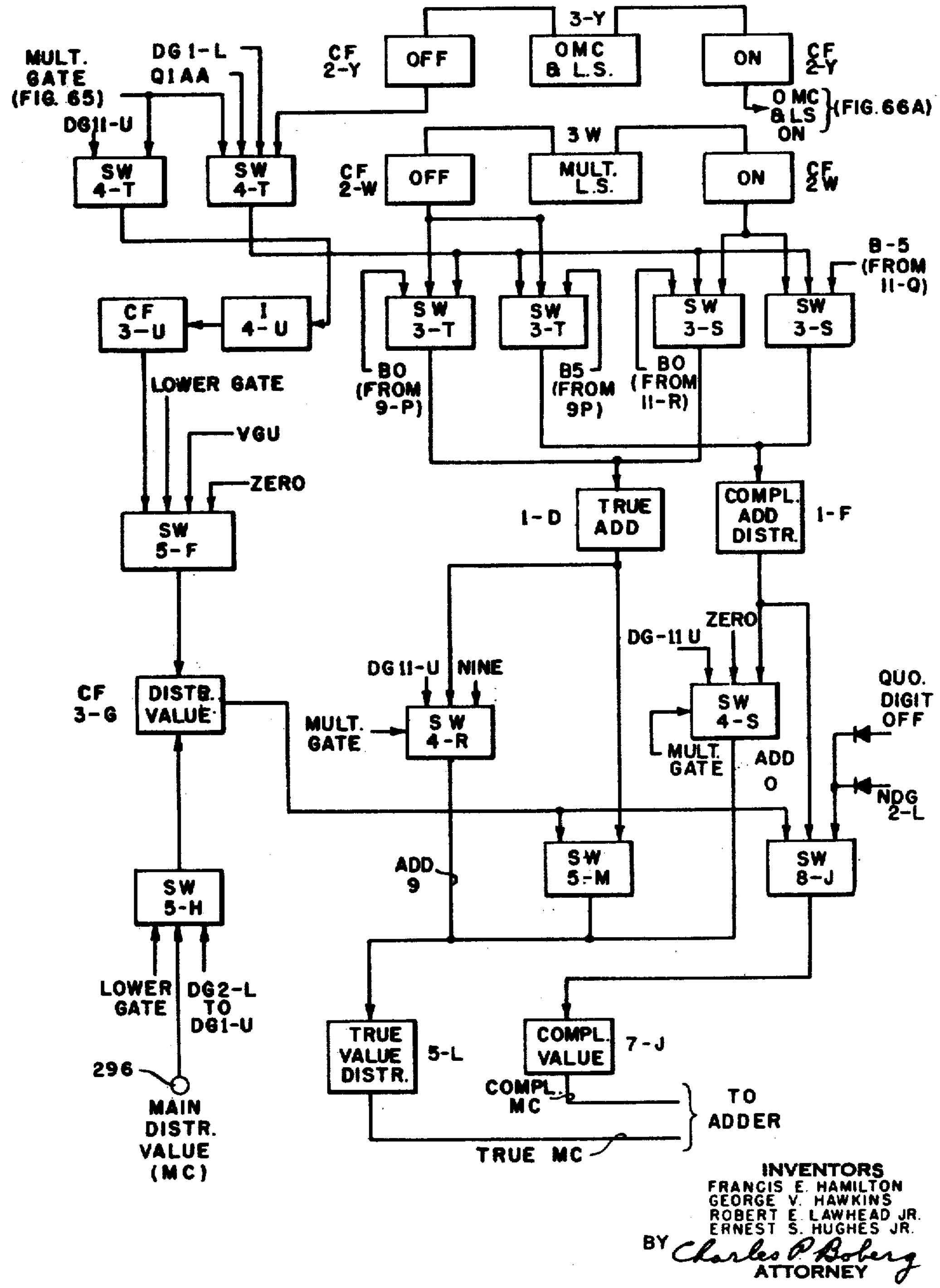
INVENTORS
FRANCIS E. HAMILTON
GEORGE V. HAWKINS
ROBERT E. LAWHEAD JR.
ERNEST S. HUGHES JR.
BY Charles P. Boberg
ATTORNEY Aug. 25, 1959 F. E. HAMILTON ET AL 2,901,166
DIGITAL COMPUTER
Filed Feb. 5, 1953 82 Sheets-Sheet 72
FIG. 68 END MULTIPLICATION
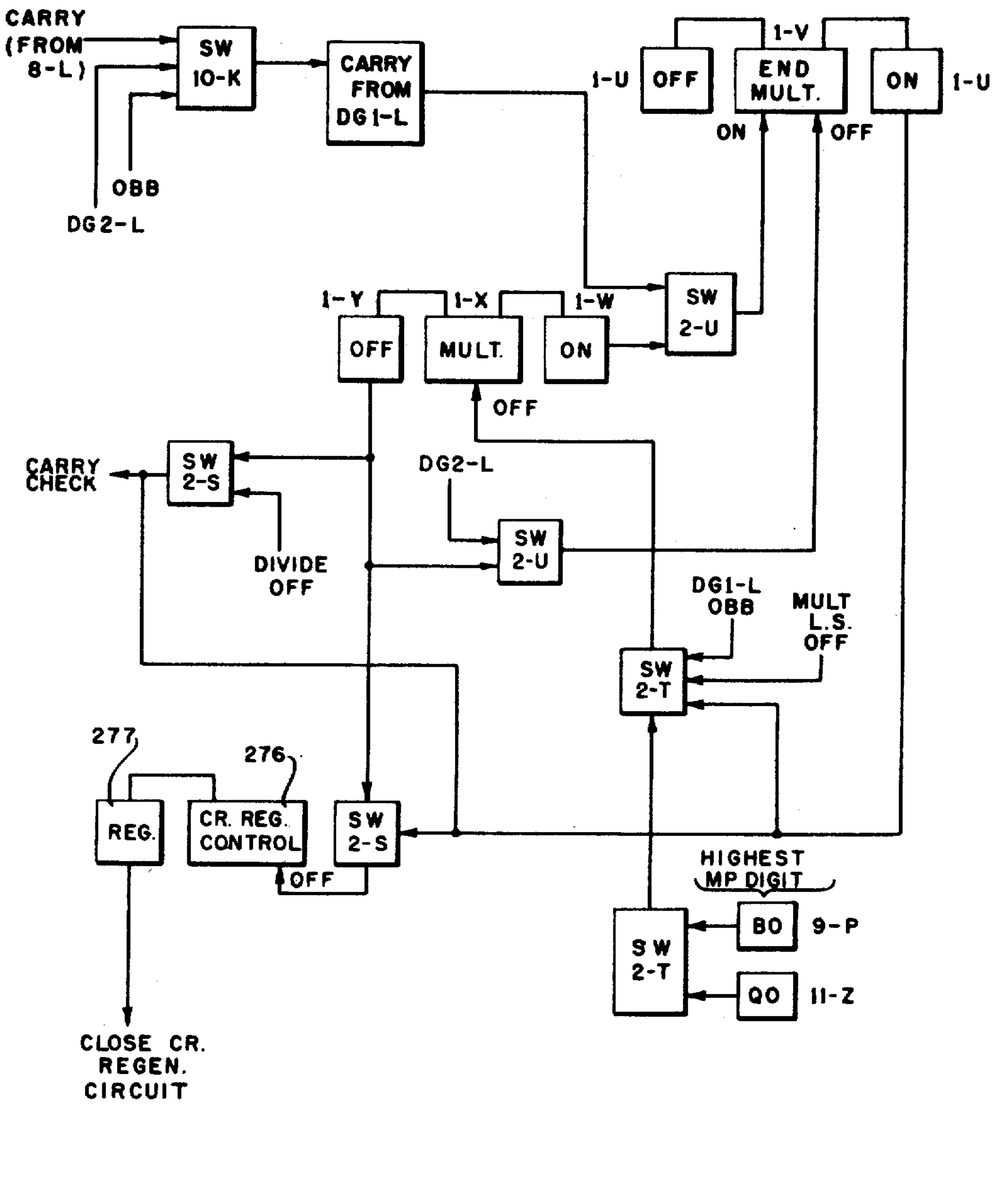
INVENTORS
FRANCIS E. HAMILTON
GEORGE V. HAWKINS
ROBERT E. LAWHEAD JR
ERNEST S. HUGHES JR.
BY Charles P. Boberg
ATTORNEY INVENTORS
FRANCIS E. HAMILTON
GEORGE V. HAWKINS
ROBERT E. LAWHEAD JR.
ERNEST S. HUGHES JR.
BY Charles P. Boberg
ATTORNEY Aug. 25, 1959 F. E. HAMILTON ET AL 2,901,166

DIGITAL COMPUTER

Filed Feb. 5, 1953 82 Sheets-Sheet 74

DIVIDE LEFT SHIFT

INVENTORS
FRANCIS E. HAMILTON
GEORGE V. HAWKINS
ROBERT E. LAWHEAD JR.
ERNEST S. HUGHES JR.
BY Charles P. Boberg
ATTORNEY

DIVISION
ADD OR SUBTRACT DR.

INVENTORS
FRANCIS E. HAMILTON
GEORGE V. HAWKINS
ROBERT E. LAWHEAD JR.
ERNEST S. HUGHES JR.
BY Charles P. Boberg
ATTORNEY INVENTORS
FRANCIS E. HAMILTON
GEORGE V. HAWKINS
ROBERT E. LAWHEAD JR.
ERNEST S. HUGHES JR.
BY Charles P. Boberg
ATTORNEY INVENTORS
FRANCIS E. HAMILTON
GEORGE V. HAWKINS
ROBERT E. LAWHEAD JR.
ERNEST S. HUGHES JR.
BY Charles P. Boberg
ATTORNEY

FIG. 73 ENTRY OF SHIFT NUMBER

INVENTORS
FRANCIS E. HAMILTON
GEORGE V. HAWKINS
ROBERT E. LAWHEAD JR.
ERNEST S. HUGHES JR.
BY Charles P. Boberg
ATTORNEY INVENTORS
FRANCIS E. HAMILTON
GEORGE V. HAWKINS
ROBERT E. LAWHEAD JR.
ERNEST S. HUGHES JR.
BY Charles P. Boberg
ATTORNEY INVENTORS
FRANCIS E. HAMILTON
GEORGE V. HAWKINS
ROBERT E. LAWHEAD JR.
ERNEST S. HUGHES JR.
BY Charles P. Boberg
ATTORNEY INVENTORS
FRANCIS E. HAMILTON
GEORGE V. HAWKINS
ROBERT E. LAWHEAD JR.
ERNEST S. HUGHES JR.
BY Charles P. Boberg
ATTORNEY Aug. 25, 1959 F. E. HAMILTON ET AL 2,901,166
DIGITAL COMPUTER
Filed Feb. 5, 1953 82 Sheets-Sheet 82
FIG. 77 END OPERATION
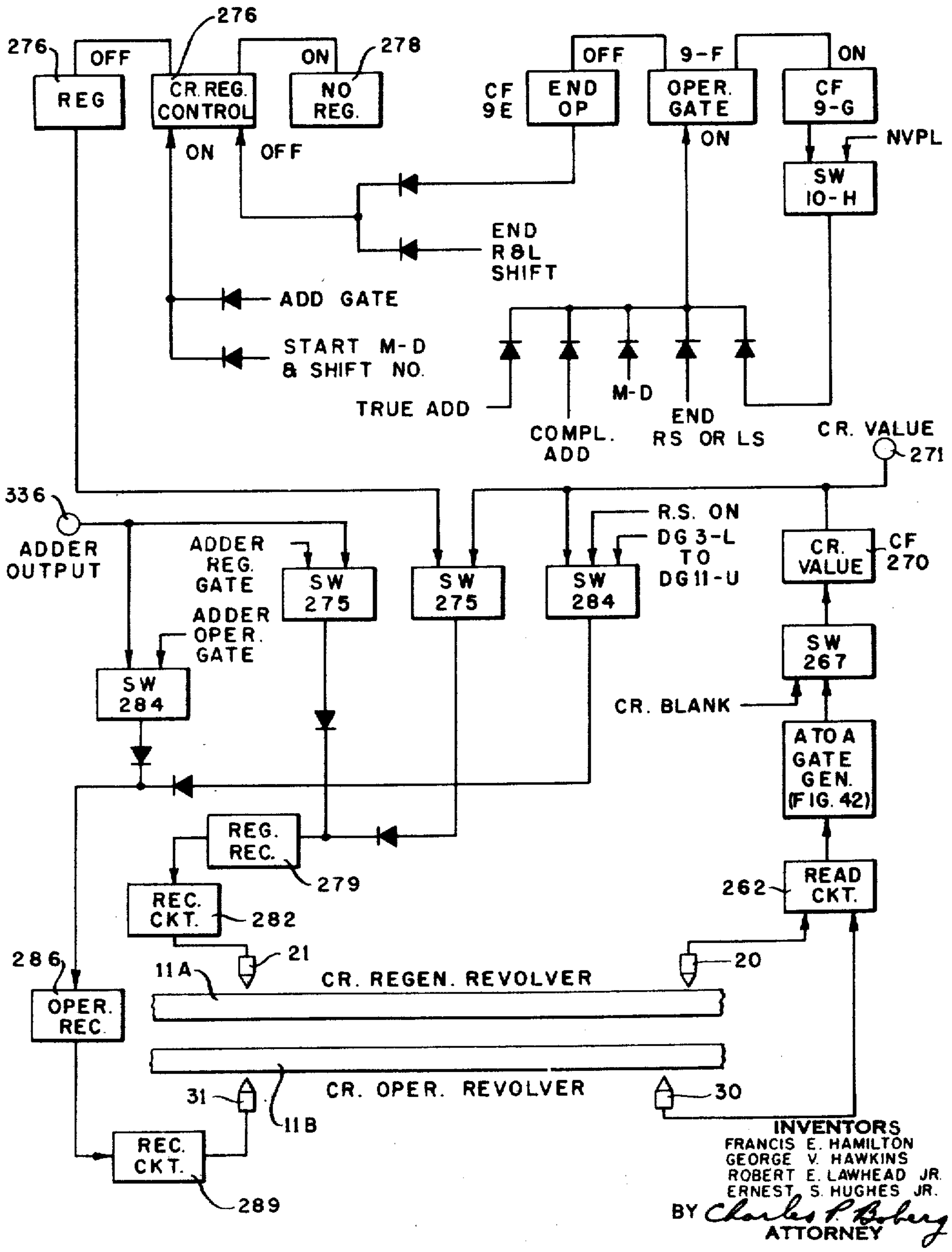
INVENTORS
FRANCIS E. HAMILTON
GEORGE V. HAWKINS
ROBERT E. LAWHEAD JR.
ERNEST S. HUGHES JR.
BY Charles P. Boberg
ATTORNEY 2,901,166

DIGITAL COMPUTER

Francis E. Hamilton, Binghamton, and George V. Hawkins, Robert E. Lawhead, Jr., and Ernest S. Hughes, Jr., Vestal, N.Y., assignors to International Business Machines Corporation, New York, N.Y., a corporation of New York Application February 5, 1953, Serial No. 335,202

42 Claims. (Cl. 235—61)

This invention relates to high-speed digital computers of the magnetic drum type.

High-speed digital computers commonly are classified according to the types of data storage media that they employ. Thus, a magnetic drum computer is one which utilizes a rotating magnetic drum for storing the information that is being processed by the machine. This type of storage medium has the advantage that it is relatively inexpensive to construct and will store a vast amount of information with only negligible power consumption. This is not true in general of other storage media, such as cathode ray tubes; yet there may be situations in which systems using such media are preferred because, for example, they have slightly lower access times than do magnetic drum systems. To compete successfully with these rival systems, a computing apparatus of the magnetic drum type should be provided with circuitry of such a character that it will utilize to the fullest extent those advantages which are inherent in a magnetic drum storage medium. The provision of such circuitry in a computing apparatus of the magnetic drum type is one of the objects of this invention.

Magnetic drum storage devices commonly include "revolvers" for the purpose of reducing access time. A "revolver," as used in this sense, is a combination of the drum surface with associated reading and recording units which are coupled together in such a manner that information read from the drum by the reading unit automatically causes information to be recorded on the drum (with or without modification thereof) by the associated recording unit. Thus, the stored information is kept in a continual state of circulation between the reading and recording units and is available for readout at any instant. A revolver serves approximately the same purpose as a static storage unit and is less expensive; therefore, it is desirable that revolvers be used wherever this will eliminate static storage devices.

There may be times when it is desired to "split" a revolver so that information can be recorded therein or read out therefrom in sections. Such a procedure greatly expedites certain types of operations, as will be pointed out more specifically hereinafter. In machines of the "parallel" type this is not a difficult problem, but in prior known machines of the "serial" type this practice has not been feasible. It is highly desirable that this feature be made available in serial type machines inasmuch as it reduces the number of revolvers or auxiliary static registers which may be required, reduces the number of steps required in processing data, enables quotient and remainder to be handled separately following a division operation, and has other advantages which will appear from the description.

Another factor which contributes to economical design is the choice of a code for representing stored values. While a pure binary code requires a minimum number of tubes in the pulse storage circuits, it also requires the use of diodes in rather large quantities for performing the necessary binary-to-decimal translations. Preferably the code selected should afford a resonable compromise as to the number of tubes and the number of diodes required. Experience has taught that a two-level code, such as the biquinary code (wherein one out of five quinary elements is combined selectively with one out of two binary elements to represent a digit in each decimal order), meets this requirement satisfactorily. The use of a two-level code, however, introduces the problem of effecting carries from one level to the other within the same order, in addition to the usual carry transfers between orders, and here again, care must be taken that the complications which arise do not offset the gains that are made.

What is needed at the present time in the art of magnetic drum computers is a new approach to the above problems which will provide a highly flexible apparatus capable of handling these functions with a minimum of complexity, and it is a prime object of this invention to meet that need.

A further object is to provide an improved magnetic drum computing apparatus having data revolvers of a unique type for enabling more than one item of information to be stored in a single revolver and for permitting items stored in the same revolver to be handled in combination or separately as desired.

A still further object is to provide an improved magnetic drum computing apparatus in which dynamic drum storage supplants some of the static electronic registers formerly employed, thereby reducing the manufacturing and maintenance costs.

Another object is to provide an improved magnetic drum computer which is particularly well adapted for handling information represented in a two-level code such as the biquinary code.

Still another object is to provide an improved adding matrix which is capable of simultaneously receiving two entries expressed as true numbers, adding them together as true numbers or handling either of them as a complement, as desired, readily detecting "doubles" in either type of addition, and expressing the result as a true value with appropriate algebraic sign.

Still another object is to provide an improved magnetic drum computing apparatus having novel controls for multiplication, division, shifting and half correction, said controls materially shortening the time required for each of these operations and being economical to construct.

An additional object is to provide an improved magnetic drum computing apparatus which is adapted to use crystal diodes in large quantity, thereby enabling the number of electron tubes to be reduced substantially below the amount customarily employed heretofore in this type of a computer.

The embodiment of the invention disclosed herein illustrates the following features:

(*a*) Data revolvers of two types ("distributor" revolvers and "computer" revolvers) for dynamically storing all of the data immediately involved in a given computation.

(*b*) The ability to enter information into a revolver with or without a reset. (That is to say, one has the choice of adding new information to information which is already in the revolver, or to delete the old information before adding the new.)

(*c*) The splitting of a computer revolver into so-called "upper" and "lower" parts, with the option of recording data and/or reading the data in the two parts separately as well as concomitantly, as desired.

(*d*) The use of distributor revolvers in conjunction with the computer revolvers for feeding synchronized data to the computer circuits and for receiving synchronized data back therefrom. In this connection there should be noted also the provision of a one-digit-early distributor for enabling a value to enter the upper computer with its sign digit transposed.

(*e*) Selective reset of either upper or lower computer.

(*f*) An adder generally of the matrix type with provisions for expeditiously converting a true value, represented in biquinary, to its corresponding complement (or vice versa) as the value is being entered therein, detecting true doubles and complement doubles, handling biquinary entries with due regard to the carries between adjacent levels as well as the carries between adjacent orders, and performing other related functions as described herein, all by means of selective switching and mixing.

(*g*) Sign controls for determining (through the medium of selective switching and mixing) whether values entering the adder should be handled as true numbers or complements, and for ascertaining the algebraic sign of the result expressed as a true value.

(*h*) Extensive use of crystal diodes in combination with electronic storage devices of high stability (latch units) for selective switching and mixing functions throughout all of the computer circuits.

(*i*) The use of the inherent one-digit delay of the adder circuitry to effect a shift of the data stored in a computer revolver.

(*j*) Provisions for combining a shift with an addition or a subtraction in a single step of the operation, thereby saving time.

(*k*) A short-cut multiplication method especially adapted to utilize biquinary information.

(*l*) The use of the split computer revolver in multiplication and division operations for storing one factor of the computation along with an intermediate result of the computation.

(*m*) Provisions for optionally cancelling or retaining the remainder left over from a division operation in one portion of a computer revolver, while the quotient is retained in another portion of said revolver.

(*n*) Control means for determining the sign of the remainder in a division operation, which may be different from the sign of the result.

(*o*) Use of the split computer to effect precise or extended division.

(*p*) The use of paired computer revolvers having common reading means and independent recording means for shift control purposes.

(*q*) Half-correction controls.

(*r*) Check circuitry for automatically checking each digit stored in the distributor and computer revolvers to insure the presence of one and only one bit in each of two levels (binary and quinary).

(*s*) Detection of overflow conditions in a computer revolver.

Other objects and features of the invention will be pointed out in the following description and claims and illustrated in the accompanying drawings, which disclose, by way of example, the principle of the invention and the best mode, which has been contemplated, of applying that principle.

Figure 6:
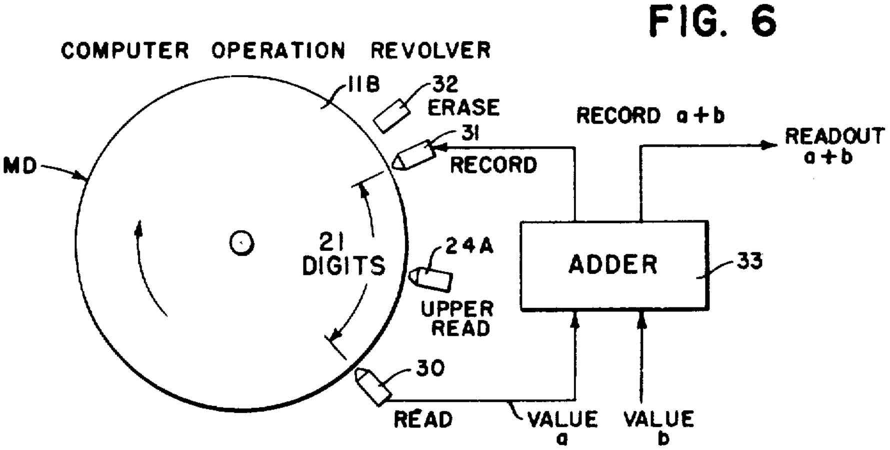
Figure 7:
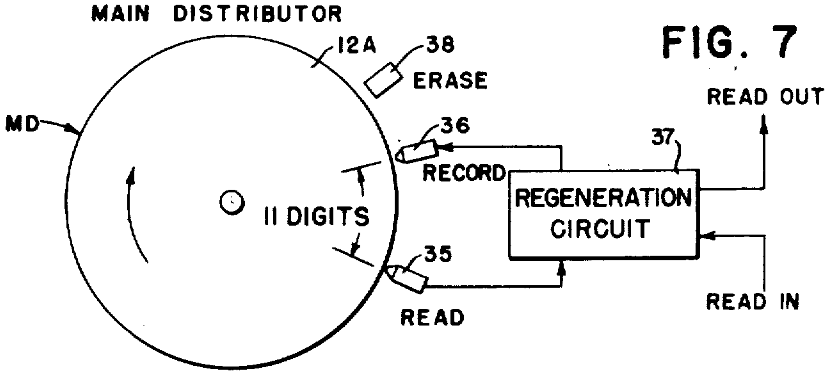
Figure 8:
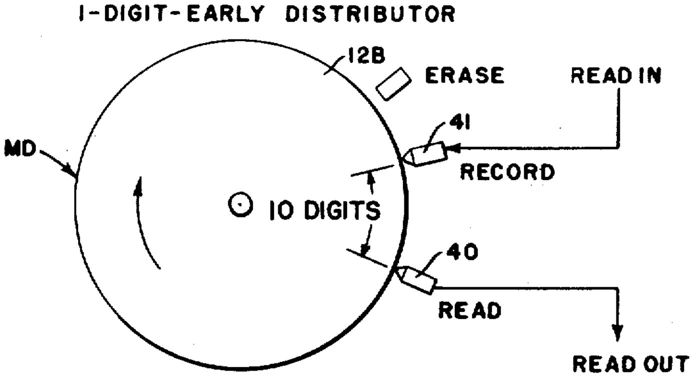

Figs. 6, 7 and 8 respectively represent the computer operation revolver, the main distributor revolver and the one-digit-early distributor.

Figure 9:
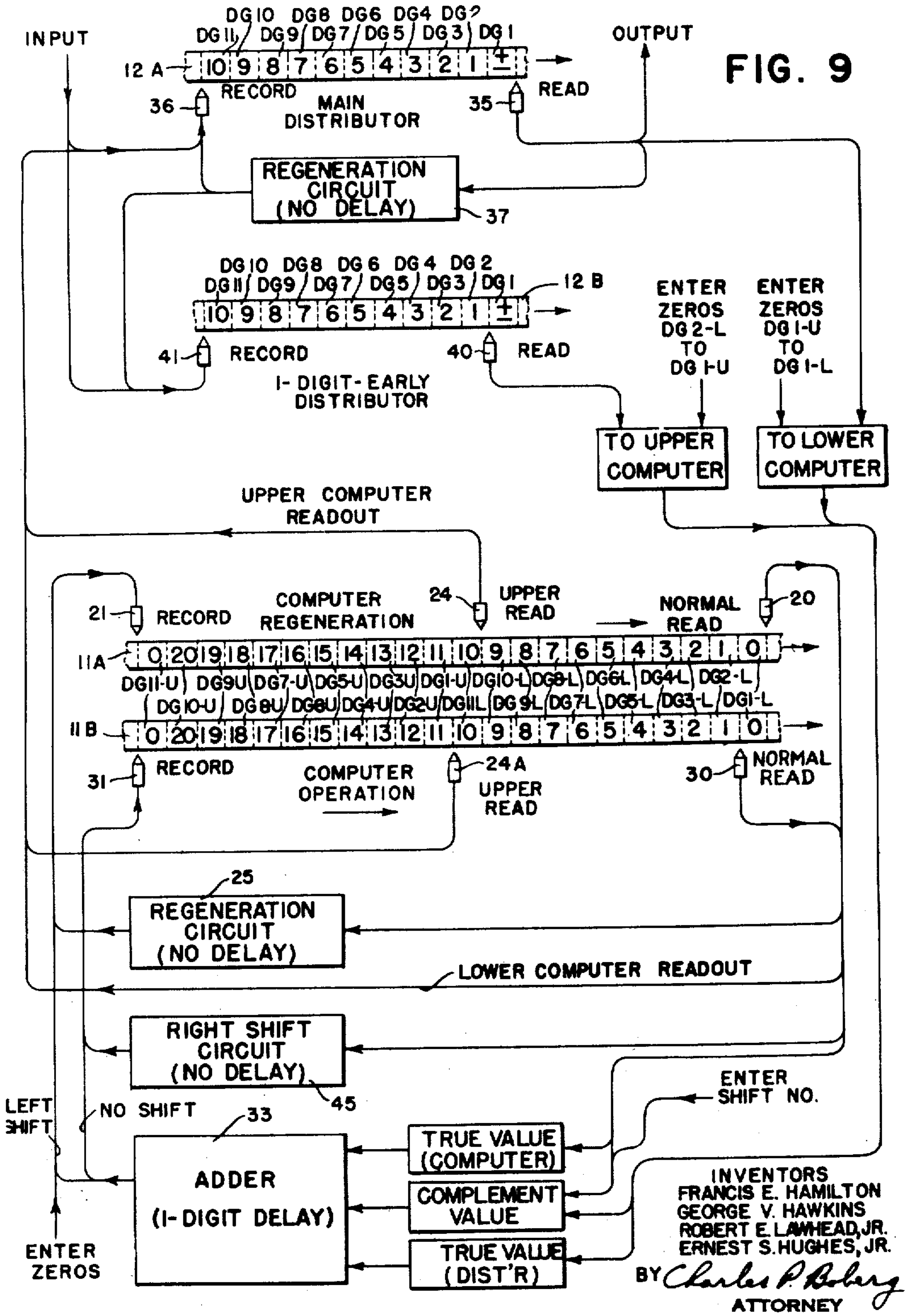

Fig. 9 is a general flow diagram of the computer.

Figure 10:
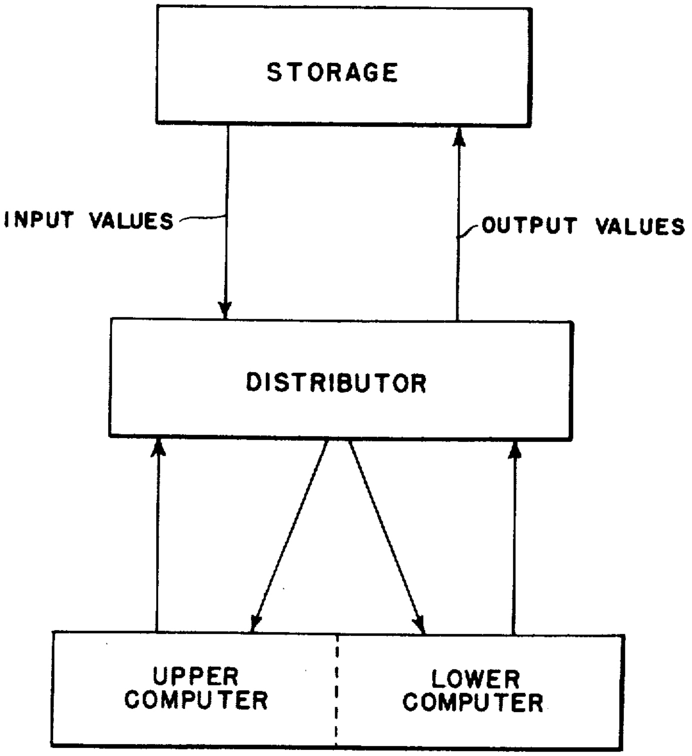

Fig. 10 is a simplified diagrammatic illustration of the computer system.

Figures 11, 12:
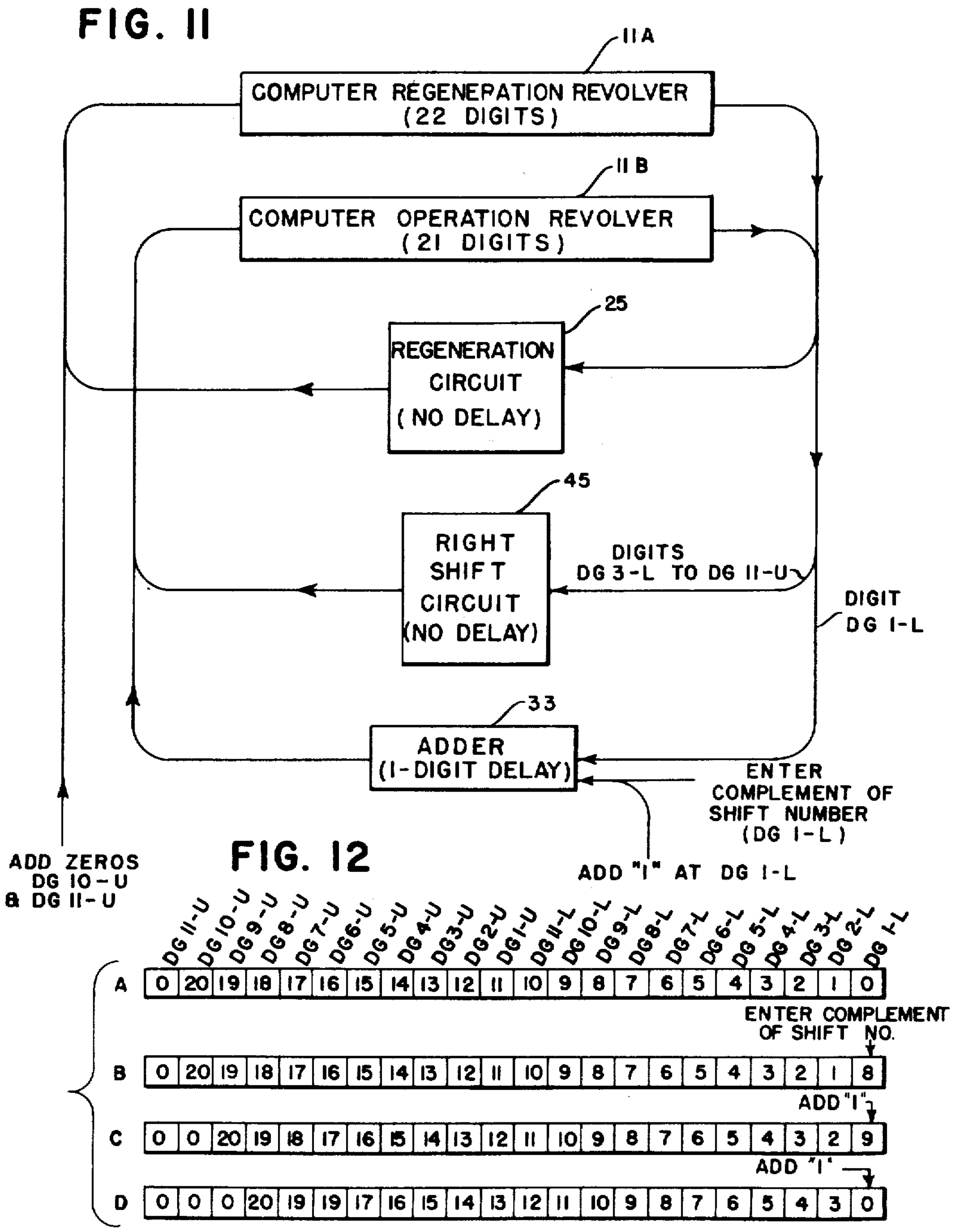

Fig. 11 is a flow diagram for a right-shift operation of the computer.

Fig. 12 is a chart showing the positions of digits in the computer at various stages of the right-shift operation.

Figures 13, 14:
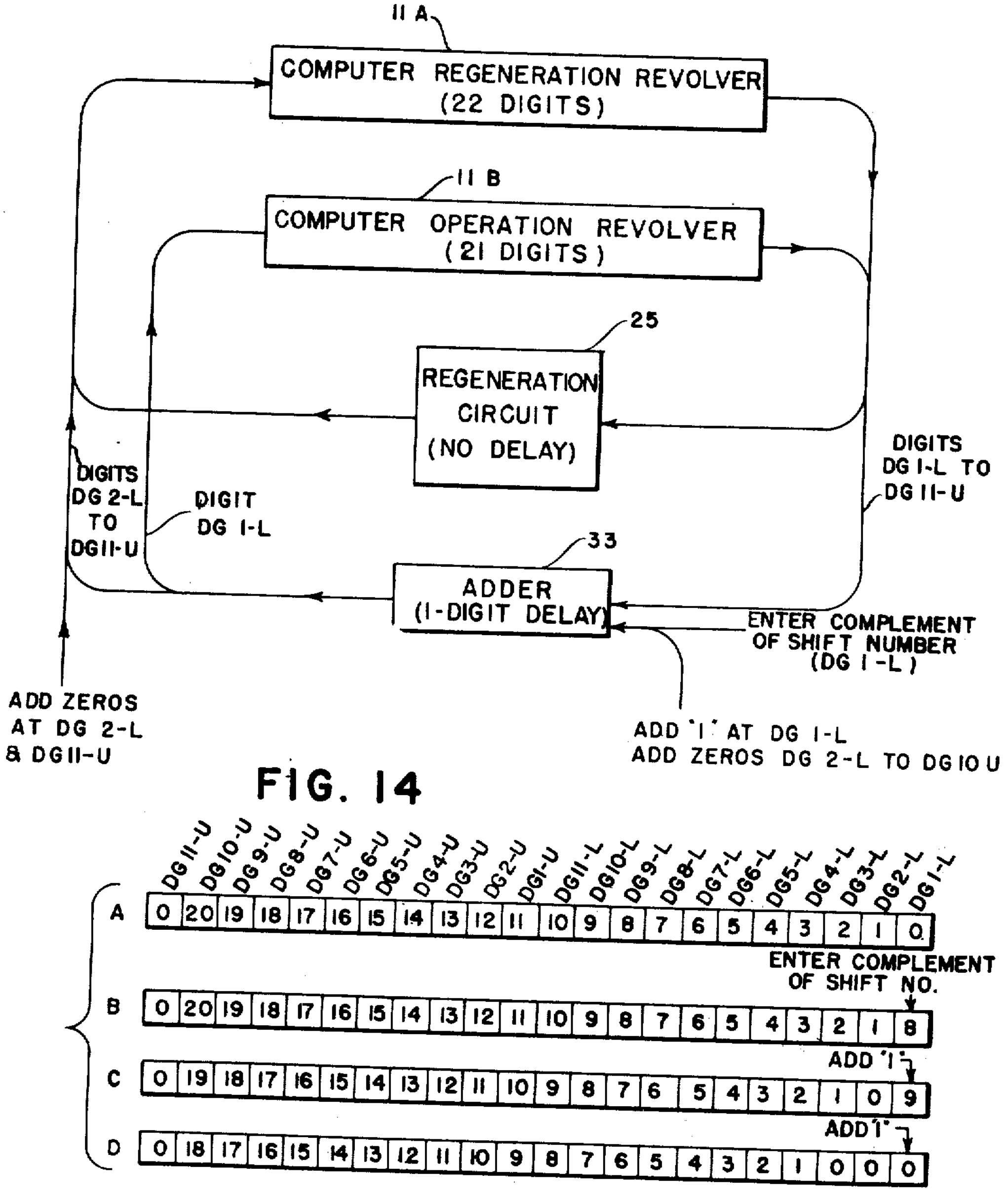

Fig. 13 is a flow diagram for a left-shift operation of the computer.

Fig. 14 is a chart showing the positions of digits in the computer at various stages of the left-shift operation.

Figure 15:
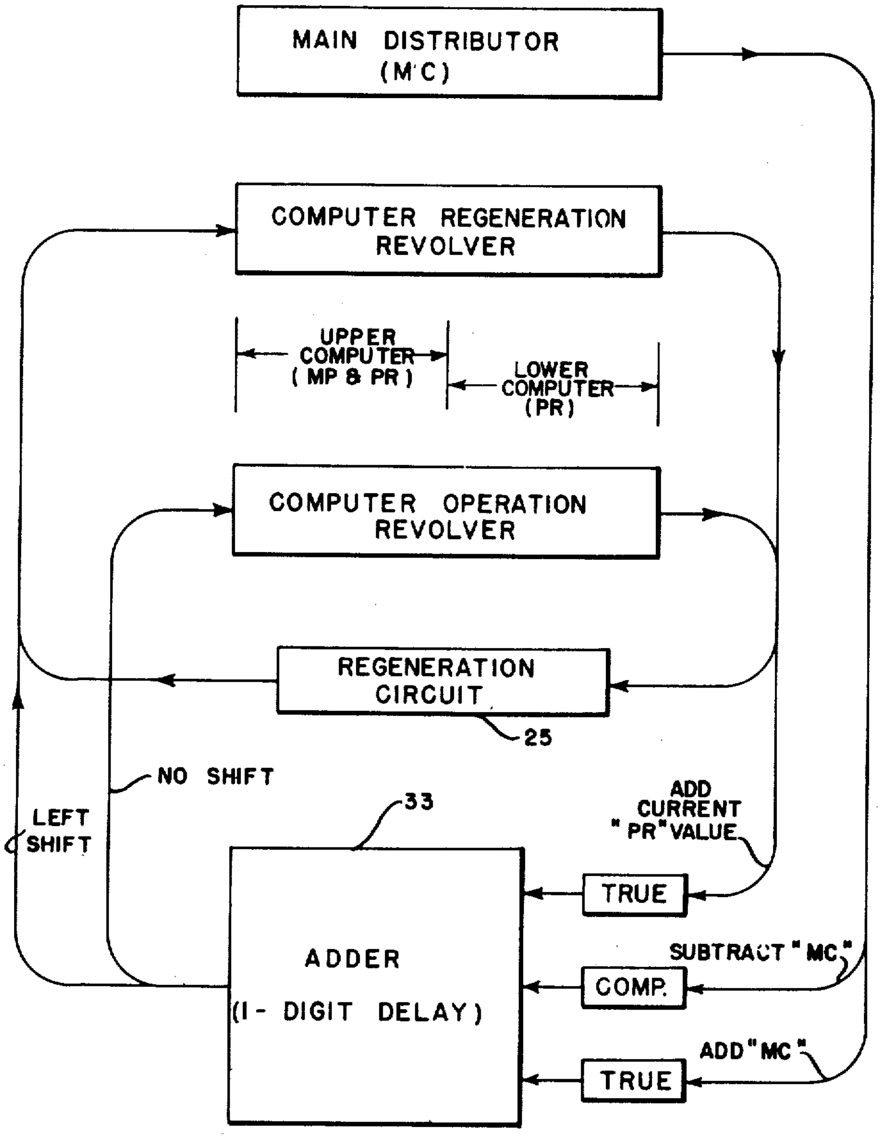

Fig. 15 is a flow diagram for a multiplication process performed by the computer.

Fig. 16 is an operational chart for a typical problem in multiplication.

Figure 17:
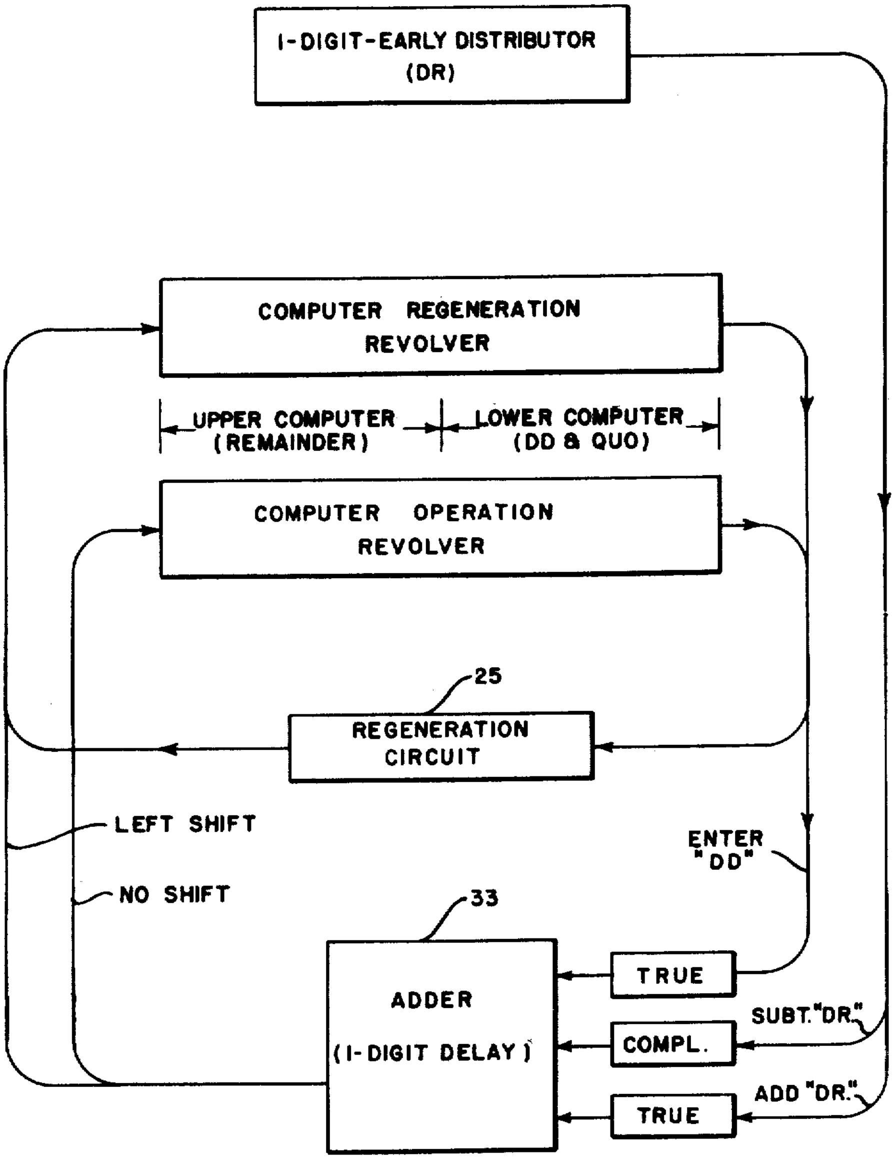

Fig. 17 is a flow diagram for a division process performed by the computer.

Figure 18:
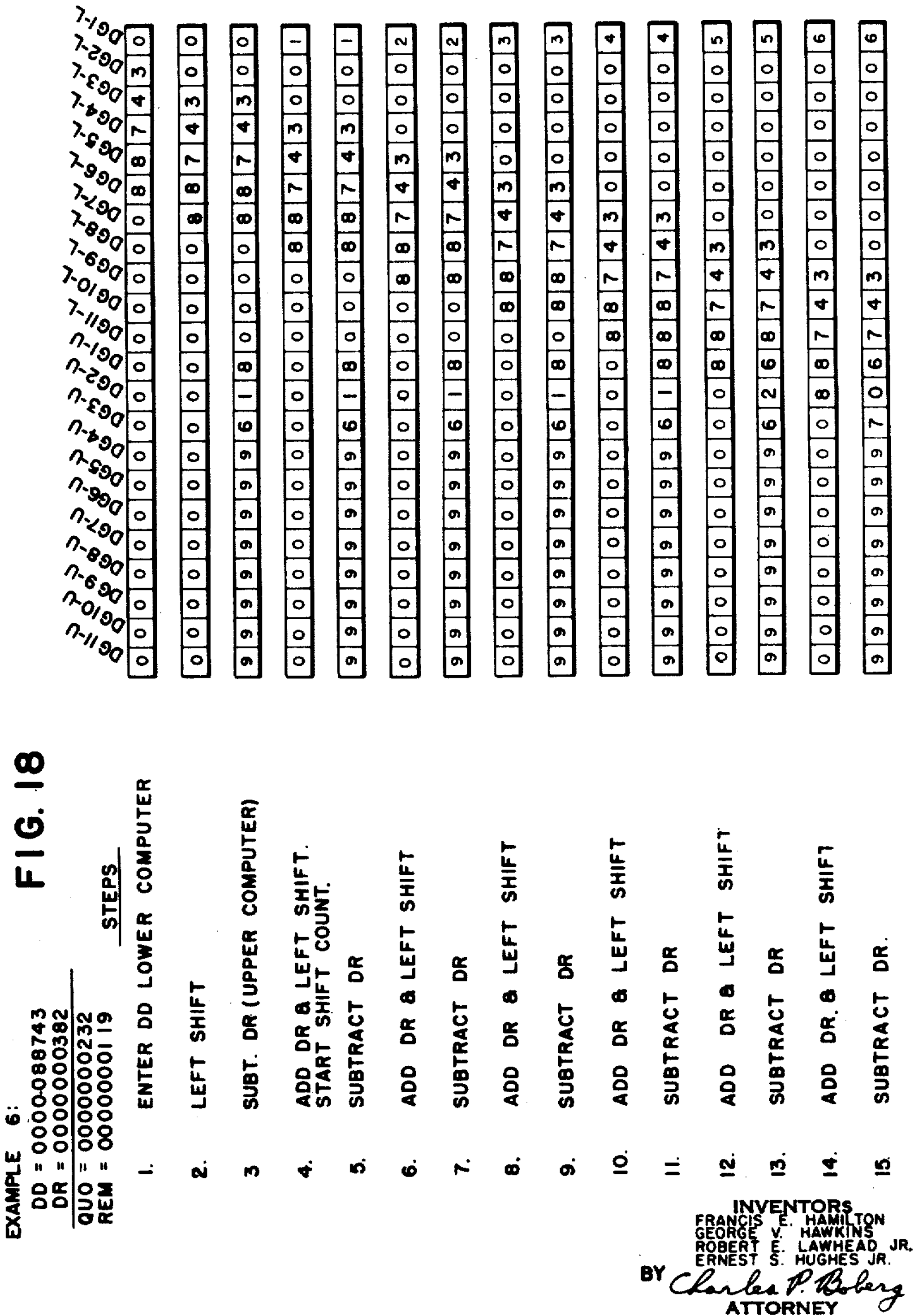
Figure 18A:
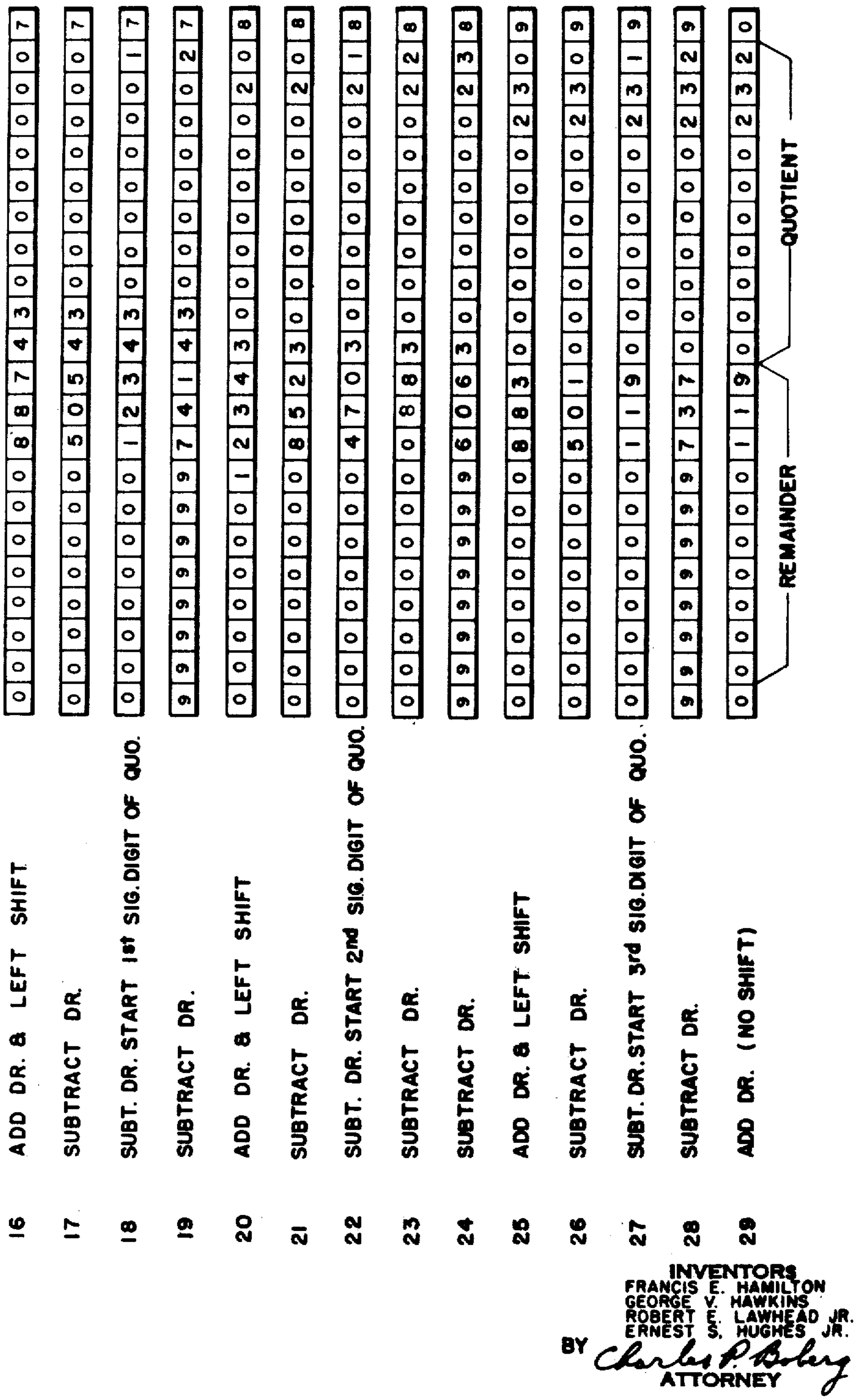

Figs. 18 and 18A together constitute an operational chart for a typical problem in division.

Figure 19:
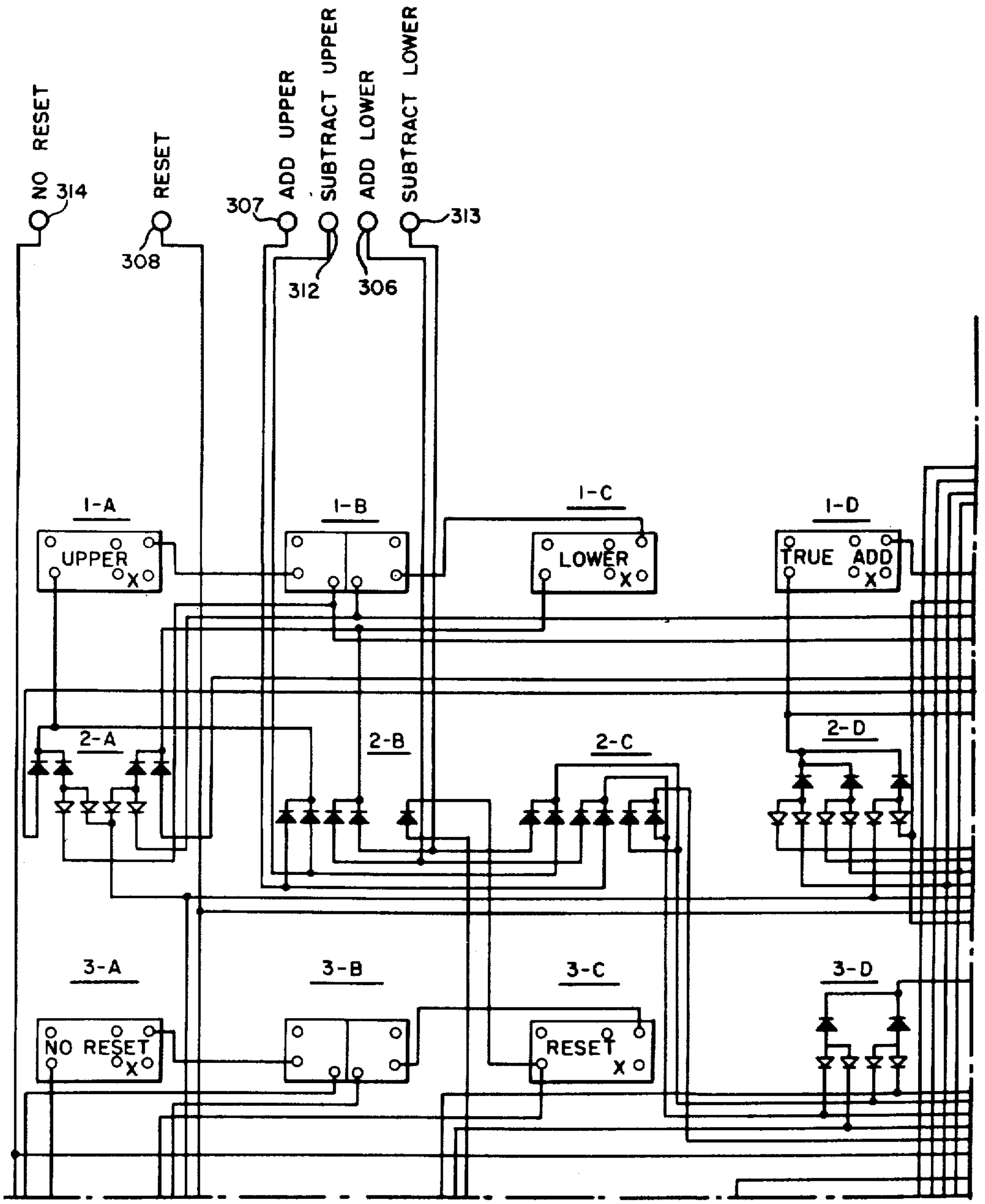

Figs. 19 to H, J to N, and P to 19S, inclusive, constitute a block diagram of the circuits in the main computer chassis.

Figure 19A:
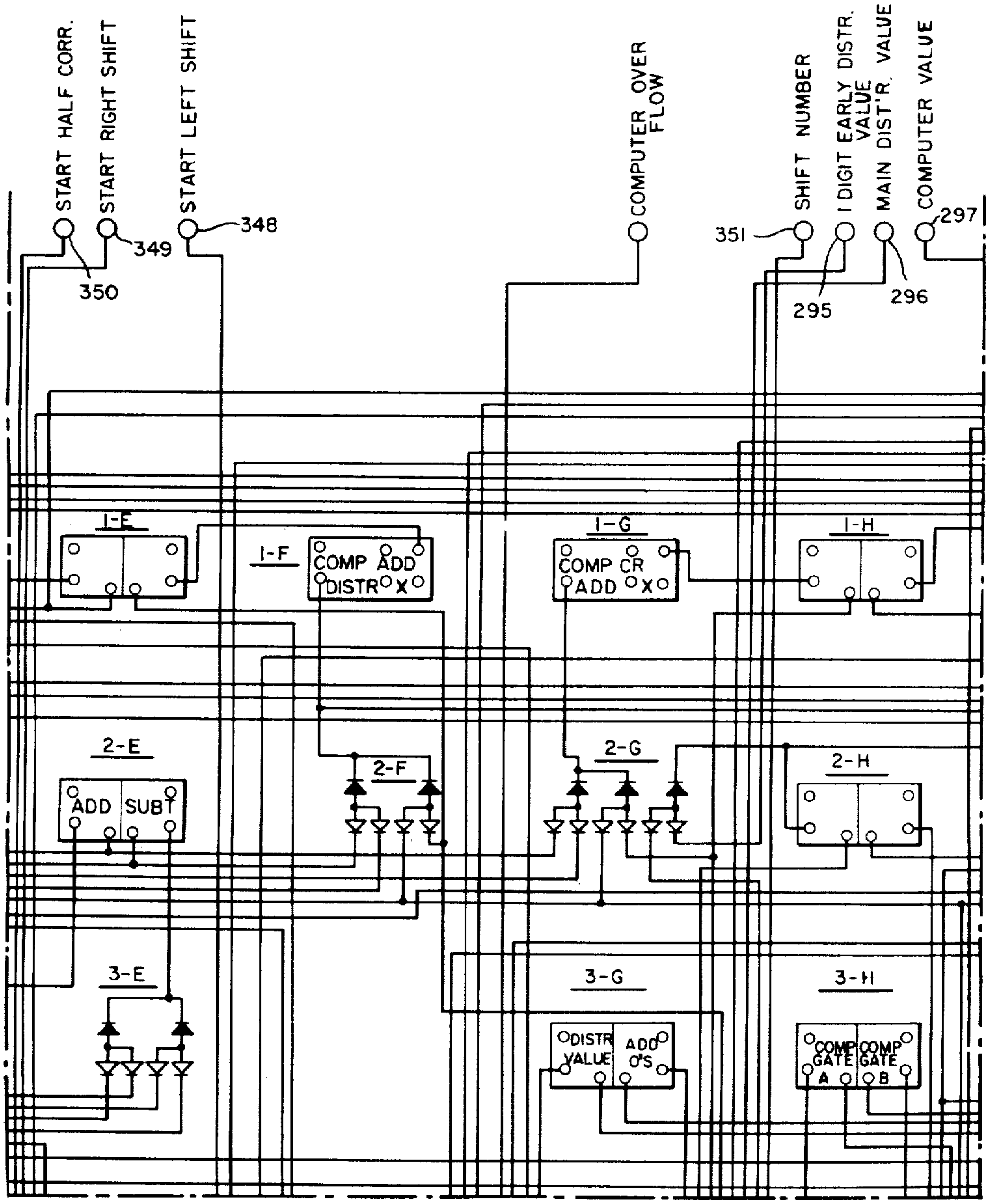
Figure 19B:
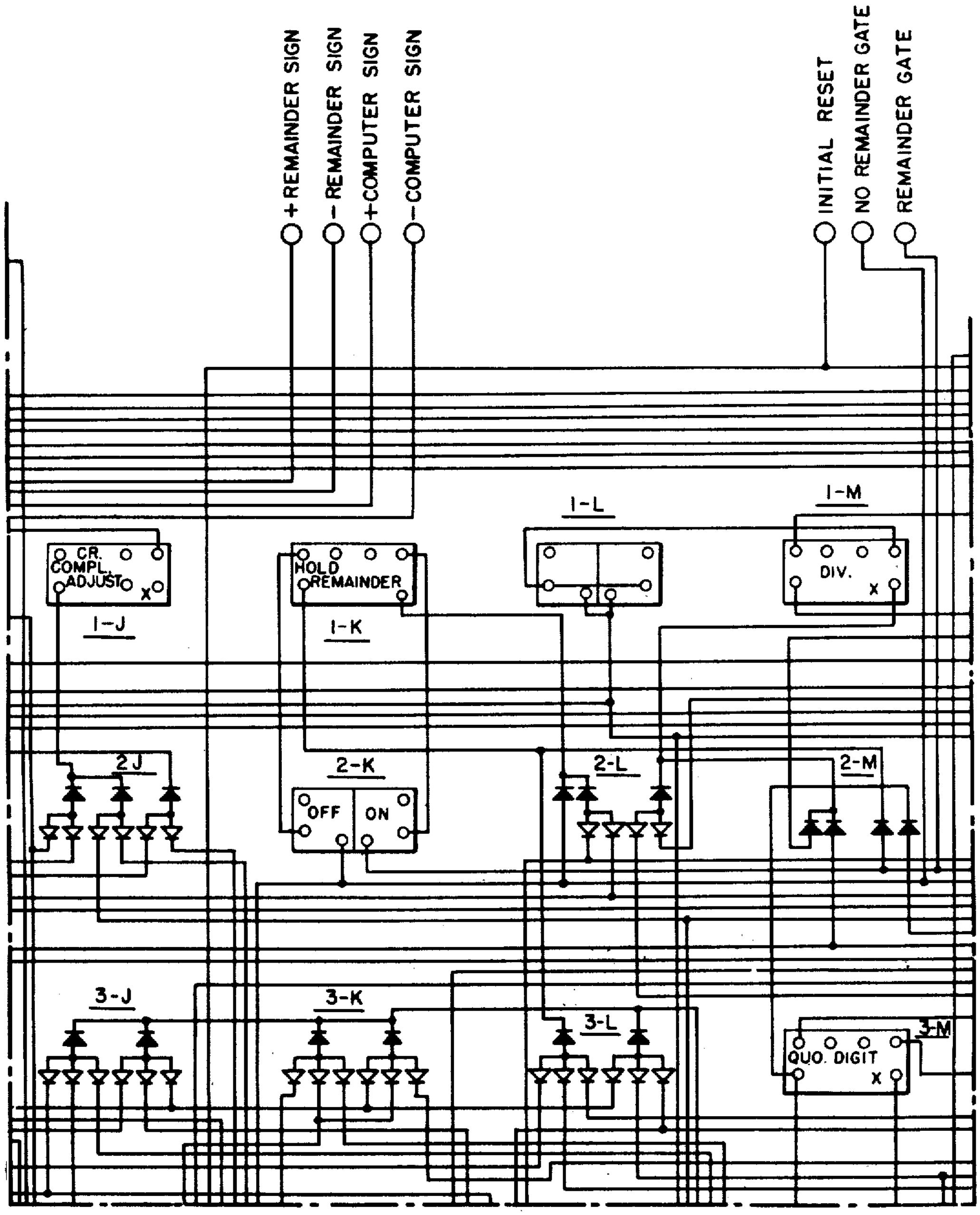
Figure 19C:
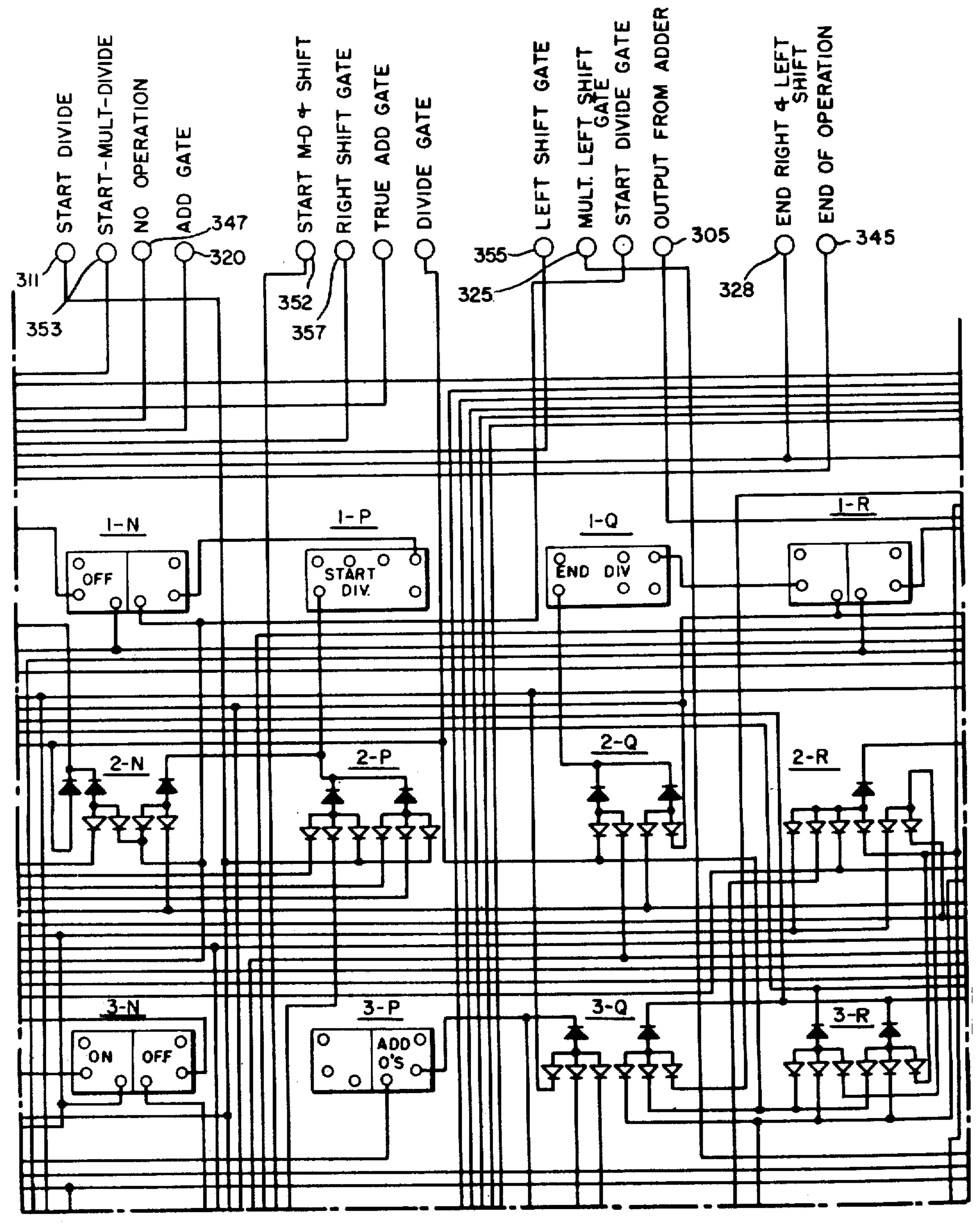
Figure 19D:
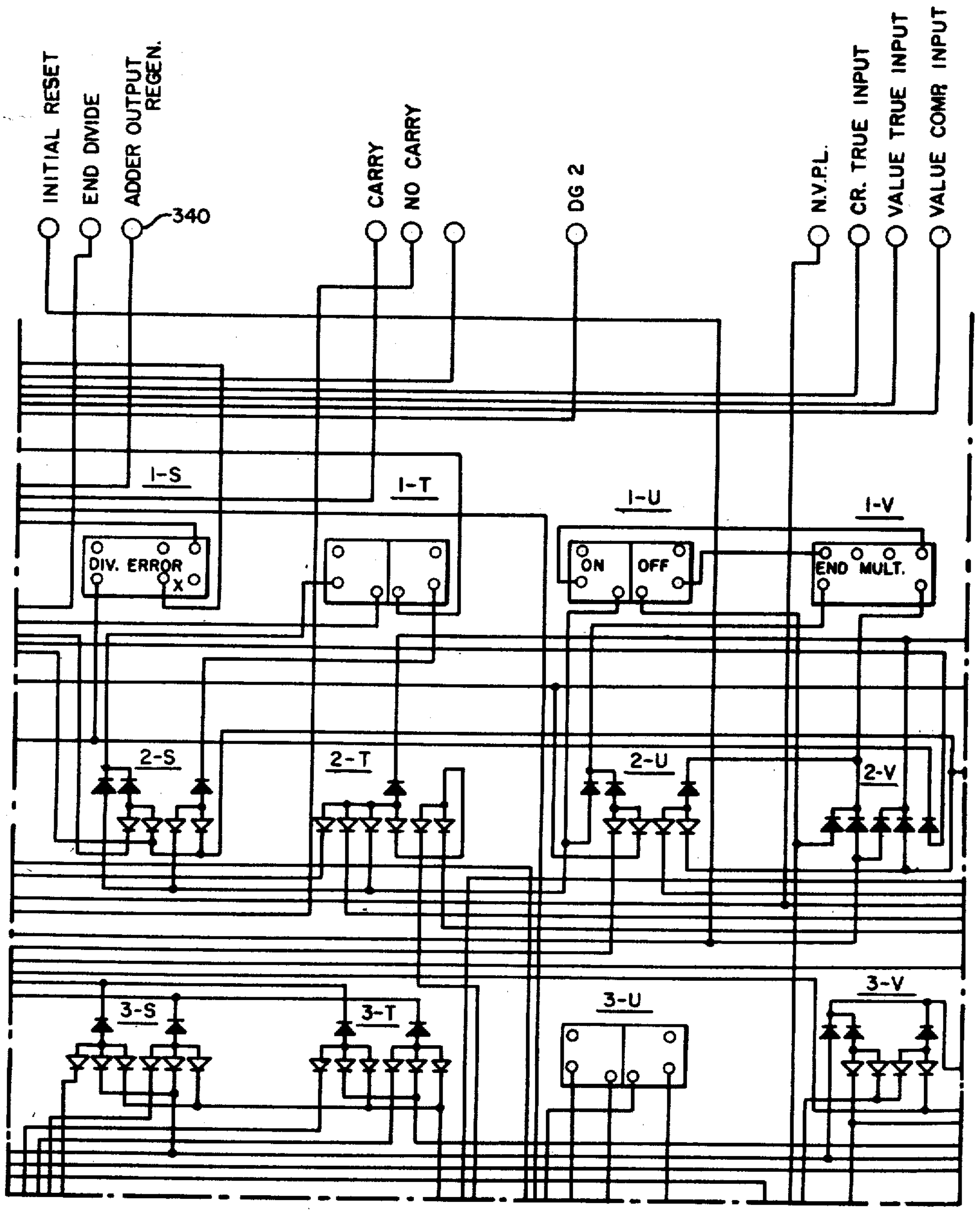
Figure 19E:
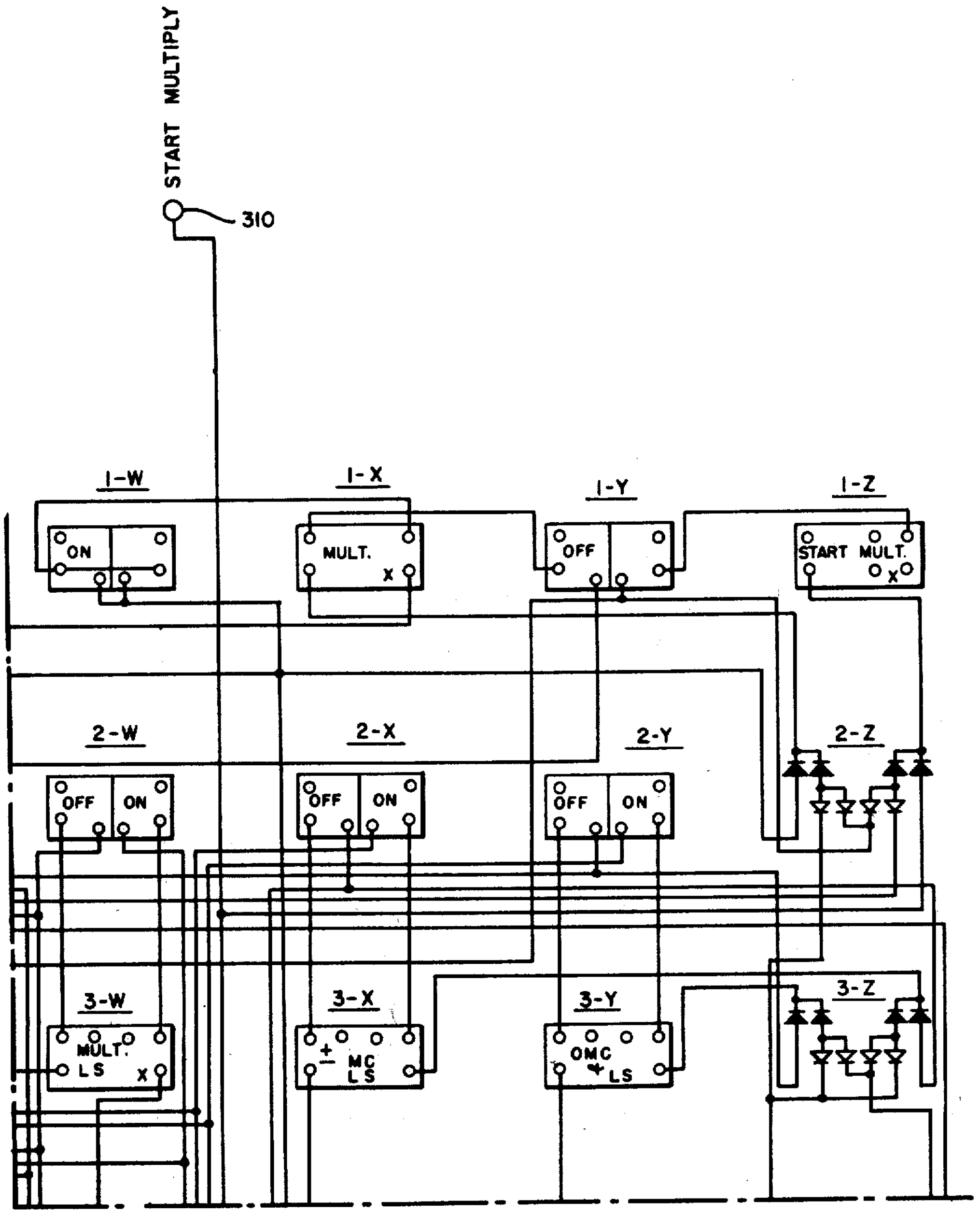
Figure 19F:
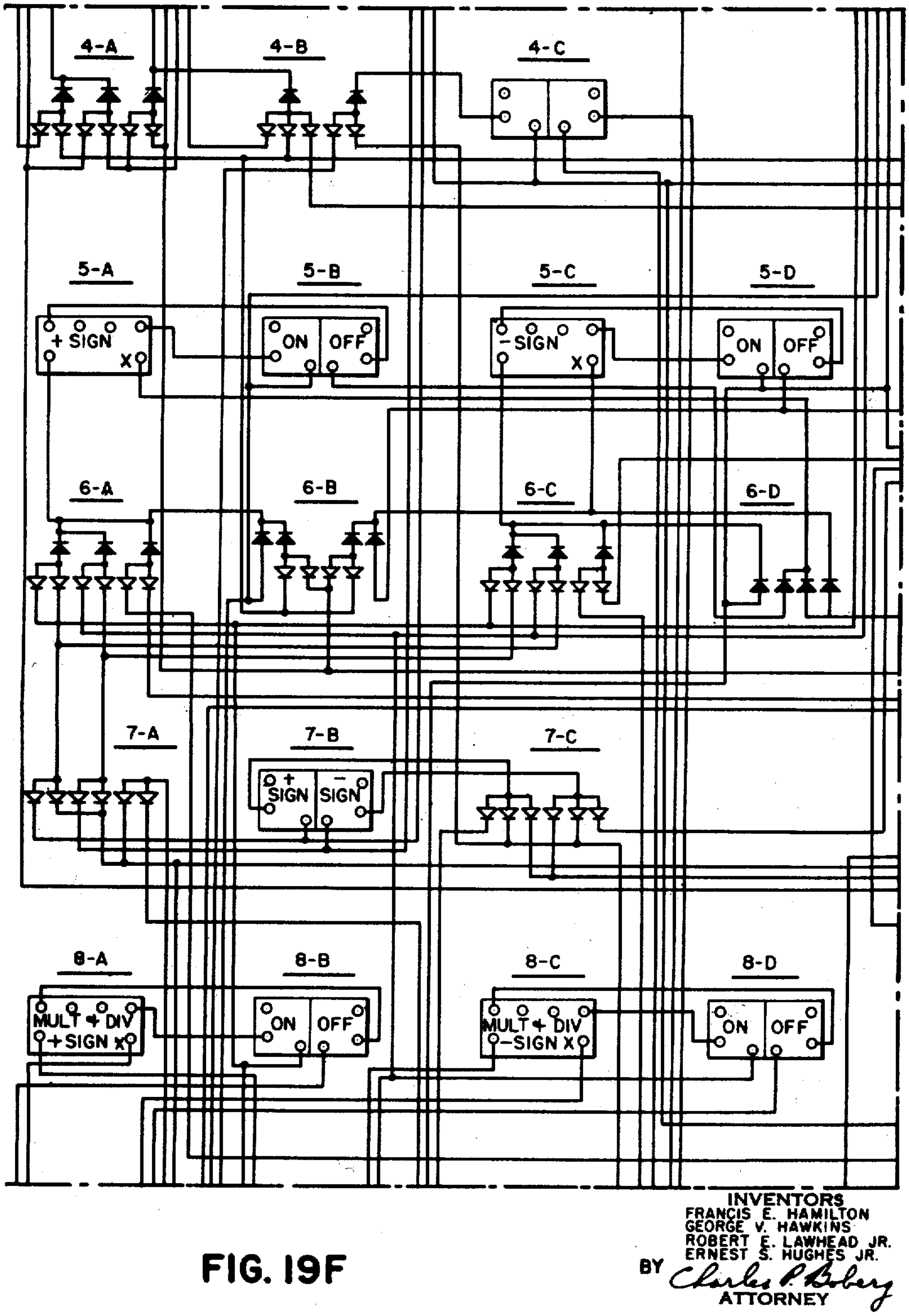
Figure 19G:
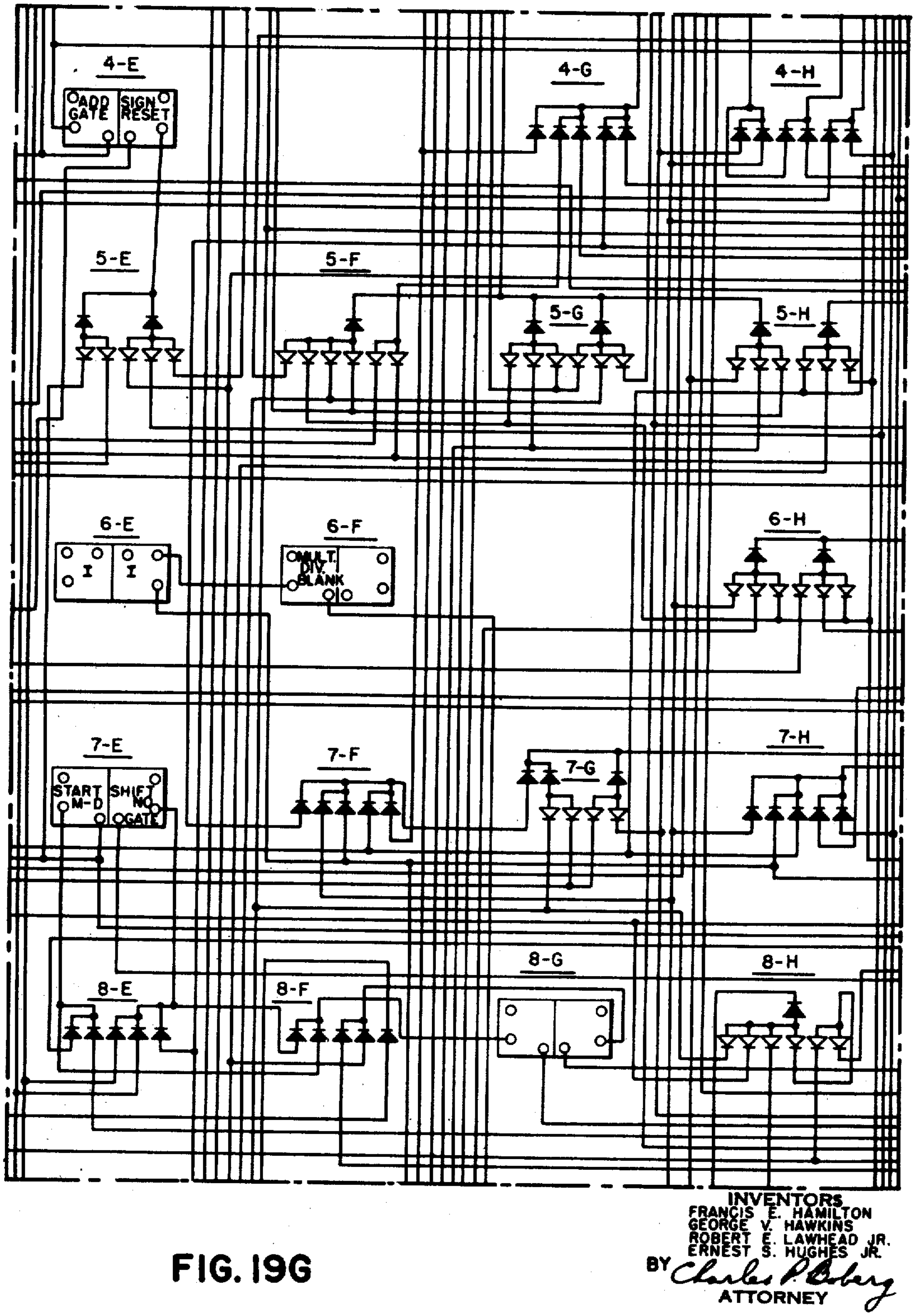
Figure 19H:
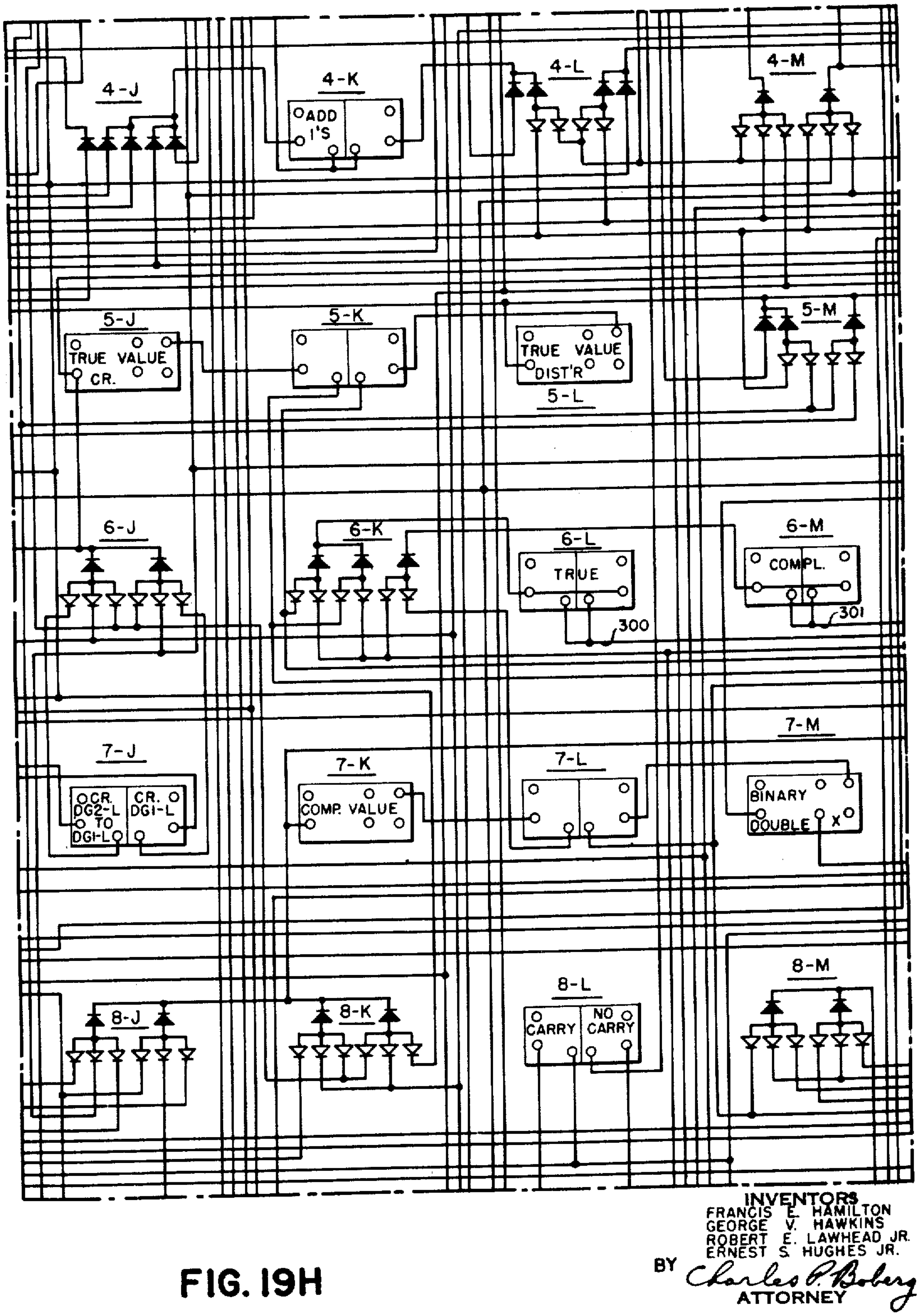
Figure 19J:
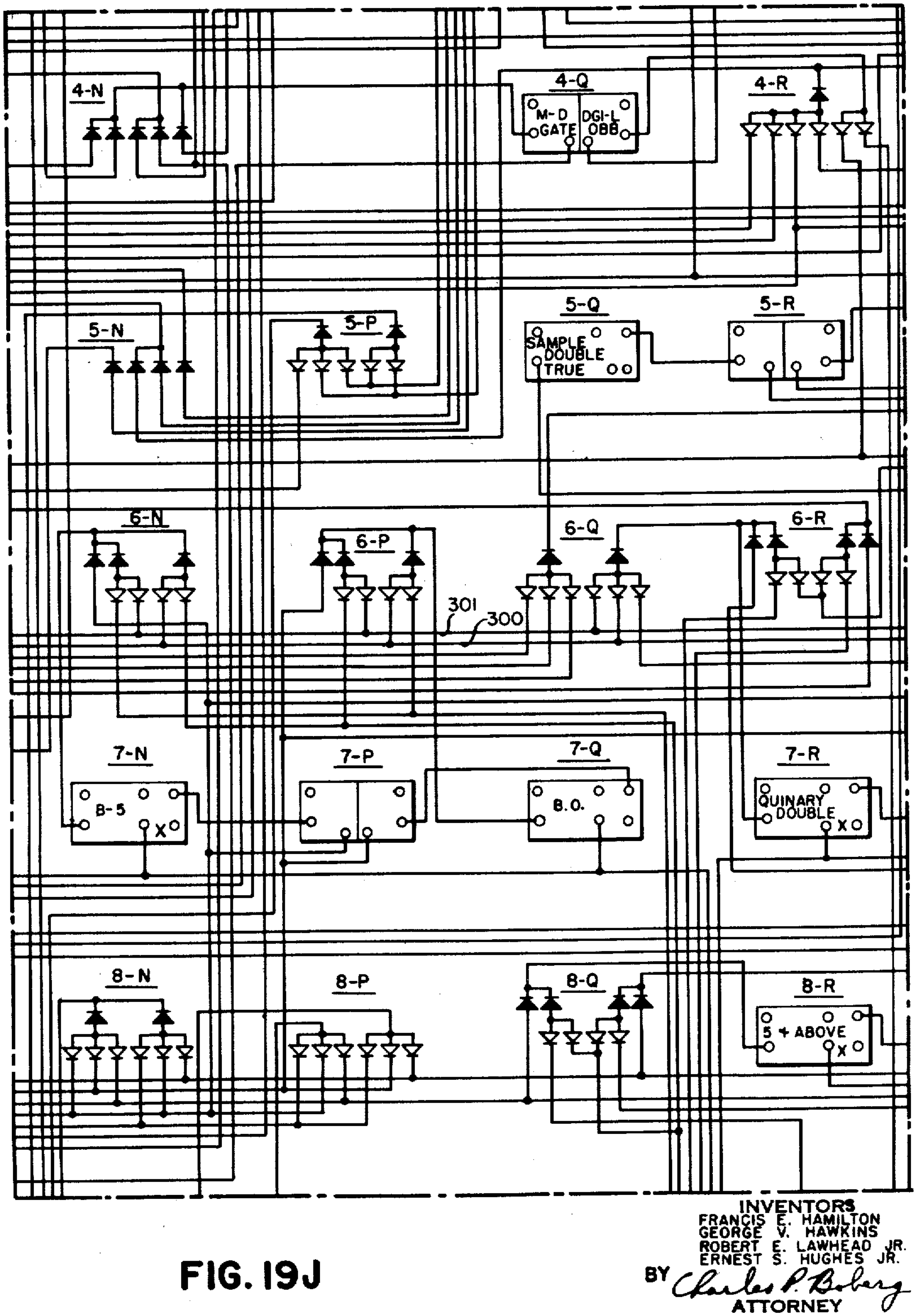
Figure 19K:
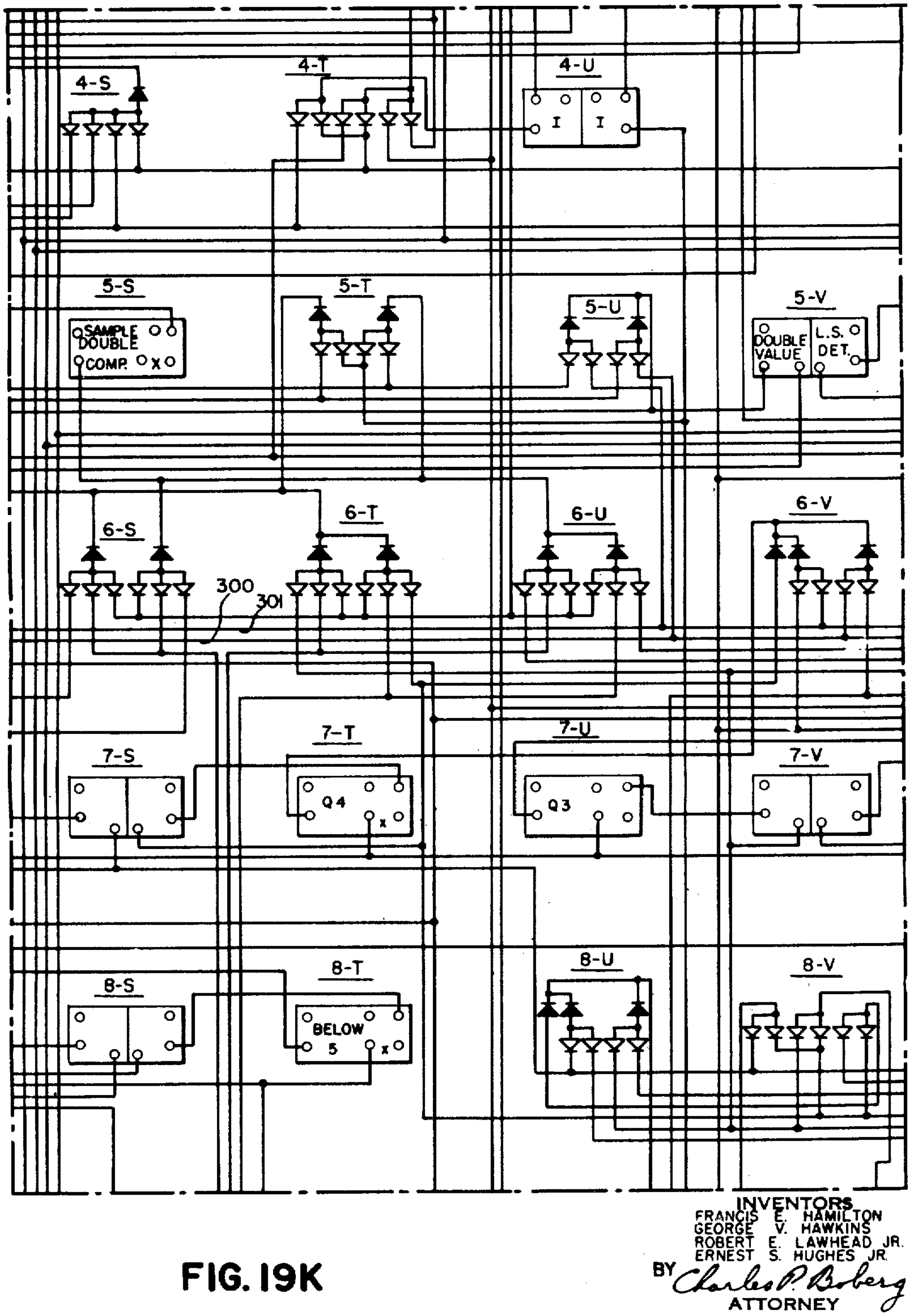
Figure 19L:
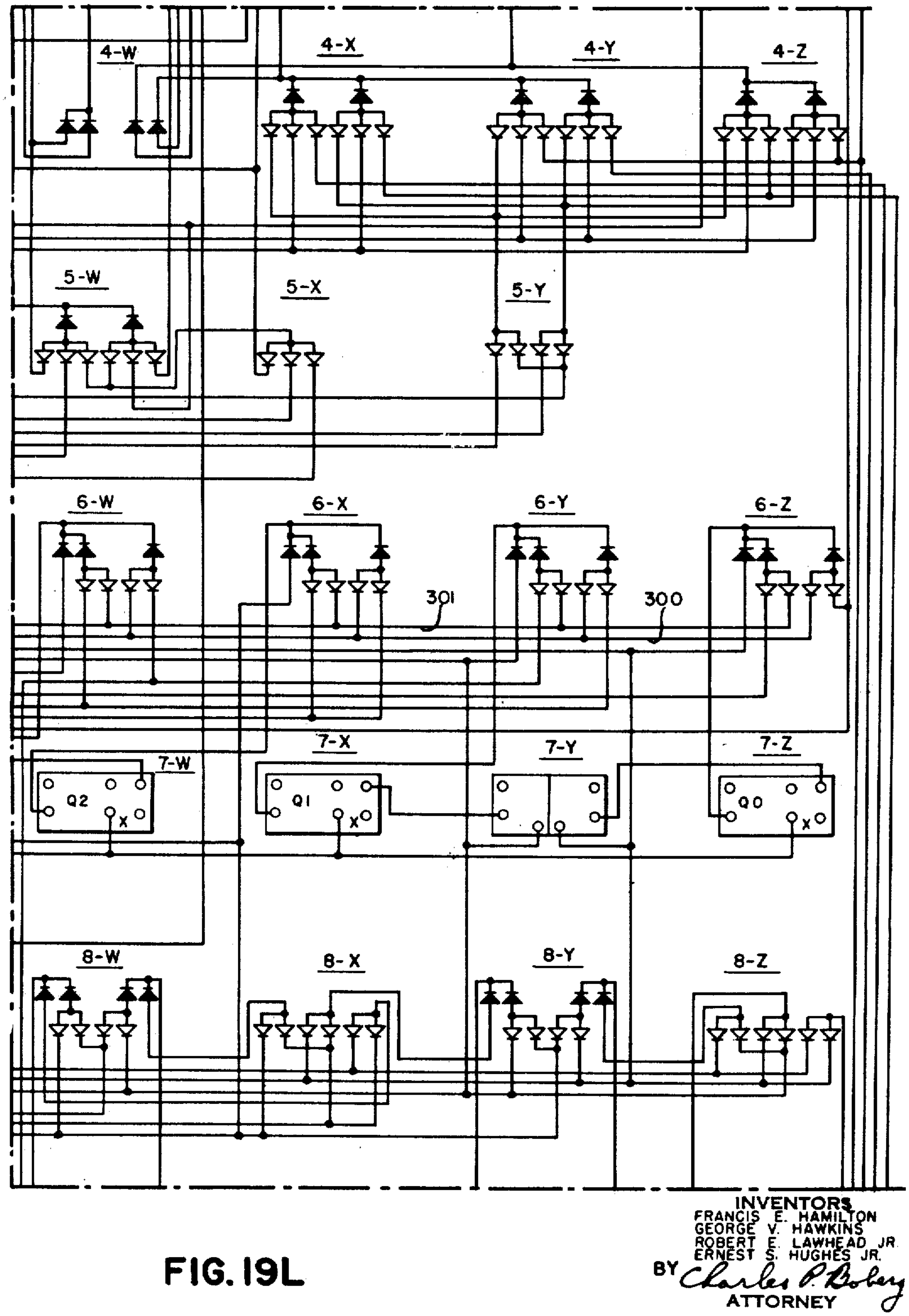
Figure 19M:
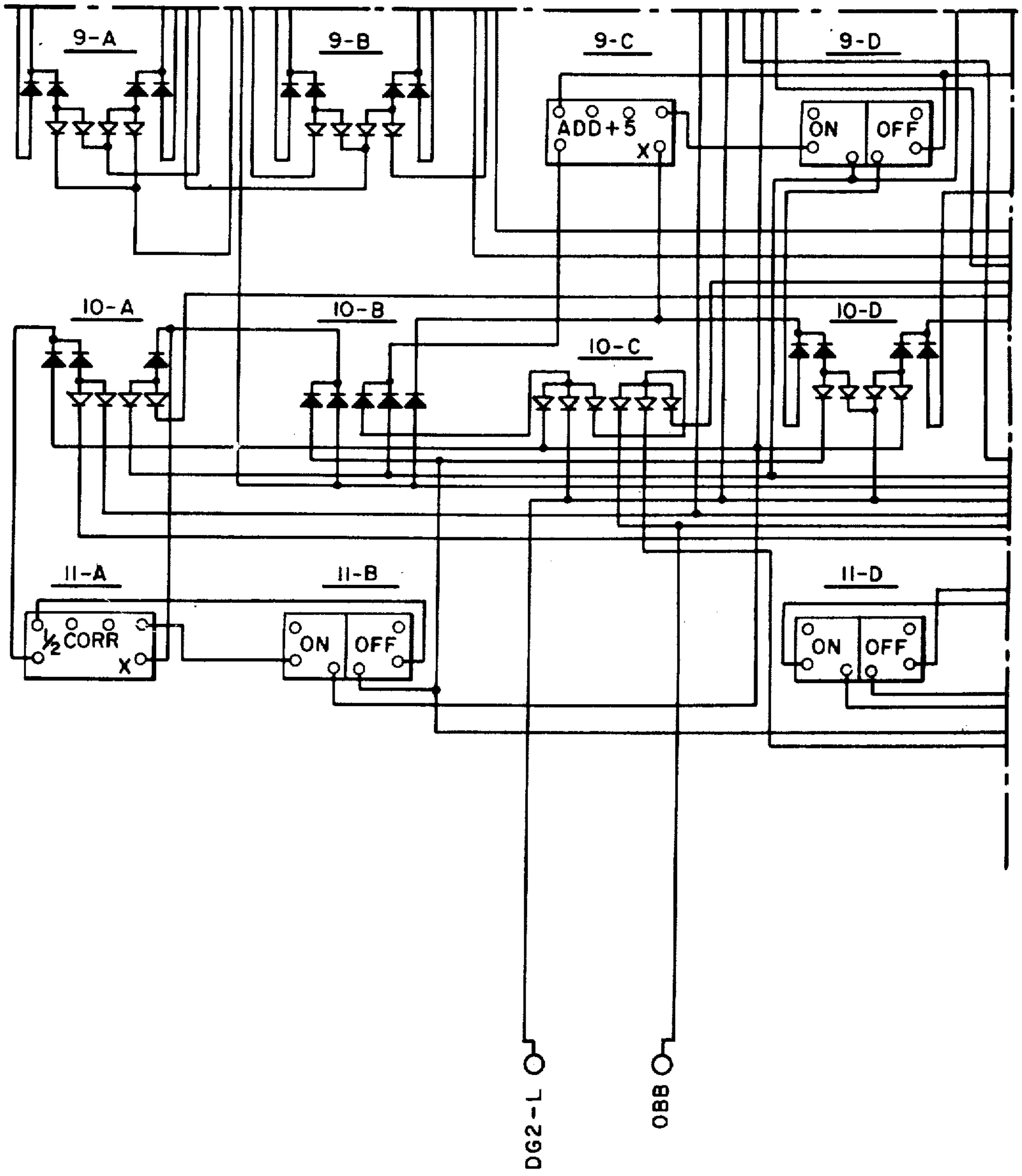
Figure 19N:
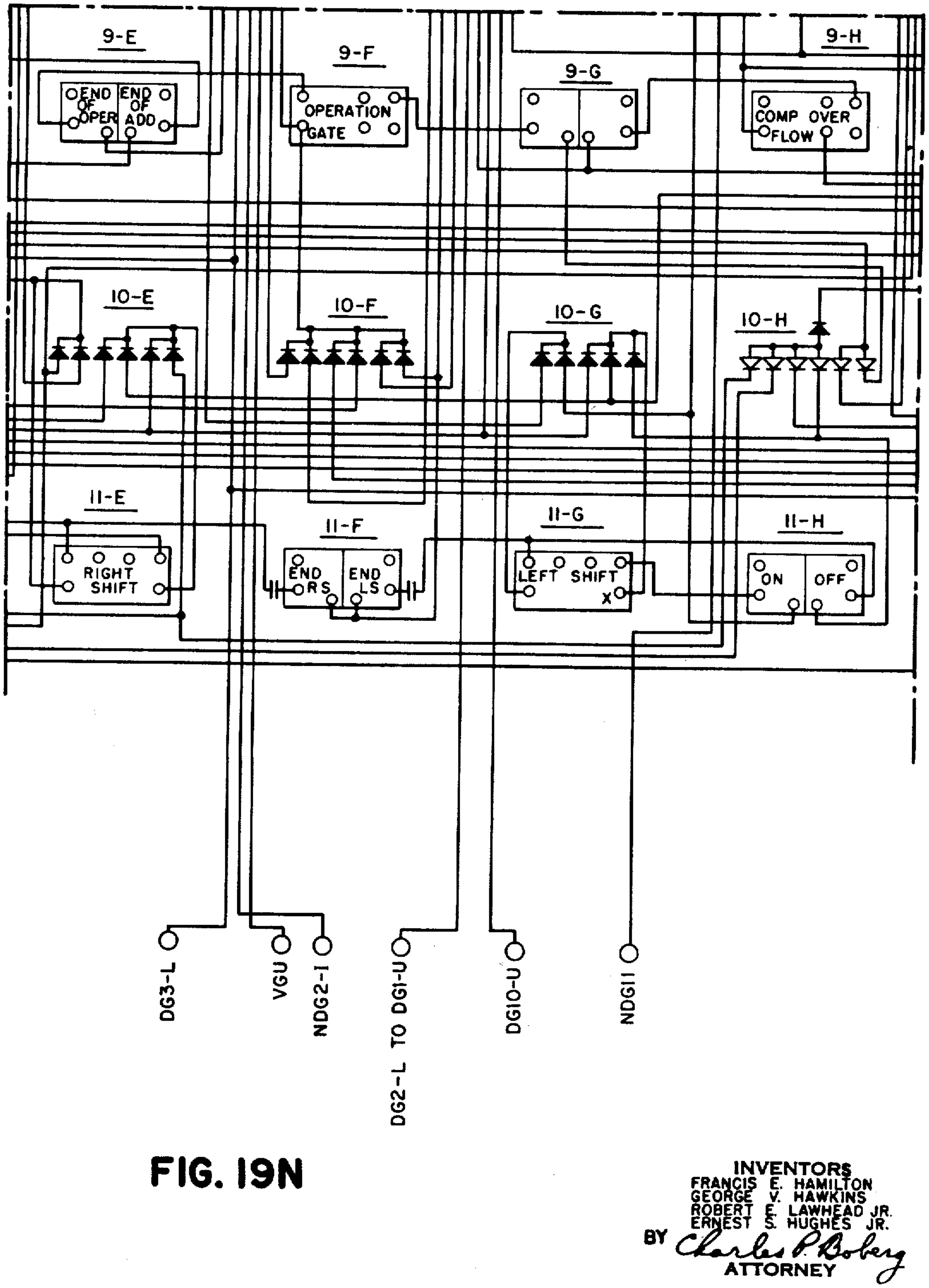
Figure 19P:
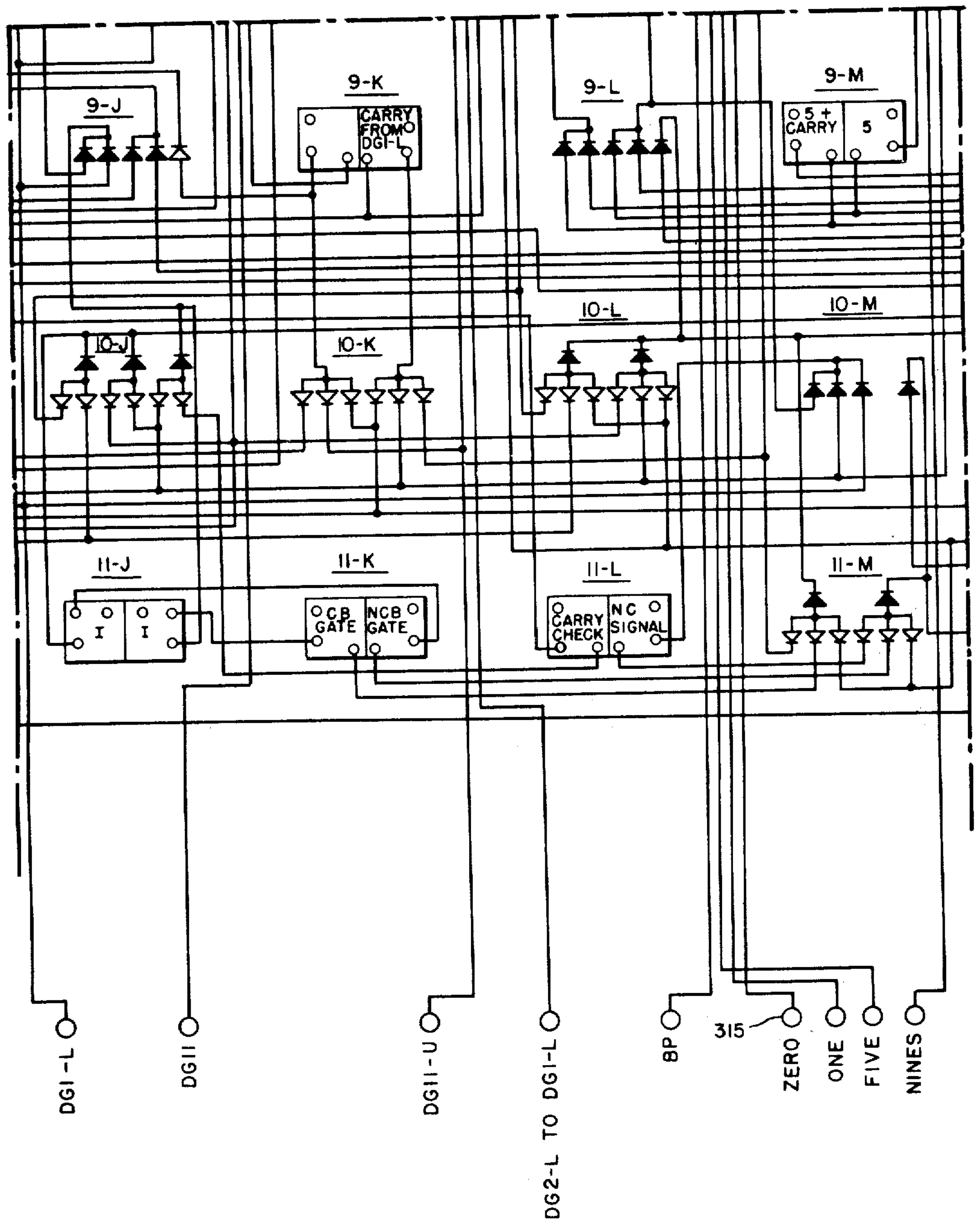
Figure 19Q:
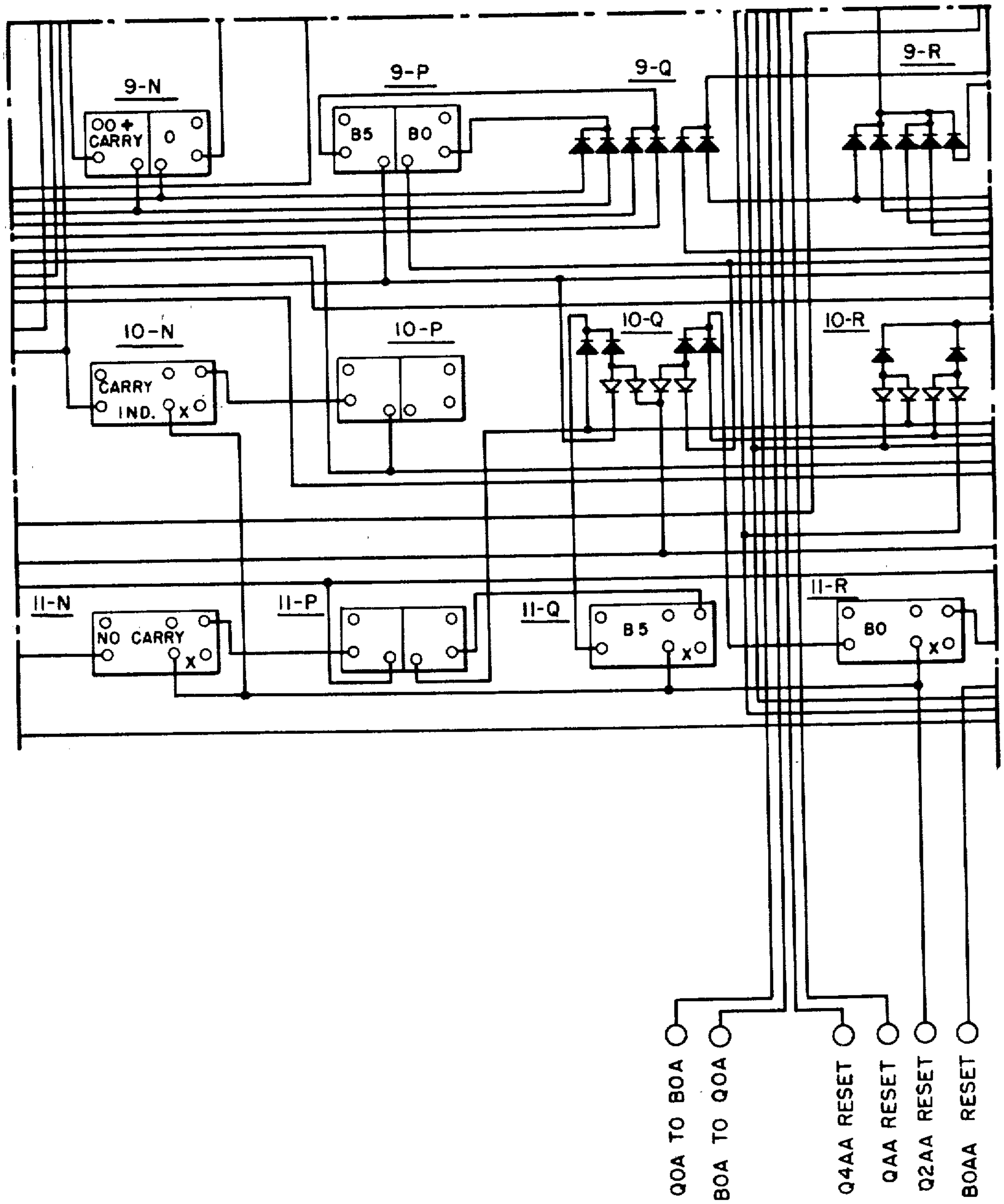
Figure 19R:
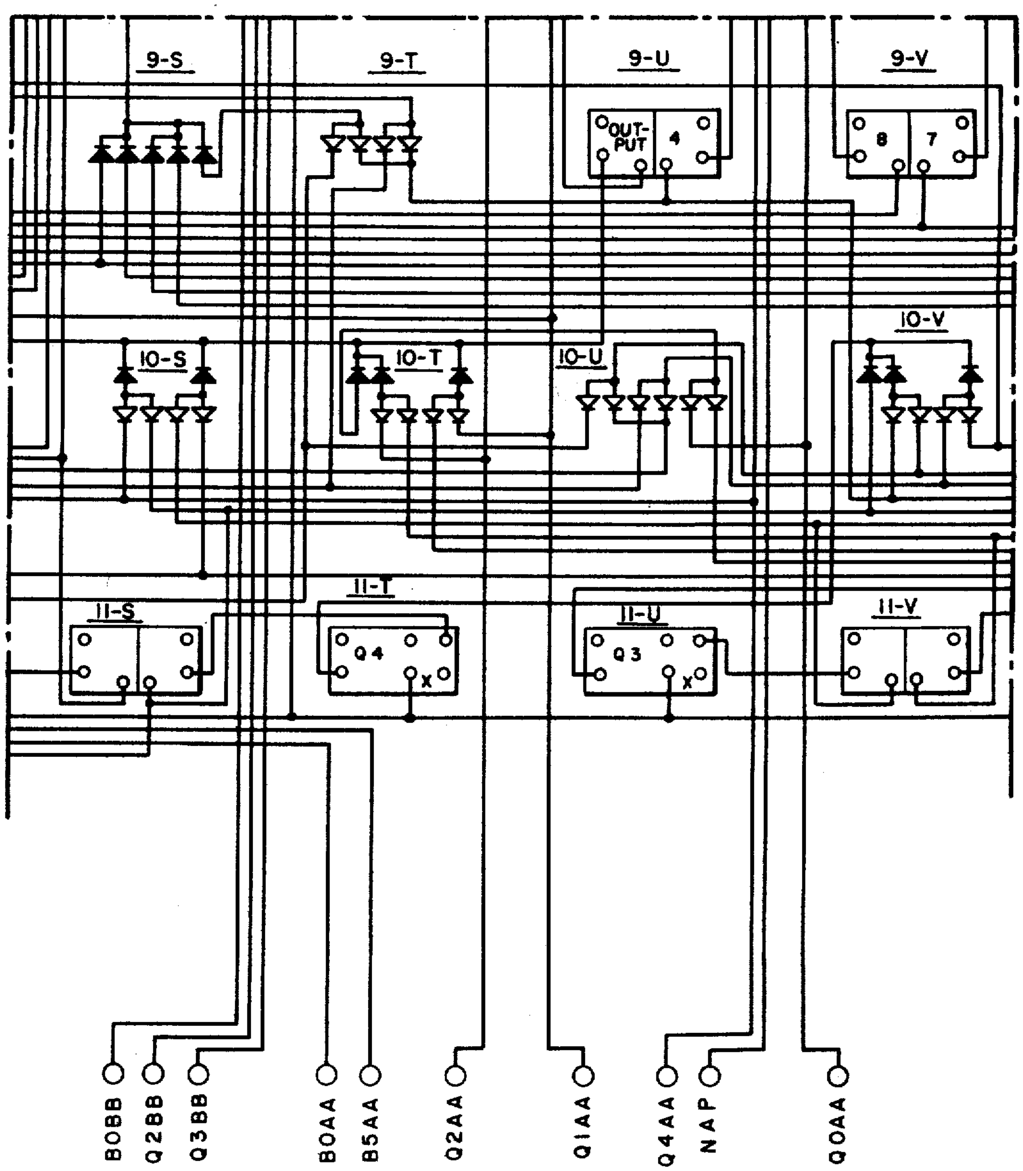
Figure 19S:
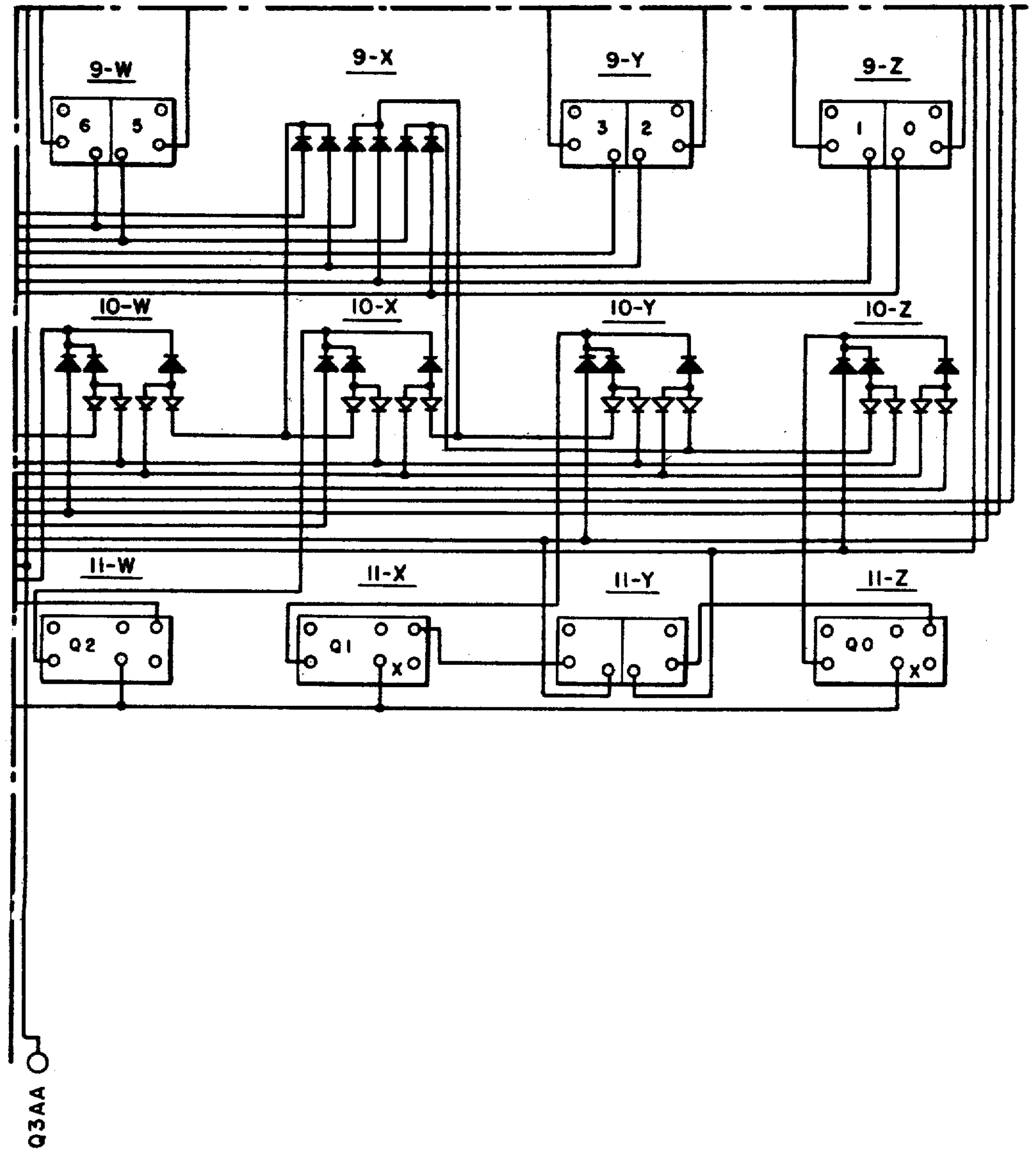
Figure 20:
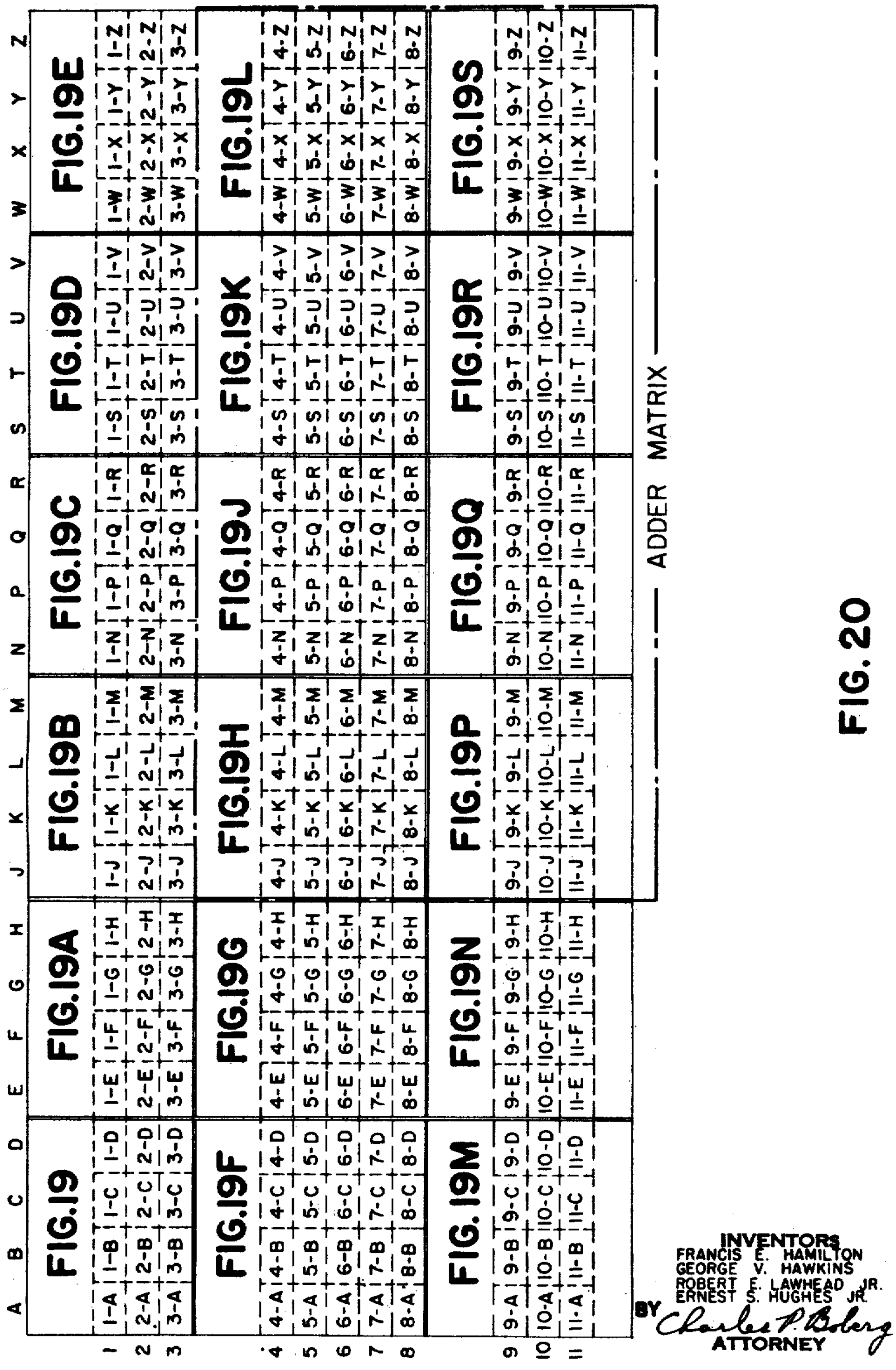

Fig. 20 is a diagram showing the manner in which Figs. 19–19S should be joined together, and also indicating the locations of the circuit elements in the respective views.

Figs. 21 through 37, inclusive, are detailed circuit diagrams of the various circuit elements which are shown in the various block diagrams.

Figure 38:
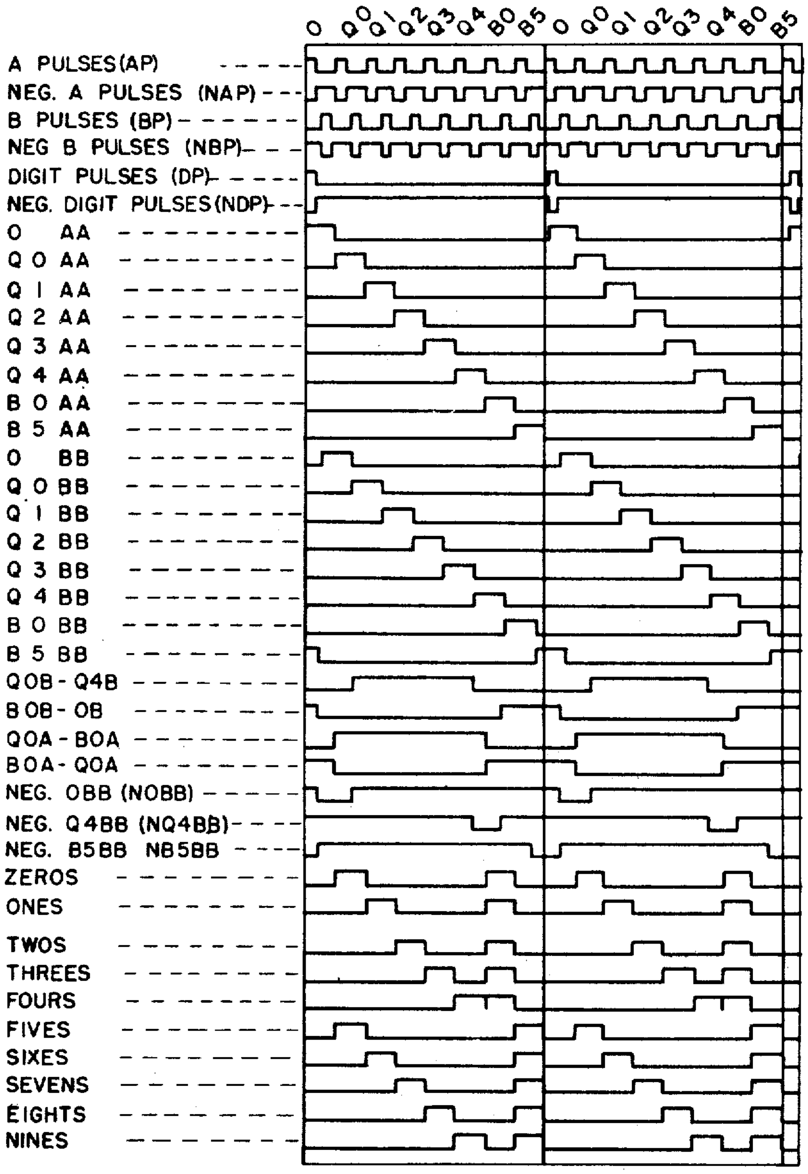
Figure 38A:
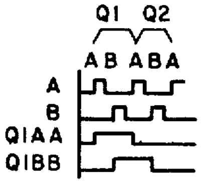
Figure 39:
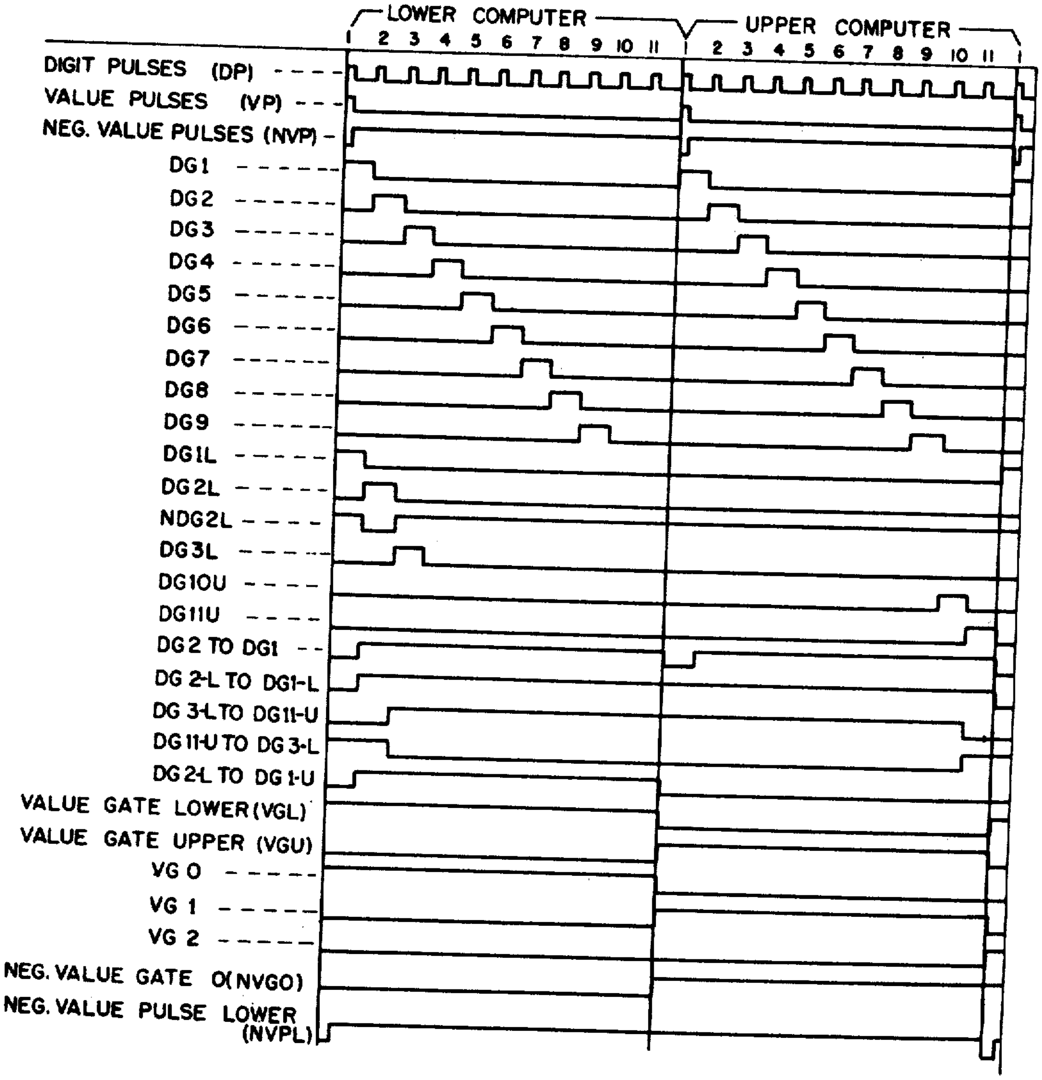

Figs. 38, 38A and 39 are timing diagrams showing the relationships of various timing pulses used by the computer.

Figure 40:
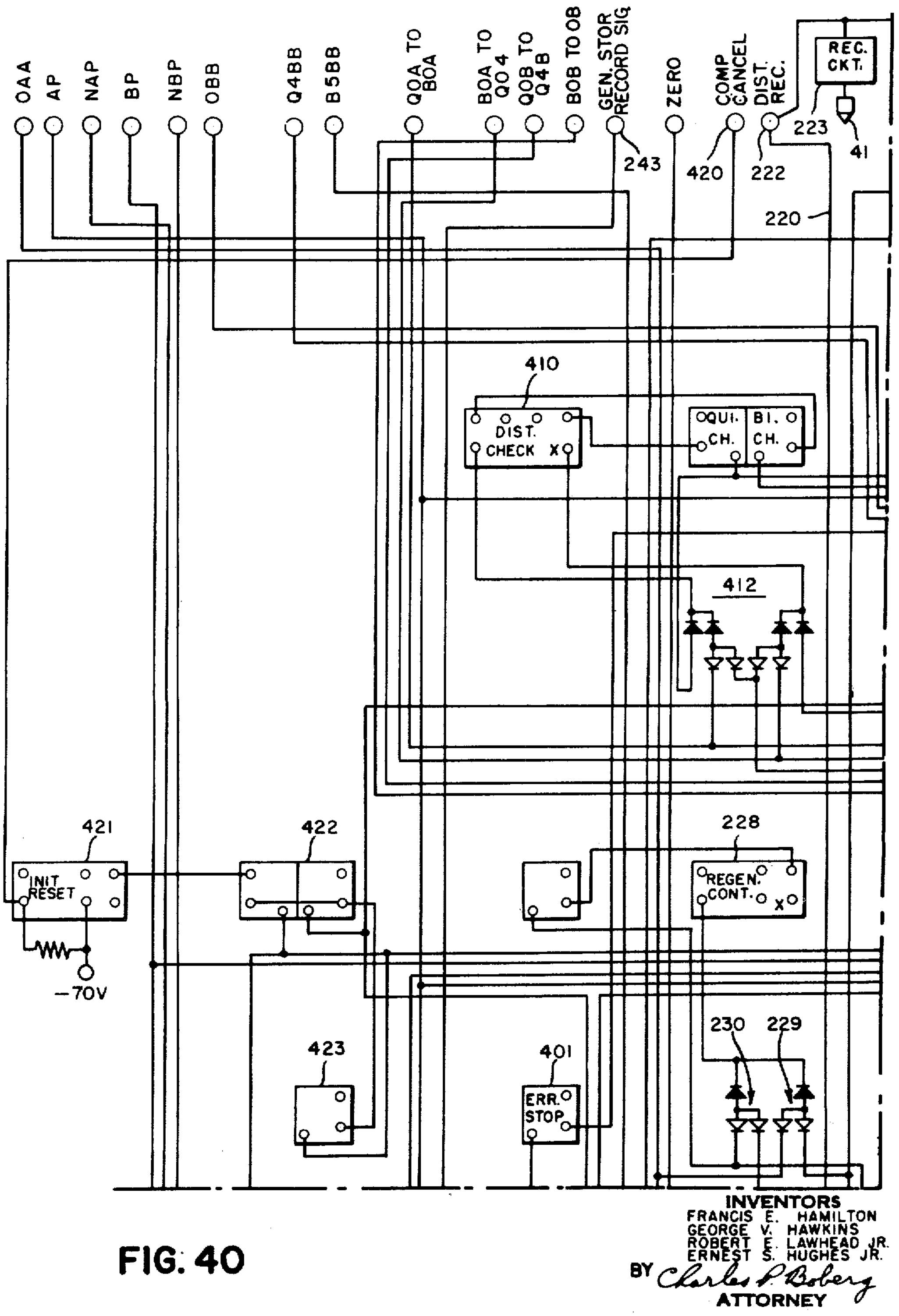
Figure 40A:
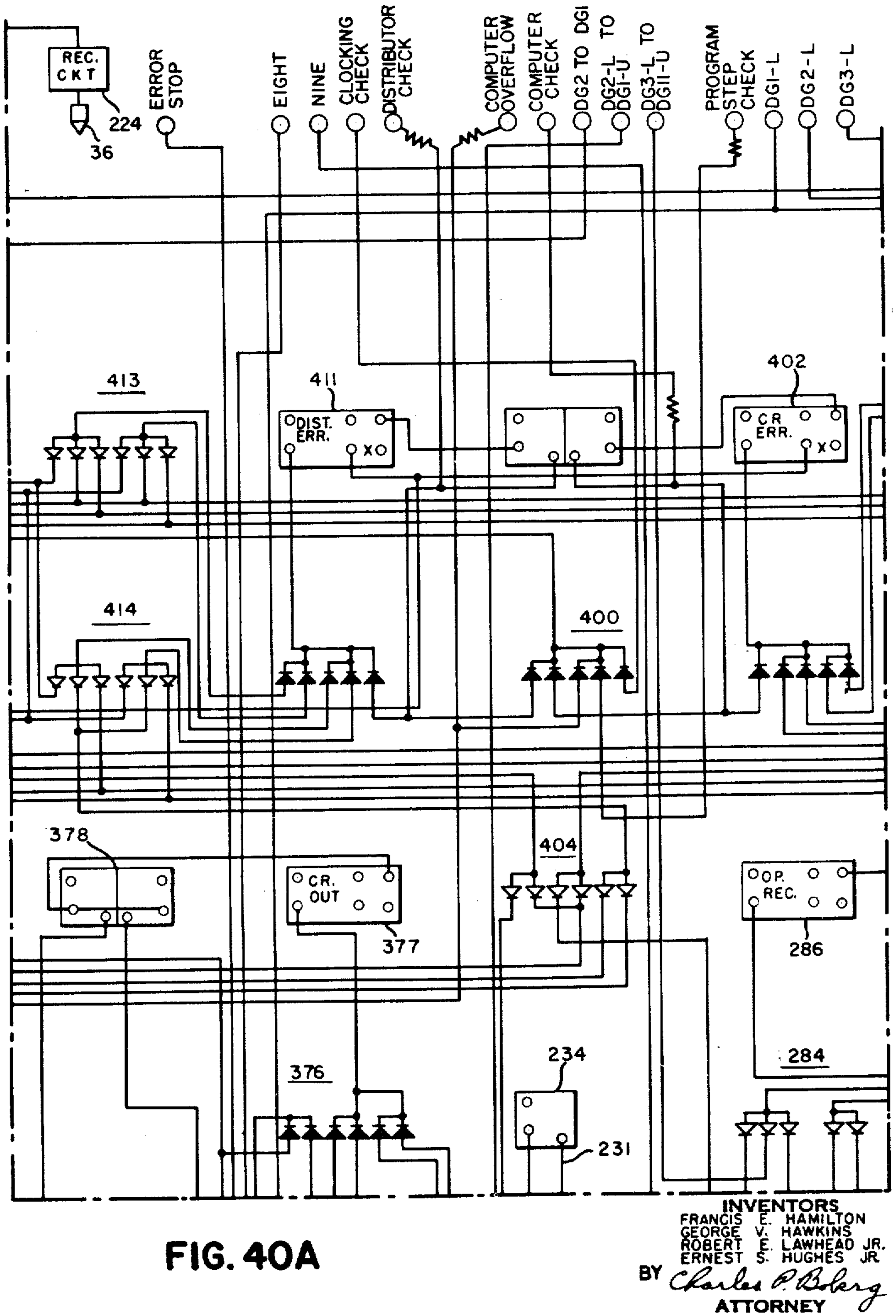
Figure 40B:
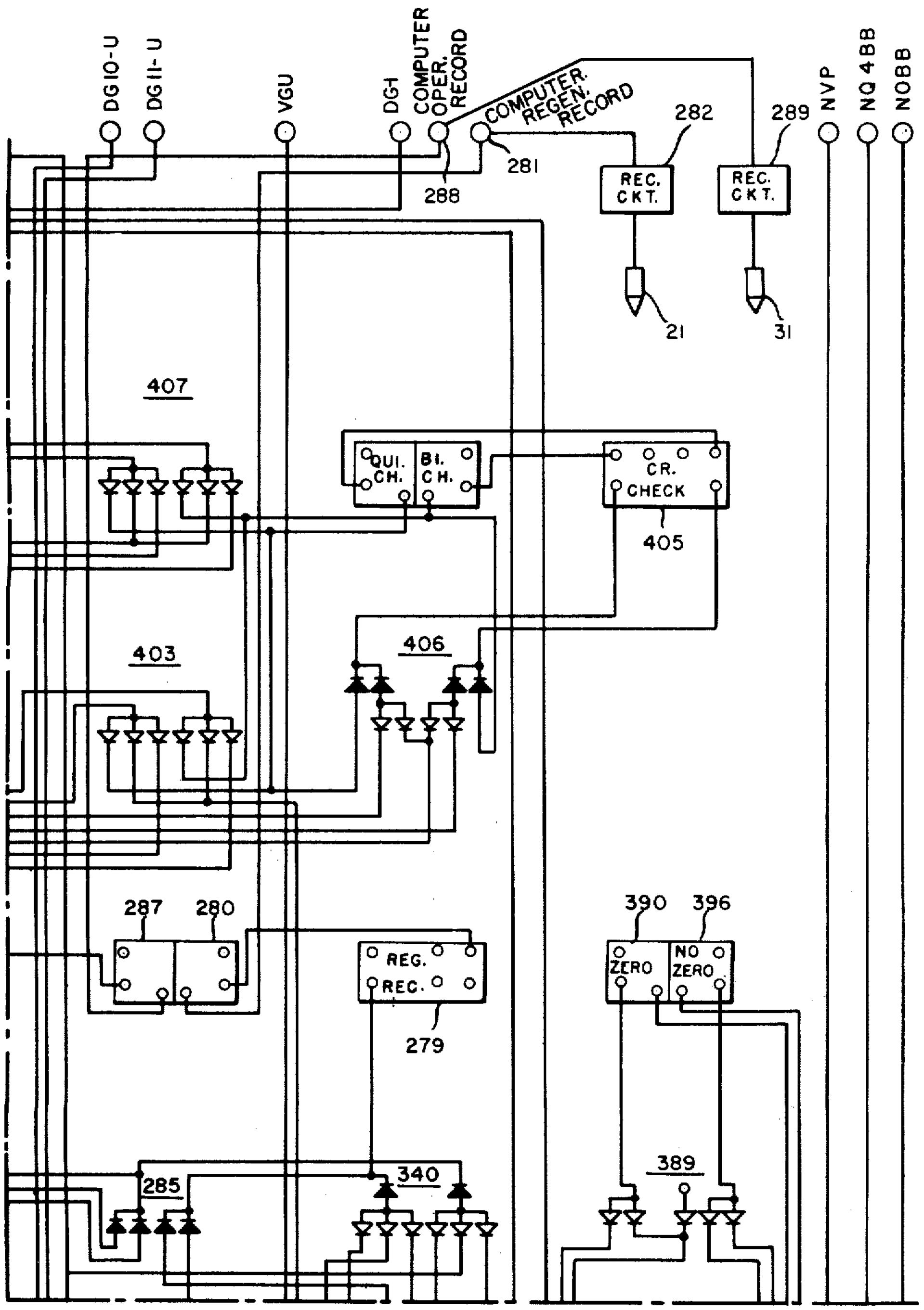
Figure 40C:
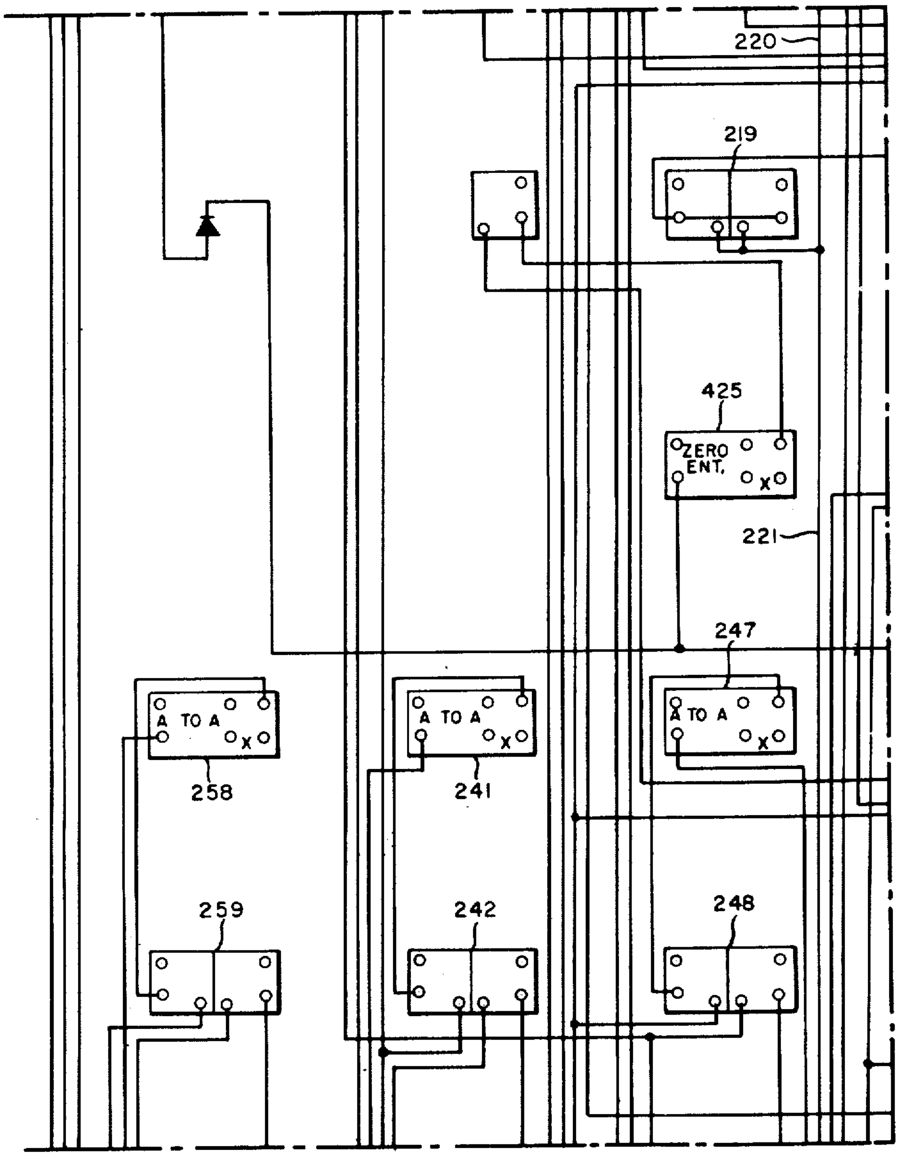
Figure 40D:
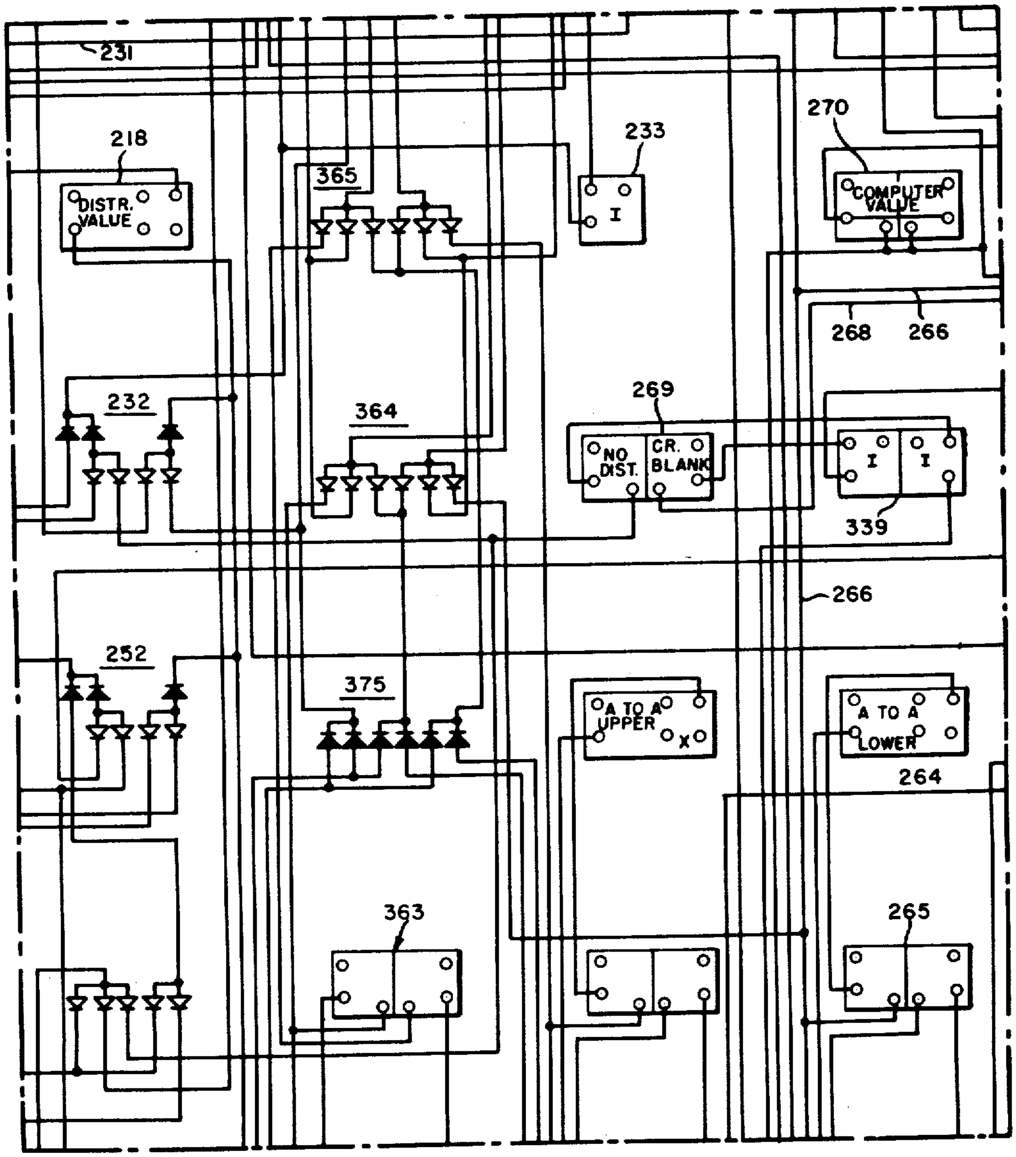
Figure 40E:
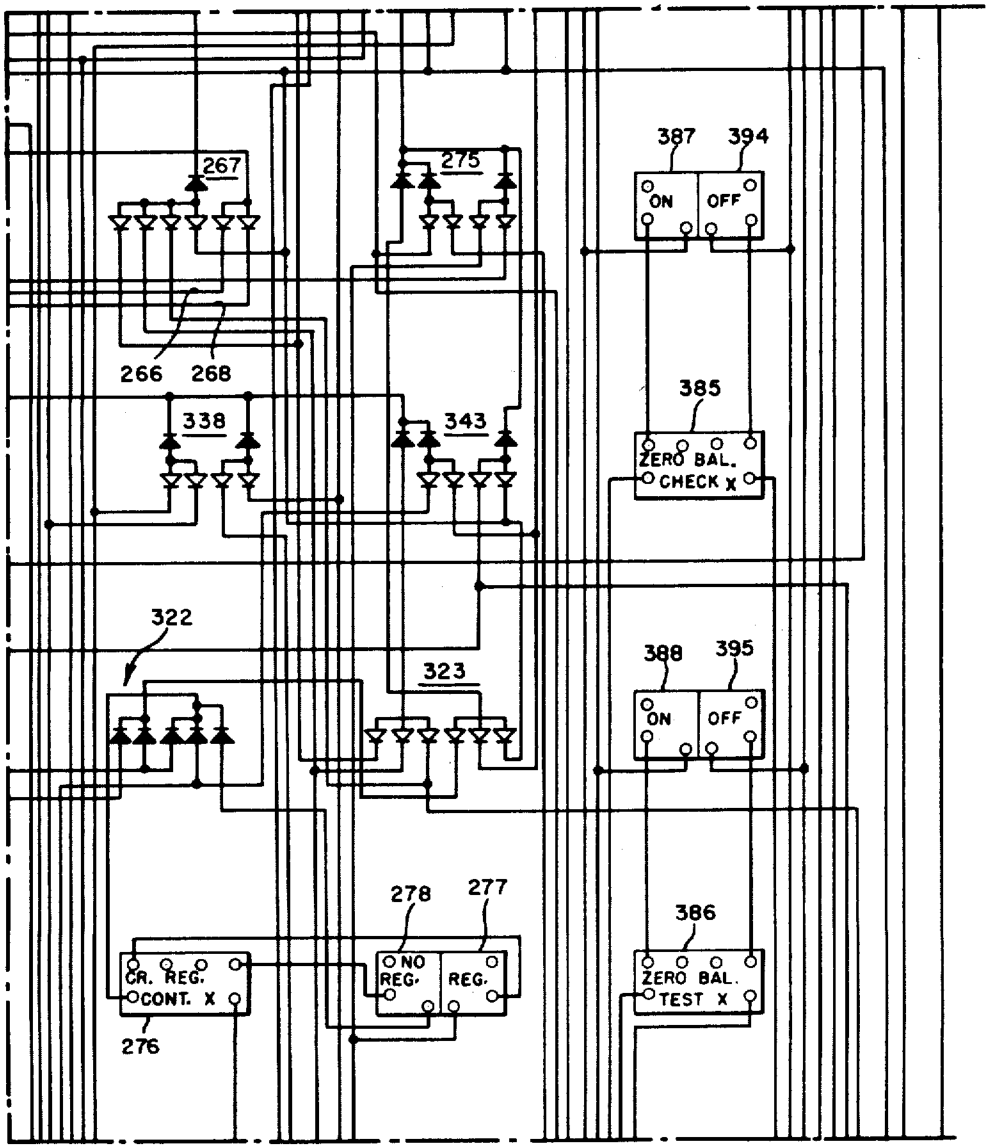
Figure 40F:
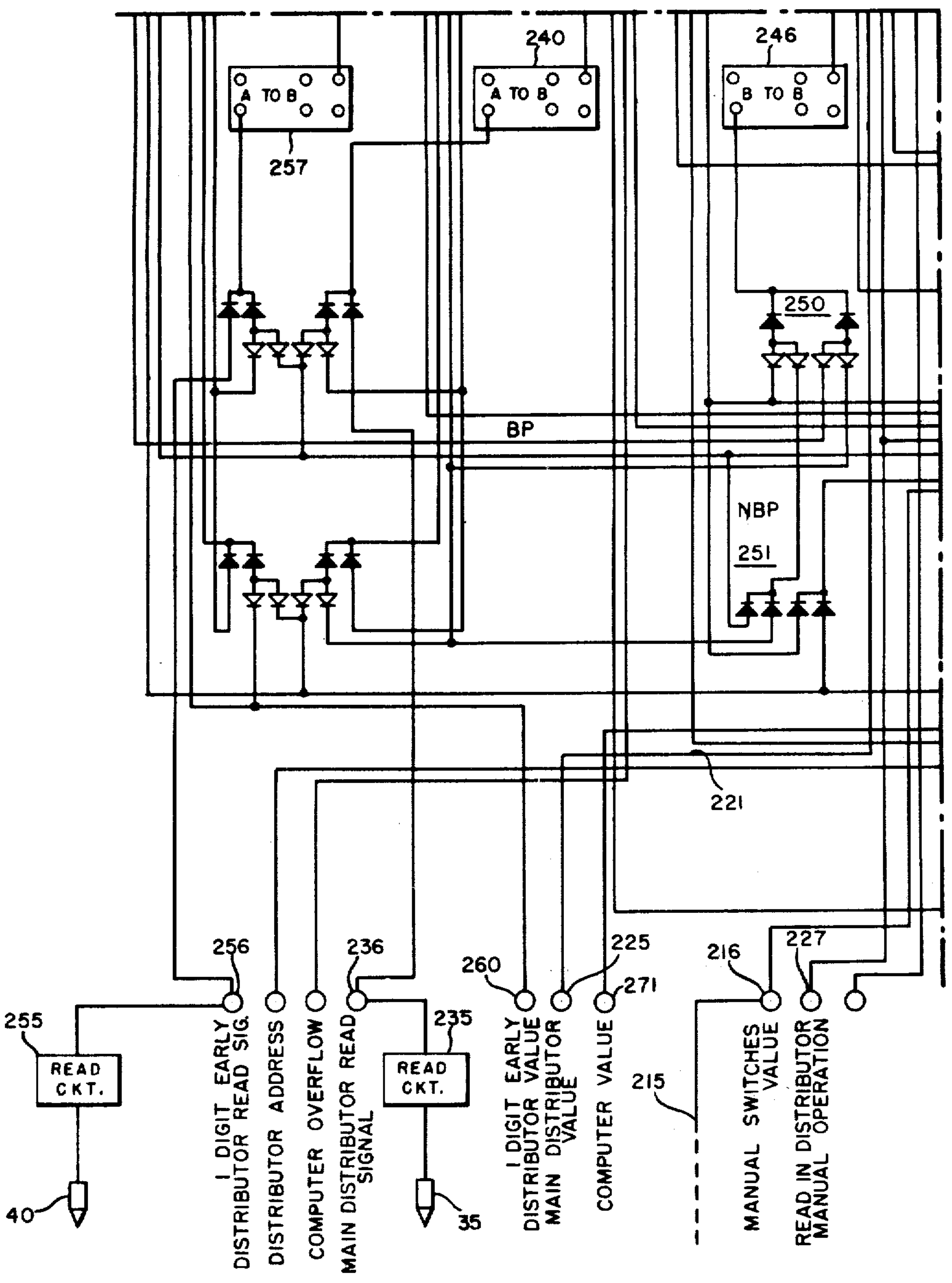
Figure 40G:
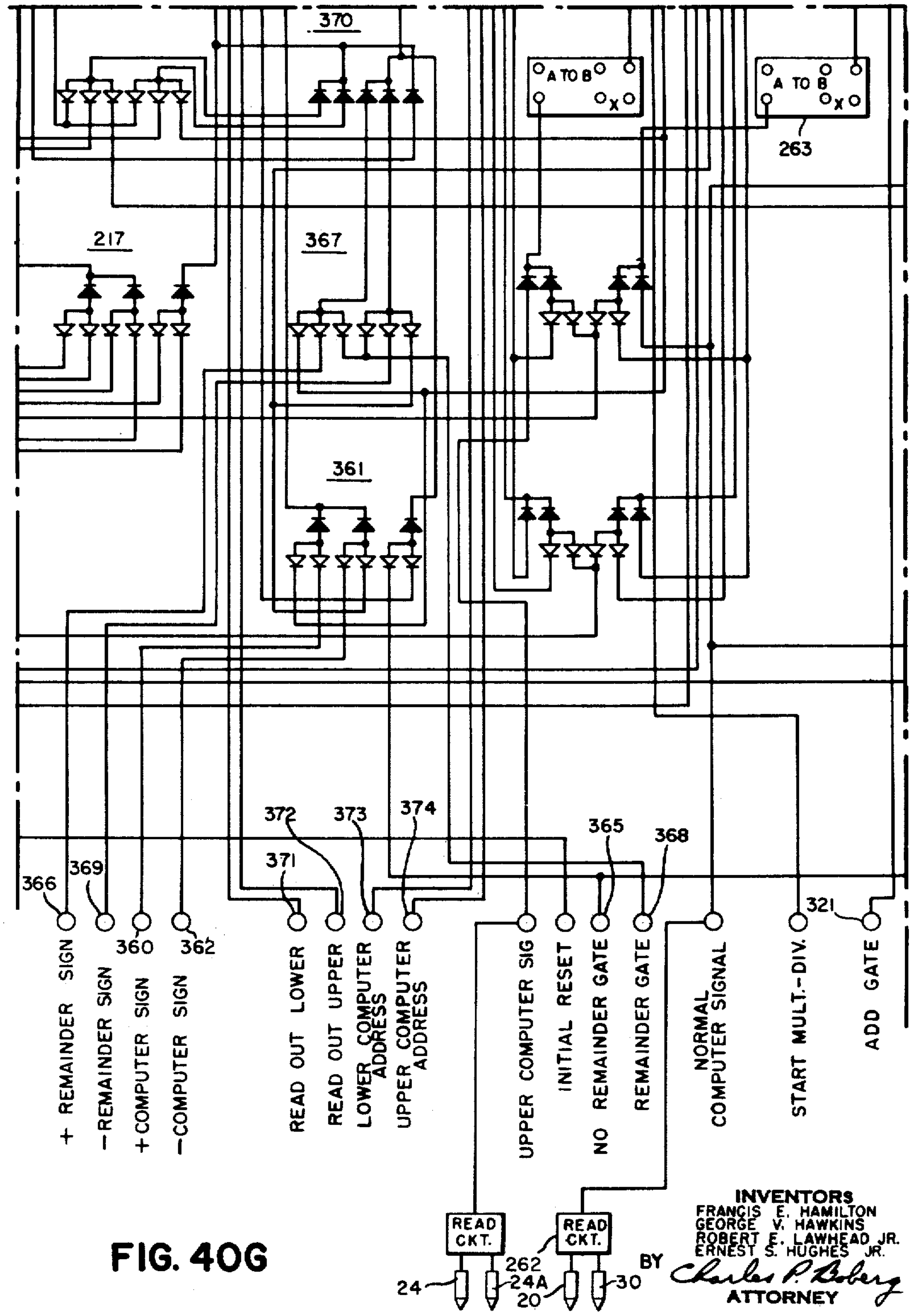
Figure 40H:
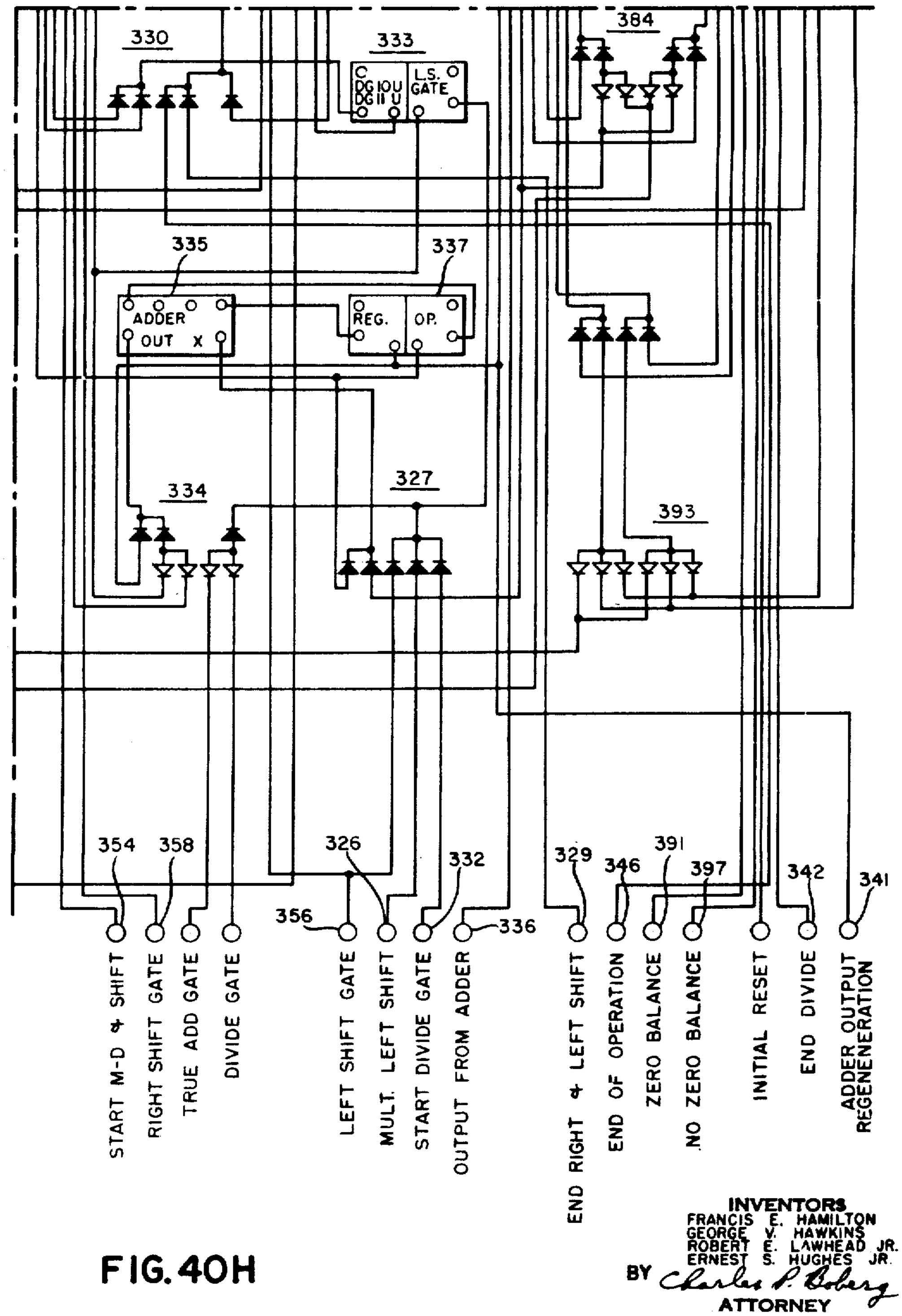

Figs. 40–40H, inclusive, constitute a block diagram of the circuits in the auxiliary computer chassis.

Figure 41:
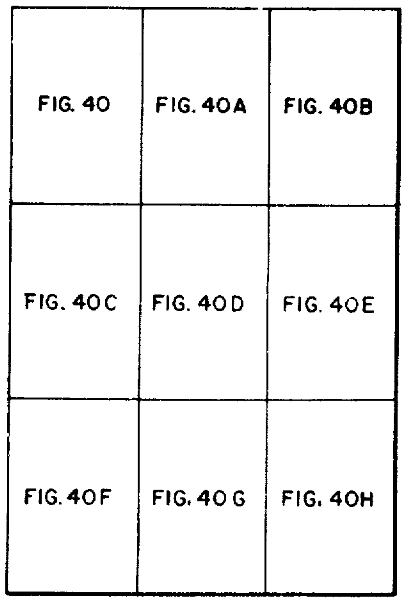

Fig. 41 is a diagram showing the manner in which Figs. 40–40H should be joined together.

Figure 42:
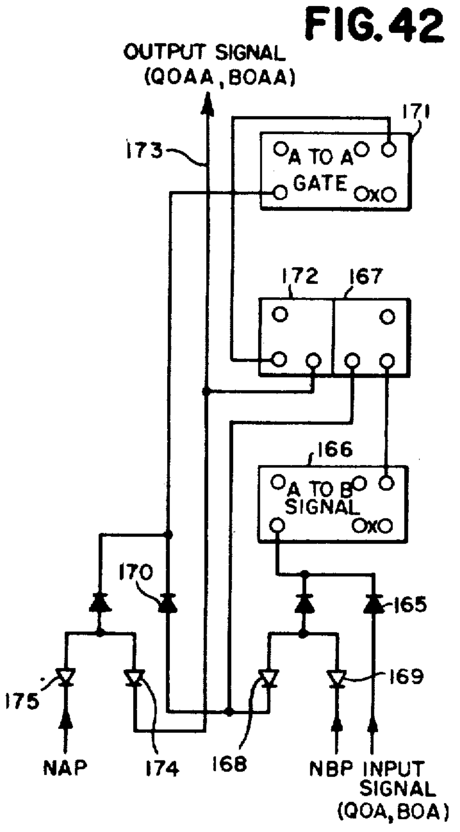

Fig. 42 is a block diagram representation of a portion of a regeneration circuit.

Figure 43:
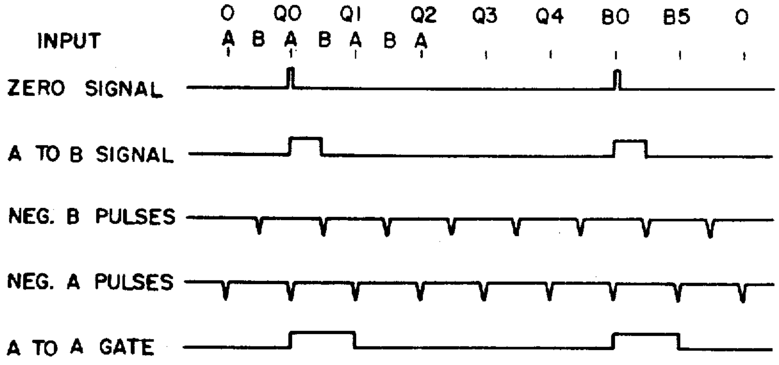

Fig. 43 is a timing diagram associated with Fig. 42.

Figure 44:
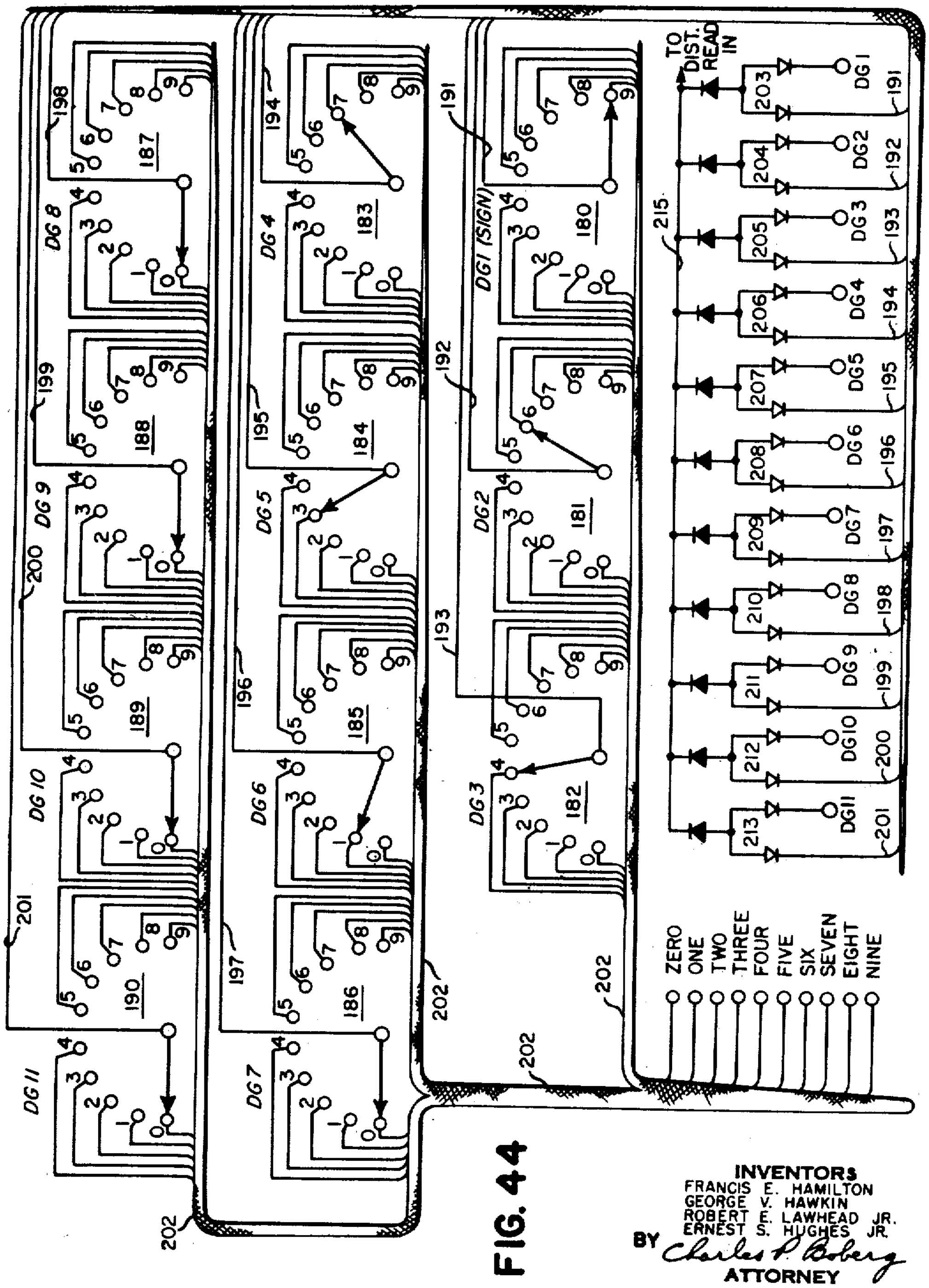

Fig. 44 is a diagrammatic wiring layout of a register for storing input values.

Figure 45:
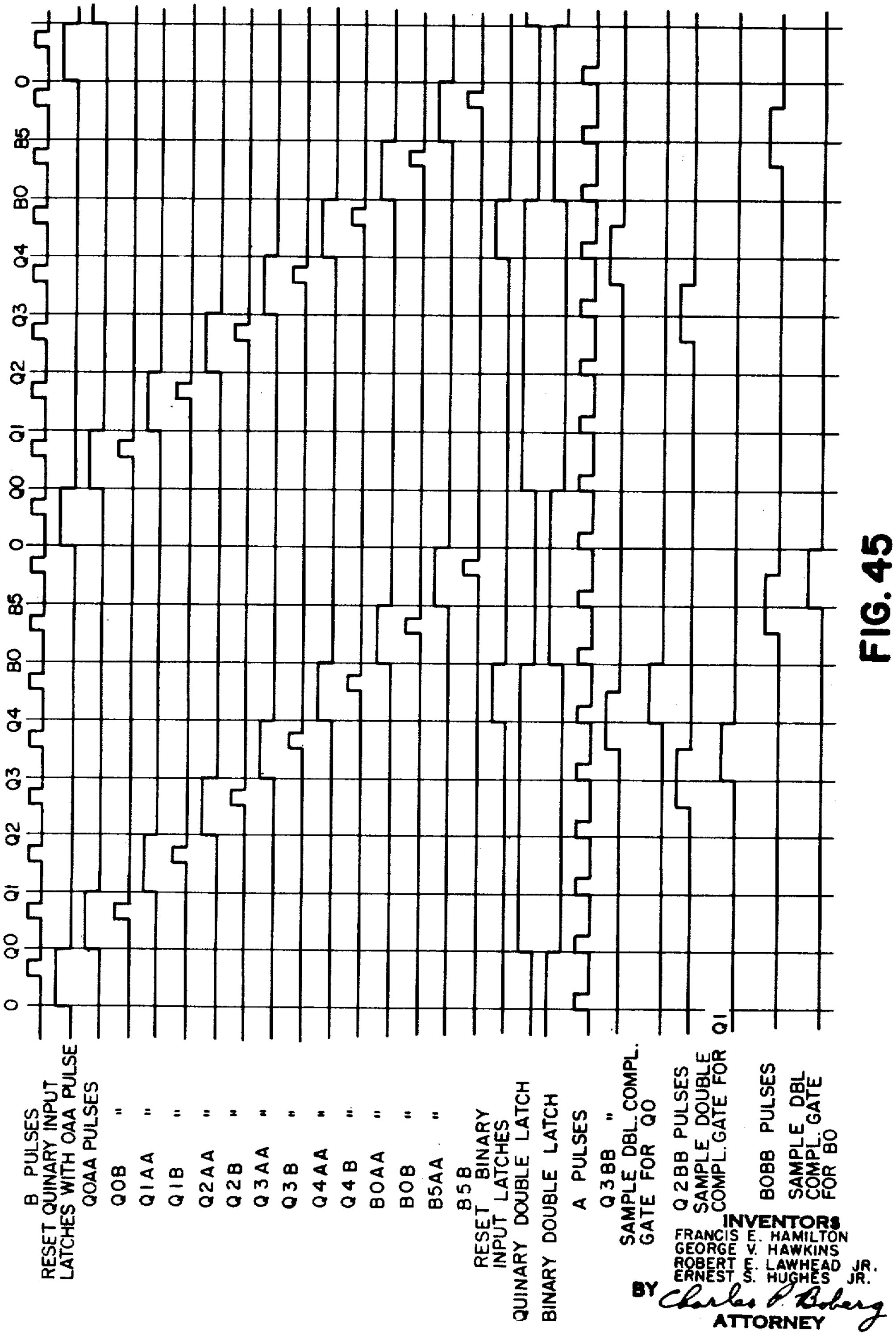
Figure 45A:
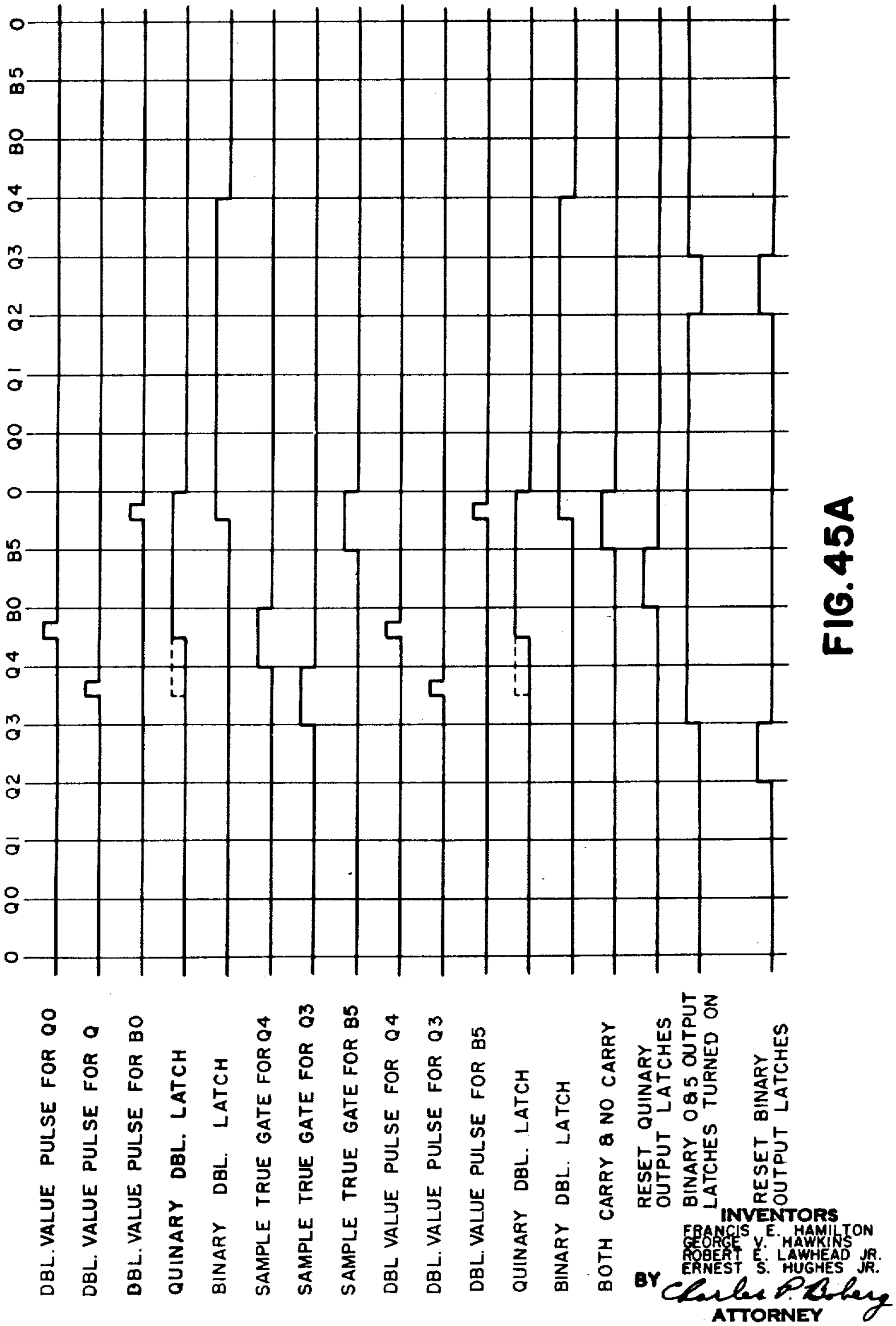

Figs. 45 and 45A constitute a timing diagram for the adder matrix of the computer.

Figure 46:
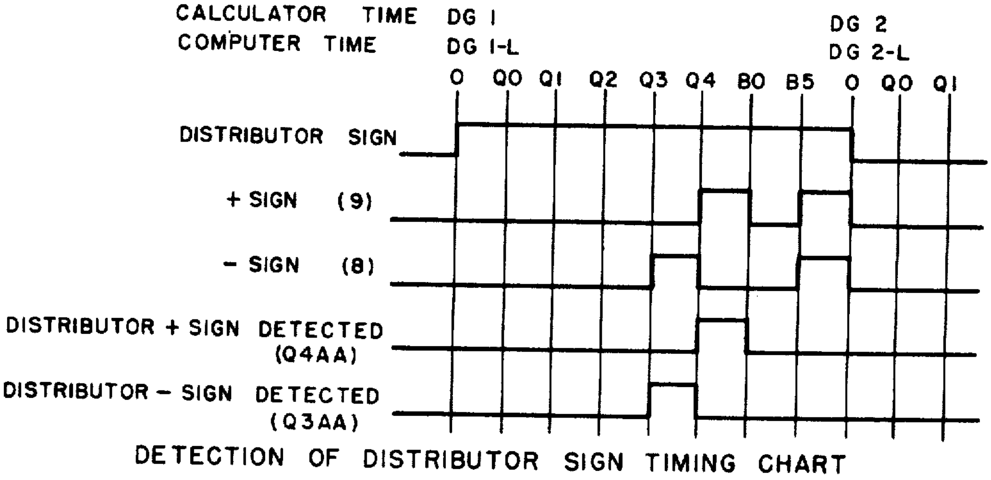

Fig. 46 is a timing diagram to illustrate the manner in which the sign of the distributor value is detected.

Figure 47:
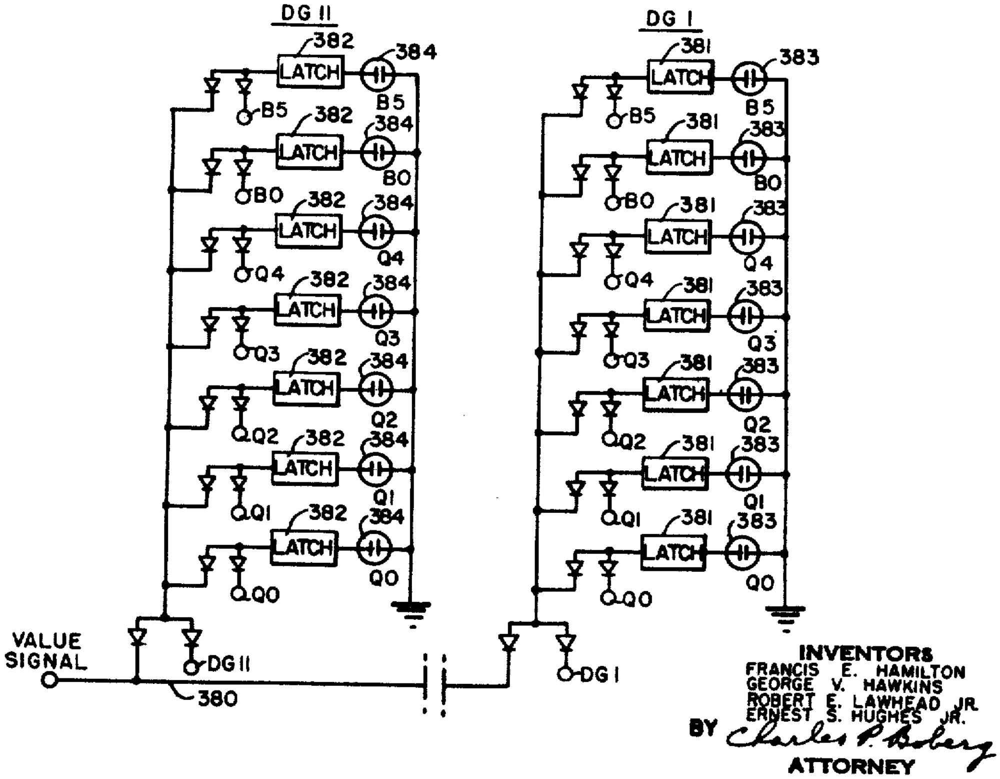
Figure 48:
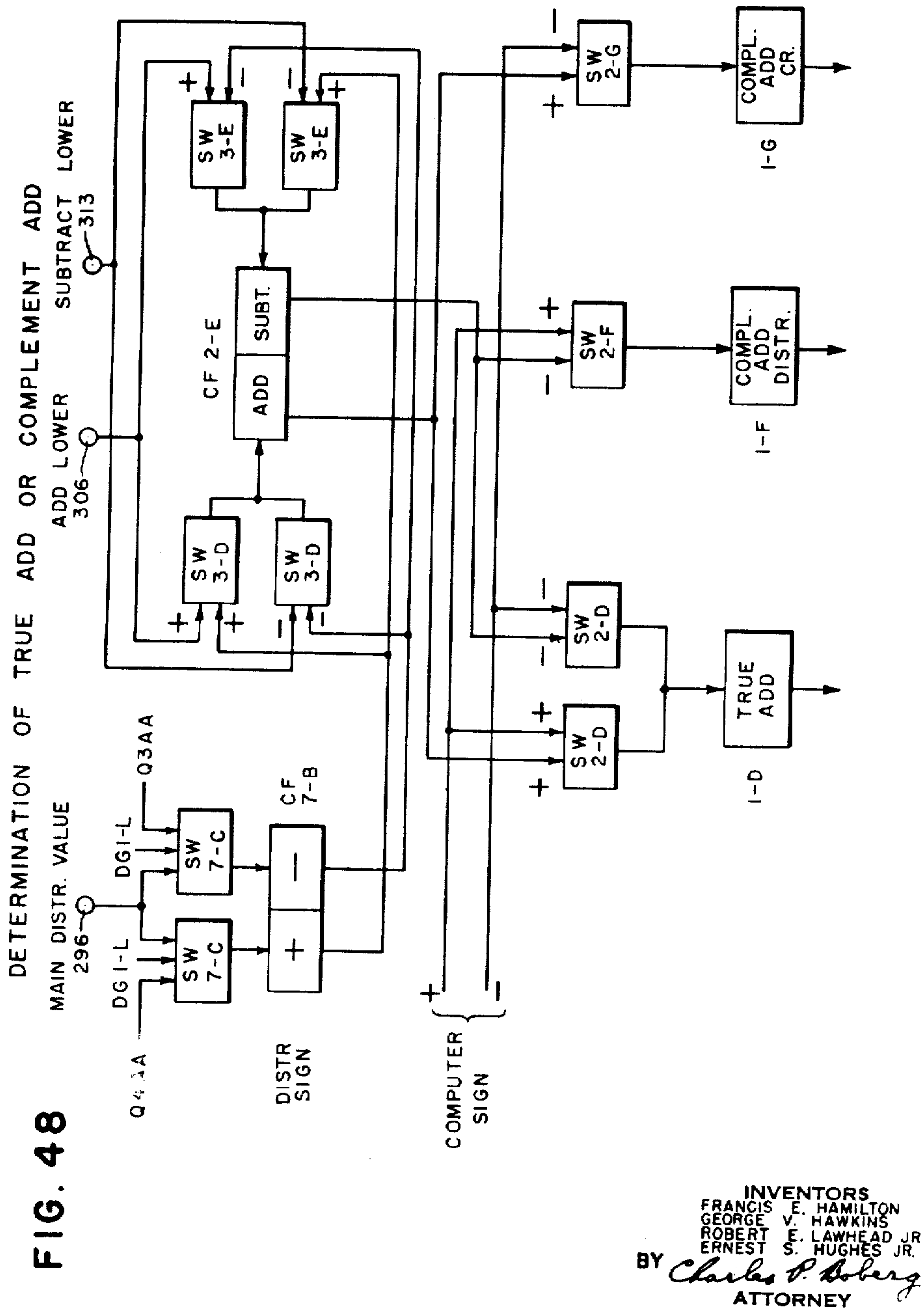

Fig. 47 is a partial schematic representation of a register for output values, and Figs. 48 to 77, inclusive, are different block diagrams respectively illustrating in simplified manner various steps in the operations performed by the computer.

GENERAL DESCRIPTION

Figure 1:
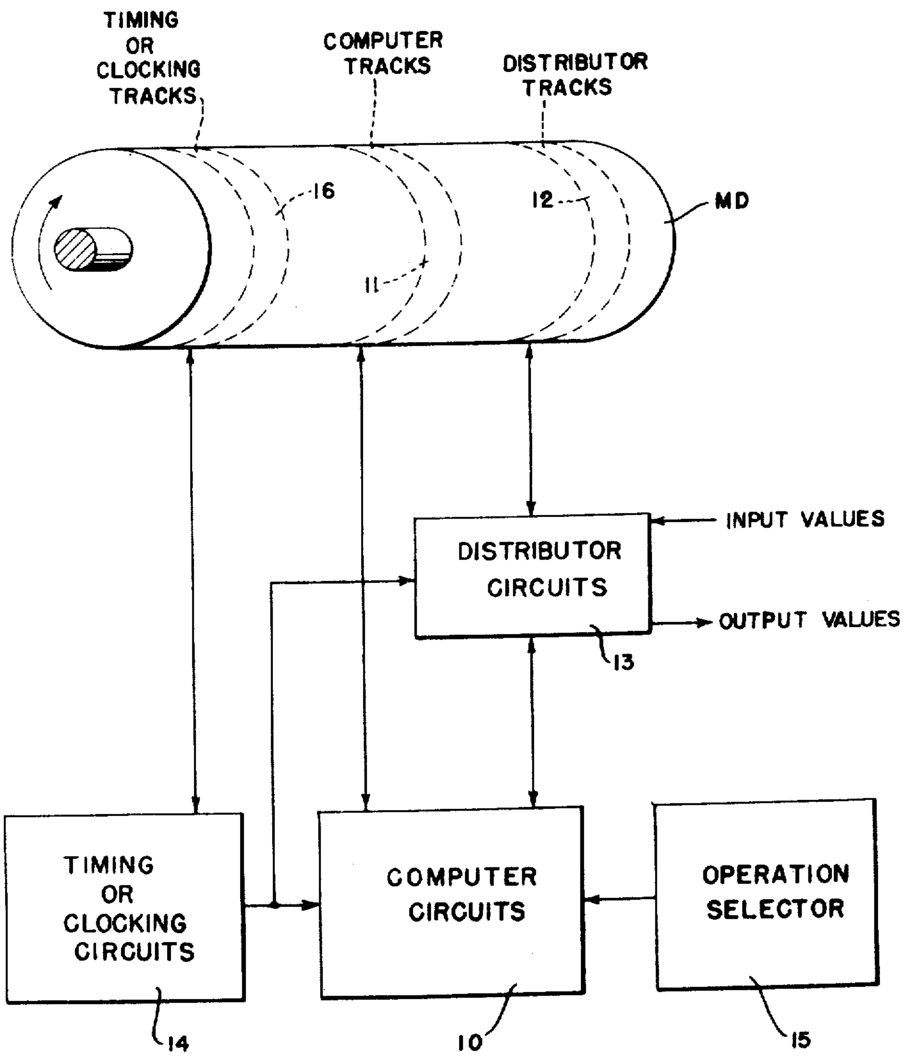
Fig. 1 is a general diagram of a magnetic drum computer embodying the principles of the invention.

In Fig. 1 there is shown schematically a computer adapted for use in a proposed high-speed calculating or accounting system of the type that utilizes a rotating magnetic drum MD for data storage purposes. The computer proper consists of certain electronic circuits, designated by the rectangle 10, which are associated with portions of the magnetic drum MD respectively designated as the computer tracks 11 and the distributor tracks 12. The meaning of these terms will become apparent as the description proceeds, but it might be stated briefly at this point that the distributor tracks 12 are associated with distributor circuits 13 through which all information passes on its way to and from the computer circuits. The distributor circuits also are adapted to store one of the factors used in a computation, the other factor being entered into the computer as a value which is to be operated upon. The computer has universal application, being adapted to perform the basic arithmetic operations of addition, subtraction, multiplication and division along with other allied operations which will be pointed out specifically hereinafter.

Inasmuch as the invention claimed herein pertains mainly to the computer, the other portions of the system to which reference has just been made are disclosed only to the extent necessary for an understanding of the claimed invention. Furthermore, as indicated above, the present computer is not limited in its application to the aforesaid calculating or accounting system, but is expected to have general utility, also.

Various control pulses are supplied to the computer circuits 10 by sources designated as timing or clocking circuits 14 and an operation selector 15. The timing pulses furnished by the circuits 14 are generated in accordance with well known techniques under the control of timing spots magnetically recorded on the timing or clocking tracks 16 of the drum MD. The various timing pulses utilized by the computer are described in greater detail hereinafter. The operation selector 15 furnishes pulses to the computer from time to time for signalling the operations that are to be performed thereby. In the contemplated data storage and processing system of which the computer is adapted to be a part, the operation selector 15 would be included within a program control unit that functions automatically to select in sequence the operations which are performed by the system. For present purposes, however, it may be assumed that these operations are selected manually by operating keys, switches or the like to pulse selected input terminals of the computer in accordance with the operations desired.

In practice the magnetic drum MD would in all likelihood be used for storing a vast amount of information that might be needed in the performance of actual accounting problems or other complex data processing operations. The utility of the magnetic drum as a high-capacity data storage device is well known. It is not the purpose of the present description, however, to disclose all of the uses to which the drum MD might be put. Consequently, only those portions of the drum MD which are directly related to the operations of the computer will be described in any detail.

Serial Representation of Values on Drum

Each track of the drum is adapted to store a number of values, each value comprising a certain number of digits usually accompanied by a sign. In the present instance it is contemplated that there will be a 11 digit positions (Fig. 2) arranged in series along the track for each recorded multi-value digit. These digit positions are respectively designated DG1, DG2, DG3, and so on, to DG11. DG1 is the position in which the algebraic sign would be recorded, if there is one, or in its absence there would be a "0" recorded at that point. The system disclosed herein employs the convention of representing a negative sign by a digit 8 recorded at DG1, while a positive sign is represented by a digit 9 recorded at DG1. This relationship holds true only for the DG1 position. The units (or lowest order) digit of the value is recorded at DG2, the tens (or second order) digit at DG3, hundreds (or third order) digit at DG4, and so on. Positions above the highest significant digit in the value are filled with zeros.

Code Representations of Digits

Figure 3:
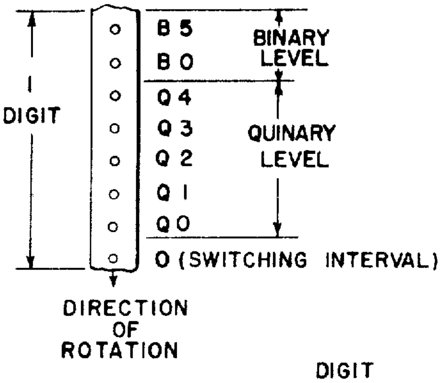
Fig. 3 is a fragmentary schematic representation of a recording track showing the arrangement of the bits or code elements in a single digit position.

In the present system we have chosen to represent the digits in accordance with a 7-bit biquinary code. As shown in Fig. 3, each digit position on a track is divided into eight cells or "spots" capable of being magnetized selectively. Seven of these cells are assigned to the seven bits or elements of the biquinary code, and the eighth cell (sometimes designated "0") is idle to afford a switching interval between digits. The first five cells respectively pertain to the quinary bits Q0, Q1, Q2, Q3 and Q4. The next two cells respectively pertain to the binary bits B0 and B5. Any of the digits can be represented by selectively magnetizing one cell in the quinary level and one cell in the binary level. For example, the digit 3 is represented by magnetizing the B0 cell and the Q3 cell. The digit 7 is represented by magnetizing the B5 cell and the Q2 cell. In this fashion each digit can be represented by two active elements, one in each level.

It will be noted that each digit is represented by one and only one active element in the quinary level, taken jointly with one and only one active element in the binary level. This feature is used to advantage in performing automatic validity checks, as will be described hereinafter. It should be noted also that zero is treated as a digit, its biquinary code being B0Q0. If the sum of two quinary bits exceeds Q4, a carry must be effected from the quinary level to the binary level. If the binary bit is B0 and a carry is made into the binary level, the binary bit changes to B5. If the binary bit prior to carry was B5, the binary bit changes to B0 and a carry is made into the quinary level of the next higher order. These characteristics of biquinary code operations will be brought out more clearly hereinafter in connection with actual examples.

Computer Revolvers

Figure 4:
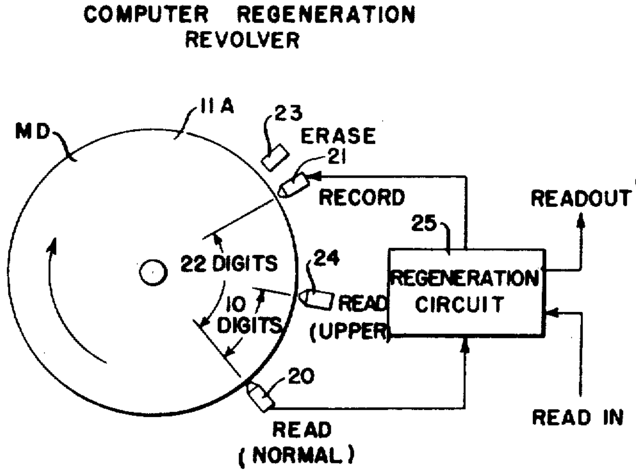
Fig. 4 is a schematic representation of the computer regeneration revolver.

The computer tracks 11, Fig. 1, of the magnetic drum MD are associated with a computer regeneration revolver, Fig. 4, and a computer operation revolver, Fig. 6. Each of these revolvers is effective to read digits from a computer track at one location and to record digits on the same track at a different location, the arrangement being such that each digit is read a certain length of time after it has been recorded, depending upon the peripheral distance between the recording and reading stations. In the case of the computer regeneration revolver, the digits which are recorded usually correspond exactly to the digits which are read, the effect of this read-record operation being merely to circulate or "revolve" the digits around the track, but in either of the two computer revolvers the digits which are recorded may differ from the digits which are read due to an intervening arithmetic operation. When a new value is being recorded in the regeneration revolver, the regeneration circuit is opened to cancel the old value.

Referring again to Fig. 4, the computer track associated with the computer regeneration revolver is designated 11A. This track passes beneath a normal reading head 20, an erasing head 23, a recording head 21 and an upper reading head 24. The peripheral spacing, counterclockwise between the heads 20 and 21 is equivalent to twenty-two digit positions on the track 11A. That is to say, two full values of eleven digits each can be recorded on that portion of the track 11A between the heads 21 and 20. The upper reading head 24, as shown, is positioned intermediate the heads 21 and 20, being located ten digit positions, counterclockwise from the reading head 20.

The reading heads 20 and 24 function to read magnetic digit representations on the computer track 11A. The signals picked up by the head 20 normally are passed through a regeneration circuit 25 to the recording head 21. Each regenerated digit is recorded on the track 11A by the head 21 at a point twenty-two digit positions away from the point (on track 11A) at which the corresponding digit representation was sensed by the head 20. The track 11A is cleared in advance of the recording head 21 by the erasing magnet 23, which usually is a permanent magnet, although other forms of erasing magnets can be employed. As indicated in Fig. 4, values may be inserted into the computer regeneration revolver and may subsequently be read out therefrom through the regeneration circuit 25.

The upper reading head 24 is employed, under some conditions, to read digits represented in a portion of the track 11A which is referred to herein as the "upper computer." The normal reading head 20, in addition to reading the digits recorded in that portion of the track 11A between the heads 20 and 21 for regeneration purposes, may also be employed on readout for reading digits from a portion of the track 11A known as the "lower computer." The splitting of the computer into upper and lower parts increases the flexibility of the system and greatly facilitates many operations.

Figure 5:
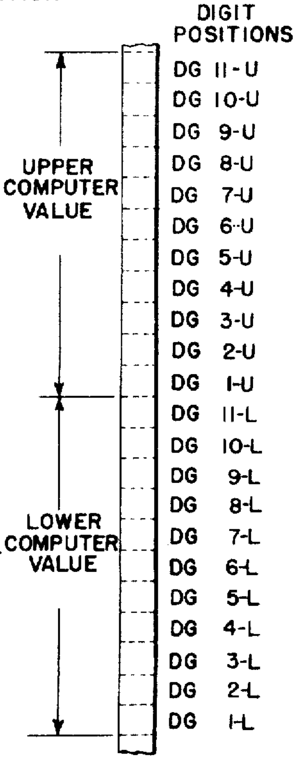
Fig. 5 represents a portion of a computer revolver track of Fig. 4 and indicates the manner in which the digit positions are arranged in the upper and lower sections thereof.

In Fig. 5 there is represented a portion of the computer track 11A in which the digit positions are identified according to whether they pertain to the lower computer (suffix "L") or to the upper computer (suffix "U"). The division of the computer into upper and lower parts is a matter of timing, the arrangement being such that the digits of the lower computer value are recorded first, followed by the digits of the upper computer value. If a value is to be entered into the lower computer only, the upper computer is filled with zeros, which are automatically recorded therein. If only the upper computer is being used, zeros are automatically entered into the lower computer. The respective functions of the upper and lower computers will be brought out more fully when the arithmetic operations of the machine are described. It should be noted that the terms "upper computer" and "lower computer" are here used in a more restricted sense than the general term "computer" as defined hereinabove. The various senses in which the term "computer" may be used in the present specification will be apparent from the context in each instance.

Normally the values stored in the computer are held in the computer regeneration revolver, Fig. 4, but when an arithmetic operation is actually in process, the values may be entered into the computer operation revolver, Fig. 6. The computer operation revolver comprises a reading head 30 and recording head 31 associated with a computer track 11B, these heads 30 and 31 being spaced apart, counterclockwise, by an amount equal to twenty-one digit positions on the track 11B. The reason for this particular spacing will become apparent as the description proceeds. Also associated with the track 11B are an erasing magnet 32, which clears the track in advance of the recording head 31, and an upper reading head 24A, corresponding to the upper reading head 24 in the regeneration revolver.

The reading head 30 and the recording head 31 are in series with an adder unit 33, of which a more detailed description will be given presently. The adder 33 is adapted to add or "merge" two values in a digit-by-digit sequence. It is necessary that two digits be entered concurrently into the adder 33 at each step of the adding operation. Either or both of these digits may be a zero.

In a normal adding operation, which may consist of adding two values *a* and *b*, for example, one of the values *a* is first recorded in the computer operation revolver. This can be done by entering the value *a* from the distributor into the adder 33 along with the zeros which are then being read by the reading head 30 from the track 11*b*. (The procedure whereby zeros are initially entered into this revolver will be described later.) The value *a* (which is the sum of *a* plus zero) is recorded on the track 11B by the head 31. Value *a* then is read out digit-by-digit through the head 30 to the adder 33, where the digits of *a* are merged serially with the corresponding digits of value *b* (from the distributor) which are concurrently entering the adder 33. The result of the addition can be recorded either in the operation revolver by the head 31 or entered into the computer regeneration revolver (Fig. 4) by the head 21, depending upon the circumstances.

The reason for spacing the reading and recording heads 30 and 31 of Fig. 6 twenty-one digit positions apart, instead of twenty-two digit positions as in the case of heads 20 and 21 of Fig. 4, is that a one-digit delay occurs in the adder 33. This delay is compensated for by placing the heads 30 and 31 only twenty-one digits apart. A twenty-second digit may be held momentarily in the adder 33.

Distributors

The distributor tracks 12 on the drum MD, Fig. 1, are associated with a main distributor, Fig. 7, and a one-digit-early distributor, Fig. 8. The main distributor, Fig. 7, is a revolver having a readying head 35 and a recording head 36 associated with a distributor track 12*a*, together with a regeneration circuit 37 linking the two heads. The counterclockwise spacing of the heads 35 and 36 corresponds to eleven digit positions on the track 12A, so that each digit read by the head 35 is recorded by the head 36 in the succeeding value group on the track 12A. The erasing magnet 38 serves to clear the track 12A in advance of the recording head 36.

Closely associated with the main distributor is a supplemental distributor known as the one-digit-early distributor, Fig. 8. This one-digit-early distributor has a reading head 40 and a recording head 41 spaced ten digit positions apart along a distributor track 12B. It derives its name from the fact that digits which are simultaneously recorded by the two distributor recording heads 36 and 41, Figs. 7 and 8, are read by the reading head 40 one digit-time earlier than they are read by the main distributor reading head 35. The one-digit-early distributor does not have a regeneration circuit of its own, but it is coupled to the main distributor regeneration circuit so that digits regenerated in the main distributor are also entered into the one-digit-early distributor. Whenever a new value is entered into the main distributor, it is entered also into the one-digit-early distributor.

The main distributor is used for entering values into the lower computer, Fig. 5, and the one-digit-early distributor is used for entering values into the upper computer, Fig. 5. The function of the one-digit-early distributor is to advance each digit by one position so that the lowest-order digit occupies the first position DG1–U in the upper computer, Fig. 5, and the highest-order digit is in the DG10–U position. The sign of the upper computer value is read out at DG11–U time, but as will be explained subsequently, it is handled differently than the other digits and so is not entered into the DG11–U position. In fact, both the DG1–L and the DG11–U positions (at this stage of operations) are idle insofar as the storage of information is concerned, since the algebraic signs of both upper and lower computer values are handled differently than are the numerical digits of these values in arithmetic operations.

From the above description it will be evident that a series of more than ten digits can be represented in the lower and upper computers without interrupting the continuity of the series. For example, if two 10-digit numbers are to be combined in a 20-digit series, one of the 10-digit numbers is entered into the lower computer in normal sequence while the other 10-digit number is entered into the upper computer through the one-digit-early distributor, thereby removing the intervening sign position and advancing the ten numerical digits into juxtaposition with the first ten digits. Thus, the twenty digits will occupy consecutive positions from DG2–L through DG10–U. This feature greatly simplifies right-shift and left-shift operations as well as carryovers from the lower computer to the upper computer.

The main distributor and the one-digit-early distributor have identical values recorded therein, the only substantial difference between the two being that reading takes places one digit-time earlier in one of these distributors than it does in the other. For this reason it is often found convenient herein to use the term "distributor" in the singular as referring collectively to both distributors, either of which may be effective at a particular time.

Computer Flow Diagram

Fig. 9 illustrates schematically the general flow of information throughout the computer and distributor circuits. The computer carries out the arithmetic operations of addition, subtraction, multiplication and division on a serial basis, utilizing information recorded in the computer tracks 11A and 11B and the distributor tracks 12A and 12B. Numbers within the computer can be shifted to the left any desired number of places, or they can be shifted to the right any desired number of places, with or without half correction. The result of an operation can be checked for both a positive-or-negative balance and a zero-or-no-zero balance.

In the performance of the various operations enumerated above, the distributor functions to route certain values to and from the computer and it also stores other values. The two computer revolvers are used in conjunction with the adder 33, Fig. 9. The computer regeneration revolver is adapted to store a partial result between steps in a computation and to store the final result when the computation is ended. Thereafter the final result may be transferred to the distributor, from which it is read out to a suitable manifesting means or to a storage means, as desired.

When a value is read into the distributor, it is circulated through the distributor by the regeneration circuit 37, Fig. 9. When a new value is being recorded in the distributor, the regeneration circuit 37 is opened to cancel the old value.

The output from the one-digit-early distributor is used in the upper computer. The output from the main distributor is used in the lower computer as well as in data storing operations. As mentioned above, the same value is recorded in both distributors; however, the output is available one digit early from the one-digit-early distributor.

In transferring a value from the distributor to the computer, the digits of the value are fed serially through the adder unit 33. If a value is being entered into the lower computer only, zeros are automatically entered into the upper computer. Conversely, if a value is being entered into the upper computer only, zeros are automatically entered into the lower computer. The adder 33 will not function to pass a single value; therefore, it is necessary that a pair of values be presented concurrently thereto. However, one of these values may comprise zeros in all of its orders. Initially there are zeros stored in all of the orders in the computer, and these may be added to the value coming from the distributor to satisfy the operational requirements of the adder 33.

The resultant value leaving the adder 33 is normally recorded through the head 31 onto the computer operation track 11B, Fig. 9, from which it is read out one digit-time early through the head 30 in order to cancel the one-digit delay that took place in the adder 33. From thence the value may be introduced into the computer regeneration revolver, or it may pass again through the adder, depending upon the circumstances. In multiplication and division operations values may be read selectively from the two computer revolvers according to whether or not a left shift is taking place.

Right and left shifts may take place in the computer independently of any arithmetic processes. (Of course, each time a shift occurs, there is, in effect, a multiplication or division by 10.) If a right shift is to be effected, the output of the computer regeneration revolver is passed directly through a right-shift circuit 45 to the computer operation revolver, from which it is read out one digit-time early and re-enters the computer regeneration revolver through the regeneration circuit 25. This effects a right shift. If a left shift is to be effected, the value stored in the computer regeneration revolver is sent through the adder 33 (being merged with zeros therein if no addition is to be performed) and is then reintroduced to the computer regeneration revolver. The inherent one-digit delay of the adder 33 effects the desired left shift. Each time a left or right shift takes place, a zero is entered into the computer regeneration revolver to fill the digit position that otherwise would be left vacant adjacent to the digits of the shifted value. Either of these shift operations may take place repeatedly, to the extent determined by the requirements of the problem. As indicated in Fig. 9, a "shift number" is entered into the computer to establish beforehand the number of shifts to be effected consecutively by the computer.

The numbers 1 to 10, inclusive, shown on the distributor tracks 12A and 12B, Fig. 9, and the numbers 1 to 20, inclusive, shown on the computer tracks 11A and 11B merely signify the sequences in which digits are recorded on the various tracks. They are not intended to denote any numerical quantities. The DG (digit) positions are marked alongside each track in Fig. 9. In the case of the computer tracks 11A and 11B, the digit positions DG1–L through DG11–L are identified with the lower computer, and the digit positions DG1–U through DG11–U are identified with the upper computer. The sign control circuits have not been indicated in Fig. 9, but it will be noted that the algebraic signs recorded in the DG1 positions of the two distributors do not enter the computer. Insofar as the computer tracks 11A and 11B are concerned, the sign digits are replaced by zeros in the digit positions DG1–L and DG11–U. Signs are handled by separate control circuits, as will be explained presently.

The lower computer value is read out through the normal reading head 20, Fig. 9, to the distributor, while the upper computer value is read out from the upper reading head 24 to the distributor. These values are read out at different times inasmuch as the distributor will accommodate only one value at a time. The operation of the reading head 30 for the computer operation revolver will be described in detail later.

To summarize the operations depicted in the general flow diagram, Fig. 9, all values are read into the computer from the distributor under control of the computer circuits. Each value is merged in the adder 33 with a value previously stored in one of the computer revolvers, or it is merged with zeros if a reset of the computer is called for. The output of the adder is always the sum of two input values. If a subtraction is required, one of the values is read into the adder as a complement. The output of the adder is recorded in one of the computer revolvers, according to whether or not a left shift is to occur. The recorded sum may again pass through the adder (as in multiplication and division opertaions) or it may be circulated in the regeneration revolver. The regeneration revolver stores twenty-two digits, which are constantly circulated, without delay through the regeneration circuit 25. Both the distributor and the computer regeneration revolver hold their values in storage (that is, in a state of circulation) until a new operation or a reset is called for. Each of the computer revolvers is split into two parts, upper and lower. The upper portions are referred to collectively as the "upper computer," the lower portions as the "lower computer." Entries are made into the upper computer through the one-digit-early distributor and into the lower computer through the main distributor. Values from either or both of the upper and lower computers are read out to the main distributor, from which they may pass to other parts of the system. Shift operations can take place either as an incident to or independently of arithmetic operations.

Various check circuits are built into the computer to check (1) that there is one and only one digit present in each of the digit positions in the distributor and computer revolvers, (2) that one and only one bit is recorded in each of the binary and quinary levels of each digit position, (3) that two and only two digits are fed to the adder during each step of an addition operation, and (4) that there is one and only one digit output per digit position from the adder. These check circuits will be described in detail at a later point in the specification.

The various sign control circuits, which will be described later, determine in advance whether a number read from the distributor or a computer revolver should enter the adder as a true number or a complement. These circuits are so arranged that a value from either a distributor revolver or a computer revolver, or values from both such revolvers, can enter the adder as a true number or as true numbers. One or the other of the two values can be entered as a complement, but never both. (For example, if a negative value is being added to a negative value, the two values will be added together as true numbers, and a negative sign will be stored for the result.) If the result of a computation turns out to be a complement, it will be converted automatically to a true number with a negative sign.

FUNCTIONAL DESCRIPTION

Referring to Fig. 10, which is a simplified version of the flow diagram in Fig. 9, it will be seen that the distributor is a routing means for information passing between storage and the computer. The distributor also serves as a temporary data storage means. Each of the computations that the machine is capable of performing will, in general, involve two values or factors. The first of these values is transferred from storage to distributor and from thence to the lower computer or upper computer, as the case may be. The second value is transferred from storage to distributor, where it remains throughout the computation. The result of the computation or arithmetic operation performed by the machine is read from the computer (upper or lower) to the distributor and from thence to storage. The value which was initially stored in the distributor is cancelled when the result is transferred from the computer to the distributor.

The term "storage" in Fig. 10 may refer to any suitable means in which information is represented. It may, for example, designate a portion of the magnetic drum devoted to factor storage or general storage, or to manually settable switches on which values are represented. It may refer also to amount-manifesting means, such as indicaor lights, on which a number is visibly indicated. The meanings of the terms "distributor" and "computer," as used in the present instance, have been explained in preceding portions of the description.

Values are stored in the distributor and computer as true numbers. All of the basic arithmetic operations which the machine performs can be described briefly as a process of merging the distributor and computer values in the adder (Fig. 9) and storing the result of the merger in the computer. Either the distributor value or the computer value can be entered into the adder as a complement through the medium of conversion circuits which will be described presently. In fact, all operations performed by the adder may be classified as true-addition and complement-addition operations. Multiplication and division will involve repeated additions of a true or complement nature.

The intermediate and final results of a computation are stored in the computer. Algebraic signs are not stored in the computer. The sign of the result is determined from the conditions of the problem, as will be explained presently.

A list of the operations that the computer is adapted to perform is given below. These operations will be described both functionally and in detail hereinafter:

Transfer from storage to distributor.
Transfer from distributor to storage.
Transfer from lower computer to storage.
Transfer from upper computer to storage.
Add to lower computer, with reset.
Add to lower computer, without reset.
Add to upper computer, with reset.
Add to upper computer, without reset.
Subtract from lower computer, with reset.
Subtract from lower computer, without reset.
Subtract from upper computer, with reset.
Subtract from upper computer, without reset.
Multiply.
Divide and retain remainder.
Divide and cancel remainder.
Left shift.
Right shift.
Half correction and shift (right).
Balance tests.

It should be mentioned at this point that the terms "add" and "subtract" are used in a relative sense herein. Both types of operation can be referred to as addition operations, of either the "add plus" or "add minus" variety.

Further consideration will be given to the various operations involving transfers of information to, from and through the distributor in subsequent portions of the description. For the present it will be assumed that certain values have been entered respectively into the distributor and the computer, where they are temporarily stored in readiness for a desired arithmetic operation. For example, if an addition or a subtraction is called for, the value in the distributor is added to or subtracted from the value in the computer, with the result of this operation being stored in the computer. The value initially stored in the computer is cancelled upon entry of the result therein.

For a multiplying operation, the multiplier (MP) is stored in the computer, and the multiplicand (MC) is stored in the distributor. At the end of the multiplying operation, the result or product (PR) is stored in the computer, and the stored multiplier will have been completely cancelled by that time. Where division is to be performed, the divisor (DR) is stored in the distributor, and the dividend (DD) is stored in the computer. At the end of the operation, the quotient (QUO) will be standing in the lower computer and the remainder will be in the upper computer (unless a cancellation of the remainder is called for, in which case the upper computer will contain zeros).

A zero balance test may be performed at any time upon the information in the computer. This test comprises detecting an all-zero condition in the stored result. A plus-minus balance test involves detecting the sign of the value standing in the computer following a given arithmetic operation.

ADDITION AND SUBTRACTION

When an "add" (or "add plus") operation is called for by the computer, the distributor value is added to the computer value. When a "subtract" (or "add minus") operation is called for, the distributor value is subtracted from the computer value. These commands do not of themselves indicate whether the value in the distributor or the computer should enter the adder as a true number or as a complement. To determine this, the algebraic signs of the two values must also be taken into consideration. Table I, below, lists eight possible conditions that can occur, and for each condition it indicates the manner in which the two values respectively enter the adder:

*Table I*

| Arithmetic operation | Algebraic signs | | Type of entry | |
|---|---|---|---|---|
| | Distributor value | Computer value | Dist'r value | Comp'r value |
| Add | + | + | True | True. |
| Do | − | − | do | Do. |
| Do | + | − | do | Complement. |
| Do | − | + | Complement | True. |
| Subtract | + | + | do | Do. |
| Do | − | − | True | Complement. |
| Do | + | − | do | True. |
| Do | − | + | do | Do. |

For a "true add" operation (both values being entered as true numbers), the sign of the computer value is also the sign of the result. For a "complement add" operation (one of the values being entered as a complement), the sign of the final result will depend upon whether the sum of the two numbers is a true number or a complement. If the sum is a true number, no conversion is necessary, and the sign of the result is positive. If the sum is a complement, it is automatically converted to a true number, and the sign of the result is negative.

The biquinary codes for the digits 0 through 9, in both true and complement form, are given in Table II. (During a complement-add operation a carry is entered initially into the lowest order of the sum, thereby adding "1" to give the effect of a tens-complement addition.)

*Table II*

| Digits | True Codes | Complement Codes |
|---|---|---|
| 0 | B0Q0 | B5Q4 |
| 1 | B0Q1 | B5Q3 |
| 2 | B0Q2 | B5Q2 |
| 3 | B0Q3 | B5Q1 |
| 4 | B0Q4 | B5Q0 |
| 5 | B5Q0 | B0Q4 |
| 6 | B5Q1 | B0Q3 |
| 7 | B5Q2 | B0Q2 |
| 8 | B5Q3 | B0Q1 |
| 9 | B5Q4 | B0Q0 |

In order to bring out various features of the adding circuits, several examples have been selected. These examples are described briefly below and will be referred to again in the "detailed description" which follows the present functional description of the computer.

EXAMPLE 1

Distriubtor value: +0000048326
Computer value: +0000058423
Operation: Add (+58423+48326=+106749)

Both values are handled as true numbers, thus:

| 10th order | 9th order | 8th order | 7th order | 6th order | 5th order | 4th order | 3rd order | 2nd order | 1st order |
|---|---|---|---|---|---|---|---|---|---|
| B0Q0<br>B0Q0 | B0Q0<br>B0Q0 | B0Q0<br>B0Q0 | B0Q0<br>B0Q0 | B0Q0<br>B0Q0 | B0Q4<br>B5Q0 | B5Q3<br>B5Q3 | B0Q3<br>B0Q4 | B0Q2<br>B0Q2 | B5Q1<br>B0Q3 |
| B0Q0 | B0Q0 | B0Q0 | B0Q0 | B0Q1 | B0Q0 | B5Q1 | B5Q2 | B0Q4 | B5Q4 |

| | 5th order | 6th order | 3rd order | 2nd order | 1st order |
|---|---|---|---|---|---|
| Quinary carry | Yes | Yes | Yes | No | No |
| Binary carry | Yes | Yes | No | No | No |
| Result | +0000106749 | | | | |

In Example 1 it will be noted that no carry is involved in the first (or most right-hand) order of the problem, nor in the second order. The third order involves a carry from the quinary part to the binary part, but no carry from the binary part to the next order. The fourth and fifth orders (counting from the right) entail carries of both kinds in each order.

EXAMPLE 2

(Omitting superfluous higher orders):

Distributor value: +09712
Computer value: +84236
Operation:
Subtract (add minus) +84236—09712=+74524

The distributor value is changed to a complement; the computer value remains true, thus:

| | | | | | |
|---|---|---|---|---|---|
| Entry from distributor | B5Q4 | B0Q0 | B0Q2 | B5Q3 | B5Q2 (90287) |
| Entry from computer | B5Q3 | B0Q4 | B0Q2 | B0Q3 | B5Q2 (84236) |
| | B5Q2 | B0Q4 | B5Q0 | B0Q2 | B0Q4 (74524) |
| Quinary carry | Yes | No | Yes | Yes | No |
| Binary carry | Yes | No | No | Yes | Yes |
| Result | +74524 | | | | |

In the foregoing analysis we have ignored the carry from the highest significant order. The presence of this carry merely signifies that the result standing in the computer is a true number; hence no conversion step is needed. This sign of the result is positive under these conditions.

EXAMPLE 3

(Omitting superfluous higher orders):

Distributor value: +09712
Computer value: —84236
Operation: Add (—84236+09712=—74524)

Computer value is entered as a complement, distributor value remains true, thus:

| | | | | | |
|---|---|---|---|---|---|
| Entry from distributor | B0Q0 | B5Q4 | B5Q2 | B0Q1 | B0Q2 (09712) |
| Entry from computer | B0Q1 | B5Q0 | B5Q2 | B5Q1 | B0Q4 (15764) |
| | B0Q2 | B5Q0 | B0Q4 | B5Q2 | B5Q1 |
| Quinary carry | No | Yes | No | No | Yes |
| Binary carry | No | Yes | Yes | No | No |
| First result | B0Q2 | B5Q0 | B0Q4 | B5Q2 | B5Q1 (25476) |

It will be noted that no carry took place from the fifth or highest significant order to the next higher order. This indicates that the value in the computer is a complement, thereby calling for a conversion step known as a "complement adjust" cycle. This consists of entering the complement of the first result into the adder (where it is merged with zeros) and storing the new result in the computer, thus: —74524.

The result is given a negative sign whenever a complement adjust cycle is performed.

Sums or differences may be produced up to a maximum of twenty digits. A computer overflow circuit will indicate an error if a sum or difference exceeds the maximum of twenty digits. Since only one value of ten numerical digits may be read into or from the computer in a single operation, numbers which exceed ten numerical digits must be considered as two values, both in storage and in the computer. Sums or differences which are known to be ten digits or less in length may be produced in either the lower or the upper portion of the computer.

Reset

Addition and subtraction can be performed with or without a reset of the computer. A reset operation involves cancellation of the value standing in the computer and replacement of this value with plus zeros (zeros with a stored positive sign).

An add or subtract operation is always accompanied by either a "reset" or a "no-reset" signal. With a "no-reset" signal the value in the computer is retained and added to the value from the distributor, the sum then being stored in the computer. With a "reset" signal the value in the computer is replaced by plus zeros before addition takes place.

Shifting

Any number stored in the computer may be shifted from one to ten places to the right or left in an operation comprising a series of consecutive shifts. One revolution of the computer revolvers (that is, one complete circulation of the twenty-two digits stored therein) is required for each position shifted.

A typical right-shift operation will now be described with reference to Figs. 11 and 12. During each step of a right-shift operation, the lowest-order digit is dropped, the remaining digits are moved to the right one place, and zeros are added to the highest-order positions DG10–U and DG11–U. In effect, the lowest-order digit is shifted out of the computer and lost, and a zero is added to the high-order end to fill the vacancy created by the right shift.

At the start of the operation the digits are disposed in the positions shown in Fig. 12A. The numbers 1 to 20 refer to digits in consecutive orders of a twenty-digit value, and not to the numerical values of the digits. These digits will have been circulating through the computer regeneration revolver 11A and regeneration circuit 25, Fig. 11, prior to the start of the right-shift operation. It will be assumed that the stored computer value is to be shifted two places to the right. In other words, the shift number in this case is 2.

As a first step in the shift operation, the tens-complement of the shift number (in this case, 8) is entered into the DG1–L position of the computer regeneration revolver, as indicated in Fig. 12B. In order to effect a right shift of one place, the value stored in the regeneration revolver is passed through the right-shift circuit 45, Fig. 11, into the operation revolver 11B. Before this action takes place, however, the shift number complement stored at DG1–L is switched to the adder 33, where a digit 1 is added to the shift number complement. In this instance, the shift number complement will be increased from 8 to 9. A similar action takes place for each subsequent shift, 1 being added to the shift number complement.

The new shift number (or shift number complement plus 1) enters the computer operation revolver just ahead of the digit which was initially stored at DG3–L in the regeneration revolver. The digit which was stored at DG2–L has by this time been neglected and lost and is, in a sense, replaced by the new shift number at this stage of the process. When the series of digits which has been passing from the right-shift circuit 45 to the computer operation revolver 11B reaches the reading station of the operation revolver, it is read out. Since the reading takes place one digit time early in the operation revolver, the effect is to shift the series of digits one place to the right, bringing them effectively into the positions thereof shown in Fig. 12C.

In order to fill the vacancy at the left-hand end of the stored value which otherwise would be created by the right shift, zeros are added to the DG10–U and DG11–U positions in each shift cycle. Theoretically, only one zero would be required, at the DG10–U position, but in practice it has been found more convenient to add two zeros than to circulate the digit which was stored initially in the DG11–U position.

The next step is a repetition of the foregoing step, except that the shift number complement is now raised from 9 to 0 plus a carry. This carry is the signal which terminates the right-shift operation after the digits have passed through the right-shift circuit and computer operation revolver to the computer regeneration revolver. The final result is depicted in Fig. 12D, wherein the digit which initially was stored at DG4–L now occupies position DG2–L, and zeros now are stored at DG9–U and DG10–U.

A typical left-shift operation will now be described with reference to Figs. 13 and 14. Any number stored in the computer may be shifted from one to ten places to the left in an operation which comprises a series of left-shift steps. One revolution of the computer revolvers (that is, one complete circulation of twenty-two digits stored in the computer) is required for each position shifted. During a left shift, the highest-order digits are shifted out of the computer and a corresponding number of zeros is added into the lower-order positions of the computer to maintain the total of twenty-two digits in the computer. The digits shifted out of the computer are lost. The complement of the shift number is stored in the DG1–L position and is increased by one for each shift until it reaches zero.

A left shift is effected by passing the value stored in the computer regeneration revolver, Fig. 13, through the adder 33 which delays each digit one position. The shift number complement digit at DG1–L, however, which is passed through the adder and is thus retarded, is switched to the computer operation revolver in order to maintain this digit effectively in the DG1–L position.

Referring now to Fig. 14, the digits 1 to 20, Fig. 14A, denote the digits in the ascending orders of a 20-digit value. These reference numerals 1 to 20 are not themselves the numerical values of the digits. Assuming that the computer value is to be shifted to the left two places, the tens-complement of 2, or 8, is first entered into the DG1–L position through the adder 33 and the computer operation revolver, as indicated in Fig. 14B. Next, the digits stored in the computer regeneration revolver are sent through the adder 33. The shift number complement is increased by 1, due to the automatic addition of 1 thereto at DG1–L time in the adder 33. The new shift number complement then passes through the computer operation revolver so that it is maintained effectively at the DG1–L position. The remaining digits of the stored computer value are merged with zeros in the adder 33 and are then fed to the computer regeneration revolver.

The digits which were in positions DG2–L to DG11–U are delayed one digit time in passing through the adder 33. Thus, the digit which originally was in position DG2–L, Fig. 14B, emerges from the adder 33 at DG3–L time, so that it will be recorded in the computer regeneration revolver in the DG3–L position, Fig. 14C. Meanwhile, it has been necessary to insert a zero in the DG2–L position, Fig. 14C, to prevent a vacancy from occurring therein. This zero entry is effected through special circuitry which will be described later. The remaining digits in the series pass through the adder 33 and are recorded in the computer regeneration revolver, where they are displaced respectively one position to the left of their original positions. The digit which originally was in the DG11–U position is lost. The digit that was in the DG10–U position tends to shift into the DG11–U position. However, it is not desirable that a digit other than zero occupy the DG11–U position since this would cause an error on a zero balance test. Therefore, the new DG11–U digit is blanked at the output of the adder 33 and is replaced by a zero which is added at DG11–U time through special circuitry.

In the course of the first left shift, from Fig. 14B to Fig. 14C, the complement shift number 8 was increased to 9. Another left shift now takes place, causing the number 9 to be increased to zero with a carry. This carry is prevented from entering the DG2–L position, being replaced by the zero therein, but it serves to terminate the left-shift operation when the current cycle is completed. The above described sequence now is repeated, with each digit being delayed one position in going through the adder 33 (where it is merged with a zero) and consequently is recorded now two digit positions to the left of its original position, as shown in Fig. 14D. The digit which was in the DG10–U position in Fig. 14C is dropped, and a zero is again inserted at DG11–U.

Left-shift and right-shift functions frequently are combined with other functions such as addition and subtraction, as during multiplication, division or half-correction operations. In this case the digits which pass through the adder 33 may be modified by other digits, rather than being merely merged with zeros as described above. This will become more apparent as the description proceeds.

MULTIPLICATION

A maximum product of twenty digits can be produced in a single multiplying operation from two factors, neither of which may exceed ten digits. The units digit of the product will always be in the units digit position (DG2–L) of the lower computer. Therefore, a product of ten digits or less will be located in the lower computer. If a product is greater than ten digits, the higher orders thereof will extend into the upper computer. Where a product occupies both the upper and lower computers, it must be treated as two separate values during readout.

The multiplier (MP) is stored in the upper computer, and the multiplicand (MC) is stored in the distributor at the start of the multiplying operation, as indicated in Fig. 15. The product (PR) is developed in the lower computer by successive additions of the MC. An intermediate product is obtained in each cycle of the multiplication by adding the MC as many times as indicated by the MP digit in the highest remaining order. The final product, as stated above, can occupy both the lower computer and the upper computer. The MP value in the upper computer is progressively shifted to the left as its digits are used up, commencing with the highest order, so that the MP value will have been removed completely from the upper computer by the time a final product is obtained.

Fig. 15 indicates the flow of information through the computer for a multiplying operation. In each cycle the current PR value (intermediate product) derived from one or the other of the computer revolvers enters the adder 33 as a true number, and the MC value from the main distributor enters the adder as a true number or as a complement, depending upon whether an addition or a subtraction is to be performed. This will be explained later. The digits of the intermediate product and the multiplicand are merged in the adder 33 to give a new product. The new product may enter the computer regeneration revolver directly or be switched to the computer operation revolver, depending upon whether or not a left shift is to be performed. If the addition (or subtraction) is to be accompanied by a left shift, the new product coming from the adder 33 is entered directly into the computer regeneration revolver. If no shift is to take place, the new product is routed from the adder 33 to the computer operation revolver, from which it is read out one digit time early to cancel the one-digit delay that took place in the adder 33. In the next succeeding cycle, the current PR value (if it is not the final product) again enters the adder 33 from either the regeneration revolver or the operation revolver, being merged in the adder with the MC value in either true or complement form.

The multiplication method employed herein is basically an over-and-over addition process with numerous modifications to reduce the multiplying time. As a general rule, if the active MP digit is below 5, the MC is added to the current PR value, and the MP digit is reduced by one, this process being repeated until the MP digit is reduced to zero. If the MP digit is 5 or greater, ten times the MC value is first added to the current PR value, and then the MC is subtracted progressively from the new PR value, with the MP digit being increased by one for each subtraction until zero is reached. When the active MP digit is zero, a left shift takes place.

The construction of the computer circuits, Fig. 15, makes it possible to combine a left shift with an addition or a subtraction. This feature lends itself to a further modification of the multiplication procedure just described, materially shortening the time required to complete a multiplication. This method involves both the detection of the MP digit in the active or highest position (DG11–U) and the detection of the MP digit in the next highest position (DG10–U) to determine whether the latter is in the below-5 level or the 5-and-above level. The resultant process (which is the one actually used in the present computer) is set forth in Table III below:

*Table III*

| MP digit DG11–U | MP digit DG10–U | Next step of operation |
|---|---|---|
| 0 | below 5 | Left shift only. |
| 1 | do | Add MC and left shift. |
| (Sub. 1) 2 thru 4 | do | Add MC. |
| (Add 1) 5 thru 8 | do | Sub. MC. |
| 9 | do | Sub. MC and left shift. |
| 0 | 5 or above | Add MC and left shift. |
| (Sub. 1) 1 thru 4 | do | Add MC. |
| (Add 1) 5 thru 7 | do | Sub. MC. |
| 8 | do | Sub. MC and left shift. |
| 9 | do | Left shift only. |
| (Sub. 1) 1 thru 4 | None [1] | Add MC. |
| (Add 1) 5 thru 9 | do.[1] | Sub. MC. |

[1] None of the original MP digits remaining in this position. Digits shifted from lower computer to upper computer are ignored here.

It will be noted that when the addition of MC is combined with a left shift, the effect is the same as though 10 times the MC had been added immediately following the left shift. This enables a subtraction of the MC value to take place in the step immediately following a left shift, without waiting for the preliminary addition of 10MC.

Example 4 given below is a simple illustration of the manner in which the various steps described in Table III can be carried out in an actual computation. In this example the MC is 7 and the MP is 189,712, the product of these two factors being 1,327,984.

EXAMPLE 4

MC=7
MP=189,712

PR=1,327,984

| Step | MP (upper computer) | PR (lower computer) | Next step of operation |
|---|---|---|---|
| A | 189712 | 0 | Add MC. |
| B | 089712 | 7 | Add MC and left shift. |
| C | 89712 | 140 | Subt. MC and left shift. |
| D | 9712 | 1330 | Left shift. |
| E | 712 | 13300 | Subt. MC. |
| F | 812 | 13293 | Subt. MC. |
| G | 912 | 13286 | Subt. MC and left shift. |
| H | 12 | 132790 | Add MC and left shift. |
| J | 2 | 1327970 | Add MC. |
| K | 1 | 1327977 | Add MC. |
| L | 0 | 1327984 | End operation. |

Step A shows the MP recorded in the upper computer and occupying the extreme left-hand position therein (it being assumed that the preliminary left shifts have been performed to bring the MP into this position). The highest order MP digit is 1, and the MP digit in the next highest order is 8. Referring to Table III, it will be seen that the next step of the operation consists merely of adding the MC value (7) to the current PR value (0). At the same time, the highest order MP digit is reduced by 1. Thus, in step B the MP value is now 089712, and the current PR value is 7. With 0 in the highest MP order and 8 in the next highest MP order, the next step of the operation is "add MC and left shift." Hence, the MC value 7 is added to the PR value 7 to give 14, and the sum is shifted to the left one place, making the PR value 140. The MP value is likewise shifted to the left one position.

Thus, in step C the highest order MP digit is 8 and the MP digit in the next highest order is above 5. The next step, therefore, is "subtract MC and left shift." Seven subtracted from 140 leaves 133, which is shifted to the left one place, yielding a new PR value of 1330. The MP is likewise shifted on position to the left, so that in step D the remaining MP value is 9712. The remaining steps E through L in Example 4 are readily traced by reference to Table III. When the MP digit which was initially in the lowest order has been shifted into the highest-order position and reduced to zero, the multiplying operation is ended. Ten left shifts are performed in each complete multiplying operation. Some of these left shifts may be idle steps insofar as forming the final product is concerned, as will be seen from the next example.

Example 5, shown in Fig. 16, gives a more complete tabular representation of the action which takes place within the computer revolvers. In this example the MC is 0000022222 and the MP is 0000108829, the product of these two factors being 2418398038. Starting in step A, with the MP recorded in the upper computer, five consecutive left shifts are performed in order to bring the highest significant digit of the MP into the DG11-U position (Step F). A shift tally is kept in the lowest position (DG1-L) of the computer. With each left shift that takes place, "1" is added to the figure recorded in this position. The figure in the DG1-L position is not shifted. Figures which are not to be shifted pass into the computer operation revolver, Fig. 15, from the adder 33, while figures which are to be shifted pass from the adder 33 to the computer regeneration revolver.

The conditions in step F, Fig. 16, are such that an "add MC and left shift" step is required. Hence, the MC is entered into the lower computer and is immediately shifted to the left one place (step H). This time a "subtract MC and left shift" step is called for. The MC value is first subtracted from the PR value, and when the difference is recorded, the digits thereof effectively occupy the positions shown in step J of Fig. 16. The next step does not require a left shift; hence (Fig. 15) the remaining MP value and the new PR value are routed from the adder 33 to the computer operation revolver. The values which were previously recorded in the computer regeneration revolver continue to circulate through the regeneration circuit, Fig. 15, until they are replaced by new values.

At the completion of the multiplication process, the multiplicand is still held in the distributor and the product is stored in the computer regeneration revolver. The multiplier has been reduced to zero by this time. The product may now be handled in the same manner as any other value stored in the computer. That is, it can be added to, subtracted from, used as a factor in a subsequent division operation, and so forth, or it can be transferred out of the computer to storage by way of the distributor.

Division

In performing division, the dividend (DD) is entered into the computer regeneration revolver, Fig. 17, and the divisor (DR) is entered into the distributor. During the course of the computation the divisor is repeatedly read out of the one-digit-early distributor in order that it can be entered into the upper computer, where the computation actually takes place. The dividend is read out of the computer and enters the adder 33 as a true number. The divisor is entered as a complement into the added 33 until an over-subtraction takes place, whereupon the divisor is added once as a true number to restore the condition which prevailed in the computer just prior to the over-subtraction. This will be brought out more clearly in connection with an actual example in the following description. The merged result which is read out of the adder 33 will enter either the computer regeneration revolver or the computer operation revolver, Fig. 17, depending upon whether or not a left shift is to take place. The dividend is progressively shifted out of the lower computer and is replaced by the quotient. The remainder appears in the upper computer and may be cancelled or retained as desired.

Example 6, illustrating the operation of the computer for a DD of 88,743 and a DR of 382, is shown diagrammatically in Figs. 18 and 18A. With the DD entered in the lower computer, an initial left shift is performed (step 2) in order to clear the DG2-L position for the first quotient digit. The DR then is subtracted (by complement addition) from the upper computer, as shown in step 3. Since the value in the upper computer is less than the DR, the result of this subtraction is a complement. This indicates an over-subtraction, and so in step 4 the DR is added to the upper computer, restoring the zero condition therein. At the same time, a left shift takes place, and the shift count is started.

Steps 5 to 16, inclusive, Figs. 18 and 18A, depict a series of alternate subtractions and additions of the DR in the upper computer, with left shifts accompanying the addition steps. During this time the significant digits of the DD are being shifted progressively to the left, until finally (step 16) the DD is in such a position that subtraction of the DR from the upper computer value no longer produces a complement (step 17). Thereupon, a second consecutive subtraction of the DR value takes place (step 18) and a "1" is recorded in the DG2-L position. Since the result of the second subtraction is likewise a true number, a third subtraction occurs (step 19), and the number at DG2-L is increased from "1" to "2." This time an over-subtraction occurs, and in step 20 the DR is added back into the upper computer, with an accompanying left shift of both upper computer and lower computer values. The remainder having been shifted to the left, it is now possible to subtract the DR therefrom without producing a complement result, as indicated in step 21. Hence, in step 22, a second subtraction of the DR from the upper computer value is performed, and a "1" is entered in the DG2-L position. Successive subtractions take place without any left shift until an over-subtraction occurs (step 24). The digit at DG2-L meanwhile has increased to "3." Now the DR is added back into the upper computer (step 25), and the remainder is shifted to the left, along with the quotient digits 23. Consecutive subtractions then take place until an over-subtraction occurs in step 28. Since the maximum number of shifts has now taken place, there is no further left shift. The DR merely is added to the upper computer value (step 29), restoring the remainder value 119. The quotient 232 appears in the lower computer.

The maximum size of divisor which can be handled by the computer in a single dividing operation is ten digits. The maximum size of the quotient is ten digits. The remainder may not exceed ten digits. The maximum size of the dividend which can be handled by the computer will vary from problem to problem in accordance with (1) the number of significant digits in the divisor and (2) the relative magnitude of the highest-order significant digits in divisor and dividend. The maximum permissible number of significant digits in the dividend is given by the followng relations:

(1) If the highest-order digit of DR is less than the highest-order digit of DD, the maximum number of significant digits in DD is equal to the number of significant digits in DR plus 9. In Example 6, Fig. 18, for instance, the DR 382 has three significant digits and the "3" in DR is less than "8" in DD; therefore, the DD could not exceed 3+9=12 significant digits.

(2) If the highest-order digit of DR is greater than the highest-order digit of DD, then the maximum number of significant digits in DD is equal to the number of significant digits in DR plus 10. Thus, if DR were 382 and the highest-order significant digit in DD were 2, the DD then could have a maximum number of 3+10=13 significant digits.

(3) If the highest-order significant digits of DR and DD are equal, then the comparison should be made in the next highest order in which there is inequality. If the DR digit in said order is less than the corresponding DD digit, or if no inequality can be found in any of the corresponding orders, then rule 1 is followed; otherwise, rule 2 is followed. For example, if DR is 382 and DD is 383*xxx* or 382*xxx*, then DD cannot exceed twelve significant digits, but if DR is 382 and DD is 381*xxx*, then the DD can have as many as thirteen significant digits.

If the proposed dividend has more than the permissible number of significant digits, the dividing operation then must be performed in sections.

As mentioned above, the quotient is stored in the lower computer, and the remainder is stored in the upper computer following a division. Either the quotient or the remainder may be read out to storage independently of the other. If it is desired to use the quotient only, the remainder can be cancelled automatically, as will be explained in a subsequent portion of the description.

Sometimes it is desired to perform an additional division using the remainder as a new dividend or as part of a new dividend. In this case the procedure is as follows:

(1) Read out the first quotient to storage.

(2) Read out the remainder to the distributor and reenter it into the upper computer with reset. This eliminates the first quotient from the lower computer, leaving it in storage only.

(3) If there were additional DD digits beyond the capacity of a single division, they may be read into the lower computer before the second division.

(4) A second division is carried out to obtain a maximum of ten additional quotient digits.

Half-Correction

Any number stored in the computer can be half-corrected from one to ten places in a single operation. The digits in the ten lowest orders of the number to be half-corrected must be in the lower computer. After a half-correction, the lowest-order digit of the number will be stored in the units position (DG2–L) of the computer. If it is desired to half-correct a value more than ten places, this can be accomplished in two operations.

The half-correction is carried out in the same manner as the right-shift operation previously described herein, except for one additional cycle which is inserted just prior to the final right shift. When the complement shift number is "9," the stored computer value is passed through the adder and +5 is added to the units digit of the value (DG2–L). If this digit is "5" or greater, a carry pulse will add "1" to the next digit (DG3–L). If the units digit is below "5," there will be no carry pulse, and the next digit will remain unchanged. These operations are illustrated by Examples 7 and 8 below:

EXAMPLE 7

Value prior to final right shift: 4817
Add 5 and carry: 4822
Shift right: 482

EXAMPLE 8

Value prior to final right shift: 4813
Add 5—no carry: 4818
Shift right: 481

In the half-correction cycle the complement shift number is not increased by "1" inasmuch as no shift is performed in this cycle. In the next cycle, however, the value is shifted one more place to the right, and the complement shift number advances from "9" to "0" plus a carry. The carry signal terminates the operation, leaving the lowest digit of the half-corrected value stored in the units digit position of the computer.

Zero Balance Test

A special circuit in the computer detects the presence of zeros in the stored computer value. If all twenty-two digits of the computer are zeros, a zero balance signal is transmitted. If any digit is different from zero, a no-zero balance signal is transmitted. The balance test signal is used generally to effect logical decisions for program control purposes.

Readout From Computer

It has been mentioned above that the algebraic signs of values entered into the computer revolvers are stored separately, being replaced by zeros in the computer revolvers. When a value is read from either the upper or lower computer, the stored computer sign is then inserted into the sign digit position of the value, unless a remainder from a division operation is being read out. If there is a remainder readout from the upper computer, the remainder sign is substituted for the computer sign. For a remainder to have its proper sign, it must be read from the upper computer.

DETAILED DESCRIPTION

Under this heading there will be described the details of various circuits that have been disclosed functionally hereinabove, and some elementary examples will be given to explain the manner in which these circuits operate. Following the detailed description, in the portion of the specification entitled "Operations," there will be described some further examples of a more comprehensive nature to illustrate the functioning of the apparatus as a whole.

Computer Circuits—Master Diagram

The principal computer circuits are illustrated in block diagram form in Figs. 19 through 19S. Fig. 20 indicates the manner in which these views should be assembled. For convenience in locating the various circuit elements, the master diagram has been referenced along one axis with the index characters 1 through 11 and along another axis with the index characters A through Z. In the following portions of the description, these index characters will be employed for locating the respective elements shown in the master diagram. The dotted rectangles in Fig. 20 serve to identify the index positions which are located in the various figures. Thus, for instance, if reference is made to position 5–E, it will be seen from Fig. 20 that this particular index position is located in Fig. 19G. Once the views are assembled as shown in Fig. 20, it will be found more convenient to use these index numbers than to employ the usual figure numbers in locating various parts of the block diagram.

Tube and Diode Circuits

Figure 21:
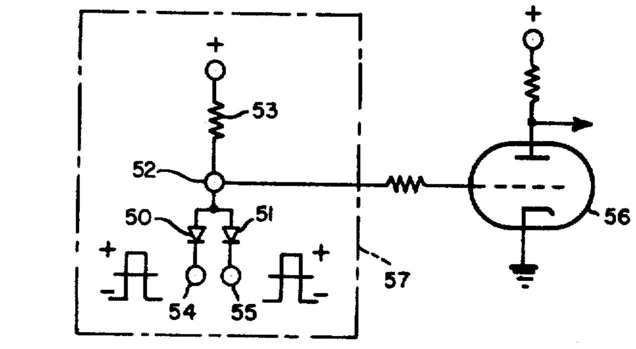
Figure 22:
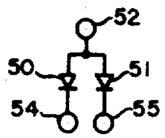

Attention will be given now to various typical forms of tube and diode circuits which are shown diagrammatically in Figs. 19 to 19S. In Fig. 21, for example, there is shown a typical coincidence switch, otherwise known as a logical "and" circuit, comprising the germanium crystal diodes 50 and 51. The common terminal 52 of the diodes 50 and 51 is connected through a voltage-dropping resistor 53 to a source of positive voltage (not shown). The individual input terminals 54 and 55 of the diodes 50 and 51 are normally biased negatively so that the common terminal 52 is normally at a negative potential with respect to ground. If coincident positive pulses are applied to the terminals 54 and 55, the potential of the terminal 52 is raised. However, if only one of the terminals 54 and 55 is pulsed positively, the potential of the terminal 52 is not raised appreciably. A voltage-responsive device, such as the electron tube amplifier 56, is controlled by the potential of the terminal 52 to furnish a usable output voltage pulse whenever a coincidence of positive input pulses is detected. For simplicity, the portion of the coincidence switch shown in the broken-line rectangle 57, Fig. 21, is generally represented as shown in Fig. 22, omitting the dropping resistor 53 and the connection to the positive voltage source.

Figure 23:
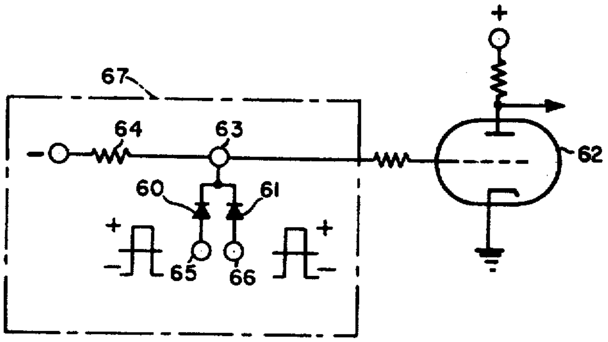
Figure 24:
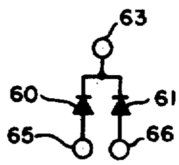

In Fig. 23 there is shown a typical mixer, otherwise known as a logical "or" circuit, comprising the diodes 60 and 61. Diodes which are employed in mixers are shaded in the present drawings to distinguish them from the diodes which are employed in switches. A voltage-responsive device, represented by the electron tube amplifier 62, is controlled by the potential of the common output terminal 63 of the diodes 60 and 61, which terminal is connected by a resistor 64 to a source of negative voltage (not shown). If either one (or both) of the diode input terminals 65 and 66 is pulsed positively, the potential of the terminal 63 is raised. For convenience, the portion of the mixer circuit shown in the broken-line rectangle 67, Fig. 23, is generally represented as shown in Fig. 24, omitting the resistor 64 and the connection to the negative voltage source.

Figure 25:
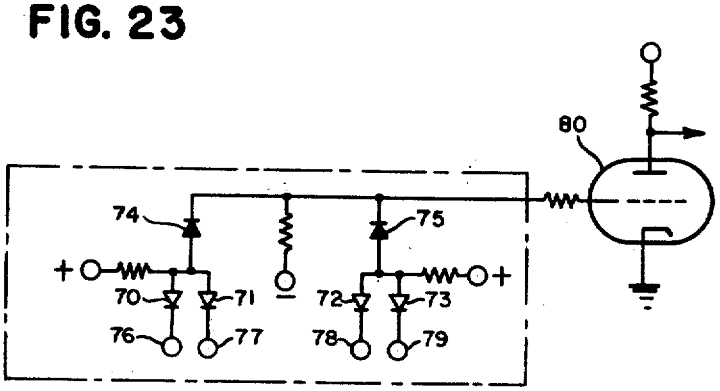
Figure 26:
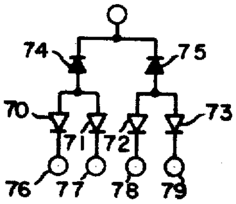

In Fig. 25 there is shown a circuit wherein separate switches, respectively comprising the diode pairs 70—71 and 72—73, feed through the respective mixer diodes 74 and 75 to the voltage-responsive device represented by the electronic amplifier 80. A coincidence of positive voltage pulses at the input terminals 76 and 77, or at the input terminals 78 and 79, causes the grid voltage of the tube 80 to rise. Fig. 26 illustrates the simplified showing of the diode network.

Figure 27:
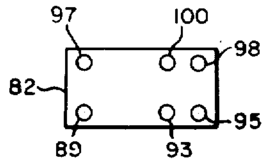

Various types of tube circuits are indicated by blocks in the master diagram, Figs. 19 to 19S. These circuits will be described now in greater detail. Fig. 27, for example, represents in block or rectangle form a type of double inverter unit 82. This unit is shown schematically in Fig. 28, where it is seen to comprise a twin triode amplifier 83 in which the plate 84 of the first triode is coupled through a resistor 85 and capacitor 86 to the grid 87 of the second triode. The grid 88 of the first triode is connected to an input terminal 89. The cathodes 90 and 91 have a common ground connection as shown. The grid 87 is connected through a resistor 92 to a terminal 93 and is also coupled by a capacitor 94 to a terminal 95. The plates 84 and 96 of the first and second triodes, respectively, are connected to plate terminals 97 and 98. The plate circuit of the second triode also has a tap 99 connected to a plate tap terminal 100.

Figure 28:
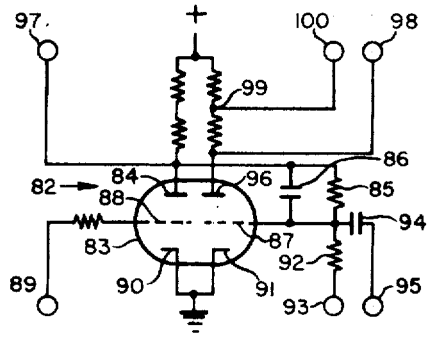

The operation of the double inverter shown in Figs. 27 and 28 is such that when a positive pulse is applied to the input terminal 89, the resulting drop of voltage at the plate 84 is communicated to the grid 87, causing a rise in voltage at the plate 96. Hence, a positive output voltage pulse is available at the terminal 98 or 100, and a negative output pulse is available at the terminal 97. As will be explained subsequently, the double inverter shown in Figs. 27 and 28 is adapted to be used in conjunction with a cathode follower to provide a latch unit. When used in this fashion, the unit is turned "on" by a positive pulse applied to the input terminal 89, and it is turned "off" or reset by the application of a positive pulse to the terminal 93 or 95.

Figure 30:
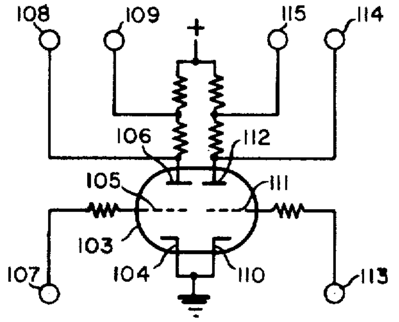
Figure 29:
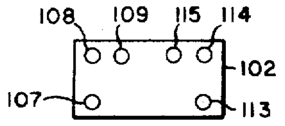
Figure 29A:
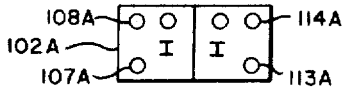

Figs. 29 and 30 illustrate another type of double inverter unit 102 comprising a twin triode 103 in which the two triode sections operate independently of each other. Thus, the triode 104—105—106 has a grid input terminal 107, a plate output terminal 108 and a plate tape terminal 109. The other triode 110—111—112 has a grid input terminal 113, a plate output terminal 114 and a plate tap terminal 115. This type of double inverter also can be employed in a latch unit, as will be explained. Since the unit shown in Fig. 30 is actually two separate inverters, it is occasionally represented herein by the symbol shown in Fig. 29A rather than the symbol in Fig. 29.

Figure 32:
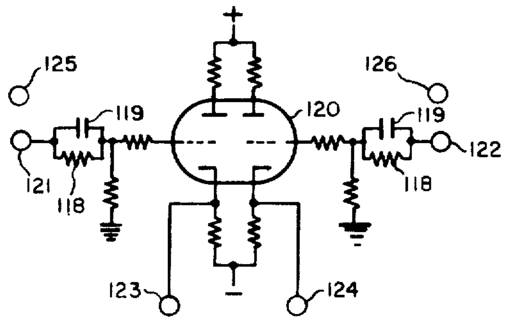
Figure 31:
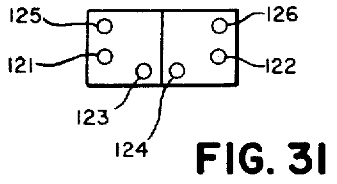

Numerous cathode followers are employed in the computer circuits, and in most instances it is found economical to utilize double units of this type. Figs. 31 and 32, for example, illustrate a double cathode follower unit utilizing a twin triode 120 having grid input terminals 121 and 122 and cathode output terminals 123 and 124. The two cathode followers of this unit operate independently of each other. Terminals 125 and 126 are not used in this type of a unit. The input resistors 118 and capacitors 119 may be omitted under some conditions.

Figure 33:
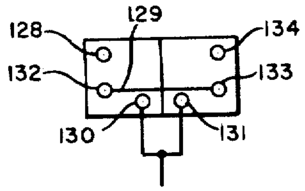
Figure 34:
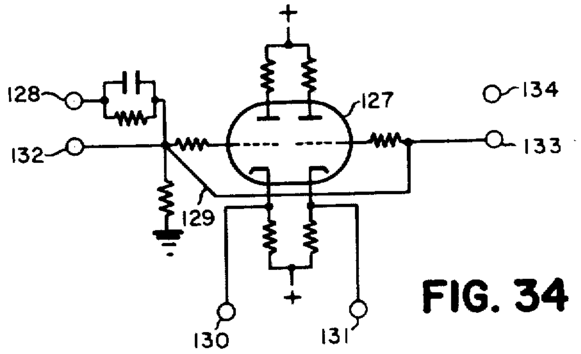

In Figs. 33 and 34 there is shown a double cathode follower unit in which the two grids of the double triode 127 are connected together by a conductor 129, and the cathode output terminals 130 and 131 usually are jumpered together, thereby connecting the two cathode followers in parallel relationship. Grid input terminals 128, 132 and 133 may be used in this unit. Terminal 134 is not used.

Figures 35, 36:
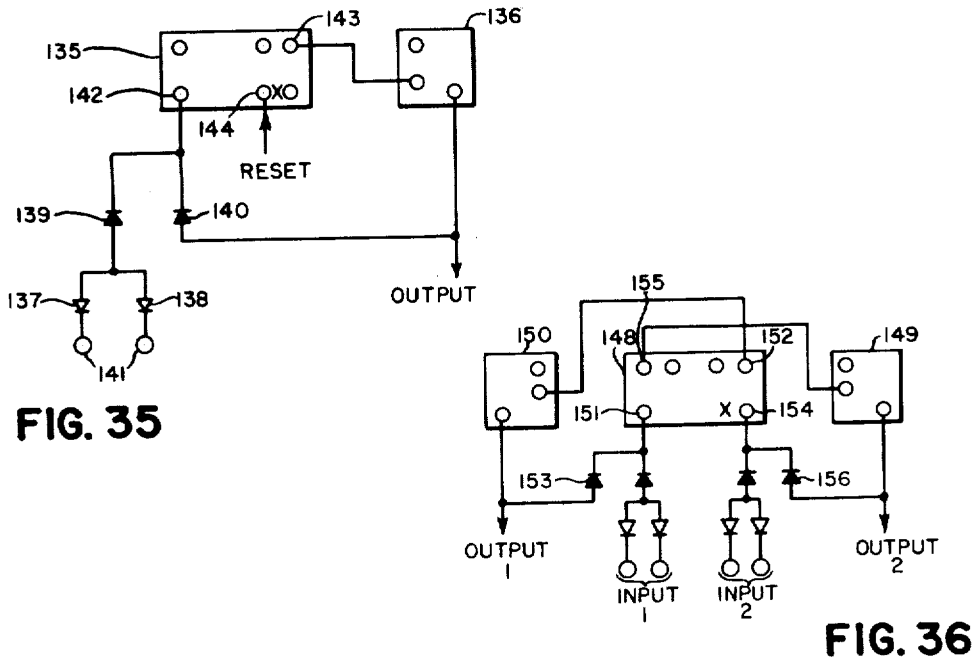
Figure 37:
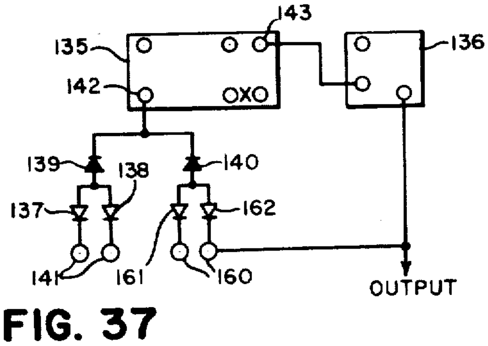

Figs. 35, 36 and 37 show various forms of latch units that are employed in the computer circuits, and are substantially identical to certain of these latch units are disclosed and claimed in the application for patent filed by Ernest S. Hughes, Jr., Serial No. 264,295, filed December 31, 1951, issued on February 10, 1953, as Patent No. 2,628,309. The latch unit which is illustrated in Fig. 35 uses a double inverter 135 of the type shown in Figs. 27 and 28 above, a cathode follower 136 and a combination of diodes 137 to 140 for input and feedback purposes. In the normal "off" condition of the latch unit, the left-hand section of the double inverter 135 is cut off and the right-hand section thereof is conducting, as indicated by the "X" in Fig. 35. The application of coincident positive pulses to the switch terminals 141 causes a positive pulse to be applied at the input terminal 142 of the double inverter 135, thereby turning the unit "on." The positive output voltage at the terminal 143 is fed back through the cathode follower 136 and the mixer diode 140 to the input terminal 142, thereby maintaining the latch unit "on." The output of the latch unit is taken from the output side of the cathode follower 136. To reset the latch unit, a positive pulse is applied to a reset terminal 144 as shown in Fig. 35, causing a negative voltage to be fed back through the cathode follower 136 and the mixer diode 140 to the input terminal 142.

Fig. 36 illustrates a type of latch unit which employs a double inverter 148 (similar to the unit shown in Figs. 29 and 30) and the two cathode followers 149 and 150. This latch unit will respond to two separate inputs, applied at different times, and will furnish two different outputs. The application of a positive input pulse to the grid terminal 151 causes a positive output voltage from the plate terminal 152 to be fed back through the cathode follower 150 and mixer diode 153 to the terminal 151. Conversely, the application of a positive input pulse to the grid terminal 154 causes a positive output voltage at the plate teminal 155 to be fed back through the cathode follower 149 and mixer diode 156 to the terminal 154.

The latch unit illustrated in Fig. 37 is similar to that shown in Fig. 35 except that the latching action depends upon the coincidence of positive voltages at input terminals 160. One of these coincident voltages, of course, is the positive output furnished by the cathode follower 136 when the double inverter 135 is "on." The other coincident voltage is supplied by a source which controls the latching action. So long as the switch diodes 161 and 162 are energized by these coincident positive voltages, the double inverter 135 is latched in its "on" condition, but when the coincidence is destroyed, the unit is immediately turned "off." It is not necessary to supply a separate reset pulse for this purpose.

Timing or Clocking Pulses

As mentioned hereinabove, the timing or clocking circuits 14, Fig. 1, generate various timing or clocking pulses under the control of timing spots magnetically recorded on the drum MD, this being done in accordance with techniques that are well known in the art. These timing pulses are supplied to the computer circuits and the distributor circuits for controlling various switching functions, as will be described more fully hereinafter.

Fig. 38 is a timing diagram of the pulses which are generated with reference to the various bits or elements of the biquinary code employed in the present system (see Fig. 3). Fig. 38A is a smaller timing diagram which illustrates certain features of these timing pulses. Each elementary period of the timing sequence contains what are known as "A" and "B" points. The "A" point comes at the beginning of the period, and the "B" is at the middle of the period. "A" pulses, Figs. 38 and 38A, are short timing pulses which are initiated at the "A" points. "B" timing pulses are initiated, respectively, at the "B" points. An "AA" pulse has a duration extending from one "A" point to the next succeeding "A" point, while a "BB" pulse is one which has a duration extending from a "B" point to the next succeeding "B" point.

Fig. 38 lists the various timing pulses which may be employed, along with their abbrevations. For example, "AP" represents "A" pulses, "NAP" represents negative "A" pulses, and so forth. Some pulses are identified as pertaining specifically to quinary bits, binary bits, or the "0" switching points. Other pulses identified as zeros, ones, twos, and so forth, comprise various combinations of binary and quinary "bit" pulses, as indicated.

Figure 2:
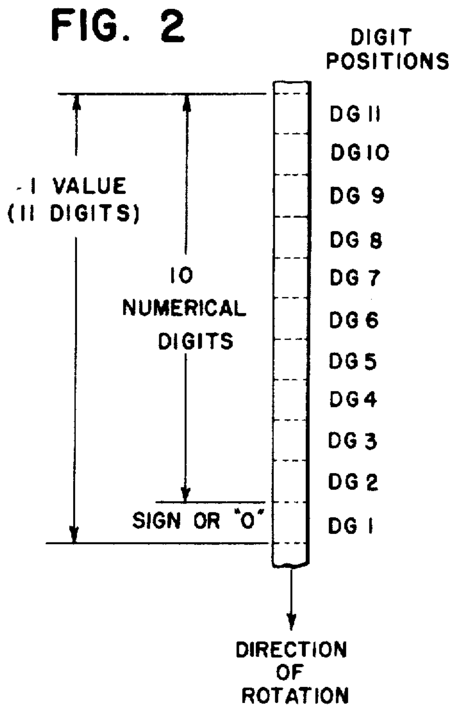
Fig. 2 is a fragmentary schematic representation of a recording track on the magnetic drum showing the arrangement of digit positions for one value.

Fig. 39 is a timing diagram for those pulses which are generated with reference to the digit and value positions laid out on the drum MD (see Fig. 2). Some of the pulses are identified as digit gate (DG) pulses and others as value gate (VG) pulses. A digit gate pulse, of course, lasts for only one whole digit interval, while a value gate pulse lasts for an entire value time. Only those gate pulses which are used in the disclosed circuitry are shown in Fig. 39.

Distributor Circuits; Regeneration Circuits; Readin and Readout Controls

Associated with the main computer circuits, Figs. 19 to 19S, are certain auxiliary circuits illustrated in Figs. 40 to 40H. The latter views are assembled as shown in Fig. 41. The auxiliary circuits relate for the most part to the distributor and computer revolvers, together with the readin and readout controls.

Before entering into a detailed consideration of these auxiliary circuits, it would be well to consider a form of circuit known as an "A to A gate generator," illustrated schematically in Fig. 42. An A-to-A gate generator is employed to convert narrow A pulses into the wide A-to-A gate pulses. The signals which come from the magnetic drum read circuits are A pulses, and in most operations it is desired that these be converted to AA pulses. The circuit shown in Fig. 42 accomplishes this conversion.

Referring now to Fig. 42 in conjunction with the timing diagram in Fig. 43, it will be assumed that an input signal representing the digit "0" is applied through a mixer diode 165 to the input terminal of the "A to B signal" latch unit 166. The zero signal is represented by Q0A and B0A pulses. As each of these A pulses reaches the latch unit 166 and turns it "on," a positive output voltage is applied through the cathode follower 167 to a diode 168 which is part of a coincidence switch comprising diodes 168 and 169. A negative B pulse (NBP) signal is maintained on the diode 169. As shown in Fig. 43, this signal is positive at all times except for a brief interval which occurs at each B point. The coincidence of positive voltages at 168 and 169 maintains the latch unit 166 in its "on" state during the interval between the incoming A pulse and the next B pulse. Application of a negative B pulse to the diode 169 destroys the coincidence of positive voltages, thereby causing the latch unit 166 to be turned "off."

The A to B signal furnished by the latch unit 166 is applied through a mixer diode 170 to the input terminal of an A to A gate latch 171, turning this unit "on." The positive output voltage of the latch unit 171 is applied through the cathode follower 172 to an output signal line 173, and it is also applied to a diode 174 which is part of a coincidence switch comprising the diodes 174 and 175. A negative A pulse (NAP) signal is applied to the diode 175, so that normally there is a coincidence of positive voltages when the latch unit 171 is "on." This serves to keep the latch unit 171 in its "on" condition until the next negative A pulse occurs, whereupon the coincidence is destroyed and the latch unit 171 is turned "off." The unit 171 meanwhile has been "on" for one A to A period. Thus, the input signal Q0A, B0A, has been converted to an output signal Q0AA, B0AA, as depicted in the timing chart, Fig. 43.

The latch units disclosed in Fig. 42 are of the type which is disclosed and claimed in the aforesaid pending application of E. S. Hughes, Jr., Serial No. 264,295, filed December 31, 1951, issued on February 10, 1953, as Patent No. 2,628,309.

When a value is being entered into the distributor, biquinary code pulses representing the digits of that value are entered serially into the distributor regeneration circuit. Insofar as the present invention is concerned, the source of these timed pulses is immaterial. For purposes of illustration only, there is shown in Fig. 44 a set of manual switches upon which numerical values can be set up for entry into the distributor. There are eleven of these manual switches numbers 180 through 190, respectively corresponding to the sign and ten digits of a value. As shown in Fig. 44, these switches are set to represent the value +0000013746. The DG1 switch 180 is set to its "9" position, indicating a plus sign.

The stationary contacts of the switches 180 to 190 are wired through cables 202 to contacts designated "zero, one, two," and so forth, respectively, which are pulsed at appropriately timed intervals during each digit time to represent the designated digits. The rotary contacts of the switches 180 to 190 are connected by conductors 191 to 201, respectively, to a series of coincidence switches 203 to 213. These coincidence switches are also pulsed respectively by digit gate pulses at the terminals respectively designated DG1, DG2, DG3, and so on.

During each digit time one of the manual switches 180 to 190 will be rendered active by a digit gate pulse, and depending upon the setting of that switch, a pair of biquinary code pulses will be passed through one of the coincidence switches 203 to 213 to a conductor 215 which leads to a distributor readin terminal 216, Fig. 40F. These digit-representing pulses are effective for only one value period during any one readin operation. Referring to Figs. 40F and 40G, the biquinary code pulses coming in on the line 215 are switched at 217 (Fig. 40F). The resultant signal is passed through an inverter unit 218, Fig. 40D, and a cathode follower unit 219, Fig. 40C, and is impressed upon the conductors 220 and 221. The conductor 220 leads to a terminal 222, Fig. 40, which is coupled through suitable recording circuits indicated by the blocks 223 and 224, Figs. 40 and 40A, respectively, to the recording heads 36 and 41 (see Fig. 9) of the main distributor and the one-digit-early distributor. The conductor 221, Figs. 40C and 40F, leads to an output terminal 225, from which signals representing the value recorded in the main distributor may be read out for any desired purpose.

The distributor regeneration circuit is controlled by a latch unit 228, Fig. 40, which is turned "on" at DG1–0AA time by a combination of DG1 and 0AA timing pulses applied to a switch 229. The latch unit 228 remains "on" so long as there is a coincidence of positive voltages at the switch 230, Fig. 40, which is to say, so long as a positive voltage is maintained on the conductor 231, Figs. 40D and 40A. However, during the interval when a value is being read into the distributor from the switches shown in Fig. 44, a positive gate pulse is supplied by the operation selector to the terminal 227, Fig. 40F. The signal from the terminal 227 is mixed at 232, Fig. 40D, and is inverted by the inverter 233 to apply a negative signal through the cathode follower 234, Fig. 40A, to the conductor 231. This causes the regeneration control latch 228, Fig. 40, to be unlatched, thereby blanking regeneration for one value period while the new value is being read into the distributor. Other conditions under which the distributor regeneration is blanked will be described hereinafter.

The manner in which normal regeneration takes place in the distributor circuits will now be described. The value recorded in the main distributor is read by a reading head 35, Fig. 9. This signal, after passing through a suitable read circuit, indicated at 235, Fig. 40F, is applied to an input terminal 236 of the auxiliary chassis.

The distance between the main distributor read and record heads 35 and 36, Fig. 9, is actually equal to eleven digit positions minus two cells. However, as will appear hereinafter, values are recorded on the drum one-half cell late, and an additional half cell is lost in the read-record circuits. Therefore, the net result is that the value from the main distributor read circuit 235, Fig. 40F, is one cell early. This enables the regeneration circuit of the distributor to supply output signals which are one cell early as well as output signals which are on time. In some instances, in the particular system for which this computer is designed, an early signal from the distributor regeneration circuit is desired, whereas in the actual regeneration process it is an on-time signal which is needed.

Referring again to Fig. 40F, the main distributor read signal from terminal 236 enters an A-to-A gate generator (similar to that shown in Fig. 41) comprising the latch units 240 and 241, Figs. 40F and 40C, in conjunction with the cathode follower unit 242. The output of this A-to-A gate generator is made available at the terminal 243, Fig. 40, designated "general storage record signal," as the one-cell-early signal mentioned above. Also, the output of this first A-to-A gate generator is applied to a second A-to-A gate generator comprising the latch units 246 and 247, Figs. 40F and 40C, in conjunction with the cathode follower unit 248.

In this second generator, the latch 246 is turned "on" for one B-to-B interval by each output pulse of the first generator, which is sampled (that is, switched) with a B pulse at 250. The latch 246 is turned "off" by a negative B pulse which passes through the mixer 251 to the switch 250. The function of the mixer 251 is to mix the NBP with the signal from the first A-to-A gate generator thereby blanking out the NBP at the time when a value is entering the second generator. Otherwise, the NBP would turn "off" the latch 246 at the same time it was turned "on."

The output of the A-to-A latch 247, Fig. 40C, after passing through the cathode follower 248, is supplied to a switch 252, Fig. 40D, where it is switched with the output from the regeneration control latch 228, Fig. 40, and enters the latch 218, Fig. 40D, in the distributor regeneration circuit. Thus, values read by the main distributor read head are recorded back into the main distributor and the one-digit-early distributor through the distributor regeneration circuit just described. The value entering the distributor regeneration circuit also is available for other purposes such as transfer to the computer revolver and checking. These operations will be described later.

The "read" signal from the one-digit-early distributor, after it is picked up by the head 40 and amplified by the read circuit 255, Fig. 40F, is applied in the form of digit-representing A pulses to the input terminal 256, from which the signal enters an A-to-A gate generator comprising the latch units 257 and 258, Figs. 40F and 40C, in conjunction with the cathode follower 259. The output of the latch 258, consisting of AA pulses representing the digit values, appears at the output terminal 260, Fig. 40F.

The main distributor output and the one-digit-early distributor output at the terminals 225 and 260, respectively, are available for readin to the computer circuits (shown in Figs. 19 to 19S), or for any other purpose which may be desired. The circuitry which is involved in the various transfers of information between the distributor and the computer will be described subsequently in connection with the arithmetic operations of the machine. For the present, attention will be given particularly to the regeneration circuitry that is associated with the computer revolvers.

The normal computer signal is picked up by the read head 20, Fig. 9, and amplified by the read circuit 262, Fig. 40G, following which it is applied in the form of digit-representing A pulses to an A-to-A gate generator comprising the latch units 263 and 264, Figs. 40G and 40D, and the cathode follower unit. The AA pulse output of this generator appears on conductor 266, Figs. 40D and 40E, which leads to one terminal of the switch 267. The other terminal of the switch 267 is connected to a conductor 268, Figs. 40E and 40D, which leads from a computer blanking unit 269 that normally has a positive output voltage. This output voltage becomes negative only under certain conditions, and for the present it will be assumed that such conditions do not exist. Switch 267, therefore, furnishes a positive signal to the cathode follower unit 270, Fig. 40D. The output signal from the cathode follower 270 may be recorded in the computer regeneration revolver during normal regeneration, or in the computer operaiton revolver during a right-shift operation, and it is also made available at an output terminal 271, Fig. 40F, of the auxiliary chassis.

For normal regeneration, the computer value signal furnished by the unit 270, Fig. 40D, is applied to a switch at 275, Fig. 40E. This switch is controlled by a computer regeneration control unit 276, Fig. 40E, which normally furnishes a positive output voltage through the cathode follower 277 to the switch at 275. When computer regeneration is to be suspended, the companion unit 278 is rendered active, and the unit 277 furnishes a negative signal. Assuming that regeneration is to take place, the output signal from the switch 275 is supplied to a regeneration control unit comprising the double inverter 279, Fig. 40B, and cathode follower 280, the output of which is delivered to the terminal 281, Fig. 40B. From the terminal 281 the computer output signal is fed back through a recording circuit 282 to the normal recording head 21 on the computer regeneration track of the drum. This completes the normal regeneration cycle of the computer.

If a right-shift operation is to occur, the computer value signal from the unit 270, Fig. 40D, is switched at 284, Fig. 40A, and mixed at 285, Fig. 40B, to supply the computer value signal to an operation record unit comprising the double inverter 286, Fig. 40A, and the cathode follower 287, Fig. 40B, from which the signal is passed through a recording circuit 289 to the record head 31 associated with the computer operation track of the drum. A more complete description of the right-shift operation will be presented hereinafter.

Adder

The adder 33, Fig. 9, comprises a diode matrix and associated latch units for concurrently receiving and merging the values which are read from the distributor and the computer, respectively. Each of these values is fed serially to the adder, where it is added digit by digit to the other value, and the digits of the sum are read serially out of the adder after being subjected to a one-digit delay interval. The biquinary bits of each digit enter and leave the adder serially, but are stored in parallel while they remain in the adder.

As indicated in Fig. 20, the adder matrix comprises, roughly, that portion of the computer circuits shown in Figs. 19H, J, K, L, P, Q, R and S of the master block diagram. Before making a detailed analysis of this circuitry, it would be well to review certain functional aspects thereof. As mentioned above, the adder is adapted to receive two values concurrently and merge them into a result or sum which is stored in the computer revolver circuitry until such time as this information is again used or read out of the computer. It is necessary that two values (usually the values stored respectively in the distributor and computer) be entered concurrently into the adder, although one of these values may consist of all zeros. For example, if the computer is in a "clear" or all-zero condition awaiting the entry of a value therein from the distributor, the machine follows the procedure of adding the distributor value to the zero value from the computer and entering the result back into the computer.

The distributor and the computer are adapted to store values as true numbers. If it should be necessary to enter the complement of either value into the adder, a conversion from true to complement form is made as the value enters the adder. Either one of the two values may be entered as a complement, but not both values at the same time. Distributor and computer values are entered as true numbers or complements according to Table I above, in the portion of the specification entitled "Functional description."

Referring to the master block diagram, Figs. 19 to 19S, and particularly to that portion thereof which is identified as the "adder matrix" in Fig. 20, the value from the distributor (either the one-digit-early distributor or the main distributor, as the case may be) enters the adder through the inverter and cathode follower units at 5–L and 5–K if it is a true value, or through the inverter and cathode follower units at 7–K and 7–L if it is a complement value. The computer value enters the adder through the inverter and cathode follower units at 5–J and 5–K if it is a true value, or through the inverter and cathode follower units at 7–K and 7–L if it is a complement value. These signals come from the input terminals 295, 296 and 297, Fig. 19A, of the main computer chassis which, in turn, are connected respectively to the terminals 260, 225 and 271, Fig. 40F, of the auxiliary chassis. A more detailed description of the manner in which these signals are routed to the adder will be presented shortly.

To summarize the foregoing, signals representing a pair of values will enter the adder through two of the three units at 5–J, 5–L and 7–K, respectively designated "true value computer," "true value distributor" and "complement value." Each digit is represented by a pair of AA pulses, one representing the quinary bit and the other the binary bit, according to the code shown in Fig. 38 near the bottom of the figure (also explained in Table II of the "Functional description"). It should be mentioned that the pulses coming from the complement value unit at 7–K and its associated cathode follower at 7–L are actually true value pulses, but as will appear presently, they are handled in the adder circuitry in such a fashion that they have the effect of complement value pulses.

The AA pulses representing the quinary and binary bits are routed to the coincidence switches at 6–K, where they are sampled (that is, switched) with B pulses before entering the "true" or "complement" cathode follower unit at 6–L or 6–M, as the case may be. By being sampled with B pulses, the incoming quinary and binary bit pulses are narrowed to such an extent that minor variations in the pulse widths will not affect the accuracy of the adder operations. The true value pulses which pass through the cathode follower at 6–L enter the matrix proper by way of the true value input line 300, Figs. 19H–L. The complement value pulses passing through the cathode follower at 6–M will enter the matrix proper by way of the complement value input line 301, Figs. 19H–L.

The timing diagram shown in Figs. 45 and 45A indicates the various timing pulses which may be involved in the operations of the adder. For example, it will be seen in Fig. 45 that the various quinary and binary AA pulses are reduced to the corresponding B pulses as a result of being sampled with B pulses in the manner described above. For convenience, the suffix B will be omitted hereinafter when referring to these quinary and binary pulses, except where clarity requires its use. Reference should be made to this timing diagram to facilitate understanding of the adder description.

The true signals on the input line 300 are switched selectively with various timing signals and are routed to a set of input latch units which correspond respectively to the quinary bits Q0 to Q4 and the binary bits B0 and B5. Thus, a Q0 input pulse is switched at 6–Z with a Q0AA timing pulse and enters the Q0 input latch at 7–Z. (The Q0AA timing pulse, it will be noted, is effective only during the B cell time inasmuch as the Q0 input signal has already been narrowed to the width of a B pulse.) The output of the Q0 input latch at 7–Z is made available at the cathode follower, 7–Y, and a portion of this output is fed back through a mixer at 6–Z to the Q0 input latch to provide the necessary latching action.

Similarly, a Q1 true input pulse is switched at 6–Y with a Q1AA timing pulse and enters the Q1 input latch unit at 7–X. A Q2 true input pulse is switched at 6–X with a Q2AA timing pulse and enters the Q2 input latch at 7–W. A Q3 true input pulse is switched at 6–W with a Q3AA timing pulse and enters the Q3 input latch at 7–U. A Q4 true input pulse is switched at 6–V with a Q4AA timing pulse and enters the Q4 input latch at 7–T. A B0 true input pulse is switched at 6–P with a B0AA timing pulse and enters the B0 input latch at 7–Q. A B5 true input pulse is switched at 6–N with a B5AA timing pulse and enters the B5 input latch at 7–N.

Before any entries are made in the quinary (Q0 to Q4) input latches, these latch units are reset by a 0AA timing pulse. Before any entries are made in the binary (B0 and B5) input latches, these latch units are reset by a Q4AA timing pulse.

Signals on the complement input line 301 are timed to represent true values but are routed as complements thereof to the input latches. Thus, a Q0 input pulse on the line 301 is switched at 6–V with a Q0AA timing pulse to enter the Q4 input latch at 7–T. Under these conditions Q0 is entered as its complement, Q4. Similarly, a Q1 complement input pulse is switched at 6–W with a Q1AA timing pulse and enters the Q3 input latch at 7–U. A Q2 complement input pulse is switched at 6–X with a Q2AA timing pulse and enters the Q2 input latch at 7–W. A Q3 complement input pulse is switched at 6–Y with a Q3AA timing pulse and enters the Q1 input latch at 7–X. A Q4 complement input pulse is switched at 6–Z with a Q4AA timing pulse and enters the Q0 input latch at 7–Z. In each case, it will be noted, the quinary bit is converted to its quinary complement in the switching process before being entered into an input latch.

In like fashion, each binary bit on the complement input line is converted to its binary complement before it is introduced to an input latch. Thus, a B0 complement input pulse is switched at 6–N with a B0AA timing pulse to enter the B5 input latch at 7–N. A B5 complement input signal is switched at 6–P with a B5AA timing pulse to enter the B0 input latch at 7–Q.

In considering the addition of two true numbers in the matrix, attention will be given first to situations in which no "doubles" (that is, simultaneous input pulses) occur on the true input line. An example in which no doubles occur would be the addition of "2" and "6." In this case the true input unit at 6–L furnishes pulses respectively representing the bits Q2, B0 and Q1, B5 to the true input line. These pulses are switched in the manner explained above to turn on the Q1, Q2, B0 and B5 input latches, respectively. Then, in a subsequent step of the matrix operation, to be described presently, the quinary bits Q1 and Q2 (represented by the "on" states of the corresponding input latches) are merged to yield a quinary sum, and the binary bits B0 and B5 (represented by the "on" states of the corresponding input latches) are merged to yield a binary sum, the result being Q3B5, or 8.

In the course of adding two true numbers, a binary or quinary double may occur. Thus, if the digit "2" is being added to the digit "7," there will be a quinary double (Q2). If a digit "6" is being added to the digit "7," there will be a binary double (B5). In this event the double bit is represented by only a single pulse on the input line. To take care of these special situations, there is provided a switch at 6–Q where the coincident pulses from the true value computer unit (5–J) and the true value distributor unit (5–L) are sampled with "B" pulses. This switch furnishes an output pulse through a cathode follower at 5–V to a pair of switches at 6–R. Here the double value output pulse is switched with either a Q0A-to-B0A timing pulse or with a B0A-to-Q0A timing pulse, depending upon whether the double occurs in the quinary or binary portion of the digit period. If a quinary double has occurred, the output of the switch at 6–R will turn on the quinary double latch at 7–R. If a binary double has occurred, the output from the switch at 6–R will turn on the binary double latch at 7–M.

Thus far, the sum of the two digits entered into the matrix is represented by the "on" or "off" conditions of the quinary input latches Q0 to Q4, the binary input B0 and B5, the quinary double latch and the binary double latch. The outputs of these latch units are utilized to selectively energize the various cathode followers at 9–U through 9–Z, and this, in turn, enables the various output latch units comprising the B0, B5 and Q0 to Q4 units (11–Q through 11–Z) and the "carry" and "no carry" latches (10–N and 11–N) to be operated selectively in accordance with the arithmetic sum of the two digits entered into the matrix. The manner in which the output latch units are operated will be described later.

The process of adding a true number and a complement is very similar to the above-described process of adding two true numbers, except in the manner of handling doubles. There are several types of doubles which may occur in the course of adding a true number and a complement. In one case the double may occur as the result of simultaneous Q2 pulses on the true and complement input lines 300 and 301. An instance of this would be where "−2" is added to "+2." The two Q2 pulses are switched at 6–O with a Q2AA timing pulse to turn the "quinary double" latch at 7–R "on."

Another case in which a double can occur is where an input latch unit is turned "on" by a true input pulse, and a subsequent complement input pulse thereafter attempts to turn the same input latch "on." Several examples of this will be considered. First, assume that "−4" is being added to "0." The true Q0 input pulse turns the Q0 input latch at 7–Z "on." Subsequently, the complement Q4 input pulse is switched at 6–Z with a Q4AA timing pulse, sending a second (but ineffective) energizing pulse to the Q0 input latch at 7–Z. Note, however, that the output of the Q0 input latch (that is, the Q0 input gate pulse) is switched at 6–U with a Q3BB timing pulse and with a positive A pulse to turn "on" the "sample double complement" latch unit at 5–S. The output of the sample double complement unit (5–S and 5–R) is switched at 5–U with the Q0 input signal on the complement line 301 to energize the "double value" cathode follower at 5–V, the output of which is in turn switched at 6–R with a Q0A-to-B0A gate pulse for turning "on" the "quinary double" latch at 7–R.

In similar fashion, if a Q3 pulse on the complement input line 301 follows a Q1 pulse on the true input line 300, the complement Q3 pulse is switched at 5–U with the "sample double complement" gate pulse to turn "on" the quinary double latch at 7–R. If a B5 input pulse on the complement line 301 follows a B0 input pulse on the true line 300, the complement B5 pulse will be switched at 5–U with the sample double complement gate, and at 6–R with a B0A-to-Q0A gate pulse, to turn "on" the "binary double" latch at 7–M. The sample double complement unit at 5–S is "on" only during that A-to-A period which corresponds to the complement quinary bit, being turned "off" by the arrival of a negative A pulse at 5–T, thereby terminating the positive coincidence of the switch voltages.

Still another condition under which a double may occur is where an input latch is first turned "on" by a signal in the complement input line 301, and a true input signal on the line 300 thereafter attempts to turn the same latch "on." The operation in this case is the same as that described above, except that the "sample double true" unit at 5–Q is operated in lieu of the "sample double complement" unit at 5–S. Thus, a complement Q0 input pulse causes the Q4 input latch to be turned "on," and the output of this latch is switched at 6–T with a Q3BB timing pulse and an A pulse to turn "on" the sample double true unit at 5–Q. Then, if a true Q4 input pulse is sent to the matrix, it will be switched at 5–U with the sample double true gate pulse to furnish a double-value pulse at 5–V. This results in the "quinary double" latch at 7–R being turned "on."

A similar action can be traced in the event a true Q3 input pulse follows a complement Q1 input pulse, the quinary input latch being turned "on" in this case, too. If a true B5 input pulse follows a complement B0 input pulse, the sample double true unit at 5–Q again is utilized to effect the operation of the binary double latch at 7–M.

To recapitulate, the entry of two digits concurrently into the adder matrix causes the input latch units (7–N through 7–Z) to be set in accordance with the respective magnitudes of the two digits in order to furnish the sum thereof by the coincidence of voltages in the summation switches. This may entail the setting up of binary double or quinary double representations temporarily in special latch units whose outputs are switched with those of the input latches. The carry bit (if any) from the next preceding order of the summation is also merged with the current input digits by selective switching. The final sum of the two input digits is represented by the settings of the output latch units at 11–Q through 11–Z, together with the settings of the "carry indicate" (CI) and "no-carry" (NC) latches at 10–N and 11–N, respectively.

The voltages furnished by the quinary input latches at 7–T, 7–U, 7–W, 7–X and 7–Z and their associated cathode followers, together with the quinary double latch at 7–R and its cathode follower at 7–S, are switched concurrently to yield the quinary portion of the sum. Thus, Q0 and QD (quinary double) are switched at 8–Z to yield 0 at 9–Z. Q0 and Q1 are switched at 8–Z to yield 1 at 9–Z. QD and Q1 are switched at 8–Z to yield 2 at 9–Y. Q0 and Q2 are switched at 8–Y to yield 2 at 9–Y. Q2 and Q1 are switched at 8–Y to yield 3 at 9–Y. Q0 and Q3 are switched at 8–X to yield 3 at 9–Y. QD and Q2 are switched at 8–U; Q3 and Q1 are switched at 8–U; and Q0 and Q4 are switched at 8–V, each of these combinations yielding 4 at 9–U. In similar fashion, the remaining combinations of quinary bits are combined to yield, respectively, 5 at 9–W, 6 at 9–W, 7 at 9–V, or 8 at 9–V.

The outputs from the cathode followers designated 0 through 8, respectively (9–U through 9–Z), are mixed at 9–X and switched at 10–V through 10–Z with carry indicate (CI) or no-carry (NC) signals coming at B5AA time to furnish the quinary portion of the output sum. Thus, 0 or 5 is switched with NC at 10–Z to turn on the Q0 output latch at 11–Z, or with CI at 10–Y to turn on the Q1 output latch at 11–X. One or 6 is switched with NC at 10–Y to turn on the Q1 output latch at 11–X, or with CI at 10–X to turn on the Q2 output latch at 11–W. Two or 7 is switched with NC at 10–X to turn on the Q2 output latch at 11–W, or with CI at 10–W to turn on the Q3 output latch at 11–U. Three or 8 is switched with NC at 10–W to turn on the Q3 output latch at 11–U, or with CI at 10–V to turn on the Q4 output latch at 11–T. Q4 is switched with NC at 10–V to turn on the Q4 output latch at 11–T or with CI at 10–Z to turn on the Q0 output latch at 11–Z.

The binary portion of the output sum is determined by (1) the settings of the B0, B5 and BD (binary double) input latches at 7–Q, 7–N and 7–M, respectively, and (2) the presence or absence of a "5-and-above" carry from the quinary level into the binary level of the sum. For example, if the binary bit is B5-doubled (B5 and BD), the result is B0 plus a carry into the next order. If, in addition to this, there is a carry from the quinary level into the binary level (B5, BD and B-above), the result is B5 plus a carry into the next order.

The presence or absence of a "5-and-above" carry is determined from the outputs of the cathode followers designated 0 through 8 (9–U through 9–Z) and the presence of CI (carry-indicate from lower order) or NC (no carry) signals. Thus, 0, 1, 2 and 3 pass through the mixer at 9–S and are switched with B5AA at 8–Q to turn on the "below 5" latch at 8–T. Four is switched with NC or CI at 9–T, as the case may be, and the resultant signal passes through the mixer at 9–S or the mixer at 9–R to be switched with B5AA at 8–Q for turning on either the "below 5" latch at 8–T or the "5-and-above" latch at 8–R. Five, 6, 7 and 8 pass through the mixer at 9–R and the switch at 8–Q to turn on the "5-and-above" latch at 8–R at B5AA time.

The outputs of the latches at 8–R and 8–T are combined with the outputs from the B0, B5 and BD input latches at 7–Q, 7–N and 7–M, respectively, to yield the binary portion of the output sum. Thus, BD, B0 and below-5 are switched at 8–P to yield 0 at 9–N. BD, B5 and 5-and-above are switched at 8–P to yield 5+carry (into next order) at 9–M. BD, B5 and below-5 are switched at 8–N to yield 0+carry (into next order) at 9–N. B5, B0 and 5-and-above are switched at 8–N to yield 0+carry at 9–N. B5, B0 and below-5 are switched at 8–M to yield 5 at 9–M. BD, B0 and 5-and-above are switched at 8–M to yield 5 at 9–M.

The 0 (9–N) and 0+carry (9–N) pass through the mixer at 9–Q and the cathode follower at 9–P to yield a B0 signal, which is switched at 10–Q with a Q3AA timing pulse to turn on the B0 output latch at 11–R. The 5 (9–M) and 5+carry (9–M) signals pass through the mixer at 9–Q and the cathode follower at 9–P to yield a B5 signal, which is switched at 10–Q with a Q3AA timing pulse to turn on the B5 output latch at 11–Q.

The signals from the 0, 5, "0+carry" and "5+carry" cathode followers at 9–N and 9–M also pass through a mixer at 9–L to the "carry-no carry" cathode follower unit at 8–L. The outputs from 8–L, in a manner which will be explained hereinafter, are employed to turn on the CI latch at 10–N, or the NC latch at 11–N, depending upon whether or not the output sum is associated with a carry into the next higher order of the result.

In consequence of all the matrix operations described above, the sum of the two digits entered into the adder now appears in the settings of the output latches at 11–Q through 11–Z and the carry latches at 10–N and 11–N. It will be recalled that the biquinary code bits of the incoming digit pair entered the adder in timed serial relation, and by appropriate switching the sum of the two digits was registered in parallel relation on the input latches at 7–M through 7–Z. The sum of the two digits then was given final expression in the settings of the output latches, this, too, being a parallel representation of the sum digit (less the carry which is separately registered). The transfer of information from the input latches to the output latches involves a delay of one digit time, as mentioned previously. This feature is used to advantage in certain shift operations which are described hereinafter.

The binary and quinary bits of the sum now must be read serially out of the adder. This is accomplished by switching the outputs of the cathode followers at 11–P, 11–S, 11–V and 11–Y with digit timing pulses at 10–R, 10–S, 10–T and 10–U. The combined signal from these switches is passed through a cathode follower labeled "output," at 9–U, to the terminal 305, Fig. 19C. The output latches are reset at B0AA time. The stored carry (if any) is not read out at this time, but is held until the next digit time in the latch unit at 10–N. If there is no carry, the latch at 11–N remains on.

Detection of Distributor Sign

When a value recorded in the distributor is being entered into the computer, the first step is to detect the distributor sign, which is in the DG1 postion. A plus sign is recorded at DG1 as the digit 9 (Q4B5 in biquinary notation) and a minus sign as the digit 8 (Q3B5 in biquinary notation). The algebraic sign, it will be recalled, is not carried over into either of the computer revolvers but is stored separately therefrom in a manner which will be explained presently.

Reference should be made to the timing diagram, Fig. 46, in conjunction with the following description. The main distributor signal coming from the terminal 296, Fig. 19A, is switched at 7–C with DG1–L and Q4AA timing pulses to detect a plus sign, and with DG1–L and Q3AA timing pulses to detect a minus sign. The resulting signal is available from an output terminal on either the plus side or the minus side of the cathode follower unit at 7–B.

It is not necessary to detect the sign of the distributor value when the same is being read from the one-digit-early distributor, inasmuch as the sign under these conditions has no significance in the operations of the computer. It is only when a value is being read from the main distributor into the computer that the sign detection is necessary. The manner in which the distributor sign is used will be described later.

Computor Sign Control

The sign of the value stored in the computer is registered in the plus or minus computer sign unit located at 5–A or 5–C. Each of these units is capable of being latched in either its "on" or its "off" condition.

When the distributor value is being entered into the computer value with an accompanying reset of the computer (computer reset to zeros prior to entry of the distributor value therein), an add gate pulse (DG1–L to DG2–L) is applied to the terminal 306 or 307, Fig. 19, depending upon whether the addition is being made into the lower computer or the upper computer, and a reset gate pulse (DG1–L to DG1–L for one computer cycle) is applied to the reset terminal 308, Fig. 19. The add gate pulse passes through the mixer at 2–C and a cathode follower at 4–E, and is switched at 4–B with the reset gate pulse (the remaining input to this three-terminal switch being positive at this time) to turn on the reset latch unit at 3–C and 3–B. The output of this unit is in turn switched with the add gate pulse at 6–B to turn on the plus sign (5–A) and turn off the minus sign (5–C). Thus, the computer sign is restored to plus as an incident to any reset of the computer. A similar result would follow if a subtract gate pulse at terminal 312 or 313 had been used in place of an add gate pulse.

A more complete description of reset functions is presented hereinafter. Also, as will be explained later, if it should happen that the sign of the distributor value was negative when an add with reset operation was called for, or positive when a subtract with reset was called for, the distributor value actually is subtracted from 0 to yield the complement of the distributor value in the computer. A complement adjust cycle then is performed automatically to convert this complement into its true value, and as an incident to this step, the computer minus sign latch is turned on while the computer plus sign latch is turned off, thereby associating a stored minus sign with the true value in the computer.

In a true add operation the stored computer sign (at 5–A or 5–C) remains unchanged. (True add may be either a + + operation or a − − operation.) If a complement add operation is to take place (meaning that either the distributor value or the computer value enters the adder as a complement—see Table I above), both the plus sign latch and the minus sign latch are turned off until it is ascertained whether the result is a complement or a true number. If a true number, the plus sign is turned on. If a complement, there is a conversion from complement to true, and the minus sign is turned on.

The computer complement add gate from 1–H is mixed at 4–H with the distributor complement add gate from 1–E, and the resulting timed signal passes through the cathode follower at 3–H. It is then switched at 5–E with a DG3–L timing pulse, passing through cathode follower 4–E and through a mixer at 6–D to reset both of the computer sign latches.

If the value in the computer after a complement add cycle is a true value, a carry occurs into the DG11–U position. If the value is a complement, however, no carry occurs into DG11–U. The timed signal described in the preceding paragraph is switched at 10–K with DG11–U and 0BB timing pulses, and the resulting signal then passes through the cathode follower at 9–K to 6–A, where it is switched with the carry signal from 8–L to turn the computer plus sign latch on (5–A). This same output from 9–K is switched at 2–J with the no-carry signal from 8–L to turn on the computer complement adjust unit at 1–J. Hence, depending upon whether or not there is a carry (that is, the value in the computer is a true value or a complement), either the computer plus sign or computer complement adjust is turned on. In the latter case, an additional cycle must be performed to change the complement in the computer to a true value and to store a negative sign. This additional operation is described later.

Multiply-Divide Sign Control

In a multiply or divide operation, the MP or DD is stored in the computer and the MC or DR is stored in the distributor. This means that the MP sign or DD sign is stored in the computer sign units at 5–A and 5–C, and the MC sign or DR sign is stored in the distributor to become available during DG1–L time at the cathode follower unit 7–B. As a preliminary step in the multiply or divide operation, the stored computer sign at 5–A or 5–C is transferred to a multiply-divide sign storage unit at 8–A or 8–C, with an accompanying reset of the computer sign latches. The stored multiply-divide sign and the distributor sign then are compared, and in consequence thereof the computer sign latches are turned on again to store the sign of the result according to the following table:

*Table IV*

| M–D Sign | Distributor Sign | Computer Sign |
|---|---|---|
| + | + | + |
| + | − | − |
| − | + | − |
| − | − | + |

The start multiply signal (a DG1–L pulse) from terminal 310, Fig. 19E, or the start divide signal (a DG1–L pulse) from terminal 311, Fig. 19C, is fed through a mixer at 8–E to a cathode follower at 7–E. The output from 7–E is switched at 9–A with a Q0AA timing pulse to reset the multiply-divide sign latches at 8–A and 8–C (both units turned off). This occurs at DG1–L, Q1AA time.

The start M–D (multiply-divide) gate pulse from 7–E also is switched at 7–A with a Q1AA timing pulse, and this output signal is switched at 9–B with the computer plus signal or minus signal to transfer the computer sign into the M–D sign storage units at 8–A and 8–C. The start M–D gate also is switched at 5–E with a Q2AA timing pulse, and the resulting signal passes through a cathode follower at 4–E and a mixer at 6–D to reset the computer sign units at 5–A and 5–C.

The start M–D gate from 7–E is also switched at 7–A with the distributor plus sign or minus sign from 7–B. It will be recalled that detection of the distributor plus sign occurs at DG1–L, Q4AA time, and detection of the distributor minus sign takes place at DG1–L, Q3AA time. The resulting plus or minus signal from 7–A is switched at 6–A or at 6–C with a plus or minus M–D sign pulse to determine the setting of the computer sign units at 5–A and 5–C, in accordance with Table IV above. This registers the sign of the result (product or quotient).

Reset-No Reset Units

The reset and no-reset latch units at 3–A and 3–C are used only in conjunction with addition and substraction operations in either the upper or lower computer. These units are controlled by reset and no-reset pulses which are supplied selectively to the terminals 308 and 314, Fig. 19, at DG1–L time by the operation selector. Concurrently with application of the reset or no-reset signals, the operation selector supplies a DG1–L pulse to one of the terminals 306, 307, 312 and 313, Fig. 19, according to whether an add lower computer, add upper computer, subtract upper computer or subtract lower computer operation is called for.

The signal from the selected one of the terminals 306, 307, 312 and 313 passes through a mixer at 2–C to the "add gate" cathode follower at 4–E. The add gate pulse from 4–E is switched at 4–A with the no-reset signal from terminal 314, Fig. 19, to turn on the no-reset latch unit at 3–A. The no-reset unit is latched through the switch at 4–A and is unlatched by a negative value pulse lower (NVPL), Fig. 39. The no-reset unit at 3–A furnishes a gate pulse for one revolution of the computer revolvers (DG1–L to DG1–L).

The add gate pulse from 4–E is switched at 4–B with the reset signal from terminal 308, Fig. 19, and a no-remainder gate pulse (positive at this time) to turn on the reset latch unit at 3–C. The reset unit is latched through the switch at 4–A and is unlatched by NVPL after one complete revolution of the computer revolvers. The computer reset gate pulse from 3–C is switched at 6–B with the add gate from 4–E to turn the computer plus sign unit on (5–A) and the computer minus sign unit off (5–B). This was explained above under the heading "Computer Sign Control."

The effects of generating the reset and no-reset pulses are described in greater detail hereinafter under the headings "True Add Cycle" and "Complement Add Cycle."

True and Complement Add Gates

The add or subtract signal coming from the terminal 306, 307, 312 or 313, Fig. 19, passes through the mixer at 2–C and is switched at 3–D or 3–E with the signal from 7–B representing the sign of the distributor value, to determine whether an add or subtract operation should follow. This determination is made in accordance with Table V below, and the "add" or "subtract" side of the cathode follower unit 2–E is energized accordingly

*Table V*

| Operation Selected | Distributor Sign | Operation Signal (2–E) |
|---|---|---|
| Add | + | Add. |
| Do | − | Subtract. |
| Subtract | + | Do. |
| Do | − | Add. |

The add signal from 2–E is switched at 2–D with the plus computer sign signal from 5–B to turn on the true add unit at 1–D. The subtract signal from 2–E is switched at 2–D with the minus computer signal from 5–D to turn on the true add unit at 1–D. This true add unit is latched through a switch 2–D and is unlatched by an NVPL.

The subtract signal from 2–E is switched at 2–F with the plus computer signal from 5–B to turn on the complement distributor add unit at 1–F. The add signal from 2–E is switched at 2–G with the minus computer signal from 5–D to turn on the complement computer add unit at 1–G. The complement add units at 1–F and 1–G are unlatched by an NVPL.

The switching operations just described, culminating in the selective operation of the true add, complement distributor add or complement computer add unit (1–D, 1–F or 1–G), are performed in accordance with Table I in the "Functional description." The effect of this is to control the manner in which the distributor value and computer value enter the adder as true or complement values. The latch units at 1–D, 1–F and 1–G will be referred to as the true and complement add gates in the following description.

Upper and Lower Gates

The upper and lower gate units are located at 1–A and 1–C, respectively. These units are operated selectively in accordance with the type of operation which is being performed, and their functions are to condition the upper and lower computer, respectively, for operation. A signal on the add upper terminal 307, Fig. 19, or the subtract upper terminal 312 will pass through the mixer at 2–B and turn on the upper gate unit at 1–A. An add lower signal from the terminal 306 or a subtract lower signal from the terminal 313 will pass through the mixer at 2–B and turn on the lower gate unit at 1–C. These gate units are latched through switches such as 2–A for one revolution of the computer and are unlatched by an NVPL.

During a multiplying operation the lower gate unit at 1–C is turned on by a multiply gate pulse from 1–W acting through a mixer diode at 2–A, and it is held on for the duration of the multiply operation. During a dividing operation the upper gate unit at 1–A is turned on by a divide gate pulse from 1–L acting through a mixing diode at 2–A, and it is held on for the duration of the operation.

Entry of Distributor Value Into Upper or Lower Computer

Entry of the main distributor value into the lower computer takes place as follows:

The main distributor value from terminal 296, Fig. 19A, is switched at 5–H with the lower gate pulse from 1–B and with a DG2–L to DG1–U timing pulse. (The DG1–L distributor digit is the sign digit and is not entered into the computer revolver, having been detected previously, as described above.) Zero timing pulses from terminal 315, Fig. 19P, are switched at 5–F with the lower gate pulse from 1–B, a value gate upper (VGU) timing pulse, and a multiplication blanking pulse from 3–U. (In a multiply operation this blanking pulse prevents a zero from entering the computer at DG11–U.) The output signals from the switches 5–H and 5–F are mixed and pass to the "distributor value" cathode follower at 3–G, the output signal of which represents the twenty-one digits for entry into the computer (a value from DG2–L to DG1–U, and zeros from DG1–U to DG1–L.) This signal from 3–G enters the adder matrix through the switch at 5–M, if it is to be entered as a true value, or through the switch at 8–J, if it is to be entered as a complement. The output of the switch 5–M passes through the inverter and cathode follower at 5–L and 5–K, and the output of the switch 8–J passes through the inverter and cathode follower at 7–K and 7–L. The remaining operation has been described above under the heading "Adder."

Entry of the one-digit-early distributor value into the upper computer takes place as follows:

The one-digit-early distributor signal from terminal 295, Fig. 19A, is switched at 2–G with a negative DG11 timing pulse to eliminate the sign digit from this value. A zero signal from terminal 315, Fig. 19P, is switched at 2–J with a DG11 timing pulse to insert a zero in place of the sign digit. The outputs of the switches 2–G and 2–J are mixed to provide an upper value entry signal at the cathode follower 2–H, which signal is switched at 5–G with the upper gate pulse from 1–B and a VGU timing pulse. Zeros from terminal 315 are switched at 5–G with the upper gate pulse and a DG2–L to DG1–U timing pulse. The combined output signal from 5–G consists of twenty-one digits, namely, zeros from DG2–L to DG1–U and value digits from DG1–U to DG1–L. This signal enters the adder matrix through the switch 5–M if it represents a true value, and through the switch 8–J if it represents a complement. The outputs of the switches 5–M and 8–J, as mentioned previously, enter the matrix by way of the true value distributor unit 5–L and the complement value unit 7–K, respectively.

Start of Addition Operation

The add gate pulse from 4–E exits at the terminal 320, Fig. 19C, of the main computer chassis (Figs. 19 to 19S) and enters the auxiliary chassis (Figs. 40 to 40H) at the terminal 321, Fig. 40G. From there the add gate pulse passes through the mixer at 322, Fig. 40E, to the computer regeneration control unit 276, placing this unit in its "no regeneration" condition. This stops the regeneration process in the computer regeneration revolver.

The add gate pulse also passes through the mixer at 322 and is switched at 323 with a zero timing pulse and a DG1–L timing pulse for entering a zero into the regeneration record cricuit at 279, Fig. 40B, by way of the mixers at 275, Fig. 40E, and 285, Fig. 40B. This causes a zero to be recorded in the computer regeneration revolver at DG1–L time in place of an algebraic sign, which is not recorded in the computer revolvers.

True Add Cycle

In this portion of the description it is assumed that a true add operation is to take place. This means that both the value in the computer and the value in the distributor enter the adder matrix as true values. Referring again to the main computer chassis, Figs. 19 through 19S, the distributor value from 3–G is switched at 5–M with the true add gate from 1–D, 1–E to enter the adder matrix as a true value by way of the inverter and cathode follower units at 5–L and 5–K. The remainder of the true add cycle will now be analyzed with reference to no-reset and reset conditions, respectively.

If no reset is to take place, the true add gate pulse from 1–D, 1–E is switched at 7–G with the no-reset gate pulse from 3–A, 3–B, and the resulting signal passes through the cathode follower at 7–J to be switched at 6–J with a DG2–L to DG1–L timing pulse and with the computer value signal coming from the terminal 297, Fig. 19A. This enables the computer value to enter the adder matrix as a true value by way of the inverter and cathode follower units at 5–J and 5–K. Addition of the computer value and the distributor value takes place serially by digit pairs from DG2–L to DG1–L in the manner explained above.

If a reset of the computer is called for, the computer reset gate pulse from 3–C, 3–B is switched at 6–H with zero signal pulses from the terminal 315, Fig. 19P, and with a DG2–L to DG1–L timing pulse, causing zeros to enter the adder matrix through the units at 5–J and 5–K as the computer true value. The computer is reset by substituting zeros for the computer value from DG2–L to DG1–L.

Complement Add Cycle

During a complement add cycle, either the distributor value or the computer value enters the adder matrix as a complement. The distributor complement value can be entered with or without a reset of the computer. The computer complement value must be entered without reset.

For entering the distributor value as a complement, the distributor value signal from 3–G is switched at 8–J with the distributor complement add gate from 1–F, 1–E and with a division blanking signal (now positive). The resulting signal activates the complement value unit at 7–K, 7–L for causing the distributor value to enter the adder matrix as a complement. If no reset is called for, the distributor complement add gate also is switched at 7–G with the no-reset gate pulse, and the output thereof passes through the cathode follower at 7–J to be switched at 6–J with the computer value signal and a DG2–L to DG1–L timing pulse, causing the computer value to enter the adder matrix as a true value. For a complement distributor add operation with reset of the computer, the computer reset gate pulse coming from 3–C, 3–B is switched at 6–H with zero signal pulses and a DG2–L to DG1–L timing pulse to enter zeros as the computer true value.

Where the computer value is being added as a complement, the distributor value signal from 3–G is switched at 5–M with the computer complement add gate from 1–G, 1–H to enter the adder matrix as a true value by way of the "true value distributor" unit at 5–L. The complement computer add gate also is switched at 8–K with the computer value signal and a DG2–L to DG1–L timing pulse to enter the adder matrix as a complement value.

Computer Complement Adjust

When a complement add cycle takes place, the algebraic sign of the sum is determined at the close of the add cycle. If the sum is a true value, the computer plus sign latch is turned on. However, if the result standing in the computer is a complement, an additional operation known as the complement adjust cycle takes place to convert the complement value into its corresponding true value and to turn on the computer minus sign latch.

The presence or absence of a carry into the DG11–U position during a complement add cycle determines whether or not a complement adjust cycle is necessary. If there is a carry into DG11–U, this indicates that the value in the computer is a true value; hence, no conversion is required. The absence of a carry into the DG11–U position indicates the presence of a complement value and the need for a conversion.

When a complement addition is being performed, the complement add signal from either 1–F or 1–J (acting through the corresponding cathode follower at 1–E or 1–H) passes through the mixer at 4–H into the cathode follower at 3–H. The output signal or complement gate pulse from 3–H is switched at 10–K with DG11–U and 0BB timing pulses to provide a sampling signal. After passing through the cathode follower at 9–K, this sampling signal will be switched either at 6–A with a carry signal from 8–L, or at 2–J with a no-carry signal from 8–L. If a carry signal is present at 6–A, the plus sign latch at 5–A is turned on, thereby indicating a true value result. If a no-carry signal is present at 2–J, the computer complement adjust unit at 1–J is turned on. The latch circuit of the unit 1–J is responsive to the computer minus sign "off" signal from 5–D and the NVPL, which are mixed at 4–H before being applied to the switch 2–J.

The computer complement adjust signal from 1–J, 1–H is switched at 6–C with a DG2–L timing pulse to turn on the computer minus sign latch at 5–C. This terminates the computer minus sign "off" signal and permits the next NVPL to unlatch the computer complement adjust unit 1–J.

During the time that the computer complement adjust unit 1–J is on, the gate pulse therefrom passes through the mixer at 7–H to the cathode follower designated DG1–L at 7–J. The output of this cathode follower is switched at 6–J with the computer value signal and a DG1–L timing pulse for entering a zero in the adder matrix at DG1–L time. The computer complement adjust signal from 1–J, 1–H passes through the mixer at 4–L to the cathode follower at 3–P, and the output signal from 3–P is switched at 3–K with a zero signal and a DG1–L timing pulse for adding zero into the adder matrix as the true distributor value. The computer complement adjust signal from 1–J, 1–H furthermore is switched at 5–F with the computer minus sign "on" gate pulse, and the output thereof passes through the mixer at 4–G to the cathode follower at 3–G designated "add zeros." The output of this cathode follower is switched at 3–J with zero signal pulses and a DG2–L to a DG1–L timing pulse to enter zeros into the matrix as the true distributor value. The reason for this, of course, is that the adder matrix will not function unless two values are entered concurrently therein, and in a complement adjust cycle the adder must function as though the complement of the computer value is being added to zero.

To add the complement of the computer value (namely, to convert the complement value already standing in the computer to its corresponding true value), the computer complement adjust signal from 1–J, 1–H is switched at 8–K with the computer value signal and a DG2–L to DG1–L to enter the computer value as a complement through the complement value unit 7–K, 7–L. As a result of this step, the desired conversion from complement to true value is effected.

Start Multiply

The start multiply signal from terminal 310 is mixed at 2–Z to turn on the start multiply gate unit at 1–Y and 1–Z. This unit remains latched until the next NVPL. The start multiply signal is also mixed at 8–E to provide a start M–D (multiply-divide) gate pulse at 7–E for sign control purposes.

The start multiply gate pulse from 1–Z, 1–Y is passed through a mixer at 7–F and a cathode follower at 7–J to the switch at 6–J, where it is switched with the computer value signal and the DG2–L to DG1–L timing pulse for entering the computer value as a true number into the adder matrix. At DG1–L a zero is inserted into the regeneration record circuit, as explained above in "Start of addition operation."

The start multiply gate pulse also is passed through a mixer at 4–G to the cathode follower at 3–G, the output of which is switched at 3–J with the zero signal and the DG2–L to DG1–L timing pulse for entering zeros in place of the distributor value into the adder matrix. This is done for the reason that the computer circuits are not yet ready to start the first round of actual multiplication, so the computer value is merely added to zero to afford time in which the computer circuits may be properly conditioned.

The start multiply gate pulse from 1–Z, 1–Y also is switched at 2–Z with a DG11–U timing pulse to turn on the multiply gate unit at 1–X.

Multiply

The multiply gate pulse from 1–X, 1–W passes through a mixer at 4–N and a cathode follower at 4–Q to provide a multiply-divide gate pulse which in turn passes through the mixer at 7–H to provide a DG1–L computer value entry signal at 7–J, and which also passes through a mixer at 7–F to provide a DG2–L to DG1–L computer value entry signal at 7–J. The multiply gate pulse from 1–X, 1–W also passes through a mixer at 2–A for turning on the lower gate latch unit at 1–C. The lower gate unit remains on for the duration of the multiplication, that is, as long as the multiply gate unit at 1–X remains on.

The multiply gate pulse from 1–X, 1–W furthermore is switched at 4–T with the zero MC "off" signal from 2–Y and with DG1–L and Q1AA timing pulses to provide a sampling signal which is used at the switch 3–T to determine whether a true add or a complement add operation should take place in the next cycle. At 3–T said sampling signal is switched with the multiply-left-shift "off" signal from 2–W and with the binary (B0 or B5) portion of the DG11–U computer digit. If a binary 0 is detected, the true add unit at 1–D is turned on. If a binary 5 is detected, the complement distributor add unit at 1–F is turned on. This is in accordance with the multiplication procedure outlined in the "Functional description" above (see Table III).

The aforesaid sampling signal is also switched at 3–S with the multiply-left-shift "on" signal from 2–W and with the binary portion of the DG10–U computer digit. If a binary 0 is detected, the true add unit 1–D is turned on. If a binary 5 is detected, the complement distributor add unit 1–F is turned on.

The multiply gate pulse from 1–X, 1–W is also switched at 4–T with a DG11–U timing pulse to provide a blanking signal at 3–U for blanking the DG11–U distributor digit through the switch at 5–F.

The multiply gate pulse is switched at 4–R with a nine signal, the true add gate from 1–E and a DG11–U timing pulse for adding a digit nine into the matrix in place of the DG11–U digit from the distributor. This effects a reduction of the highest remaining MP digit by one, in those situations where this step is required (see Table III).

The multiply gate pulse is switched at 4–S with a zero signal, the complement add gate from 1–F, 1–E and a DG11–U timing pulse for adding a zero into the matrix in place of the DG11–U digit from the distributor. This zero plus a carry effects an increase of the highest remaining MP digit by one in those situations where the MP digit is being increased (see Table III).

Multiplication Left Shift Detection

Referring to Table III in the "Functional description" above, there are instances during a multiplication process in which a left shift is required, either with or without the addition of the MC value.

The multiply gate from 1–W is switched at 5–X with the end multiply "off" gate from 1–U and a Q0AA timing pulse to provide a sampling signal. This sampling signal is switched at 5–W with the multiply-left-shift off gate from 2–W and a DG1–L timing pulse to provide a left-shift-detection timing signal at 5–V. This sampling signal is also switched at 5–W with the multiply-left-shift on gate from 2–W and a DG11–U timing pulse to provide the left-shift-detection timing signal.

The left-shift-detection timing signal is switched at 5–Y with the binary zero of the second highest MP digit to detect a below-five condition. If this condition is met, the following takes place:

(*a*) The below-five signal is switched at 4–Z with the binary zero and the quinary zero of the highest MP digit to turn on the 0MC and left shift gate at 3–Y.

(*b*) The below-five signal is also switched at 4–Y with the binary zero and quinary one of the highest MP digit to turn on the ±MC and left shift gate at 3–X.

(*c*) The below-five signal is also switched at 4–X with the binary five and quinary four of the highest MP digit to turn on the ±MC and left shift gate.

The left-shift-detection timing signal is switched at 5–Y with the binary five of the second highest MP digit to detect an above-five condition. If this condition exists, the following occurs:

(*a*) The above-five signal is switched at 4–Z with the binary five and quinary four of the highest MP digit to turn on the 0MC and left shift gate at 3–Y.

(*b*) This above-five signal is also switched at 4–Y with the binary zero and quinary zero of the highest MP digit to turn on the ±MC and left shift gate at 3–X.

(*c*) The above-five signal is also switched at 4–X with the binary five and quinary three of the highest MP digit to turn on the ±MC and left shift gate.

Multiply Left Shift

The 0MC and L.S. gate from 2–Y is switched at 3–V with a DG3–L timing pulse to turn on the multiply-left-shift gate at 3–W. The ±MC and L.S. gate from 2–X is switched at 3–V with a DG3–L timing pulse to turn on the multiply-left-shift gate at 3–W. The 0MC and L.S. gate is mixed at 4–G to provide an add zeros gate at 3–G to substitute zeros for the distributor value. The 0MC and L.S. gate is also mixed at 4–J to provide an "add 1" signal at 4–K to add a 1 in the DG1–L position. The ±MC and L.S. gate is mixed at 4–J to do the same thing. The 0MC and L.S. off gate and the ±1MC and L.S. off gate are switched at 3–Q with the multiply gate from 1–W to provide an add zero signal at 4–K to add a zero at DG1–L.

The multiply-left-shift gate is used with the multiply gate to detect whether a true or complement addition is to take place in conjunction with the left shift, as explained above under "Multiply." The multiply-left-shift gate also goes to terminal 325, Fig. 19C, and from there to terminal 326, Fig. 40H. This gate from terminal 326 is mixed at 327, Fig. 40H, to provide a special left shift gate. For use of this special left shift gate see "Start divide left shift" hereinafter.

End Multiply

The "carry from DG1–L" signal coming from 9–K (at DG2 time) is switched at 2–U with the multiply gate from 1–W to turn on the end multiply gate at 1–V and 1–W.

The end multiply gate is switched at 2–T with the binary and quinary zeros of the last MP digit, the multiply left shift off gate, and a DG1–L, 0BB timing pulse from 4–Q to turn off the multiply gate unit at 1–X.

The multiply "off" gate from 1–Y is switched at 2–S with the end multiply "on" gate to close the computer regeneration circuit. Thus, the output signal of 2–S passes through 1–T, and thence through the terminal 328, Fig. 19C, the terminal 329, Fig. 40H, and the mixer 330, Fig. 40H, to the reset terminal of the computer regeneration control unit 276, Fig. 40E, turning this unit off to its "regenerate" condition.

The multiply off gate is switched at 2–U with a DG2–L timing pulse and mixed to turn off the end multiply gate unit at 1–V.

Start Divide

The divide operation has been explained functionally above in connection with Figs. 18 and 18A. The circuits for performing this operation will now be traced in detail.

The start divide signal from terminal 311, Fig. 19C (DG1–L pulse), is mixed at 8–E with the start multiply signal to turn on the start multiply-divide gate at 7–E. (See "Multiply-divide sign control" above).

For a divide-and-retain-remainder operation, the procedure is as follows:

(*a*) The start divide signal from terminal 311 is switched at 3–L with the no reset signal from terminal 314 and a Q0AA timing pulse to turn on the hold remainder gate at 1–K and 2–K.

(*b*) The start divide signal also is switched at 2–P with the hold remainder gate and a Q3AA timing pulse to turn on the start divide gate at 1–P. The hold remainder gate is used only as a check here. The start divide gate is unlatched by a NVPL at 2–N.

For a divide-and-cancel-remainder operation, the procedure is as follows:

The start divide signal from terminal 311 is switched at 2–P with the reset signal from terminal 308 and the no remainder gate from 2–K to turn on the start divide gate at 1–P.

The start divide gate from 1–P is mixed at 7–F to provide a gate at 7–J to read the computer value into the matrix from DG2–L to DG1–L. At DG1–L time a zero is added into the regeneration record circuit. (See "Start of addition operation" above.) The start divide gate from 1–P also is mixed at 4–G to provide a gate at 3–G for entering zeros in place of the distributor value from DG2–L to DG1–L. The start divide gate also is switched at 2–N with a DG11–U timing pulse to turn on the divide gate at 1–L and 1–M.

Start Divide Left Shift

The start divide signal from terminal 332, Fig. 40H, is mixed at 327 to provide a left shift gate pulse at the cathode follower 333. This left shift gate pulse is switched at 334 with a DG3–L timing pulse to flip the adder output gate unit 335 from the "operation" condition to the "regeneration" condition. The adder output signal from terminal 336, Fig. 40H, is switched at 275, Fig. 40E, with the regeneration gate pulse from 337, Fig. 40H, and the resulting signal turns on the regeneration record unit 279, Fig. 40B.

The left shift gate pulse from 333, Fig. 40H, also is switched at 338, Fig. 40E, with a DG11–U timing pulse, and the output thereof passes through the inverter unit 339, Fig. 40D, and cathode follower 269 to provide a computer blanking signal. The computer value signal coming over the conductor 266 is switched at 267, Fig. 40E, with the computer blanking signal from 269, Fig. 40D.

The left shift gate pulse is also switched at 340, Fig. 40B, with a zero signal and a DG3–L timing pulse for entering a zero into the operation record circuit at 386, Fig. 40A. This zero subsequently appears in the DG2–L position of the computer regeneration revolver to fill the vacancy which is created in this position due to a left shift.

Division

Referring again to the master diagram, Figs. 19 to 19S, the divide gate unit (1–L and 1–M) furnishes a divide gate signal which is utilized as follows:

(*a*) The divide gate is switched at 3–Q with the adder output regeneration signal from terminal 340, Fig. 19D (connected to terminal 341, Fig. 40H), and the DG1–L, 0BB timing pulse from 4–Q to turn on the complement distributor add gate at 1–E and 1–F. This occurs only on the first left shift of the division operation.

(*b*) The divide gate is also switched at 3–R with a carry (DG11–U) signal from the matrix and the DG1–L, 0BB timing pulse to turn on the complement distributor add gate at 1–F.

(*c*) The divide gate is also switched at 3–R with a no-carry (DG11–U) signal from the adder matrix and the DG1–L, 0BB timing pulse to turn on the true add gate at 1–D. This no-carry pulse is switched with the quotient digit gate at 2–R as a check.

(The divisor is subtracted as long as a carry occurs from DG11–U, but when no carry occurs, the divisor must be added back once.)

The divide gate is mixed at 2–A to turn on the upper gate at 1–A, which remains on for the duration of the division operation (i.e., as long as the divide gate is on).

If a complement add cycle is to take place, the divide gate is switched at 4–L with the complement distributor add gate and mixed to provide a gate at 3–P to add a zero at DG1–L time through the switch at 3–K. If a true add cycle is to take place, the divide gate is switched at 4–L with the true add gate and mixed to provide a gate at 4–K to add a "one" at DG1–L time through the switch located at 3–K.

The divide gate is switched at 4–M with the complement distributor add gate from 1–E and a DG11–U timing pulse to turn on the quotient digit gate at 3–M and 3–N. This gate remains latched on until the next true add cycle, when it must be turned off. The true add gate from 1–E is switched at 4–M with DG1–L and Q3AA timing pulses to turn off the quotient digit gate at 3–M.

The divide gate is mixed at 4–N to provide the multiply-divide gate at 4–Q. The multiply-divide gate is mixed at 7–H to provide the DG1–L computer entry gate at 7–J and is mixed at 7–F to provide the DG2–L to DG1–L computer entry gate at 7–J.

Quotient Digit Gate (Division)

The quotient digit "on" gate from 3–N is switched at 3–L with a zero signal and a DG2–L timing pulse to add "one" into the matrix in place of the distributor value. (Zeros were first complement-added into all positions; this set up a carry into DG2–L. Now the quotient digit gate blanks the "nine" going into DG2–L and inserts a true zero in its place, causing a "one" to be added in DG2–L. The actual carry is added at 10–L. Another carry inserted into DG3–L will complete the zero complement-add in the other positions.)

The quotient digit "off" gate is mixed at 8–F with a negative DG2–L timing pulse to blank the complement distributor readin at 8–J. (NDG2–L blanks only when the quotient digit "off" gate is down.)

The quotient digit "on" gate is switched at 10–J with a DG3–L timing pulse and mixed to provide a blanking signal for the no-carry output from DG2–L. The blanking signal from 11–K blanks the no-carry signal at 11–M. The quotient digit "on" gate also is switched at 10–L with DG3–L and Q3AA timing pulses to turn on the carry gate at 10–N and 10–P.

End Division

Main computer chassis (Figs. 19–19S):

The divide gate from 1–L is switched at 2–Q with the carry from the DG1–L position, which comes from 9–K, to turn on the end divide gate at 1–Q and 1–R. This gate is unlatched by NVPL at 2–Q. The end divide gate is switched at 2–L with a Q1AA timing pulse and mixed to turn off the divide gate at 1–M. (End divide is turned on at DG2–L, 0BB; divide is turned off at DG2–L, Q1AA, carry or no-carry gate is set up at DG2–L, Q3AA. The same carry signal that turns on the end divide gate must be blocked by turning off the divide gate, which in turn ends the multiply-divide gate to effect the carry check at DG2–L time.)

The end divide gate is mixed at 4–N with the multiply gate and divide gate to provide the multiply-divide gate at 4–Q. This keeps the computer value entering the adder matrix after the divide gate at 1–M is off.

Auxiliary computer chassis (Figs. 40–40H):

The end divide gate from terminal 342, Fig. 40H, is switched with the no-remainder gate and the VGU at 323, Fig. 40E, and mixed at 343 to provide a computer value blanking signal at 269. This blanking signal is switched at 267 with the computer value signal. The end divide gate is also switched at 267 with the no-remainder gate and the VGU and zeros to enter the regeneration record circuit. (This is to reset computer. The normal computer value goes through if remainder is retained.)

End of Operation Signal

The operation gate at 9–F is turned on by any of the following signals: the true add gate pulse from 1–D, 1–E; the complement add gate pulses from 3–H; the multiply-divide gate from 4–Q; the end right shift pulse or end left shift pulse from 11–F; or a "no operation" signal from the operation selector received through the terminal 347, Fig. 19C, and the mixer at 10–F. The operation gate at 9–F is latched at 10–H until the NVPL, at which time the end of operation signal becomes available at 9–E. The end operation signal exists at terminal 345, Fig. 19C, and may be utilized in any suitable fashion to furnish an indication that the computer is ready for a new operation. This signal also is applied to the terminal 346, Fig. 40H, and is mixed at 330 to turn the computer regeneration control gate 276, Fig. 40E, to "regenerate" at 277.

Carry-No Carry

There are four possible outputs from the binary portion of the matrix; zero (9–N), zero-plus-carry (9–N), five (9–M), and five-plus-carry (9–M). The zero and five signals are mixed at 9–L to produce a no-carry signal at 8–L. The zero-plus-carry and five-plus-carry signals are also mixed at 9–L to produce a carry signal at 8–L.

The no-carry signal and DG1–L and DG2–L timing pulses are mixed at 10–M to produce a no-carry signal to the cathode follower at 11–L. The combined complement gates from 3–H are switched at 10–J with a DG2–L timing pulse. The quotient digit gate from 3–N is also switched at 10–J with a DG3–L timing pulse. These two outputs are mixed to provide a no-carry blanking gate at 11–K. The no carry signal from 11–L and the no carry blanking gate from 11–K are switched at 11–M with a Q3AA timing pulse to turn on the no carry gate at 11–N and 11–P.

The carry check signal from 11–L (described below) is switched at 10–J with a DG2–L timing pulse and mixed at 10–J with DG1–L and the shift number gate pulse to provide a carry blanking gate at 11–K. The carry blanking gate is switched at 11–M with the carry signal from 8–L and a Q3AA timing pulse to turn on the carry gate at 10–N and 10–P.

The combined complement gates from 3–H are switched at 10–L with DG2–L and Q3AA timing pulses to turn on the carry gate at 10–N and 10–P. This provides the carry into DG2–L to complete the tens-complement in that order.

The quotient digit gate from 3–N is switched at 10–L with DG3–L and Q3AA timing pulses to turn on the carry gate at 10–N.

The carry signal from 8–L is switched at 10–K with DG2–L and 0BB timing pulses to provide a carry from DG1–L signal at 9–K. This signal is used to terminate right shift, left shift, half correction, multiplication, and division operations.

The combined complement gate (A) from 3–H is switched at 10–K with the multiply-divide blanking signal, and DG11–U and 0BB timing pulses to provide a sampling signal at 9–K to determine the algebraic sign following a subtraction operation. The carry sampling switch to detect a plus sign is at 6–A; the no-carry sampling switch to detect a minus sign is located at 2–J.

The carry from DG1–L (see above) causes the multiply and divide gates to turn off through the end multiply or end divide circuits. The multiply off gate from 1–Y is mixed at 2–S with the divide off gate from 1–N to provide a multiply-divide off signal at 1–T. This signal is switched at 10–H with the half correction off, left shift off, and right shift off gates to provide a carry check signal at 11–L. This signal is used to block a carry from DG1–L, as mentioned above.

Left Shift; Right Shift; Half Correction

The left shift, right shift and half correction operations are explained hereinafter under their respective headings in the section of the description entitled "Operation," and the details of the circuits for performing these functions likewise are explained hereinafter.

The aforementioned shift controls are claimed in the pending application of F. E. Hamilton, G. V. Hawkins, R. E. Lawhead, Jr., and E. S. Hughes, Jr., Serial No. 264,304, filed December 31, 1951.

Computer Readout

In a computer readout operation the value stored in the computer is transferred to the distributor, from which it is read out to a suitable register or manifesting device. A value may be transferred from either the lower computer or the upper computer to the distributor for readout purposes.

Referring to the auxiliary chassis diagram, Figs. 40–40H, the plus computer sign signal from terminal 360, Fig. 40G, is switched at 361 with a 9 signal. The minus computer sign signal from terminal 362 is switched at 361 with an 8 signal. The output signal from this operation will be a 9 signal if the computer sign was positive and an 8 signal if the computer sign was negative. After passing through the cathode follower 363, Fig. 40D, said output signal is fed to a switch at 364 and is also fed back to the switch at 361. If there is no remainder in the upper computer, a further switching action takes place at 361 with the no remainder gate pulse from terminal 365, Fig. 40G, and the output therefrom passes through the other side of the cathode follower 363, Fig. 40D, to a switch at 365.

If there is a positive remainder stored in the upper computer, the plus remainder sign signal from terminal 366, Fig. 40G, is switched at 367 with a 9 signal and a remainder gate signal from terminal 368. If there is a negative remainder, the minus remainder sign signal from terminal 369 is switched at 367 with an 8 signal and the remainder gate signal. The output of this switching operation passes through the mixer at 370 to the cathode follower 363, Fig. 40D.

To read out the value which is stored in the lower computer, the operation selector applies DG1–L to DG1–U gate pulses on the terminals 371 and 373, Fig. 40G. These two signals are mixed at 375, Fig. 40D, to produce a lower readout gate pulse. For reading out the value stored in the upper computer, the operation selector applies DG1–L to DG1–U pulses on the terminals 372 and 374, Fig. 40G. (The upper value is read from the special reading head 24 at the same time that the lower value is read by the normal reading head 20.) These two signals are mixed at 375 to produce an upper readout gate pulse. The signals on the terminals 371 and 372 also are mixed at 375 for producing a computer readout gate pulse which conditions the distributor circuits for allowing the computer value to enter the distributor. Said readout gate pulse, after passing through the mixer at 376, Fig. 40A, is inverted at 233, Fig. 40D, to provide a negative gate pulse for unlatching the regeneration control unit at 228 during the time that the computer value is being read into the distributor.

The lower readout gate signal from the mixer 375 is switched at 364 with a DG1–L timing pulse and the lower computer sign signal, and it is also switched at 364 with a DG2–L to DG1–U timing pulse and the lower computer value signal. These two outputs are mixed at 376, Fig. 40A, to provide the complete lower computer value signal for readout at the inverter and cathode follower units 377 and 378. This computer output signal is then switched at 232 with the aforesaid computer readout gate pulse to enter the distributor by way of the inverter and cathode follower units 218 and 219.

In similar fashion the upper readout gate pulse from 375, Fig. 40D, is switched at 365 with a DG1–L timing pulse and the upper sign signal, and it is switched also at 365 with the DG2–L to DG1–U timing pulse and the computer value signal. These two outputs are mixed at 376, Fig. 40A, to provide the complete upper computer value signal for readout at 377 and 378. This output, in turn, passes into the distributor by way of the units 232, 218 and 219.

The distributor regeneration circuit is opened during the interval when the value from the computer is being entered into the distributor. This is done by resetting the latch unit 228, Fig. 40, for one value time in the manner explained above, thereby wiping out the value which was stored in the distributor. The unit 228 is relatched following transfer of the computer value, and regeneration thereafter takes place within the distributor revolver. The value now stored in the distributor is available as an output signal at the terminal 225, Fig. 40F.

To manifest the value held in the distributor, any suitable register which is responsive to the distributor output signal may be employed. Fig. 47 illustrates two orders of a neon lamp register for displaying in biquinary code form the value represented by a signal such as that which appears at the output terminal 225, Fig. 40F. This signal is applied to the conductor 380, Fig. 47, from which it is switched by DG1 to DG11 timing pulses, respectively, to banks of latch units 381, 382, and so forth, respectively associated with the various digital orders of the value. The binary and quinary portions of the signal in each order are switched respectively with the appropriate timing pulses for turning on the selected latch units in that order. The output of each latch unit as 381 or 382 energizes a neon lamp as 383 or 384 to furnish a visual indication of the stored information. The latch units are reset when it is desired to clear the register.

ZERO BALANCE TEST

In a zero balance test, the normal computer signal picked up by the reading head 20, Fig. 40G, is checked for the presence of zeros in all orders. As a preliminary step in this operation, DG2–L and 0AA timing pulses are switched at 384, Fig. 40H, to provide signals for resetting the zero balance check latch 385, Fig. 40E, and the zero balance test latch 386, Fig. 40E, to their "on" conditions. That is to say, the latches 385 and 386 are placed in such a condition that positive output voltages are furnished through their "on" cathode follower units 387 and 388, respectively, to the switch unit 389, Fig. 40B. There, the "on" output signals are switched to provide the zero balance signal at 390, which signal then is made available at the terminal 391, Fig. 40H.

If a no-zero condition is present in the computer value, both the latches 385 and 386 are turned "off." Two latches are used in order to provide a check. The normal computer signal from the reading head 20, Fig. 40G, is switched at 393, Fig. 40H, with two sets of N0BB and NQ4BB timing pulses. The result of this switching step is to suppress all Q0A and B0A pulses in the normal computer signal and to let any other pulses through. Any pulses which pass the switches at 393 will be effective to turn off the latch units at 385 and 386, Fig. 40E. The positive "off" signals from these latches, after passing through the cathode followers 394 and 395, respectively, are switched at 389 to provide the "no-zero" signal at 396, Fig. 40B, and at the terminal 397, Fig. 40H.

COMPUTER OVERFLOW

If the result of a true add operation exceeds the capacity of the computer (twenty digits), an error indication is furnished by the computer overflow circuit. At 8–H, Fig. 19G, the carry signal from 8–L is switched with a DG11–U timing pulse, and the output is in turn switched with the true add gate pulse from 1–D, 1–E, the multiply-divide blanking signal from 6–F and Q2AA timing pulses to turn on the computer overflow gate at 9–G, 9–H. The computer overflow gate pulse from 9–G is mixed at 400, Fig. 40A, to provide an error stop signal at 401, Fig. 40. This stop signal remains on until the computer is reset by a special reset signal (see Computer Cancel operation described below).

DIVIDE ERROR

A condition similar to a computer overflow exists if there is a carry signal from 8–L during the DG3–L time while the quotient digit gate is "on." This indicates an error since a quotient digit should never be greater than 9. The quotient digit "on" gate from 3–N is switched at 2–R with the carry signal and with DG3–L and Q1AA timing pulses to turn on the divide error gate at 1–R and 1–S. The divide error signal goes through the mixer at 9–J to turn on the computer overflow unit at 9–H. (A separate "divide error" output could be provided if desired.)

ERROR CHECK CIRCUITS

A special check circuit is provided to check for one digit and only one digit in each digit space of the computer regeneration revolver. Each digit, in accordance with the biquinary code, consists of one pulse in the quinary level and one pulse in the binary level. The check circuit is made up of two parts, one part to check for more than one pulse in either level and one part to check for the absence of a pulse in either level. Both the "none" and "more than one" signals will turn on a computer error latch 402, Fig. 40A, which in turn sends a signal to the error stop unit 401, Fig. 40.

The normal computer signal, as it comes from the reading head 20 and the read circuit 262, Fig. 40G, consists of A pulses representing the binary and quinary bits of the computer value. This signal is routed directly to the "more than one" switch 403, Fig. 40B. It also is fed to the computer regeneration circuit for converting the A pulses into corresponding AA pulses (units 263, 264 and 265, Figs. 40G and 40D). The AA output pulses are sampled with B pulses at 404, Fig. 40A, and the resulting signal is switched at 406 to either the quinary or binary side of a latch 405, Fig. 40B. The switch 406 is conditioned on one side by a Q0A to B0A pulse and is conditioned on the other side by a B0A to Q0A pulse for performing this separation of quinary and binary elements in the signal. The quinary-binary (Q–B) latch 405 is always latched on one side or the other depending upon the last pulse which is fed to it.

The output from the quinary side of the Q–B latch 405 is available to the quinary half of the "more than one" check switch 403, Fig. 40B. Similarly, the output from the binary side of the Q–B latch 405 is available to the binary half of this check switch. Each half of the check switch 403 consists of a triple coincidence switch. One half of the switch 403 receives a Q0B to Q4B pulse and is used to check for the presence of a quinary pulse. The other half of the switch 403 receives a B0B to 0B pulse and is used to check for the presence of a binary pulse. "A" pulses representing the computer signal are available to both halves of the switch 403.

The first signal pulse coming in on the quinary level cannot get through the "more than one" switch 403 because there is a binary output from the Q–B latch 405. This output is the result of the last pulse checked, which was in the binary level. The first signal pulse in the quinary level also goes to the computer regeneration circuit as described above, and shortly thereafter a corresponding B pulse reaches the Q–B latch 405 and flips it to the quinary side. If there should now be an additional pulse in the quinary level, it will get through the "more than one" switch 403 and turn on the error latch 402.

A first signal pulse in the binary level cannot get through the "more than one" switch 403 because there is now a quinary output from the Q–B latch 405. This signal pulse also goes to the above-mentioned regeneration circuit, causing a corresponding B pulse to reach the Q–B latch 405 and flip it to the binary side. If there should be an additional pulse now in the binary level, it will get through the "more than one" switch 403 and turn on the error latch 402.

The "none" switch 407, Fig. 40B, checks for absence of a pulse. The quinary half of the switch 407 receives the quinary output of the Q–B latch 405 along with a 0BB pulse. The binary half of the switch 407 receives the binary output of the Q–B latch 405 along with a Q4BB pulse. "A" pulses are available to both halves of the switch 407. If the quinary side of the Q–B latch 405 is on at Q0A time, a signal will get through the switch 407 to the error latch 402. This would happen only if there had been no pulse at all in the preceding binary level. Similarly, if the binary side of the Q–B latch 405 is on at B0A time, a signal will get through the switch 407 to the error latch 402. This condition would exist only if there had been no pulse in the preceding quinary level. In this way, the absence of either a quinary or binary pulse produces an error signal.

A check circuit similar to that just described is provided for the distributor to check whether there is one and only one digit in each digit space of the distributor. This distributor error check circuit comprises the latch units 410 and 411, Figs. 40 and 40A, along with the switches 412, 413 and 414. A detailed description of this circuit will be omitted inasmuch as the circuit functions in substantially the same manner as the computer error check circuit which has been described.

In addition to checking each of the digit entries for one and only one bit or pulse per level, the computer circuits also check for the presence of two bits per level in the adder matrix (it being recalled that two digits must be entered concurrently into the adder; never just one digit alone). If the necessary pair of bits is not present in either level, none of the latch units for that level will be operated; hence, the adder will not furnish an output. This condition will be detected immediately by the error check circuit associated with the revolver that is to receive the output from the adder. Similarly, if there should be more than two levels per digit coming out of the adder, this condition likewise will be detected by an error check circuit.

Computer Cancel

Cancellation of the values standing in the computer and the distributor may be effected as a special operation by applying a positive signal to the terminal 420, Fig. 40. The computer cancel signal from terminal 420 is applied to the input of the initial reset latch 421, Fig. 40, which normally is held "off" by being connected to −70 volts through a suitable resistor. The output from the unit 421 drives the cathode follower units 422 and 423, which accordingly furnish reset signals to the various latch units in the auxiliary chassis (Figs. 40–40H) and the main chassis (Figs. 19–19S).

Insofar as the auxiliary chassis is concerned, the initial reset signal is effective to turn off the distributor error latch 411, Fig. 40A, and the computer error latch 402, Fig. 40A. The initial reset signal also turns off the distributor regeneration control unit 228, Fig. 40, to interrupt the distributor regeneration circuit, and it turns on a zero entry gate 425, Fig. 40C, for entering zeros into the distributor until the end of the value period in which the cancel signal is released, at which time the zero entry gate 425 automatically resets itself. The initial reset signal furthermore is effective to switch zeros into the computer regeneration circuit at 343, Fig. 40E, so long as the cancel signal is available.

On the main chassis the initial reset signal is effective to reset the computer overflow latch at 9–H, the divide error latch at 1–S, the multiply latch at 1–X, the end multiply latch at 1–V, the quotient digit latch at 3–M, the divide latch at 1–M, the left shift latch at 11–G, the right shift latch at 11–E, the add +5 latch at 9–C, and the half correction latch at 11–A. The computer cancel signal is also switched at 4–B on chassis 3 with a DG1–L timing pulse to provide a synchronized cancel signal at 4–C. This signal at 4–C is mixed at 2–B to turn on the reset latch at 3–C. The reset latch remains on until the end of the computer cycle (two value periods) in which the cancel signal is released.

The synchronized cancel signal from 4–C is also mixed at 4–J to provide the add gate pulse at 4–E, which remains as long as the cancel signal is available. The add gate pulse switches with the reset signal at 6–B to turn on the plus sign latch and to turn off the minus sign latch, thus resetting the computer sign. The add gate pulse also is mixed at 322 (Fig. 40E) for entering a zero into the regeneration record circuit at DG1–L time through the switch at 323.

The cancel signal from 4–C also is mixed at 8–F to turn on the operation gate latch at 9–F. This operation gate latch is reset automatically at the end of the computer cycle (two value periods) in which the cancel signal is released. When the operation gate goes off, it initiates the "end of operation" signal at 9–E. This "end of operation" signal is mixed at 330, Fig. 40H, to turn the computer regeneration control latch 276, Fig. 40E, to its "regenerate" condition.

OPERATION

The operation of the computer will be described primarily with reference to Figs. 48–77, inclusive, which are based upon the main chassis diagram (Figs. 19–19S) and the auxiliary chassis diagram (Figs. 40–40H). Corresponding elements are numbered alike in these views. Reference will be made also to various flow diagrams in the functional description above.

Addition and Subtraction

In performing an addition or a subtraction, one of the initial steps is to determine whether a true addition or a complement addition is to take place, and in the event of the latter, it must further be determined whether the computer value or the distributor value is to enter the adder as a complement. These functions are performed by the circuits illustrated in Fig. 48, which shows a portion of the main computer chassis, Figs. 19 to 19S. Corresponding elements in the two diagrams are identified in similar fashion. For example, "SW 7–C" in Fig. 48 refers to the switch 7–C in Fig. 19F of the master diagram, and "CF 7–B" in Fig. 48 refers to the cathode follower 7–B in Fig. 19F.

To detect the sign of the distributor value, the main distributor value signal coming from the main distributor revolver is switched at 7–C with DG1–L, Q3AA and Q4AA timing pulses. In this way the DG1–L or sign digit of the distributor value is tested to determine whether it is plus (Q4AA) or minus (Q3AA). The resulting signal passes through the plus or minus side of the cathode follower 7–B to the switches at 3–D and 3–E, where it is switched with an "add" or "subtract" signal from the operation selector. The resulting signal from 3–D or 3–E passes through either the "add" or "subtract" side of the cathode follower 2–E. Now a still further test must be performed to determine whether the distributor value enters the adder as a true number or a complement, and also to determine whether the computer value enters the adder as a true number or a complement. Thus, the "add" or "subtract" signal coming from 2–E is switched at 2–D and 2–F, or at 2–D and 2–G, as the case may be, with a plus or minus computer sign signal. The manner in which the signal representing the sign of the computer value is furnished will be explained subsequently. Depending upon the outcome of this switching step, one of the latch units at 1–D, 1–F or 1–G will be turned on to furnish a gate signal calling for a true add operation, a complement addition of the distributor value or a complement addition of the computer value, respectively. This is done in accordance with Table I given in "Functional description" above.

Figure 49:
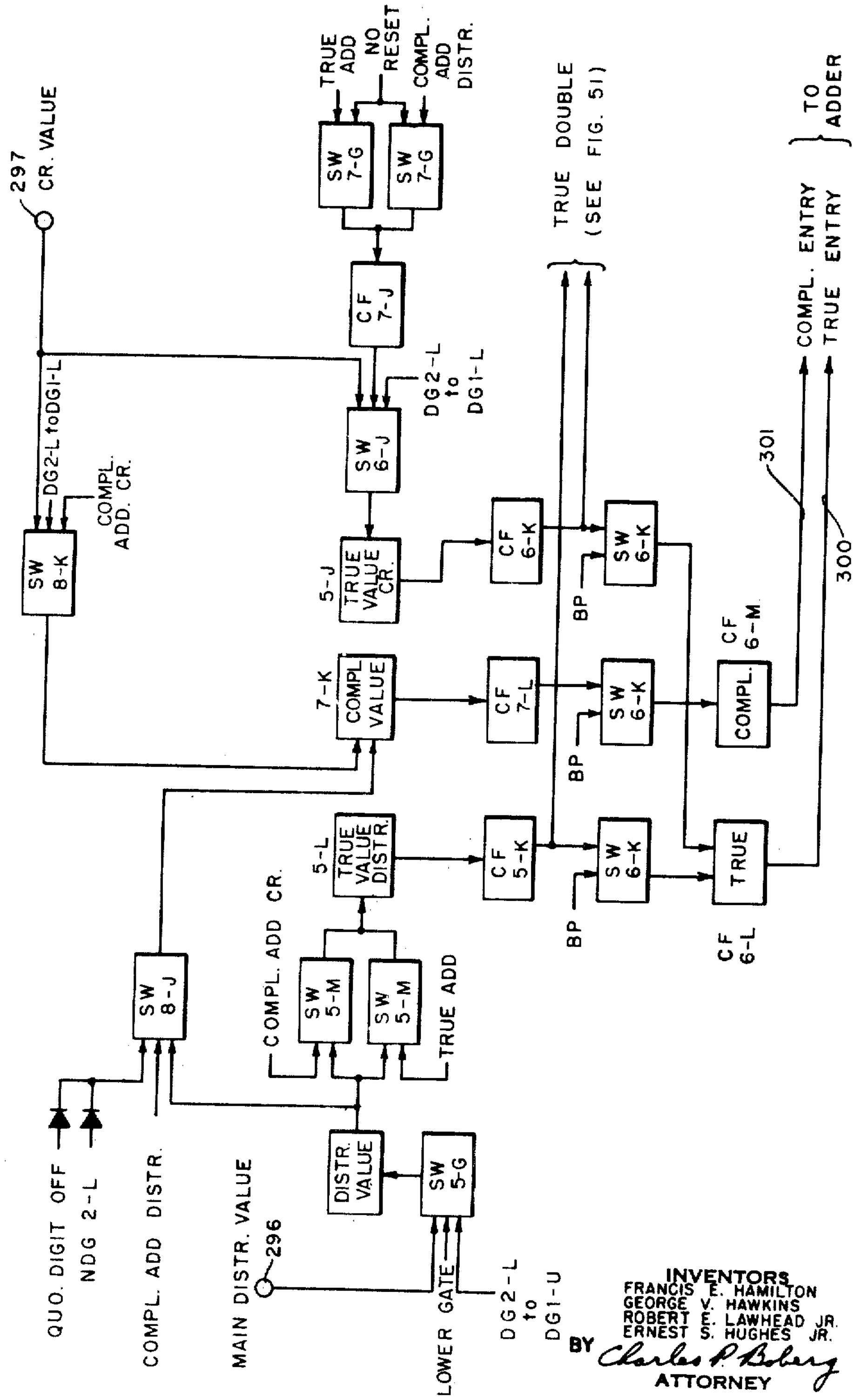

Referring now to Fig. 49, the main distributor value and the computer value signals enter the adder matrix concurrently by way of the terminals 296 and 297 (shown also in Fig. 19A). Each of these signals is switched with a true add gate signal or a complement add gate signal (from Fig. 48) to determine whether it should be routed to the true entry line 300 or the complement entry line 301. Thus, the distributor value signal, after passing through the switch 5–G and the cathode follower 3–G, can be switched alternatively with a true add gate signal or a complement add computer gate signal at 5–M or with a complement add distributor gate signal at 8–J, depending upon the circumstances. If a true add operation is called for, or if the computer value is being entered as a complement, the distributor value signal will enter the matrix through the inverter and cathode follower units at 5–L and 5–K. On the other hand, if the distributor value is to be entered as a complement, the distributor value signal will pass through the inverter and cathode follower units at 7–K and 7–L.

Similarly, the computer value signal from 297, Fig. 49, is routed through the switch 6–J to the inverter and cathode follower units at 5–J and 6–K if a true add operation is called for, or if the distributor value is being entered as a complement. Under these circumstances, the computer value enters the matrix as a true number. On the other hand, if the computer value is to be entered as a complement, the computer value signal is switched at 8–K with a complement add computer gate signal and thereafter passes to the inverter and cathode follower units at 7–K and 7–L. Complement value signals derived from either the distributor or the computer, after being sampled with B pulses at 6–K, are passed to the complement entry line 301 through the cathode follower 6–M. True value signals derived from the distributor or the computer, after being sampled with B pulses at 6–K, are passed to the true entry line 300 through the cathode follower 6–L. (The entry lines 300 and 301 extends through Figs. 19H, J, K and L of the master diagram.)

A typical true add operation will now be described with reference to Example 1 which was given above in the "Functional description." This example is repeated below, together with a tabular listing of the various digit entries and the special functions of doubles and carries associated therewith:

Example 1: +58423 (Cr. value)
(Add) +48326 (Distr. value)

+106749

| Digit Time | Entries | Codes | Doubles | | Carries |
|---|---|---|---|---|---|
| DG2–L | True 6<br>True 3 | B5Q1<br>B0Q3 | No doubles | | No carry. |
| DG3–L | True 2<br>do | B0Q2<br>B0Q2 | BD | QD | Do. |
| DG4–L | True 3<br>True 4 | B0Q3<br>B0Q4 | BD | -------- | Qui. carry. |
| DG5–L | True 8<br>do | B5Q3<br>B5Q3 | BD | QD | Bi. and qui. carries. |
| DG6–L | True 4<br>True 5<br>Carry 1 | B0Q4<br>B5Q0<br>-------- | No doubles | | Do. |
| DG7–L | True 0<br>do<br>Carry 1 | B0Q0<br>B0Q0<br>-------- | BD | QD | No carry. |

Figure 50:
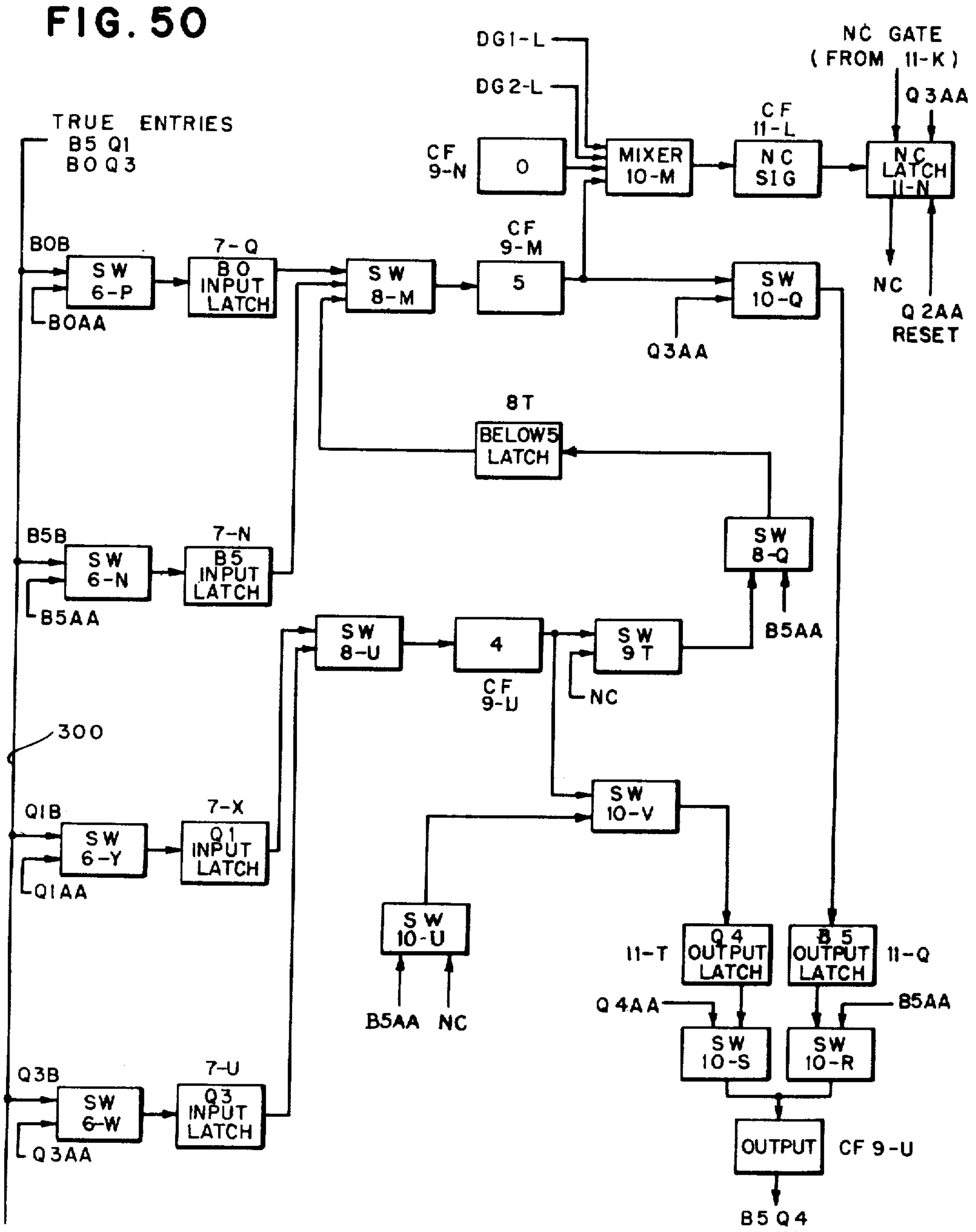

Fig. 50 illustrates those portions of the adder circuitry which are involved in the addition of a true 6 and a true 3, these being the first digits of the distributor and computer value, respectively, to enter the adder matrix. Pulses representing the biquinary code bits B5Q1 and B0Q3 are routed to the true entry line 300 in the manner already explained. These pulses are switched with appropriate timing pulses, as indicated in Fig. 50, to set the B5, B0, Q1 and Q3 input latches. The output signals from the Q1 and Q3 input latches are switched at 8–U, and the resulting signal passes through the "4" cathode follower at 9–U. There being no carry from a lower order, the "4" signal is switched with the NC signal as shown to set the Q4 output latch and the "below 5" latch. This action takes place at B5AA time. When the B0 and B5 input latches are turned on, their respective outputs are switched at 8–M with the output from the below 5 latch. The resulting signal passes through the "5" cathode follower at 9–M and is switched at 10–Q with a Q3AA timing pulse for setting the B5 output latch.

As an incident to the addition of any two digits, the adder furnishes a CI or NC signal to indicate a carry or no carry to the next higher order. In this instance there is to be no carry. Therefore, the output of the "5" cathode follower 9–M is passed through the mixer at 10–M and the cathode follower 11–L to the switch 11–M (Fig. 19P), where it is switched with a Q3AA timing pulse and a no-carry gate pulse from 11–K for turning on the "no carry" latch 11–N. The NC signal furnished by the latch 11–N is utilized in the next higher order or DG time. The NC gate pulse from 11–K is a control signal which permits the no-carry latch 11–N to be operated when the computer circuits have been properly conditioned for a no-carry operation, provided of course that the addition of the two digits in the adder matrix does not result in a carry. No carry will result if the binary output of the sum is furnished by either the "5" cathode follower 9–M or the "0" cathode follower 9–N, signifying that the binary level has not been exceeded.

Further reference to the no-carry circuit just described will be omitted in the succeeding portions of this description. It will be understood, however, that the no-carry latch 11–N is turned on for signalling NC (no carry) to the next higher order whenever the addition of two digits fails to produce a carry, that is to say, whenever the binary portion of the sum is furnished by either the "0" cathode follower 9–N or the "5" cathode follower 9–M as just mentioned. The no-carry latch 11–N is turned on at B0AA or B5AA time and is reset at Q2AA time in the next higher order.

Figure 51:
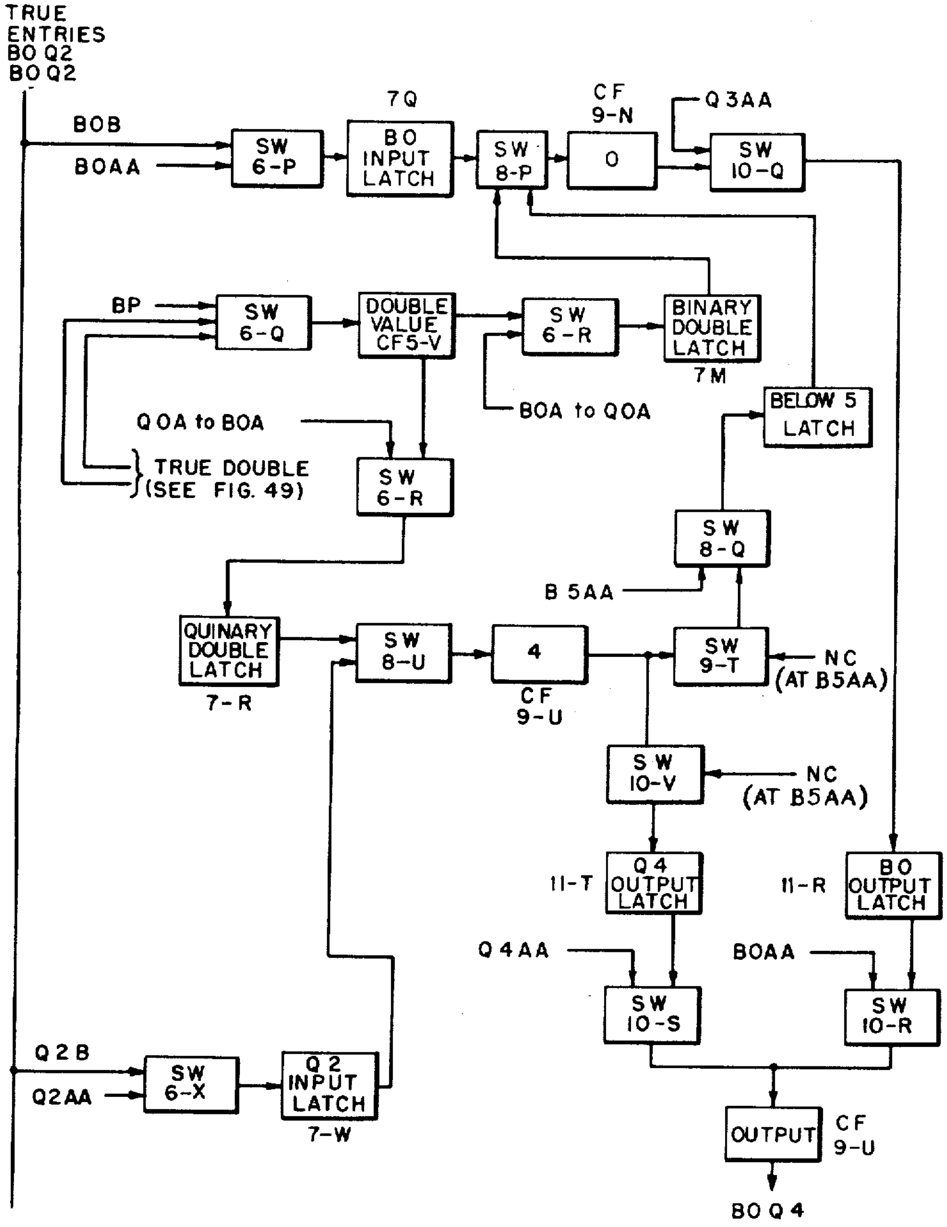

Coming now to the addition of a true 2 to another true 2, Fig. 51, it will be noted that there are two simultaneous binary bits B0 and two simultaneous quinary bits Q2, each of these sets being represented by only a single pulse in the true entry line 300. This results in the B0 input latch 7–Q and the Q2 input latch 7–W being turned on while the remaining input latches remain off. It should be noted also that the cathode follower unit at 5–K (see Fig. 49) furnishes a pair of coincident pulses to the switch 6–Q (Fig. 51) in each of the binary and quinary levels to signify a double B0 and a double Q2. The coincident pulses are sampled with B pulses at the switch 6–Q, and the resulting signal passes through the double value cathode follower 5–V to the switch 6–R. In the quinary level, the signal from 5–V is switched at 6–R with a Q0A to B0A timing pulse to turn on the quinary double latch 7–R. In the binary level the signal from 5–V is switched at 6–R with a B0A to Q0A timing pulse to turn on the binary double latch at 7–M.

The outputs of the Q2 input latch 7–W and the quinary double latch 7–R are switched at 8–U, Fig. 51, to produce a quinary "4" output signal at the cathode follower 9–U. This quinary 4 signal is switched with NC at 10–V to turn on the Q4 output latch 11–T. It is switched also with NC at 9–T and with B5AA at 8–Q to turn on the below 5 latch 8–T, signifying that the quinary level of the sum has not been exceeded. B0, binary double and below 5 signals are switched at 8–P for producing a binary 0 output signal at the cathode follower 9–N, which in turn is switched with Q3AA at 10–Q for turning on the B0 output latch 11–R. A new NC signal (not shown) is also produced for use in the next higher order.

Figure 52:
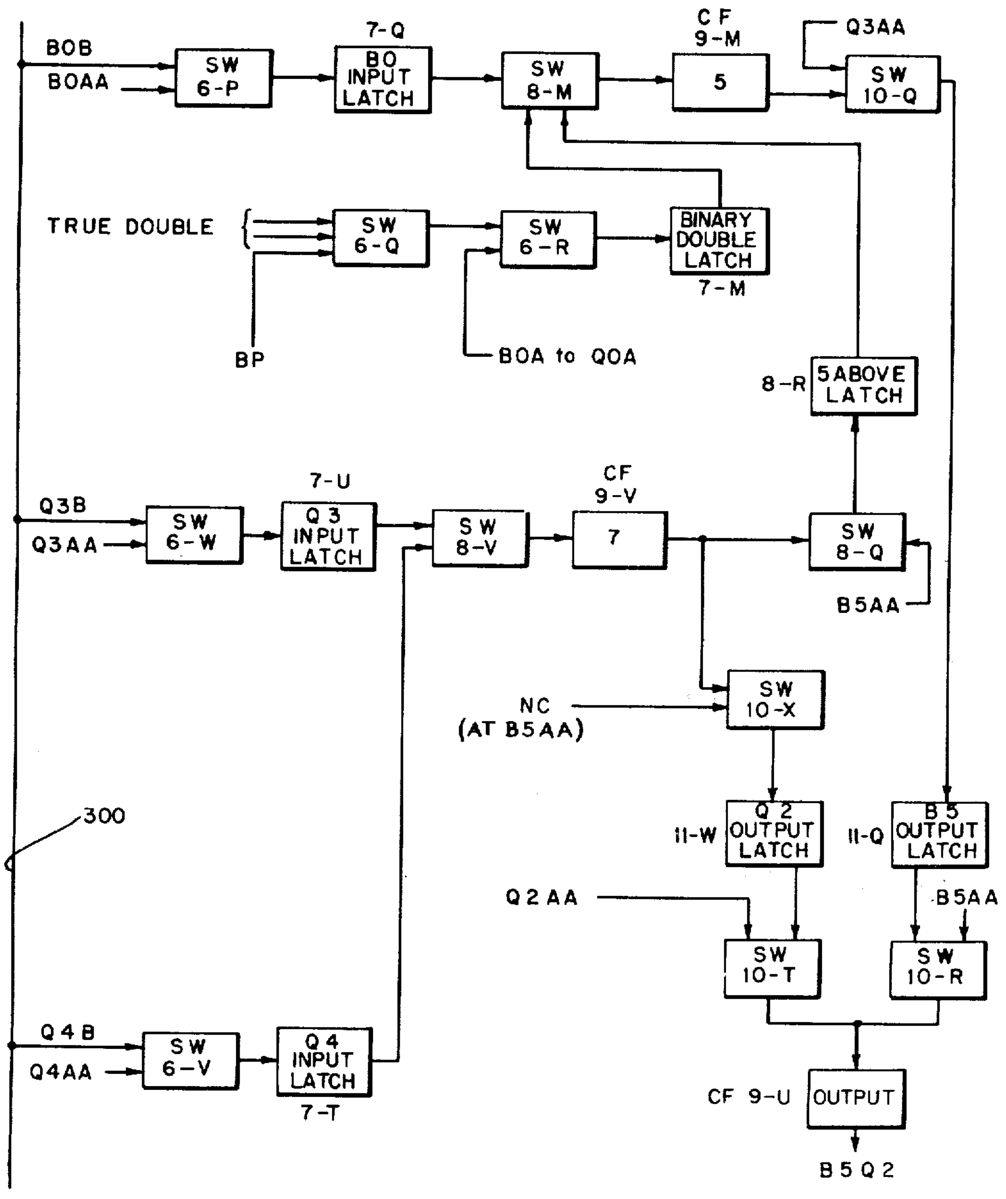
Figure 53:
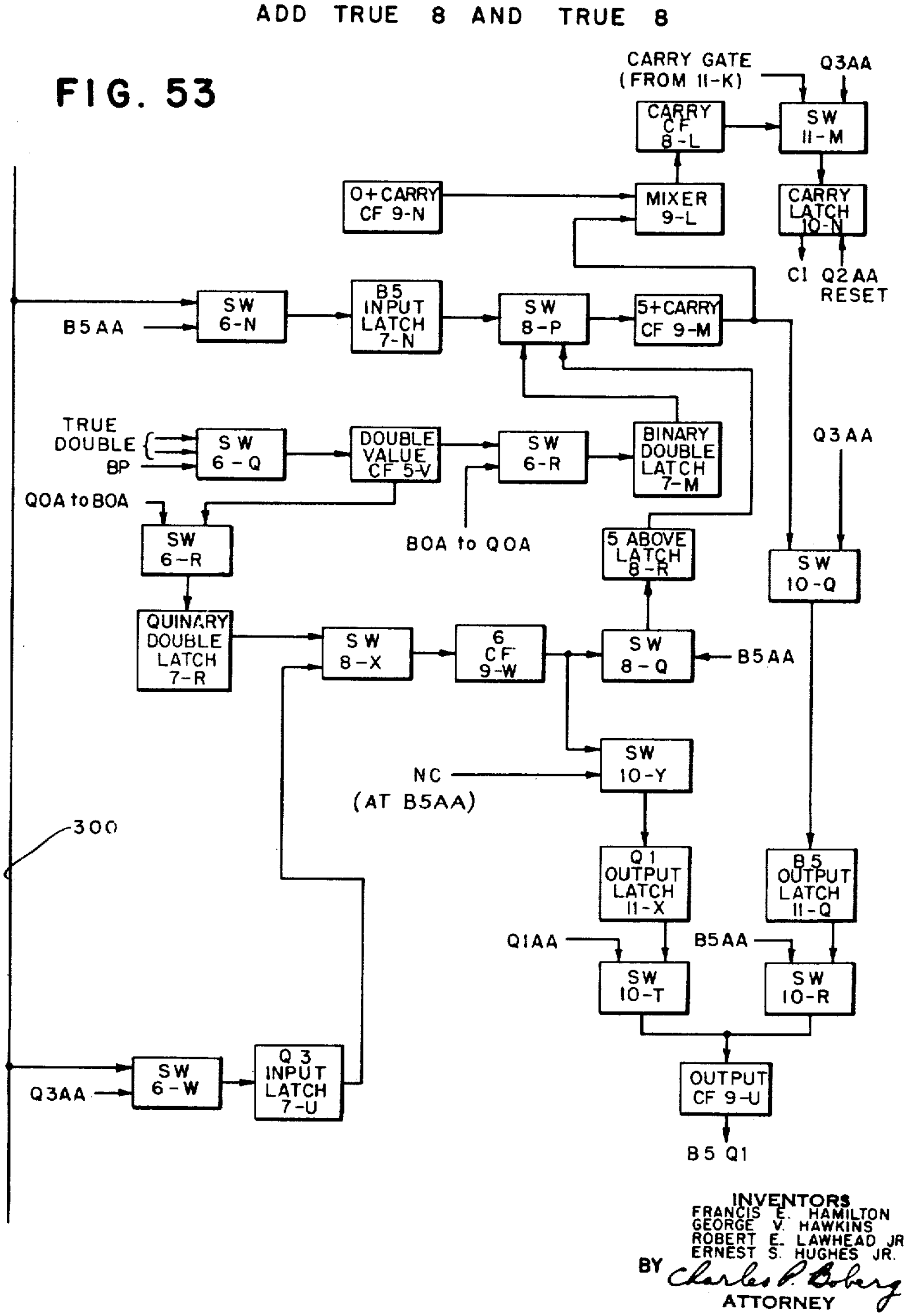

The addition of true 3 and true 4, Fig. 52, involves a binary double but no quinary double. First the addition of Q3 and Q4 takes place, resulting in the Q2 output latch 11–W and the 5 above latch 8–R being turned on as depicted in Fig. 52. The binary double latch 7–M and the B0 input latch 7–Q then are turned on. The outputs from the three latches 7–Q, 7–M and 8–R are switched at 8–M to produce a binary 5 without a carry, this result being manifested by the turning on of the B5 output latch 11–Q and the production of an NC signal (not shown) for the next higher order.

The addition of true 8 and true 8, Fig. 53, again involves doubles in both the binary and quinary levels, as manifested by the setting of the latches 7–M and 7–R. The quinary double latch 7–R and the Q3 input latch 7–U are effective to operate the Q1 output latch 11–X and the 5 above latch 8–R, thereby indicating a quinary 1 with a carry into the binary level. This double B5 plus carry from the quinary level results in a binary output of B5 with a carry into the next higher order. This is manifested by turning on the "5+carry" cathode follower 9–M. The output of the cathode follower 9–M is effective to turn on the B5 output latch 11–Q. It also acts through the mixer 9–L and the cathode follower 8–L to furnish a signal which is switched at 11–M with the carry gate from 11–K and a Q3AA timing pulse for turning on the carry latch 10–N. The carry gate from 11–K permits a carry to take place under certain conditions if the addition of two digits in the adder matrix causes the binary level to be exceeded. The CI output signal of the carry latch 10–N is utilized to effect a carry into the next higher order. The latch 10–N is reset at Q2AA time in the succeeding digit interval.

Figure 54:
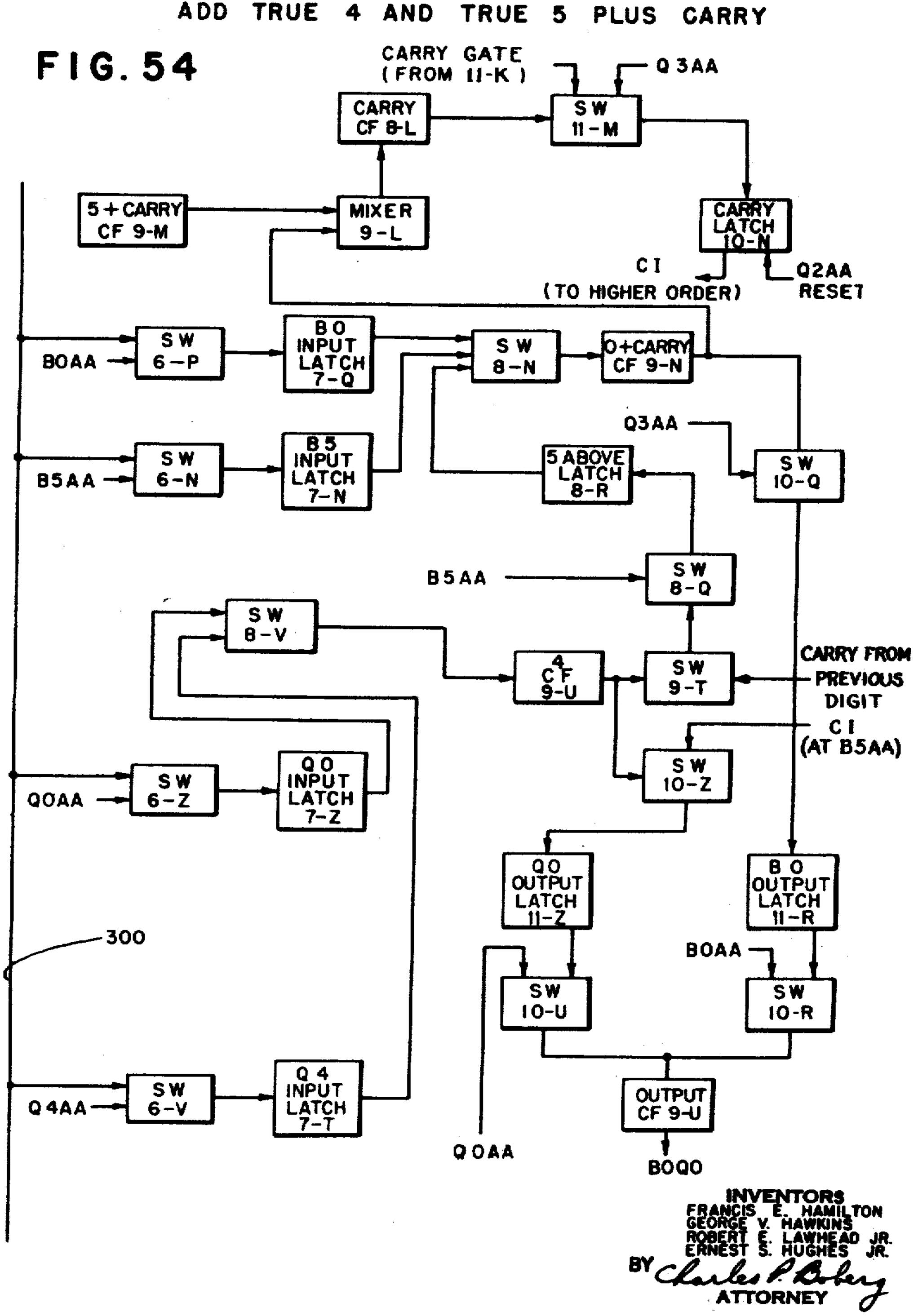

Referring now to Fig. 54, the addition of true 4 and true 5 plus a carry from the preceding order involves a carry from the quinary level to the binary level and another carry from the binary level to the next higher order. The Q0 and Q4 bits are first added together, yielding a quinary 4 at 9–U. This is switched with CI from the preceding order to turn on the Q0 output latch 11–Z and the 5 above latch 8–R. Subsequently, the B0 and B5 input latches are turned on at 7–Q and 7–N. The outputs of the three latches 7–Q, 7–N and 8–R are switched at 8–N to yield a 0+carry signal at 9–N. The output of 9–N is utilized to turn on the B0 output latch 11–R and the carry latch at 10–N, the latter storing a carry for the next higher order. The result, therefore is B0Q0 with a carry.

Figure 55:
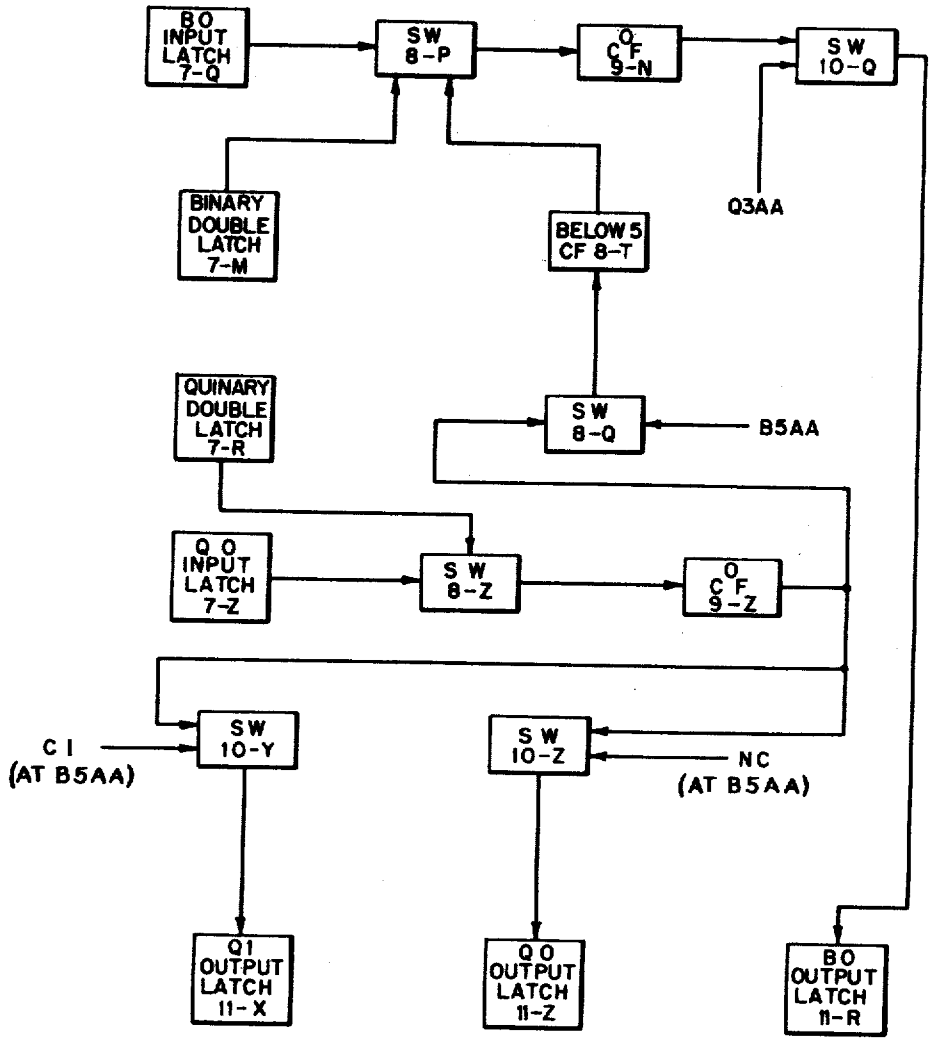

Fig. 55 depicts the action which takes place in the next and succeeding orders of the addition process. Since the remaining digits in both the distributor value and the computer value are zeros, the B0 and Q0 input latches, and the binary and quinary double latches, will be turned on in each instance. The Q0 input latch 7–Z and the quinary double latch 7–R, acting through the switch 8–Z, provide a quinary 0 signal at 9–Z. Where there is a carry, as from the operation depicted in Fig. 54, the quinary 0 and CI signals are switched at 10–Y, Fig. 55, to turn on the Q1 output latch. Where there is no carry, the quinary 0 and NC signals are switched at 10–Z to turn on the Q0 output latch. The remainder of the operation shown in Fig. 55 is apparent from this diagram. In each instance where 0 is being added to 0, the B0 output latch is turned on.

A typical complement addition operation will now be described with reference to Example 2 which was given above in the "Functional description." This example is repeated below, together with a tabular listing of the special functions associated with the problem.

Example 2: +84236 (Cr. value)
(Subtract) +09712 (Distr. value)

+74524

| Digit Time | Entries | Codes | Doubles | | Carries |
|---|---|---|---|---|---|
| DG2–L | True 6<br>Compl. 2<br>Carry 1 [2] | B5Q1<br>B0Q2 [1]<br>— | BD | — | Bi. carry. |
| DG3–L | True 3<br>Compl. 1<br>Carry 1 | B0Q3<br>B0Q1 [1]<br>— | — | QD | Bi. and qui. carries. |
| DG4–L | True 2<br>Compl. 7<br>Carry 1 | B0Q2<br>B5Q2 [1]<br>— | BD | QD | Qui. carry. |
| DG5–L | True 4<br>Compl. 9 | B0Q4<br>B5Q4 [1] | BD | — | No carries. |
| DG6–L | True 8<br>Compl. 0 | B5Q3<br>B0Q0 [1] | BD | — | Bi. and qui. carries. |
| DG7–L | True 0<br>Compl. 0<br>Carry 1 | B0Q0<br>B0Q0 [1]<br>— | No doubles | | Do. |

[1] In the case of a complement, the true code is entered but has the effect of a complement, due to the arrangement of the adder circuitry. This will be brought out more clearly in the following description.

[2] This initial carry provides a tens-complement in the DG2–L or units order.

In the above example the computer value is entered as a true number on the true entry line 300, Fig. 49, and the distributor value is entered also as a true number but on the complement entry line 301. In effect, the distributor value is entered as a complement, as just noted above. As an initial step in a complement addition operation, whether it be the complement addition of the distributor or of the computer value, the carry circuits must first be conditioned to enter a carrying in the lowest order of the computation. The reason for this is that the complement entry circuits automatically convert the true digits of an entry into their nines-complements, but a tens-complement is needed; therefore, some provision must be made for entering a carry along with the first pair of digits.

Figure 56:
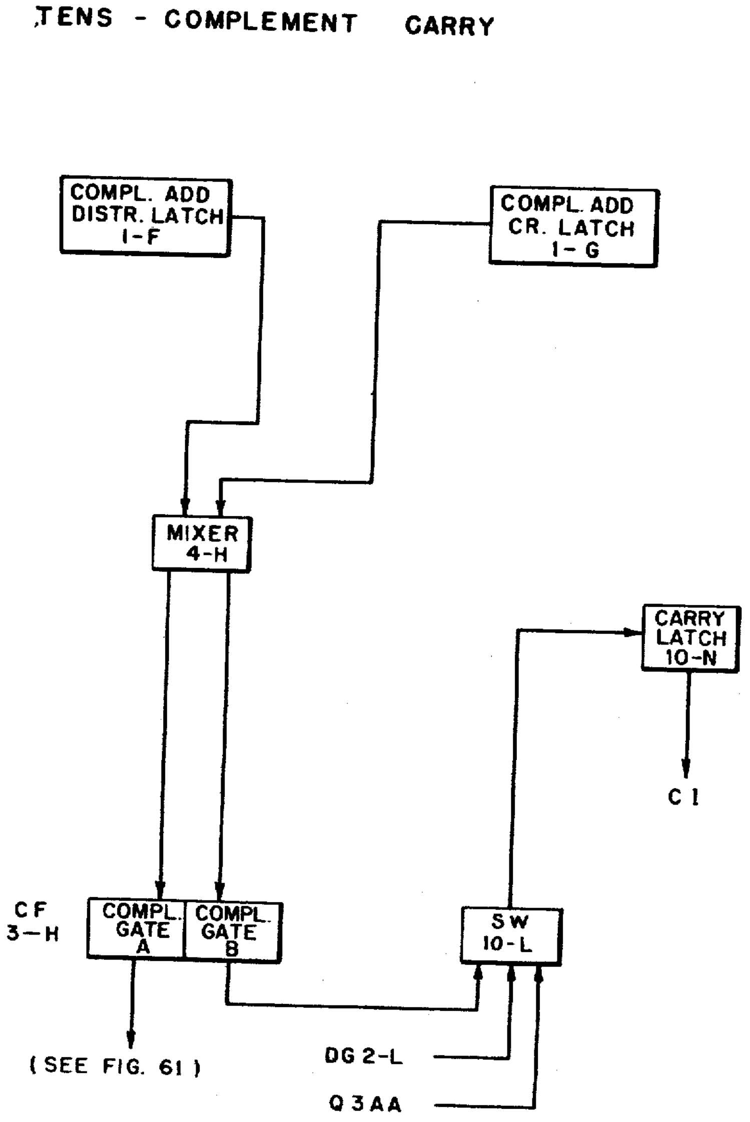
Figure 57:
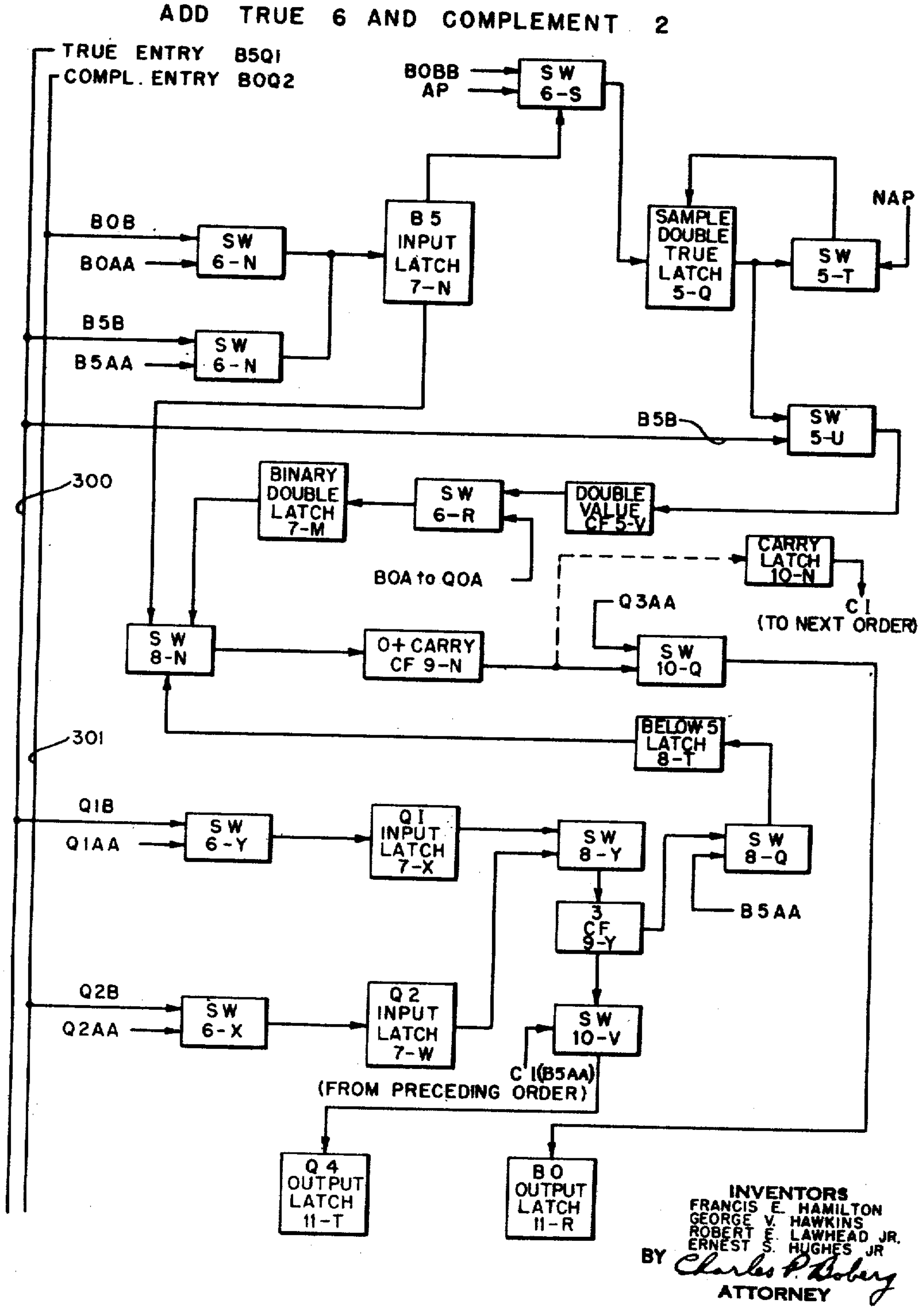
Figure 58:
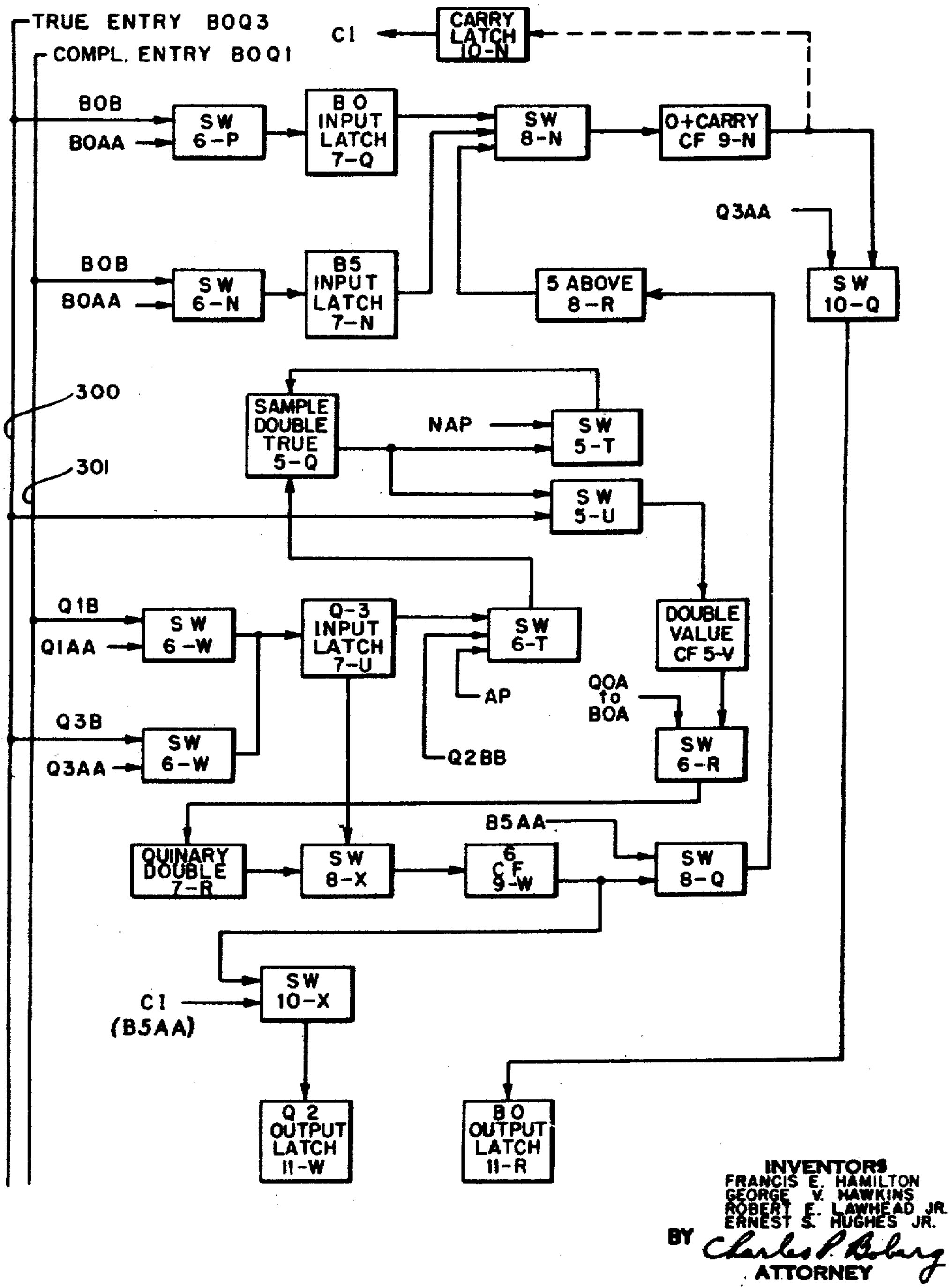
Figure 59:
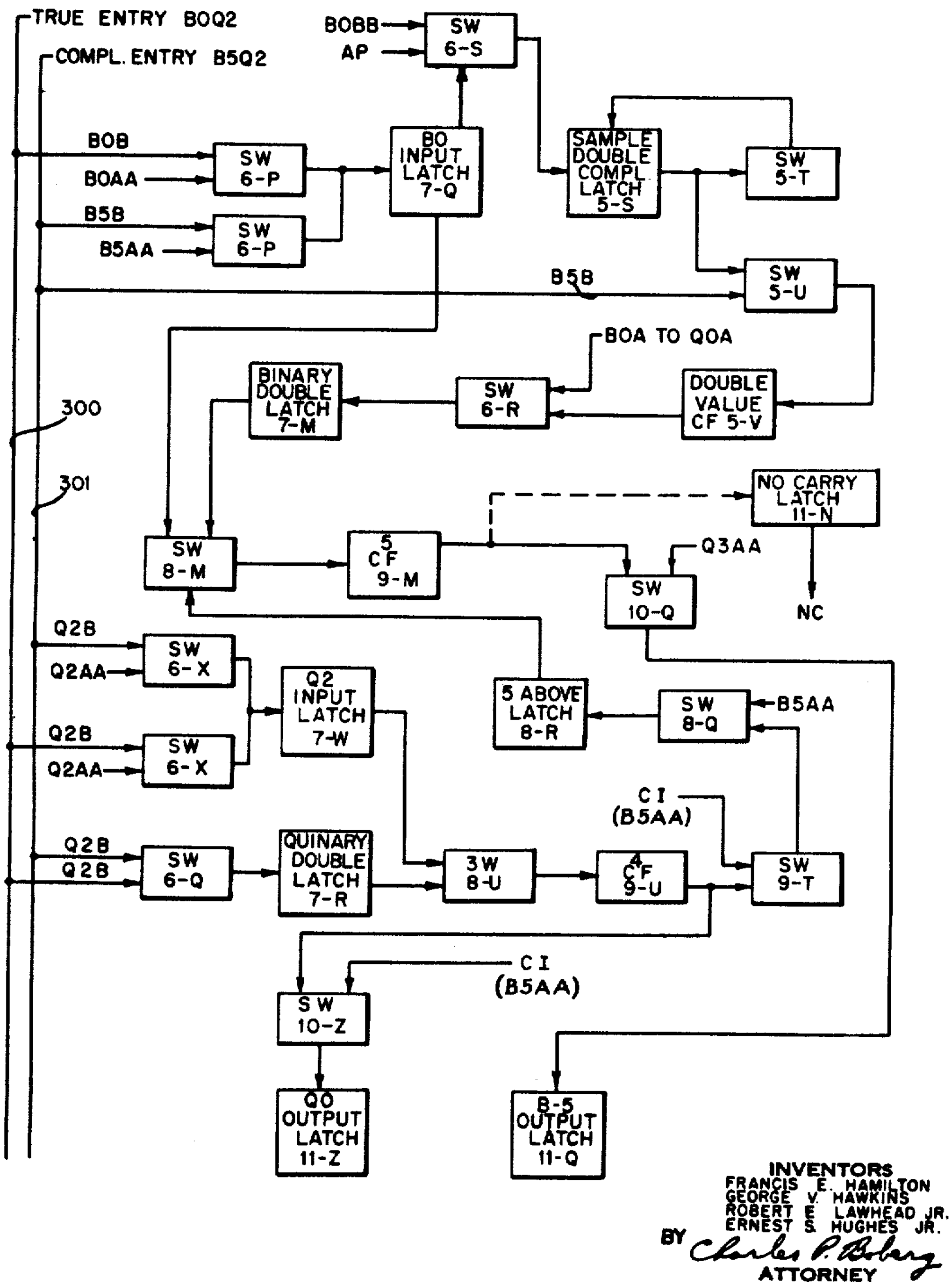

The operation of the circuit shown in Fig. 56 is apparent from the figure. In a complement addition either the complement add distributor latch 1–F or the complement add computer latch 1–G is turned on. In either case a signal is furnished through the mixer at 4–H to the complement gate cathode follower unit 3–H. The complement gate signal from this unit is switched with DG2–L and Q3AA timing pulses at 10–L to turn on the carry latch 10–N. This provides the needed carry (CI) signal for a tens-complement in the lowest order.

The addition of a true 6 and complement 2 (Fig. 57) involves the entry of a true 6 on the true entry line 300 and the entry of a true 2 on the complement entry line 301. As mentioned above, a true 2 on the complement entry line 301 is handled as a digit 7, the nine's complement thereof. The Q1 and Q2 bits of the digits 6 and 2, respectively, are switched at 6–Y and 6–X to turn on the Q1 and Q2 input latches 7–X and 7–W. The signals from these latches are switched together at 8–Y to furnish an output signal through the cathode follower 9–Y which is related to the digit 3. A signal from 9–Y is switched at 10–V with a CI signal (from Fig. 56) to turn on the Q4 output latch 11–T. A signal from the cathode follower 9–Y also is effective to turn on the "below 5" latch at 8–T, signifying that the quinary portion of the sum is less than 5. When the B0 and B5 bits enter the adder by way of the entry lines 301 and 300, respectively, the corresponding B0B and B5B pulses are switched at 6–N with timing pulses to turn on the B5 input latch 7–N. Actually, the B5B pulse is ineffective in this particular instance since the latch 7–N was already turned on by the B0B pulse. However, the B5B pulse also is applied to the switch 5–U. Where it is switched with a sample double true signal furnished by the latch 5–Q, this latch was turned on at B5A time and remains on until the next succeeding NAP. The signal from the switch 5–U passes through cathode follower 5–V to the switch 6–R, where it is switched with a B0A to a Q0A timing pulse to turn on the binary double latch 7–M. The outputs of the B5 latch 7–N, the binary double 7–M and the below 5 latch 8–T are switched at 8–N to supply a signal through the cathode follower 9–N and switch 10–Q for turning on the B0 output latch 11–R. A carry (CI) signal is furnished as an incident to the step just described for entering a carry in the next succeeding order.

The addition of true 3 and complement 1 (Fig. 58) involves the addition of a Q3 bit on the true entry line 300 to a Q1 bit on the complement entry line 301. The Q1B pulse on line 301, acting through switch 6–W turns on the Q3 input latch 7–U. Subsequently the Q3B pulse on line 300 acting through the switch 6–W is applied to the Q3 input latch 7–U, but this is without effect inasmuch as the Q3 latch was already turned on by the Q1B pulse. The output of the Q3 latch 7–U is switched at 6–T with Q2BB and A pulses to turn on the sample double true latch 5–Q at Q2A time. The latch 5–Q remains on until the next NAP, and its output is switched at 5–U with the Q3B pulse from line 300 to supply a double value signal through the cathode follower 5–V to the switch 6–R. This signal is then switched with a Q0A to B0A timing pulse for turning on the quinary double latch 7–R. The output of 7–R is switched at 8–X with the output from the Q3 latch 7–U to furnish a signal representing the digit 6. This signal is switched at 10–X with a CI signal to turn on the Q2 output latch 11–W, the "6" signal from 9–W also is effective to turn on the 5 above latch at 8–R. The binary bit pulses (B0B) in both the true and complement entries are effective, respectively, to turn on the B0 and the B5 input latches at 7–Q and 7–N. The output signals from these latches are switched with the 5 above signal at 8–N to furnish a 0+carry signal, which turns on the carry latch 10–N and the B0 output latch 11–R.

The addition of true 2 and complement 7 (Fig. 59) involves a Q2 double. Thus, the Q2B pulses, from both of the lines 300 and 301 are switched at 6–Q to turn on the quinary double latch 7–R. The Q2B pulses from the lines 300 and 301 also are switched at 6–X with Q2AA timing pulses for turning on the Q2 input latch 7–W. The outputs of the latches 7–W and 7–R are switched at 8–U to provide a signal representing the digit 4 at 9–U. This signal is switched with CI at 10–Z to turn on the Q0 output latch 11–Z. It is also switched with CI at 9–T to turn on the 5 above latch 8–R at B5AA time. The B0B pulse in the true entry line 300 is switched at 6–P with a timing pulse to turn on the B0 input latch 7–Q. The B0 output signal from this latch is effective, via switch 6–S, to turn on the sample double complement latch 5–S for one digit time. The B5B pulse from the complement entry line 301 is switched at 6–P without effect inasmuch as the B0 input latch has already been turned on by the B0B pulse from the true entry line 300. The B5B pulse from line 301 also is switched with a sample double complement signal at 5–U to provide a double value signal which is effective to turn on the binary double latch 7–M. It will be noted in this instance that the quinary double occurred upon entry of the complement, whereas in the preceding step (Fig. 58) it occurred upon entry of the true number. The difference in operation is merely a matter of which binary pulse reaches the input latch first. Referring again to Fig. 59, the B0, binary double and 5 above signals are switched at 8–M to furnish a B5 output signal and a no-carry (NC) signal. The production of the NC signal signifies that the subtrahend (7) in this particular case exceeded the minuend (2).

The operations of adding a true 4 and complement 9, and a true 8 and a complement 0, are not described in detail herein, but these operations may readily be traced in the master diagram (Figs. 19–19S).

Next, we come to the addition of the minuend zeros and subtrahend zeros in the orders above the highest significant digits. This step is illustrated in Fig. 60, wherein two different conditions are considered—first, the presence of a carry from the preceding order, and second, the absence of such a carry.

Figure 60:
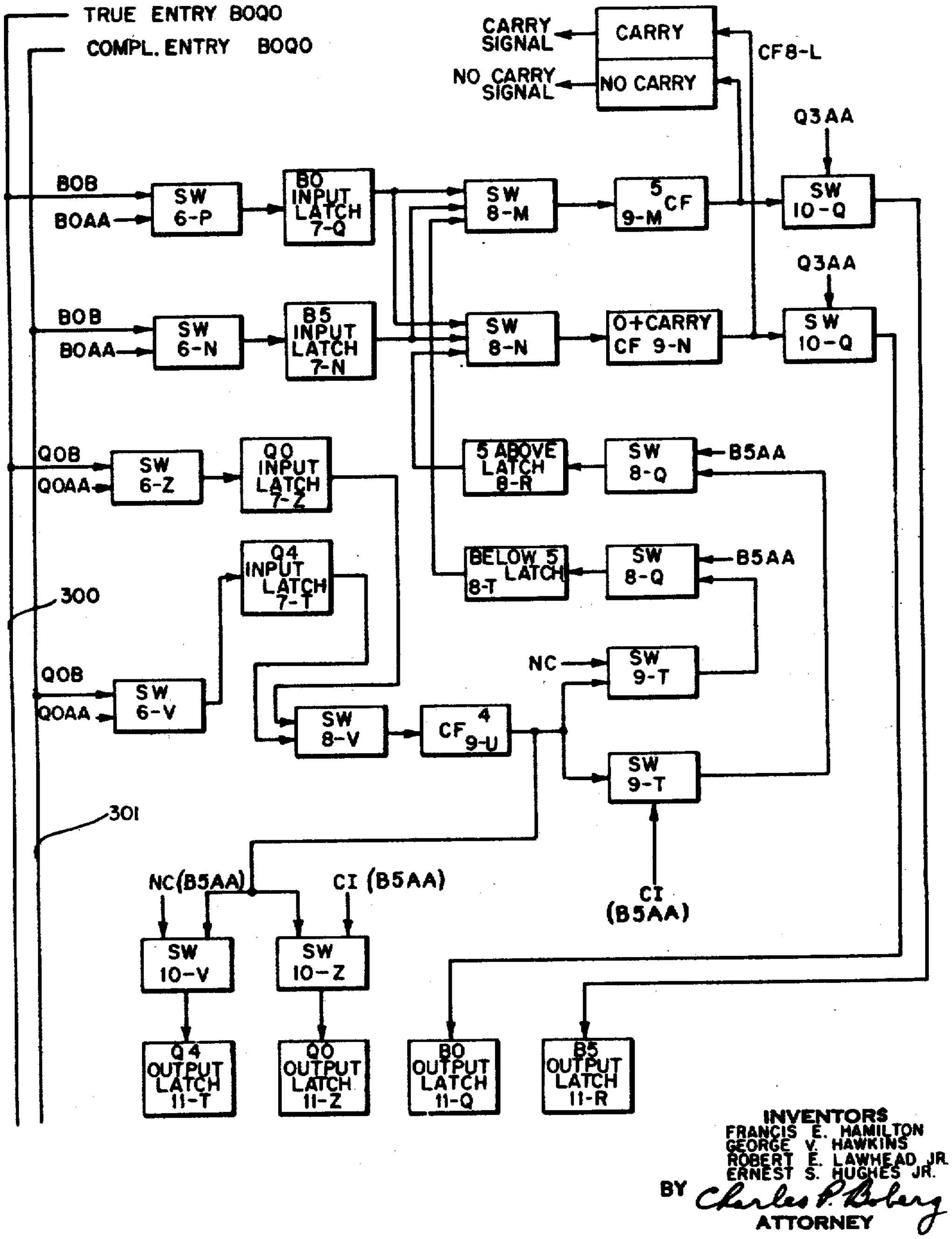

Referring to Fig. 60, the Q0B pulses in the true and complement entry lines 300 and 301, respectively, are effective to turn on the Q0 and Q4 input latches. The signals from these latches are switched at 8–V to provide a signal representing the digit 4. If a carry is present from the preceding order, this signal is switched with CI signals to turn on the Q0 output latch 11–Z and the 5 above latch 8–R. If no carry is present, the digit 4 signal from 9–U is switched with NC signals to turn on the Q4 output latch 11–T and the below 5 latch 8–T. When the B0 and the B5 input latches are turned on respectively by the B0B pulses in the true and complement entry lines 300 and 301, the outputs therefrom are switched with either the 5 above signal or the below 5 signal, as the case may be. With a carry from the preceding order, the 5 above signal is effective at the switch 8–N to provide a 0+carry output signal. This turns on the B0 output latch 11–Q and the carry latch 10–N. With no carry from the preceding order the below 5 signal is effective at switch 8–M to provide a digit 5 signal which turns on the B5 output latch 11–R and the no-carry latch 11–N.

As each pair of digits is added together, a carry or a no-carry signal is furnished at the cathode follower 8–L (Fig.60). When the final order in the computer revolver is reached, the production of a carry or a no-carry signal is used as an indication that the sum standing in the computer revolver is a true number or a complement. If it is a true number, a carry signal will be generated to effect a carry in the DG11–U position. On the other hand, if the result is in complement form, there will be no carry in the DG11–U position.

The manner in which the carry and no-carry signals are employed to control the computer complement adjust circuits will be explained presently.

Figure 61:
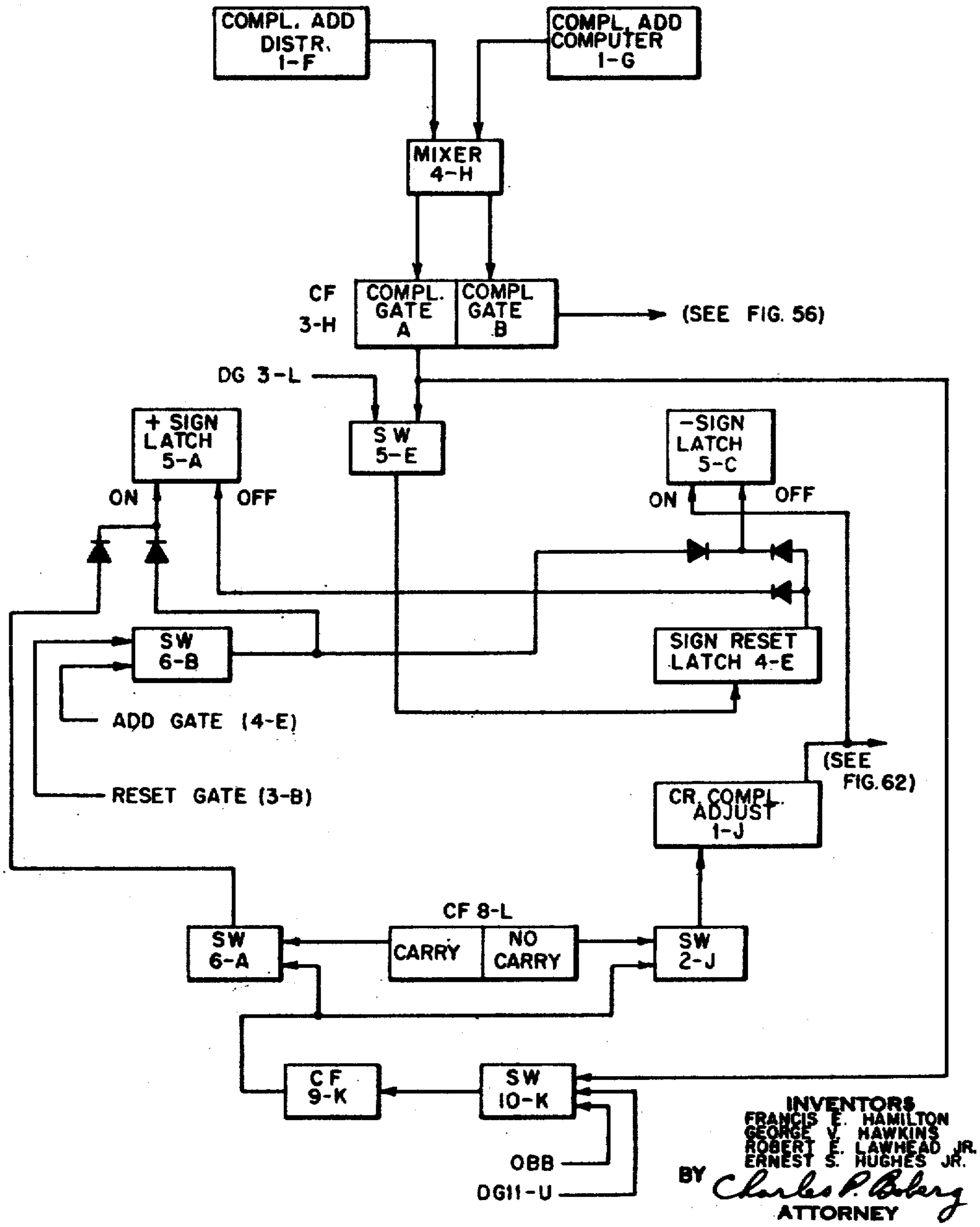

Referring now to Fig. 61, an explanation will be given of the manner in which the sign of the value stored in the computer revolver is determined. Several conditions will be considered. First, if an add with reset operation is called for by the operation selector, the add gate and reset gate signals are switched at 6–B to provide a signal for turning on the + sign latch 5–A and turning off the − sign latch 5–C. In other words, a reset of the computer involves automatically adjusting the computer sign to +. Second, if a true add operation is called for, the computer sign remains unchanged. The true add operation has no effect upon the sign latches at 5–A and 5–C.

A third condition arises when there is a complement addition. In this case the + and − sign latches are turned off at the beginning of the operation. Thus, the complement gate signal from the cathode follower 3–H (Fig. 61) is switched with a DG3–L timing pulse at 5–E to turn on the sign reset latch at 4–E. This furnishes a signal for turning off the + sign latch 5–A and the − sign latch 5–C. At the end of the complement addition operation, either the + sign latch or the − sign latch is turned on again according to whether the sum is a true number or a complement. To accomplish this, the complement gate signal from 3–H is switched at 10–K with DG11–U and 0BB timing pulses to provide a test signal at 9–K. At this time there will be either a carry signal or a no-carry signal available at 8–L (see Fig. 60). If a carry signal is present, it is switched with the test signal at 6–A to turn on the + sign latch 5–A. If a no-carry signal is present, it is switched with the test signal at 2–J for turning on the computer complement adjust unit 1–J. The output of the unit 1–J is used to effect a complement adjust cycle for converting the complement value standing in the computer to its corresponding true value. The output of 1–J also is effective to turn on the − sign latch 5–C, indicating that the sign of the adjusted true value is negative.

Figure 62:
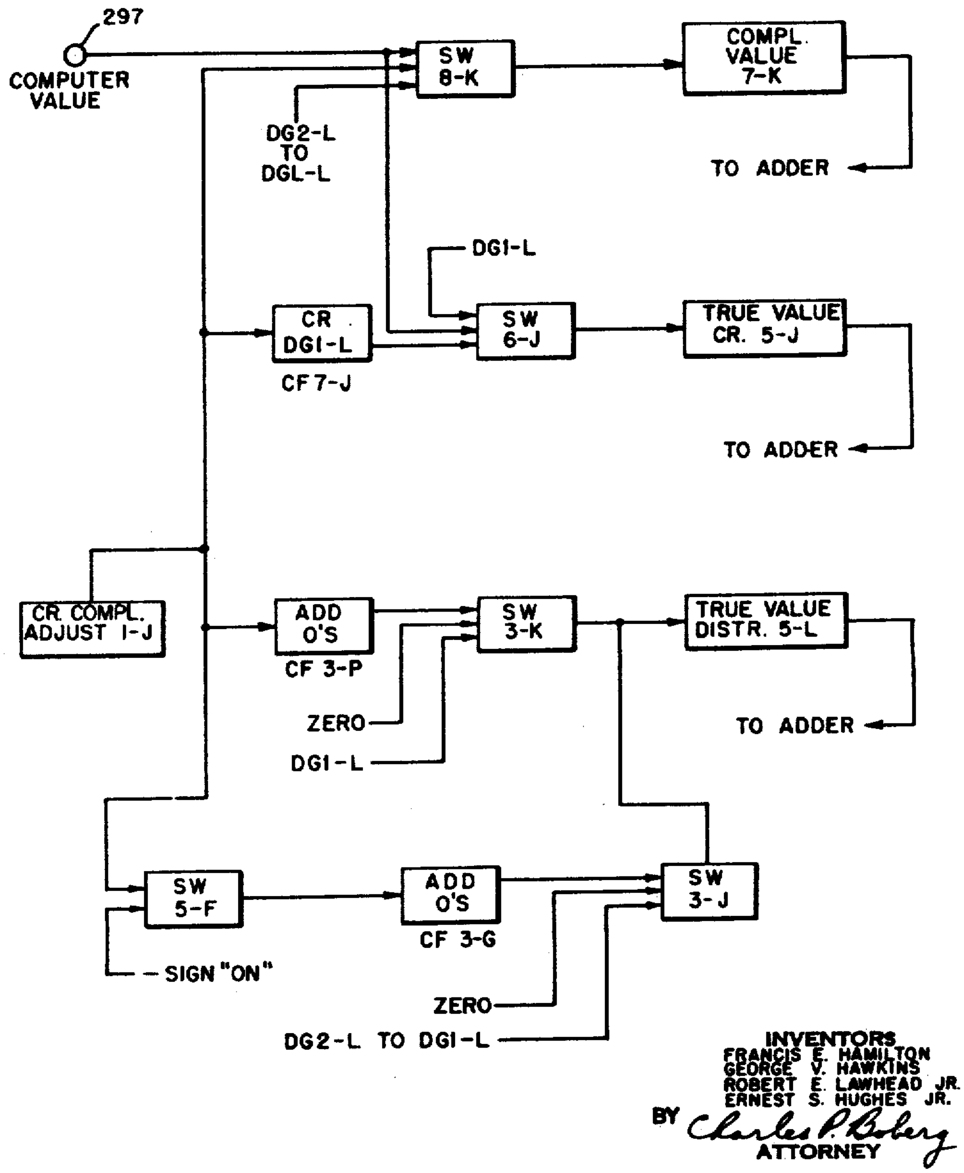

Referring now to Fig. 62, the signal from the complement adjust unit 1–J is applied to the cathode follower at 7–J, and the output of this cathode follower is switched at 6–J with a DG1–L timing pulse and with the computer value signal (from the computer regeneration revolver) to enter the DG1–L portion of the computer value into the adder as a true value. The DG1–L portion of the computer value will be a zero. The complement adjust signal from 1–J also is switched at 8–K with the computer value signal and a DG2–L to DG1–L timing pulse for causing the computer value in the positions DG2–L to DG1–L to enter the adder as a complement. In effect, this will cause the complement value standing in the computer to be replaced by the corresponding true value. Since it is necessary that two values be entered concurrently into the adder, the complement adjust unit 1–J causes zeros to enter the adder in place of the distributor value. Thus, the complement adjust signal from 1–J, after passing through the cathode follower 3–P, is switched with zero and DG1–L timing pulses for entering a zero in the DG1–L position. The complement adjust signal also is switched at 5–F with the minus sign "on" signal and is switched again at 3–J with a DG2–L to DG1–L timing pulse and zero timing pulses for entering zeros (instead of a distributor value) in the remaining positions. These zeros are entered as true values, being added respectively to the digits of the computer value which are undergoing conversion to their true form.

This complement adjust cycle is performed whenever the complement adjust unit 1–J has been turned on. As explained hereinabove in connection with Fig. 61, this occurs whenever a complement is left standing in the computer following the addition of a true number and a complement.

MULTIPLICATION

Figure 63:
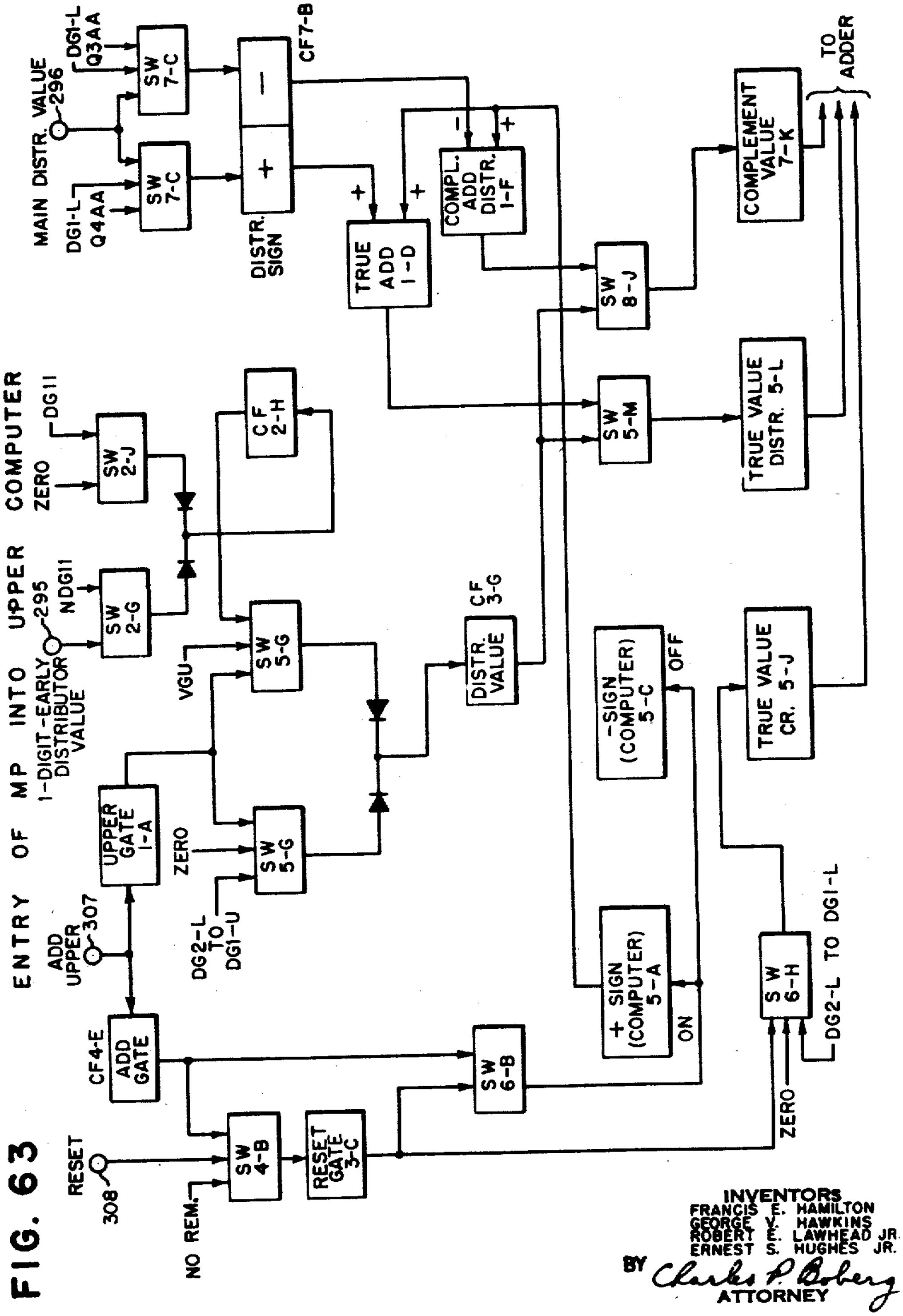

As a preliminary step in performing a multiplication, the multiplier (MP) value is transferred from the distributor to the upper computer. Referring to Fig. 63, the entry of the MP value from the distributor to the upper computer is effected by applying an "add upper" signal from the operation selector to the terminal 307. A reset signal also is applied simultaneously to the terminal 308. The add upper signal turns on the upper gate 1–A and provides an add gate signal through the cathode follower 4–E. The add gate is switched with the reset signal at 4–B to turn on the reset gate 3–C. The reset gate and the add gate are switched at 6–B to provide a signal for turning on the plus computer sign latch 5–A and turning off the minus computer sign latch 5–C. The MP value is fed to the computer by way of the one-digit-early distributor. This one-digit-early distributor value signal, which is applied to terminal 295, Fig. 63, is switched with NDG11 at 2–G to eliminate the sign digit from this value. A zero timing signal is switched with a DG11 timing pulse at 2–J to insert a zero in place of the sign digit which has been eliminated. The outputs of 2–G and 2–J are mixed to provide the upper entry value at 2–H. This upper entry signal is switched at 5–G with the upper gate and a VGU timing signal. Zeros are switched at 5–G with the upper gate and a DG2–L to DG1–U timing pulse. These two outputs from 5–G are mixed to provide the distributor value signal at 3–G for entry into the computer. The distributor value now consists of zeros from DG2–L to DG1–U, and a value (MP) from DG1–U to DG1–L.

In the meantime, the main distributor value signal at terminal 296, Fig. 63, has been switched at 7–C with a DG1–L timing pulse and with either a Q4AA timing pulse or a Q3AA timing pulse, depending upon whether the distributor sign is plus or minus. The resulting distributor sign signal from 7–B is switched at 1–D or 1–F with the computer sign signal to furnish a true add signal or a complement add distributor signal. If the MP value is positive, a true add signal is provided, and this signal is switched at 5–M with the distributor value signal from 3–G, causing the distributor value to enter the computer by way of the true value distributor unit 5–L. If the MP value is negative, the distributor value enters the computer as a complement by way of the complement value unit 7–K. It being assumed that a reset of the computer is called for, the reset gate 3–C is effective to operate the switch 6–H for causing zeros to be entered into the adder as the true computer value. Since the no-reset gate 3–A is off at this time, the actual computer value (perhaps an unwanted value left over from a previous operation) is blocked from entering the adder and is consequently lost.

Figure 64:
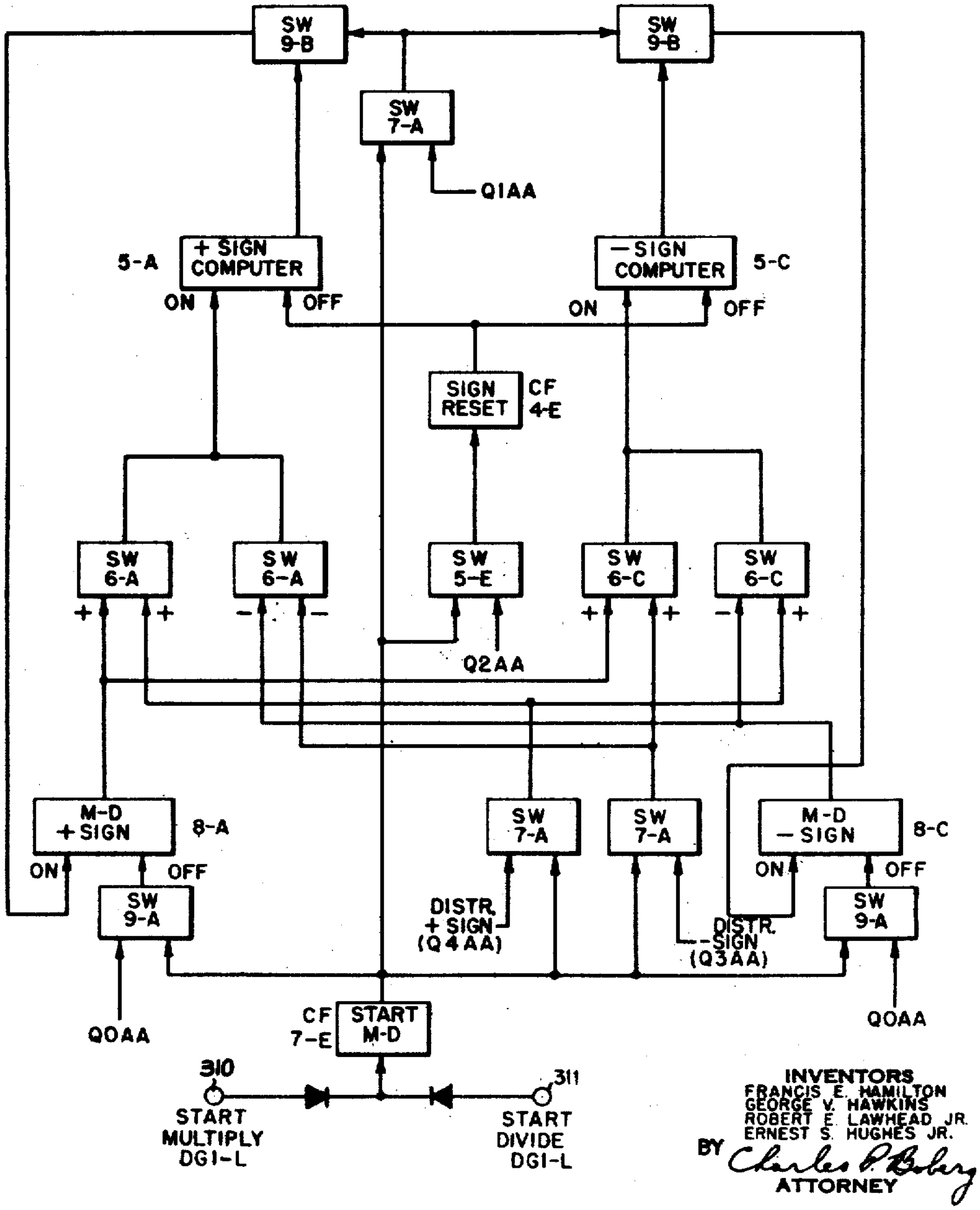

As a result of the foregoing operation, the MP value originally stored in the distributor is now stored in the upper computer. The multiplicand (MC) value may now be entered into the distributor revolver in the manner which is explained in the "Detailed description" above under the heading "Distributor circuits." As an incident to the entry of the MC value into the distributor revolver, the MP value is cancelled from the distributor.

Where a multiplication or division operation is involved, the algebraic sign of the result is determined before the computation commences. Consequently, as the first step in performing a multiplication or division, a multiply-divide sign control operation takes place. Referring to Fig. 64, the receipt of a start multiply signal or a start divide signal from the operation selector provides a start M–D signal at the cathode follower 7–E during DG1–L time. The start M–D signal is switched at 9–A with a Q0AA timing pulse for turning off the M–D sign latches at 8–A and 8–C, thus preparing these latches to store the sign of the computer value. At this time the sign of the computer value is stored in the latches 5–A and 5–C. The next step is to transfer the stored computer sign from the latches 5–A and 5–C to the latches 8–A and 8–C. Accordingly, the start M–D signal is switched at 7–A with a Q1AA timing pulse to provide a sampling signal which is switched at 9–B with the output signal from either the latch 5–A or the latch 5–C, depending upon whether the sign of the computer value is plus or minus. If the computer sign is plus, the switch 9–B furnishes a signal for turning on the M–D plus sign latch 8–A. If the sign of the computer value is negative, the switch 9–B furnishes a signal for turning on the M–D minus sign latch 8–C. The computer sign now is stored in the appropriate M–D latch. At Q2AA time the start M–D signal becomes effective through the switch 5–E and the cathode follower 4–E to furnish a sign reset signal for turning off the computer sign latches 5–A and 5–C.

As the next step in the multiply-divide sign control operation, the algebraic sign of the distributor value (stored in the DG1 position of the distributor revolver) is switched selectively with the M–D sign to determine the sign of the result. Referring again to Fig. 64, the start M–D signal is switched at 7–A with either a Q4AA pulse or a Q3AA pulse, depending upon whether the distributor sign is plus or minus during DG1–L time. The distributor plus signal or the distributor minus signal which results from this switching step is in turn switched at 6–A or 6–C with the computer plus signal or computer minus signal, as the case may be, which is furnished by the M–D sign latch 8–A or 8–C. If the computer sign and distributor sign are alike (that is, both plus or both minus), a signal is provided for turning on the computer plus sign latch 5–A. If the computer sign and the distributor sign are different, a signal is provided for turning on the computer minus sign latch 5–C. Thus, the computer sign latches 5–A and 5–C are set in accordance with the sign of the result (product or quotient) which is to appear in the computer regeneration revolver when the multiplication or division operation is completed.

Figure 65:
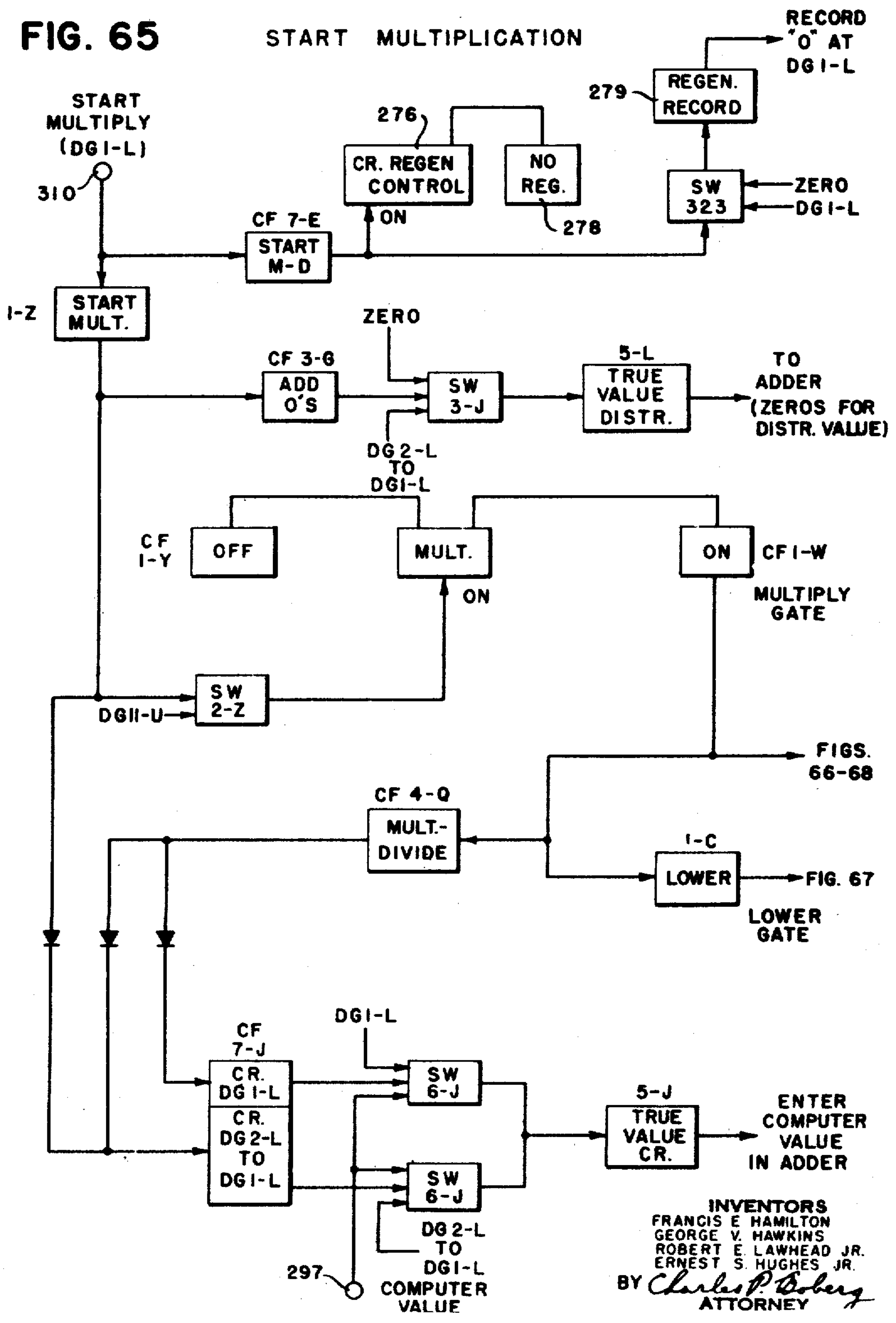

In addition to effecting a multiply-divide sign control as just described, the start multiply signal also initiates the functions which are indicated in Fig. 65. Referring to this figure, the start multiply (DG1–L) signal from terminal 310 acts through the cathode follower 7–E to furnish a start M–D signal for turning the computer regeneration control unit 276 "on" to its "no regeneration" state. This start M–D signal also acts through the switch 323 and a regeneration record unit 279 to effect the recording of a zero in the DG1–L position of the computer regeneration revolver, replacing the sign digit which is omitted from the computer revolvers. The start multiply signal from terminal 310 also turns on the start multiply latch at 1–Z for the duration of the initial computer cycle. The start multiply gate pulse from 1–Z, acting through the cathode follower 3–G, is switched at 3–J with zero and DG2–L to DG1–L timing pulses for entering zeros into the adder in place of the distributor value. (In this initial phase of the multiplication operation the MC value stored in the distributor is not entered into the adder.) The start multiply signal also acts through the cathode follower 7–J and the switch 6–J to enter the computer value once into the adder. At this stage the value in the lower computer is all zeros.

At the conclusion of the initial computer cycle, the start multiply gate from 1–Z is switched at 2–Z with a DG11–U timing pulse to turn on the multiply gate latch unit at 1–X, which unit remains on for the duration of the multiplying operation. The multiply gate signal from 1–Z turns on the lower gate unit at 1–C and is effective to control the various addition, subtraction and left-shift operations which are involved in the multiplication process, as will be described subsequently in connection with Figs. 66 and 67. The multiply gate signal also acts through the cathode followers 4–Q and 7–J and the switches at 6–J to control the entry of the computer value into the adder during each of the succeeding cycles of the operation. That is to say, the computer value (current PR value) from the terminal 297 is caused to enter the adder as a true value in each cycle of the multiplication. The distributor value or MC, on the other hand, may enter the adder as a true number or a complement according to the circumstances.

The method of multiplication employed in the present computer system was explained briefly above in conjunction with Table III ("Functional description"). This table is again presented below with some modifications, as Table III*a*.

*Table IIIa*

| Highest MP Digit | 2nd Highest MP Digit | Add or Subtract MC (lower computer) | Add or Subtract 1 (highest MP digit) | Left Shift |
|---|---|---|---|---|
| 0 | below 5 | no | no | yes, |
| 1 | do | add MC | no | yes. |
| 2 | do | add MC | subt. 1 | no. |
| 3 | do | add MC | subt. 1 | no. |
| 4 | do | add MC | subt. 1 | no. |
| 5 | do | subt. MC | add 1 | no. |
| 6 | do | subt. MC | add 1 | no. |
| 7 | do | subt. MC | add 1 | no. |
| 8 | do | subt. MC | add 1 | no. |
| 9 | do | subt. MC | no | yes. |
| 0 | 5 or above | add MC | no | yes. |
| 1 | do | add MC | subt. 1 | no. |
| 2 | do | add MC | subt. 1 | no. |
| 3 | do | add MC | subt. 1 | no. |
| 4 | do | add MC | subt. 1 | no. |
| 5 | do | subt. MC | add 1 | no. |
| 6 | do | subt. MC | add 1 | no. |
| 7 | do | subt. MC | add 1 | no. |
| 8 | do | subt. MC | no | yes. |
| 9 | do | no | no | yes. |
| 1–4 | none | add MC | subt. 1 | no. |
| 5–9 | do | subt. MC | add 1 | no. |

Figure 66:
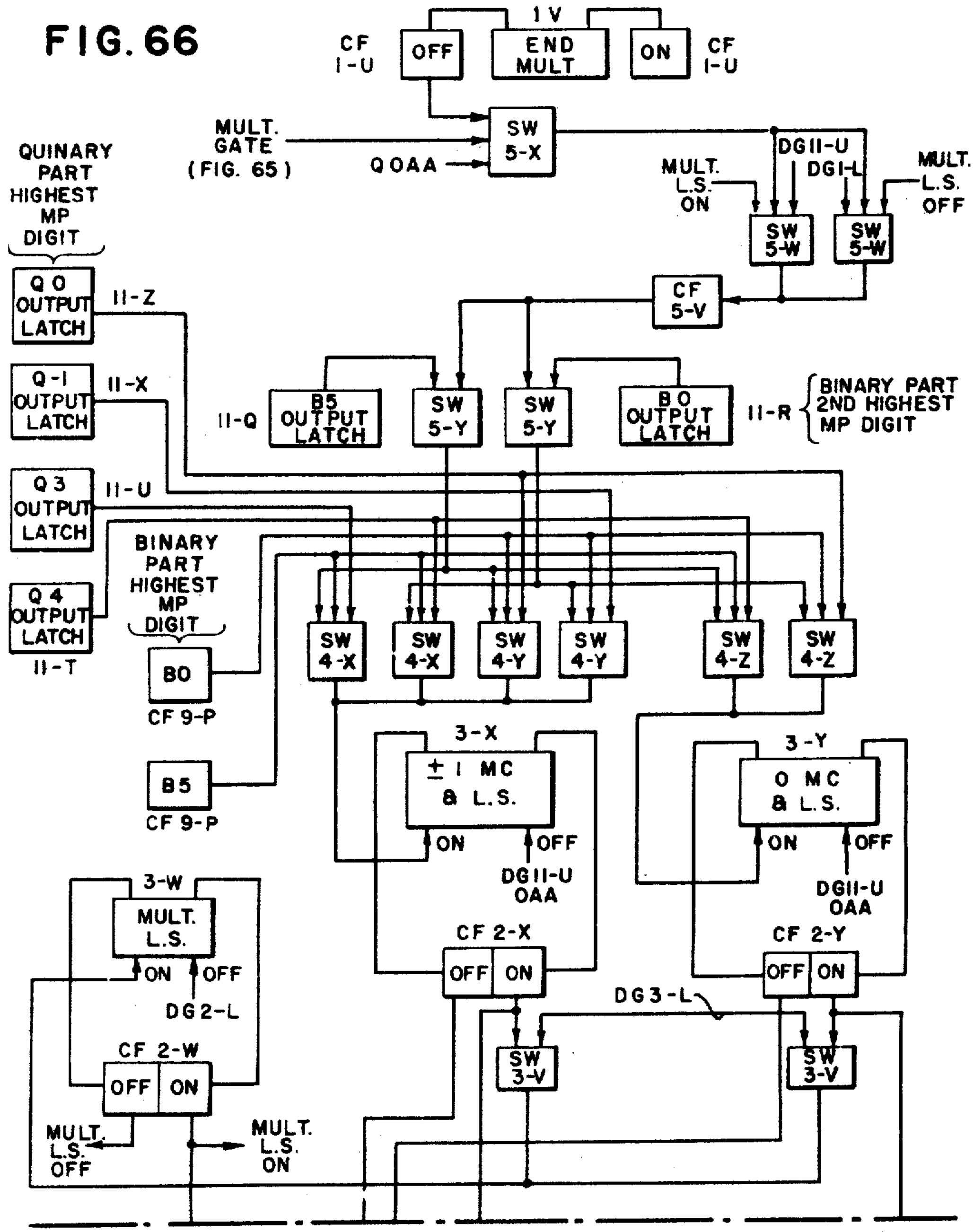
Figure 66A:
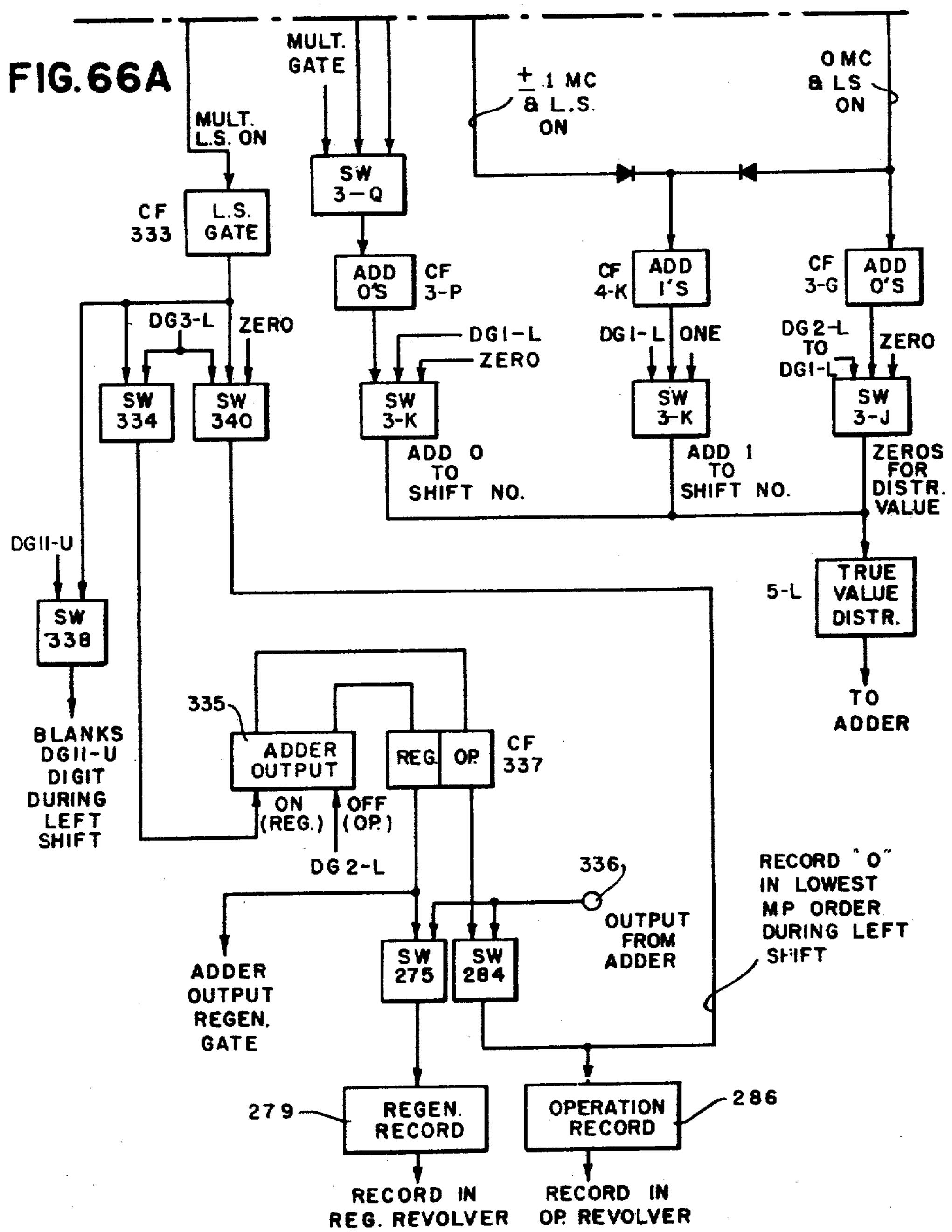

As each new cycle of the multiplication process commences, it must be determined beforehand whether or not a left shift is to occur, and provisions must be made to insure that the left shift takes place at the proper time. These functions are performed by the circuits which are schematically illustrated in Figs. 66 and 66A. Referring first to Fig. 66, the multiply gate from 1–X, 1–W is switched at 5–X with the end multiply "off" gate from 1–U and a Q0AA timing pulse to provide a sampling signal for detecting the condition of the digits in the highest two orders of the MP. This sampling signal is switched at 5–W either with a DG1–L timing pulse or a DG11–U timing pulse, depending upon whether or not the multiply left shift unit 3–W is in its "off" or "on" condition. (If a left shift has just taken place, the second highest MP digit is read from the computer regeneration revolver at DG10–U, and the highest MP digit is read from this revolver at DG11–U. Under these conditions the binary part of the second highest MP digit and the quinary part of the highest MP digit are available at the output side of the adder during DG11–U time, while the binary part of the highest MP digit is available at the input side of the adder during DG11–U time. If no left shift has taken place, the second highest MP digit is read from the computer operation revolver at DG11–U, and the highest MP digit is read from this revolver at DG1–L. Under these conditions the binary part of the second highest MP digit and the quinary part of the highest MP digit are available at the output side of the adder at DG1–L time, while the binary part of the highest MP digit is available at the input side of the adder at DG1–L time.) As a result of the switching action at 5–W, a left-shift detection timing signal is made available at 5–V. This signal from 5–V is switched at 5–Y with a signal from either the B0 or B5 output latch, depending upon whether the binary part of the second highest MP digit is 0 or 5. The signal from 5–Y then is switched at 4–X, 4–Y or 4–Z with signals representing, respectively, the quinary and binary parts of the highest MP digit.

As a result of the aforesaid switching operations, either the "+1MC and left shift" latch 3–X, or the "0MC and left shift" latch 3–Y, may be turned on for one cycle, depending upon whether an add MC or subtract MC operation is to take place concurrently with the left shift, or else the latches 3–X and 3–Y will both remain off in the event that no left shift is to take place. If either of the latches 3–X and 3–Y is turned on, the "multiply left shift" latch 3–W also is turned on; otherwise, the latch 3–W remains off.

Thus, the circuits shown in Fig. 66 cause the latches 3–X, 3–Y and 3–W to be selectively operated or not, depending upon whether or not a left shift is to take place in the current multiplication cycle. Referring now to Fig. 66A, the multiply left shift "on" signal acts through the cathode follower 333 and the switch 338 to furnish a blanking signal at DG11–U time for blanking the DG11–U digit which otherwise would be recorded in the following DG1–L position as a result of the left shift. The signal from 333 also is switched at 334 with a DG3–L timing pulse to turn on the adder output latch 335, thereby placing this latch in its regenerate condition. This causes the adder output to be recorded in the regeneration revolver for effecting a left shift. Otherwise the adder output would be recorded in the operation revolver (when the adder output latch 335 is off) to cancel the left shift. The signal from 333 also is switched with DG3–L and 0 timing pulses at 340 to furnish a signal for recording a zero in the lowest MP order during a left shift, so that this position will not be left vacant.

As another incident to the left-shift operation during a multiplication, an "add 1" signal is provided at 4–K, Fig. 66A, and this signal is switched at 3–K with DG1–L and one timing pulses for adding 1 to the shift number in the DG1–L position (see Fig. 16). This occurs in response to either the ±1MC and L.S. signal or the 0MC and L.S. signal. If no addition or subtraction of the MC is called for (0MC and L.S.), an "add zeros" signal is made available at 3–G for entering zeros into the adder in place of the MC value.

If no left shift is called for, the "off" signals from the ±1MC and L.S. latch 3–X and the 0MC and L.S. latch 3–Y (Fig. 66) are switched at 3–Q (Fig. 66A) with the multiplier gate to provide an "add zeros" signal at 3–P. This signal is switched at 3–K with DG1–L and zero timing pulses for adding a zero to the shift number in the DG1–L position (see Fig. 16). In other words, the shift number is not increased if no left shift is taking place.

Referring back to Table III*a* above, the MC value is added as a true number or a complement to the current PR value standing in the computer during each cycle of the multiplication, except in those instances where a left-shift-only operation occurs. The circuits shown schematically in Fig. 67 determine whether the MC value from the distributor is to enter the adder as a true number or a complement. First, the multiply gate is switched at 4–T with the 0MC "off" gate and with DG1–L, Q1AA timing pulses to provide a sampling signal. Then, if no left shift is in process, this sampling signal is switched at 3–T with the multiply left shift "off" gate and the binary portion of the highest MP digit, which at this time is available at the cathode follower 9–P. Depending upon whether a binary 0 or a binary 5 is detected in the highest MP digit, the true-add or complement-add entry circuits for the distributor are rendered effective. If a left shift is taking place, the aforesaid sampling signal is switched at 3–S with the multiply left shift "on" gate and with the binary portion of the highest MP digit, which at this time is available from the output latch 11–R or 11–Q. Again, depending upon whether or not a binary 0 or a binary 5 is detected in the highest MP digit, the true-add or complement-add entry circuits become effective.

The distributor value (or MC) enters the adder during the DG2–L to DG1–U or lower computer period of each multiplication cycle (except when a left-shift-only operation is called for; see Table III*a*). The DG1–L position is reserved for the shift number. During the upper computer period, zeros are entered in place of a distributor value (through the switch 5–F, Fig. 67) for all positions except the DG11–U position. Entry of a zero through the switch 5–F is blocked at DG11–U time. At this point in the cycle the true-add or complement-add circuitry is effective to enter a true nine or a true zero, depending upon whether the highest MP digit is to be decreased or increased (see Table III*a*) as an incident to the entry of a true MC or a complement MC.

When the MC is being added as a true value without an accompanying left shift, a signal is furnished through the switch 4–R, Fig. 67, to add 9 in the DG11–U position. This effectively decreases the highest MP digit by 1. If a left shift accompanies the true add operation, the addition of 9 in the DG11–U position is without effect inasmuch as the DG11–U digit is blanked during a left shift, as explained hereinabove in connection with Fig. 66A.

When the MC is being subtracted (that is, entered as a complement), a signal is furnished through the switch 4–S, Fig. 67, to add 0 in the DG11–U position. This 0, plus the carry of 1 into DG11–U which takes place when there is a complement addition, increases the highest MP digit by 1. This is of significance only when no left shift is taking place. If a left shift is taking place, the DG11–U digit is blanked; hence the change in the value of the highest MP digit is of no consequence.

The completion of the multiplying process is indicated by a carry from the DG1–L position in which the shift number is stored (see Fig. 16). Referring to Fig. 68, the carry signal from 8–L is switched at 10–K with DG2–L, 0BB timing pulse to provide a "carry from DG1–L" signal at 9–K. This signal is switched at 2–U with the multiply gate from 1–W to turn on the end multiply latch 1–V. When the binary and quinary portions of the highest MP digit reach zero, appropriate signals are furnished to the switch 2–T, where they are switched with the end multiply gate from 1–U, the multiply left-shift "off" gate and DG1–L, 0BB timing pulse to furnish a signal for turning off the multiply latch unit 1–X. The multiply "off" gate and the "end multiply" gate are effective to provide a carry check signal which blocks the carry from DG1–L before it can set up the carry latch at 10–N. The multiply "off" gate also is switched at 2–S with the end multiply gate to furnish a signal for turning off the computer regeneration control unit 276, thereby restoring this unit to its "regenerate" condition. This closes the computer regeneration circuit for enabling the result of the multiplication to be stored in the computer regeneration revolver until such time as it is read out therefrom. The multiply "off" gate is switched at 2–U with a DG2–L timing pulse for turning off the end multiply latch 1–V.

Division

As a preliminary step in performing a division operation, the dividend (DD) is stored in the lower computer (see Fig. 18), and the divisor (DR) is stored in the distributor. The manner in which these entries are effected will not be explained in detail inasmuch as the operations are the same in principle as corresponding operations described hereinabove in connection with other arithmetic operations. A multiply-divide sign control step then takes place upon receipt of the "start divide" (DG1–L) signal from the operation selector. This has been described above in connection with Fig. 64.

Figure 69:
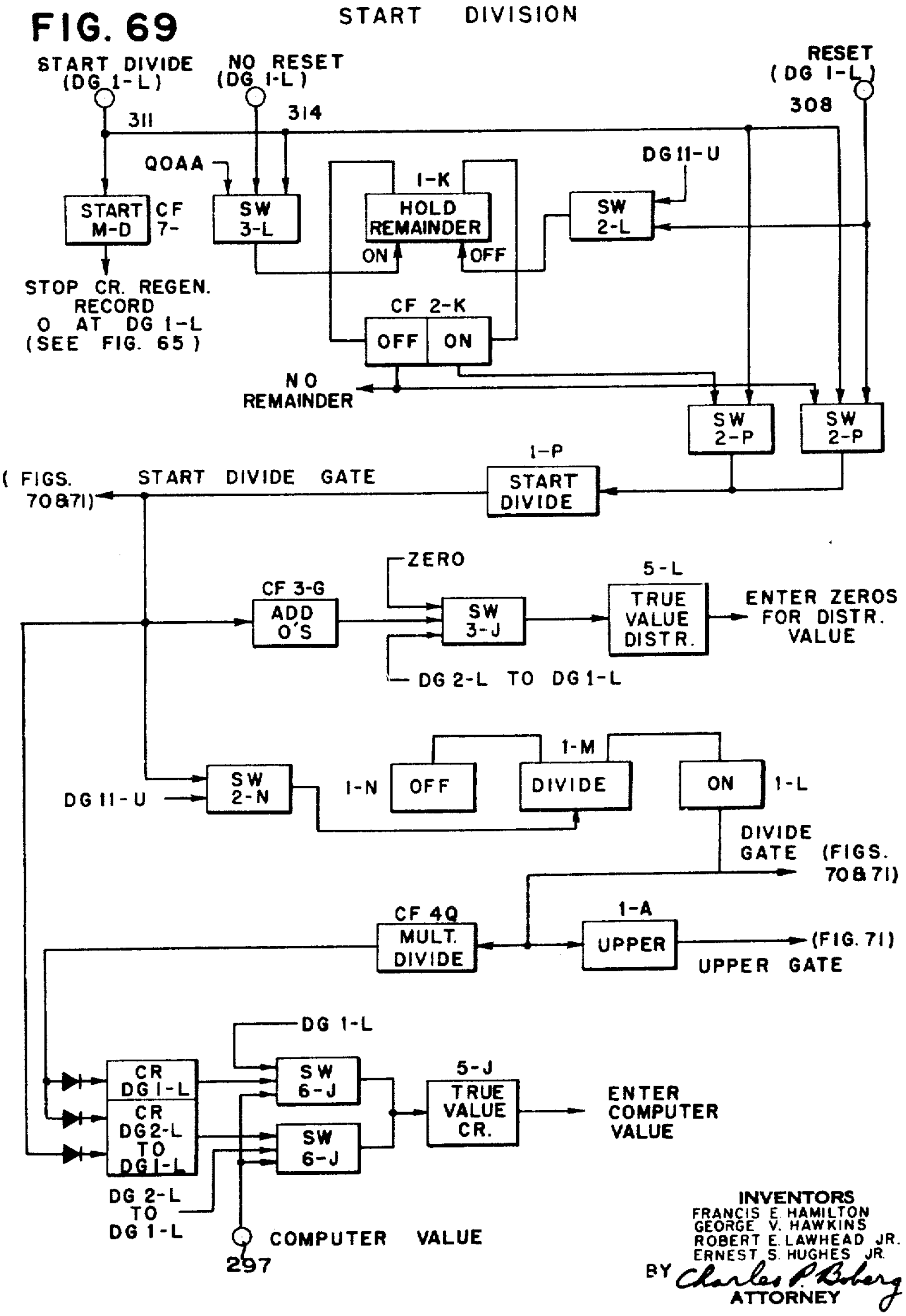

For a divide-and-retain-remainder operation, the "start divide" signal is employed in conjunction with a "no reset" signal. For a divide-and-cancel-remainder operation, the "start divide" signal is employed in conjunction with a "reset" signal. Referring to Fig. 69, the "start divide" signal from terminal 311 is switched at 3–L with the "no reset" signal from terminal 314 to turn on the hold remainder latch 1–K, if the remainder is to be retained. If the remainder is to be cancelled, the reset signal from terminal 308 is switched at 2–L with a DG11–U timing pulse for turning off the hold remainder latch 1–K. In either event, the "start divide" signal is effective to turn on the "start divide" latch 1–P, thereby providing a "start divide" gate signal. The "start divide" signal from terminal 311 also effects the recording of zero in the DG1–L position of the computer regeneration revolver. This step is identical with that described above in connection with Fig. 65.

In following the operation of the divide circuits, reference should be made to Figs. 18 and 18A in conjunction with the circuit diagrams, Figs. 69–72. Referring particularly to Fig. 69, the "start divide" gate is effective in the first step of the division process (after the DD has been entered into the lower computer) to provide a signal at 7–J for reading the computer value into the adder from DG2–L to DG1–L. The "start divide" gate also is effective to furnish a signal at 3–G for entering zeros into the adder in place of the distributor value during this initial step. The "start divide" gate furthermore is effective to turn on the divide latch at 1–M, thereby providing the divide gate which controls the balance of the division process.

Figure 70:
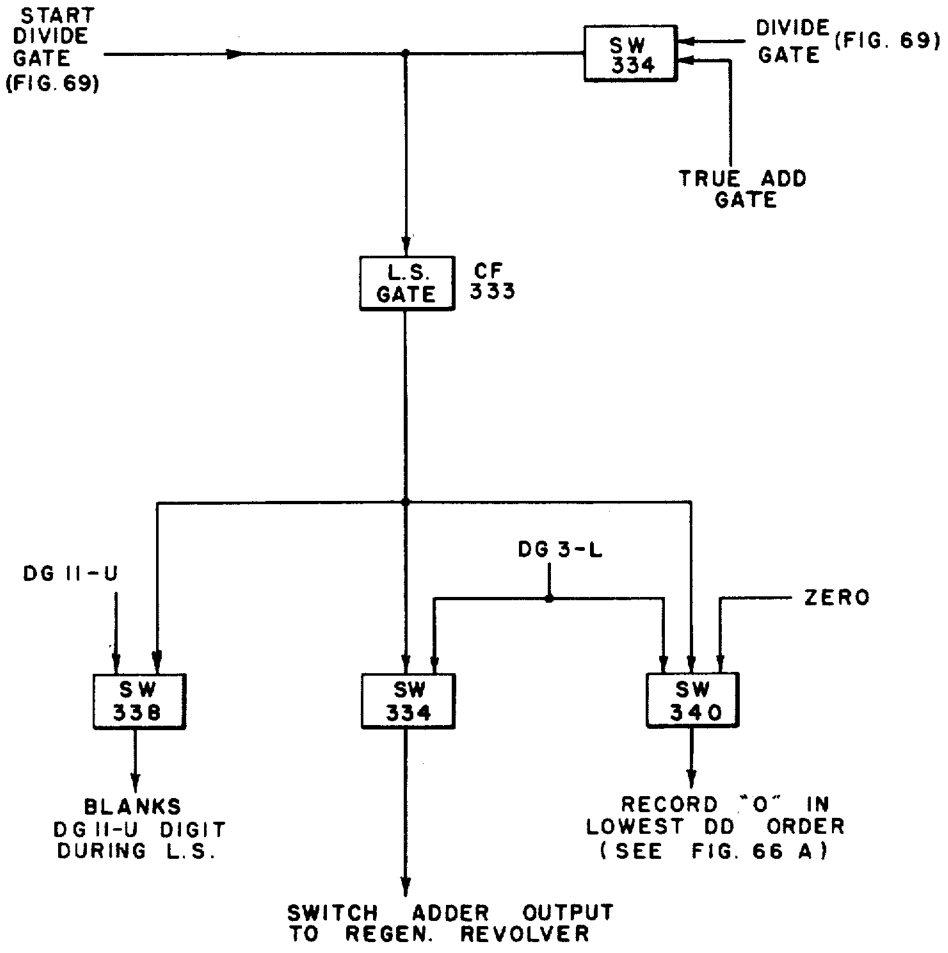

Still another function of the "start divide" gate is to effect an initial left shift of the computer value. Referring to Fig. 70, the "start divide" gate produces a left-shift gate which acts in the same manner as the left-shift gate described above in connection with Fig. 66A. That is to say, the left-shift gate causes the adder output to be switched from the operation revolver to the regeneration revolver; it causes a zero to be recorded in the lowest DD order (DG2–L) during the left shift; and it blanks the shifted DG11–U digit.

Figure 71:
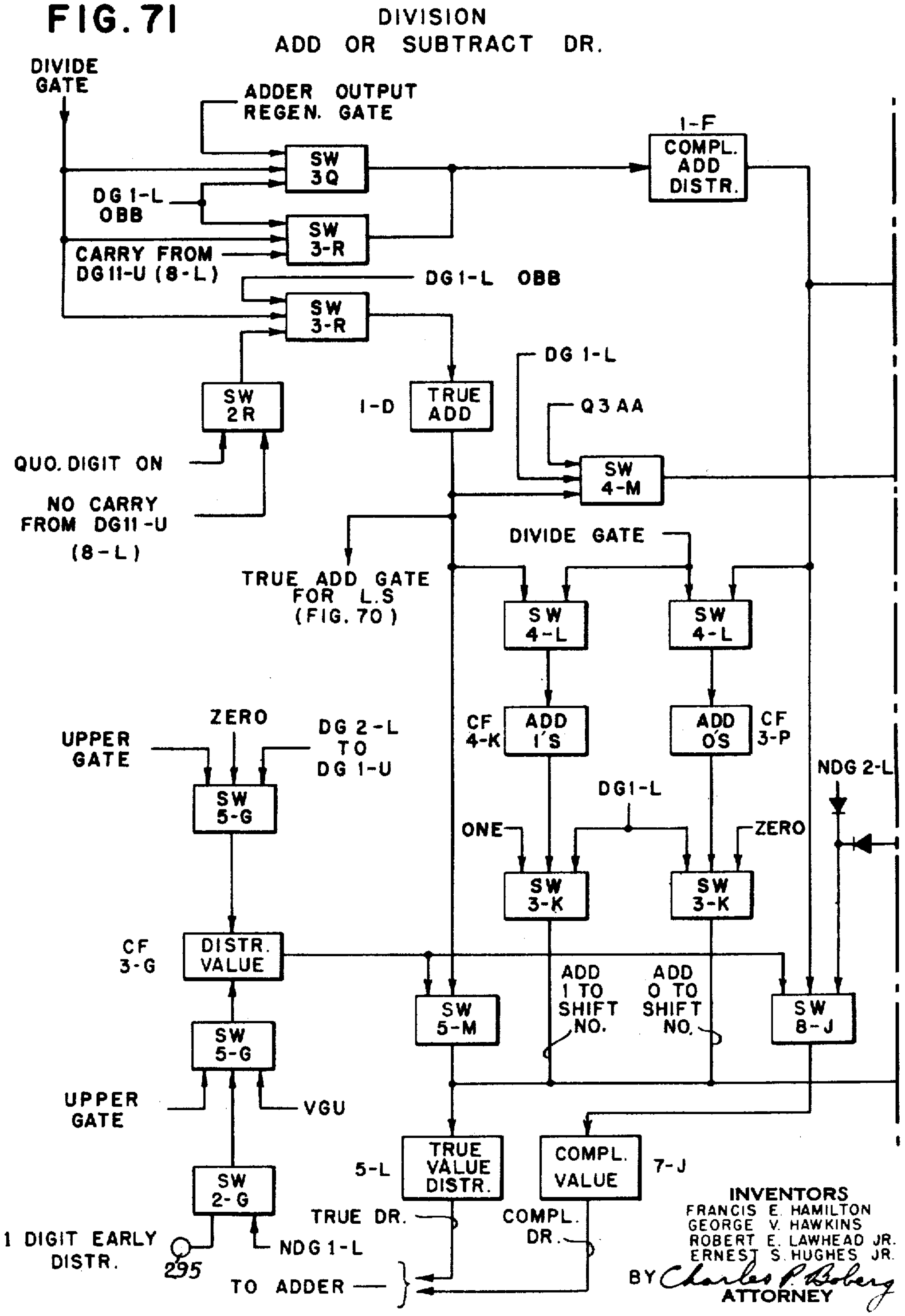

After this initial left shift has been performed (step 2, Fig. 18), the next step consists of subtracting the DR amount from the quantity recorded in the upper computer (step 3, Fig. 18). Referring to Fig. 71, the divide gate is switched at 3–Q with an adder output regeneration gate (available whenever the regeneration revolver is active)

and with a DG1–L, 0BB timing pulse to turn on the complement add distributor unit 1–F. For reasons which will become apparent as the description proceeds, the action just described will take place only when the first left shift of the division operation has been completed. The complement add distributor gate from 1–F conditions the switch 8–J for enabling the value from the one-digit-early distributor (DR value) to enter the adder as a complement. (The quotient digit gate is off at this time.) Thus, the initial subtraction of the DR from the upper computer value is performed. During this cycle the conditions will be such (neither a start divide gate nor a true add gate being available, Fig. 70) that the output of the adder is recorded in the operation revolver. This is likewise true of each of the succeeding cycles in which a "subtract DR" step is performed. The subtract DR and left shift steps are never combined in the division process.

In the course of entering the complement DR value into the upper computer, complement zeros are entered into the lower computer positions DG2–L through DG11–L. Entry of the usual tens-complement carry into the DG2–L position yields a zero in the DG2–L position (step 3, Fig. 18). The digits in the lower computer positions above the highest significant DD digit likewise will be zeros. Insofar as the upper computer is concerned, the carry into the DG1–U position converts the digit in that position to a tens-complement. At the conclusion of this cycle the computer positions above the highest significant digit in the DR complement will have been filled with 9's, and there will be no carry from the DG11–U position.

Insofar as the DG1–L position is concerned, the shift number initially recorded in this position was zero. Whenever the DR value enters the adder as a complement, a true zero will be entered in lieu of the DG1–L distributor sign digit. This is indicated in Fig. 71. Hence, the shift number remains at zero following a complement DR entry.

Figure 71A:
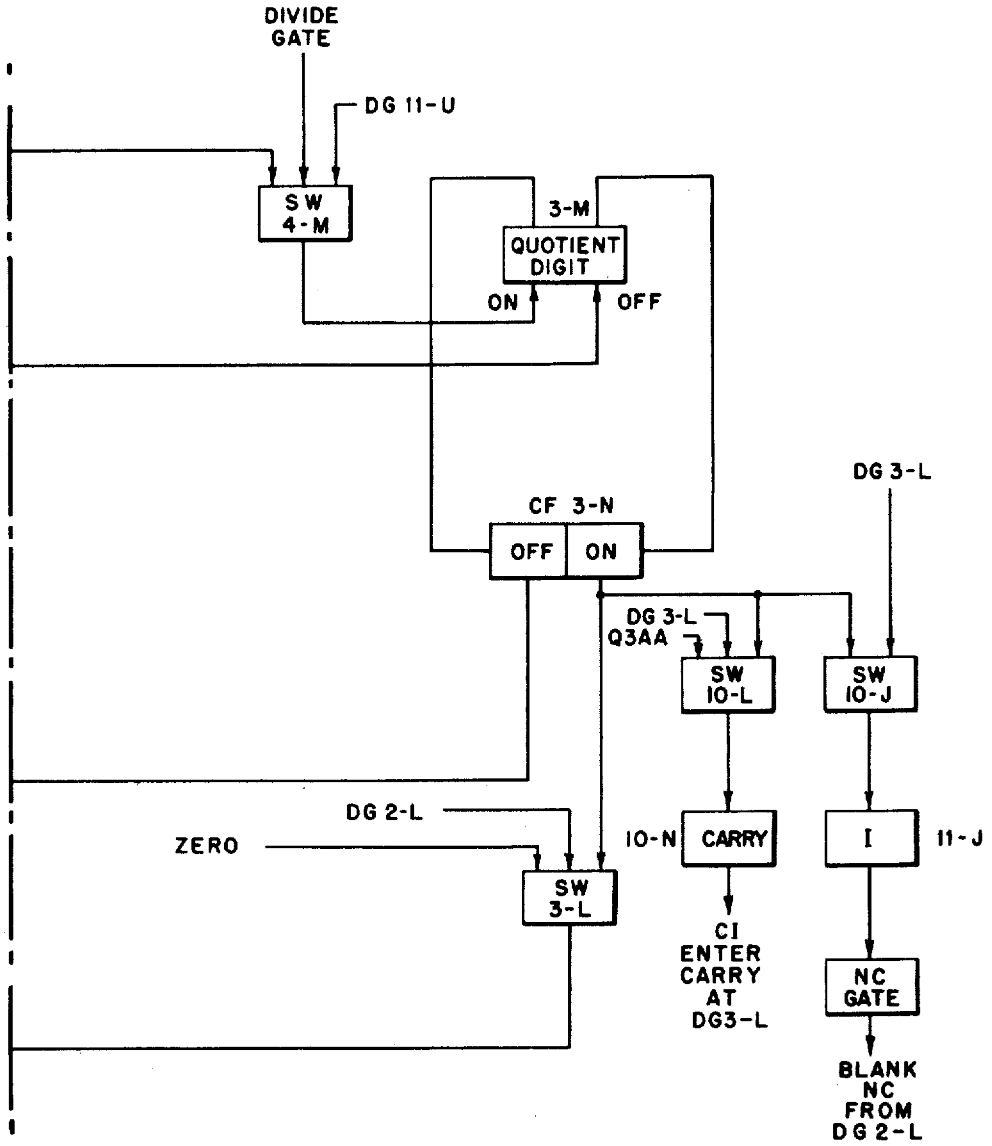

The quotient digit gate at 3–M, Fig. 71A, is turned on at DG11–U time whenever the DR has been entered as a complement for the first consecutive time, and the gate is not turned off again until the first succeeding true add cycle commences. Hence, a quotient digit "on" gate is now available.

The absence of a carry from the DG11–U position following a complement entry indicates that an over-subtraction has taken place, and the next step is to add the DR value back into the upper computer as a true number while performing a left shift. The "no carry" signal which occurs at DG1–L, 0BB time is switched with the quotient digit "on" gate at 2–R, Fig. 71, and with the divide gate at 3–R to turn on the true add unit 1–D for one cycle. The concurrence of the true add gate and the divide gate at 334, Fig. 70, initiates a left shift. The true add gate causes the distributor value to enter the adder as a true number (Fig. 71), and it also causes a true 1 to be added to the shift number at DG1–L, thereby initiating the shift count (step 4, Fig. 18). This occurs each time there is a true add cycle.

The quotient digit gate is now off, and the carry from the DG11–U position at the end of the true add cycle is effective at DG1–L, 0BB time (switch 3–R, Fig. 71) to turn on the complement add distributor unit 1–F. Hence, the distributor value again is entered as complement (step 5, Fig. 18). Again this results in an over-subtraction, thereby initiating an "add DR with left shift" cycle (step 6).

This alternation of true add and complement add cycles continues until eventually the DD amount is shifted sufficiently far to the left (step 16, Fig. 18A) that the next subtraction of the DR value leaves a true value standing in the computer (step 17). This is indicated by a carry from the DG11–U position occurring at a time when the quotient digit gate 3–M, Fig. 71A, is "on." The carry signal (Fig. 71) initiates another "complement add distributor" cycle. This time, instead of entering a complement 0 in the DG2–L position, a "1" is entered in that position (step 18, Fig. 18A). The manner in which this takes place is as follows:

At DG2–L time the quotient digit "on" gate is switched with zero at 3–L, Fig. 71A, to insert a true zero in the adder as though it were the DG2–L distributor digit. Meanwhile, the customary DG2–L complement 0 entry is blanked at the switch 8–J, Fig. 71, by the NDG2–L timing pulse occurring in the absence of a quotient digit "off" gate. Hence, a true zero is entered in place of a complement zero at this time. However, the carry from DG1–L (i.e., the tens-complement carry which is generated at DG2–L time, Fig. 56) takes place as usual, causing "1" to be entered into the DG2–L position. Thus the building up of the quotient value commences in the lower computer.

It is now necessary to provide for a special carry into the DG3–L position in substitution for the carry that normally would have taken place if the complement zero entry at DG2–L had not been blocked. Referring again to Fig. 71A, the quotient digit "on" gate is switched at 10–J with a DG3–L timing pulse and is inverted at 11–J to provide a no carry blanking gate at 11–K. This blanks the no carry signal from DG2–L. Concurrently with this, the quotient digit "on" gate is switched at 10–L with DG3–L and Q3AA timing pulses to turn on the carry latch at 10–N for entering the desired carry at DG3–L.

Figure 72:
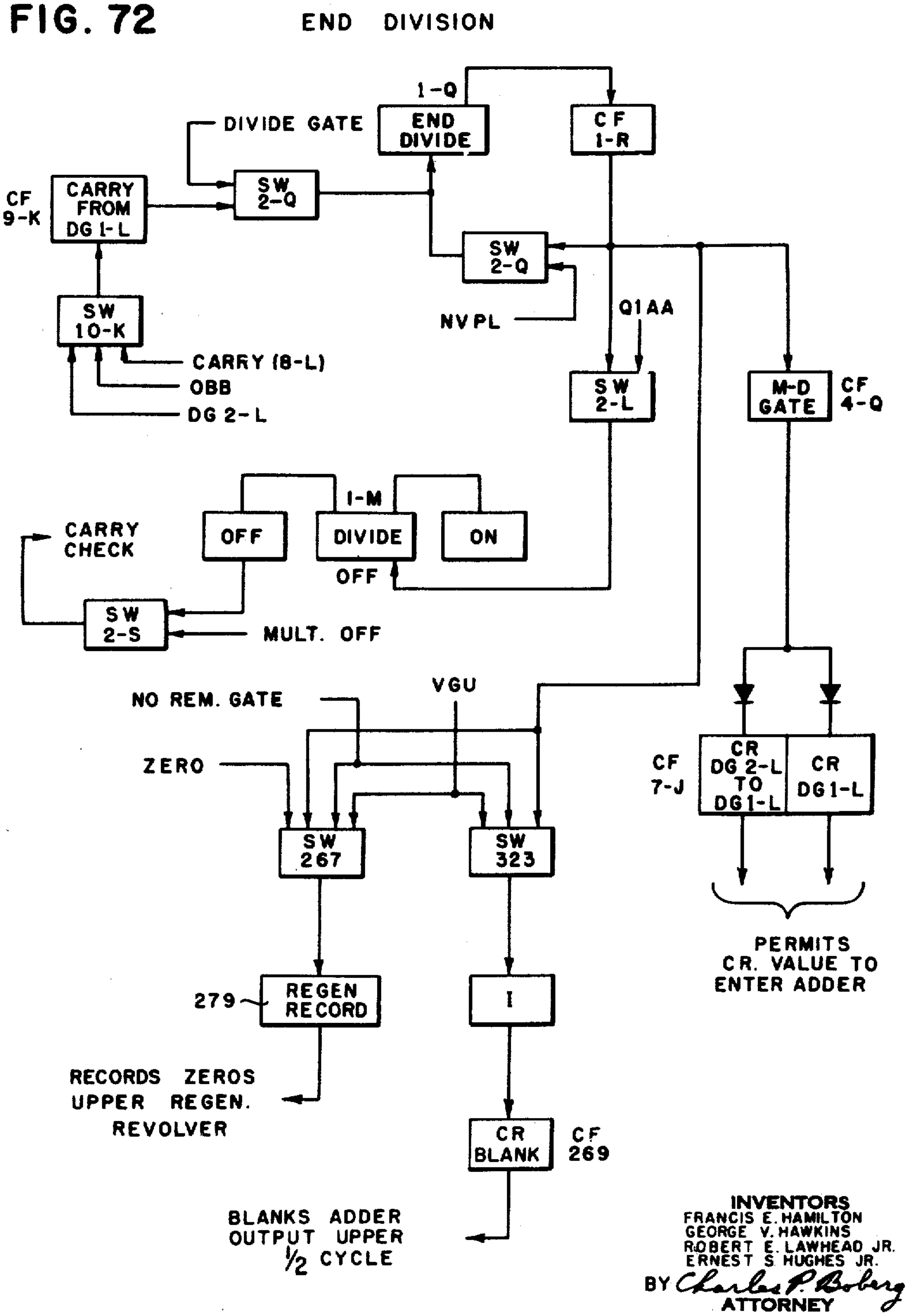

The quotient value continues to build up in the units order until an over-subtraction occurs (step 19, Fig. 18A). This is the signal for adding the DR amount back into the upper computer and performing a left shift (step 20). The remaining steps of the division operation are evident from the chart, Fig. 18A, and from the foregoing description, except for the final step, which takes place as follows:

Referring to Fig. 72, the carry from the DG1–L position (step 29, Fig. 18A) is switched at 2–Q with the divide gate to turn on the end divide latch 1–Q. This latch remains on until the next succeeding NVPL. The end divide gate turns off the divide latch 1–M. The divide "off" gate is switched with the multiply "off" gate at 2–S to furnish a carry check signal which blocks the carry from DG1–L. The end divide gate also is effective to prolong the M–D gate at 4–Q, thereby enabling the computer value to enter the adder in the final cycle. This is necessary to prevent a computer error from being registered.

When the divide gate goes off, it therefore prevents a left shift on the last cycle. Therefore, the result of the division is recorded in the operation revolver. However, as will appear hereinafter, the result of any computation will be stored in the computer regeneration revolver, and necessary provisions are made for transferring any result registered in the operation revolver to the regeneration revolver when the computation is ended.

If the remainder is being retained, it is recorded in the upper computer in the usual fashion as an incident to the final "add DR" step. If the remainder is being cancelled, the end divide gate is switched at 323, Fig. 72, with the no remainder gate and VGU to furnish a computer blanking signal for blanking the output of the adder insofar as the upper computer is concerned. At the same time, the end divide gate, no remainder gate and VGU are switched at 267 with zeros for recording zeros in the upper portion of the regeneration revolver.

If the remainder is retained, it can be used as a new dividend to extend the division in situations where results are required to a high degree of precision. This entails transferring the quotient from the lower computer to the distributor, thence to storage; thereafter transferring the remainder from the upper computer to the distributor and thence back to the upper computer, where it becomes a new dividend (the computer having been completely reset in the interim). The divisor is again entered into the distributor, and the division process is repeated to extend the quotient.

Where the quotient and the remainder are being read out individually, the quotient carries the sign of the result, which is stored in the computer sign latches at 5–A, 5–B, 5–C and 5–D. On the other hand, when the remainder is read out of the upper computer, it will take the sign of the dividend, which has meantime been transferred to the M–D sign latches at 8–A, 8–B, 8–C and 8–D as previously explained. The remainder plus or minus sign is available at terminal 366 or 369, Fig. 40G, and this signal is switched at 367, Fig. 40G, with the remainder gate and either an 8 or a 9 timing signal to provide an upper sign signal which can be switched at 365 with the upper computer value when an upper computer readout is requested. Thus, it is possible to handle a quotient and a remainder whose respective signs are either the same or different.

If an attempt should be made to divide a quantity by zero, the error will appear in the form of a carry from the lowest order of the quotient digit. This automatically gives rise to a warning signal, as explained hereinabove under the heading "Divide error."

Shift Operations

A value stored in the computer may be shifted to the right or left any number of places from 1 to 10 by means of the circuitry which will now be described. A left or right shift operation or a half correction operation (which is a modified right shift) may be initiated by the application of two signals from the operation selector, one of these being a signal to the appropriate terminal 348, 349 or 350 (Fig. 73) occurring throughout a full distributor cycle (DG1 to DG1), and the second signal being a digit timing pulse at DG1–L time representing the shift number, that is, the number of places through which the computer value is to be shifted.

Figure 73:
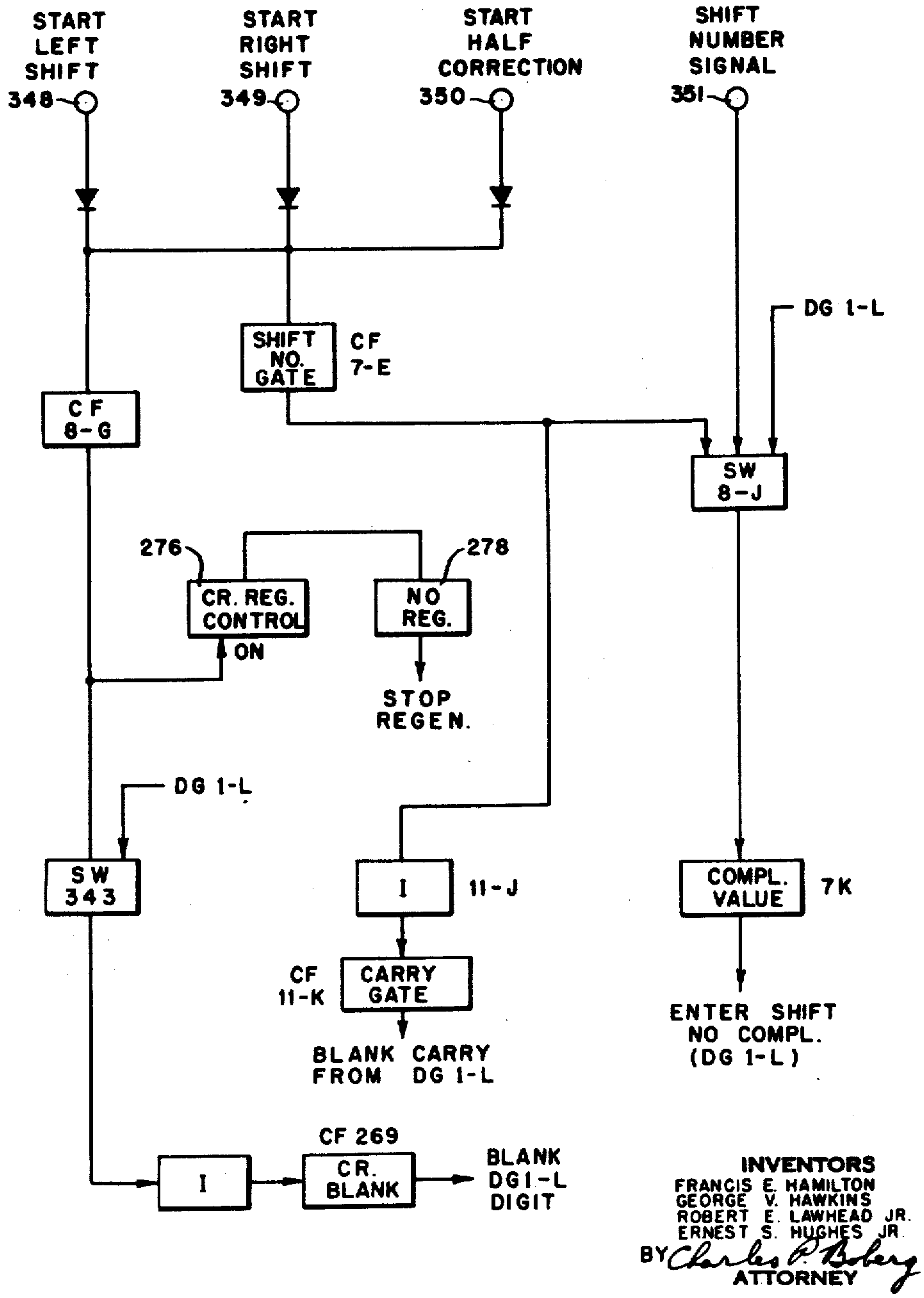

The start left shift, start right shift or start half correction signal, as the case may be, produces a shift number gate at 7–E, Fig. 73. The shift number gate is switched at 8–J with the shift number signal and a DG1–L timing pulse for causing the complement of the shift number to enter the adder at DG1–L time. As will be explained in more detail presently, it is the tens complement of the shift number which emerges from the adder in this particular step. This shift number complement is increased by one with each left shift.

Concurrently with the entry of the shift number complement, a carry blanking signal is provided by inverting the shift number gate at 11–J and applying the inverted signal to the carry gate at 11–K. This blanks a possible carry from DG1–L when the shift number complement is entered into the computer. It is also necessary to stop regeneration and blank the DG1–L digit that normally would be recorded through the regeneration circuit. Referring again to Fig. 73, the start left shift, start right shift or start half correction signal from the operation selector is effective to turn on the computer regeneration control unit 276, placing this unit in its "no regeneration" condition and furnishing at the cathode follower 269 the DG1–L blanking signal which blanks the unwanted DG1–L digit.

Figure 74:
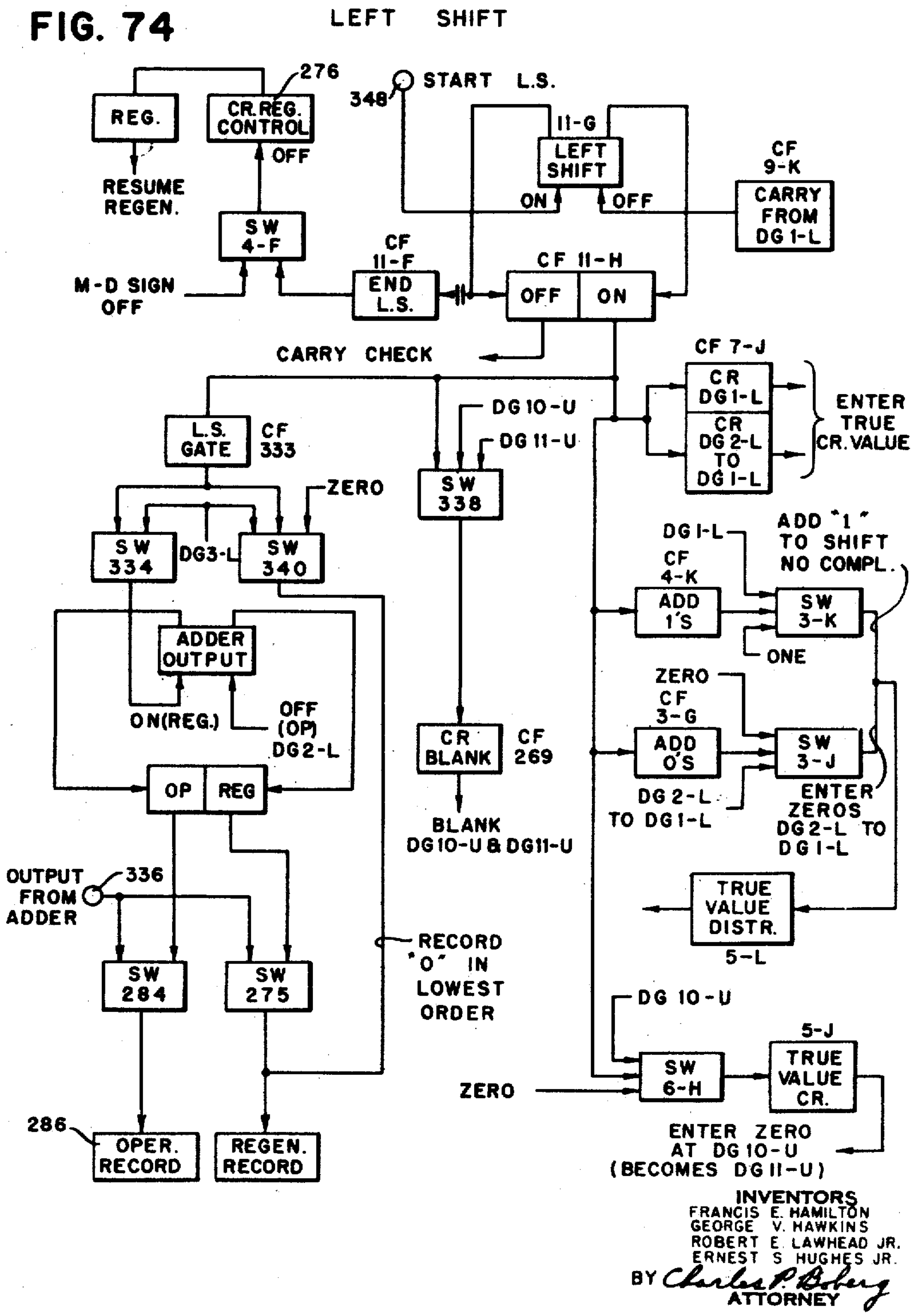

The left shift operation will be described with reference to Fig. 74 taken in conjunction with Figs. 13 and 14. The start left shift signal from terminal 348 turns on the left shift unit 11–G. The left shift "on" signal from 11–H, acting through the cathode follower 7–J, causes the computer value to enter the adder as a true number. In lieu of the distributor value, the left shift "on" signal provides an "add 1" signal at 4–K which is switched at 3–K with DG1–L and one timing pulses for causing the addition of 1 to the shift number complement. (This also causes the tens-complement of the shift number to be entered initially.) Through the cathode follower 3–G and switch 3–J, the left shift "on" signal causes zeros to be entered from DG2–L to DG1–L.

Through the switch at 6–H, the left shift "on" signal causes a zero to be inserted at DG10–U, which zero occupies the DG11–U position after the left shift. At the same time, the left shift "on" signal, acting through the switch 338, furnishes a blanking signal at DG10–U and DG11–U time for blanking the digits which otherwise would be shifted out of the DG10–U and DG11–U positions into the next succeeding positions.

The left shift "on" signal also provides a left shift gate at 333 which causes the adder output to be recorded in the regeneration revolver. It also causes a zero to be inserted in the regeneration revolver to fill the vacancy created by shifting the lowest digit of the computer value to the left.

Each cycle of the left shift operation takes place in the manner just described, except that when the final cycle is reached, the shift number complement becomes zero, and there is a carry from DG1–L. This carry signal turns off the left shift unit 11–G, giving rise to an end left shift signal at 11–F. The end left shift signal in turn restores the computer regeneration control unit 276 to its regenerate condition. This enables the new value obtained by the shift process to be stored in the computer regeneration revolver until needed.

Figure 75:
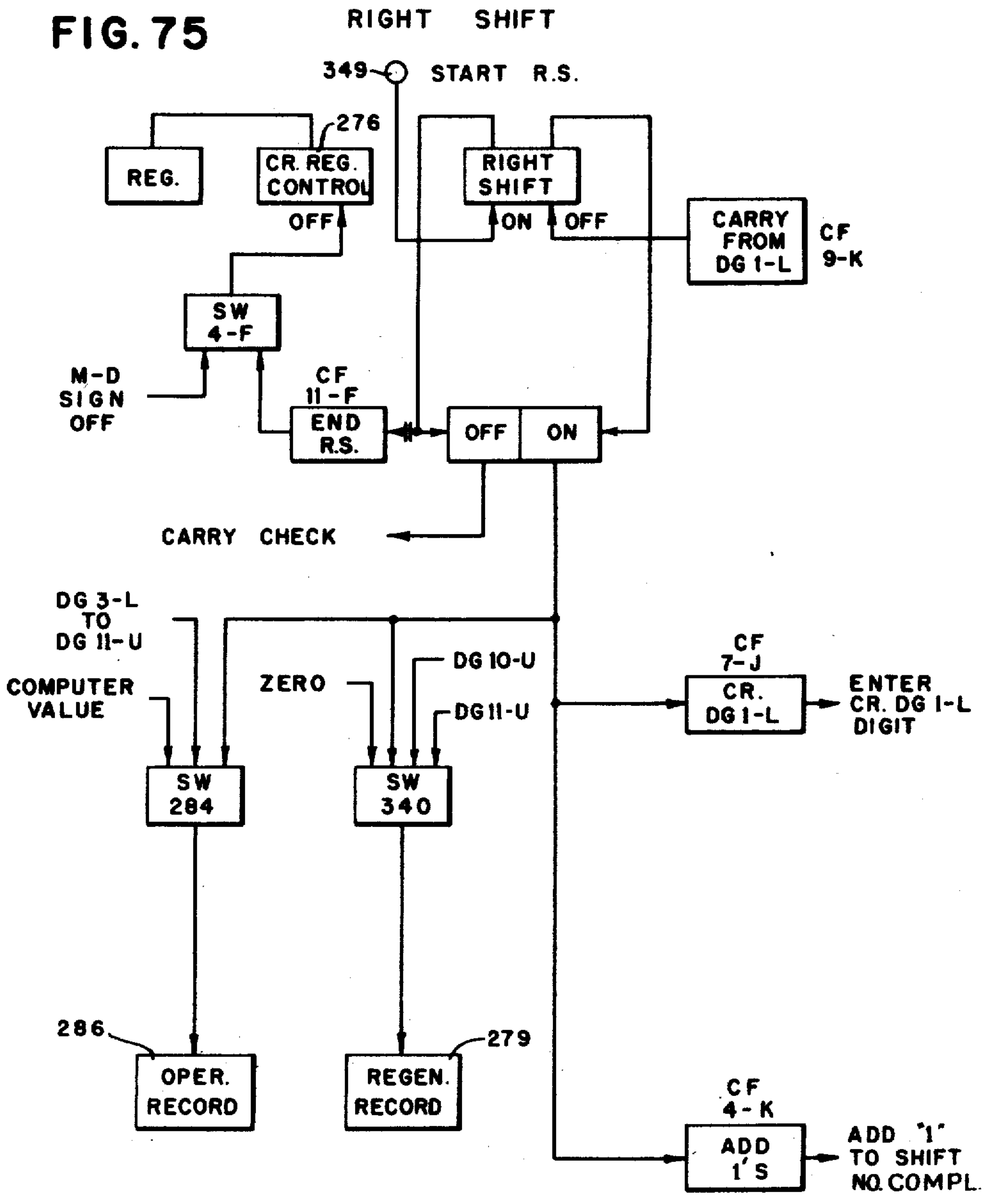

The right shift circuitry will be described with reference to Fig. 75 taken in conjunction with Figs. 11 and 12. Upon application of a start right shift signal to the terminal 349, the right shift latch unit 11–E is turned on. The right shift gate supplies a signal at 7–J for entering the computer DG1–L digit into the adder. At the same time it also furnishes a signal at 4–J for adding 1 to the shift number complement in the DG1–L position.

In each right shift cycle the computer value digits starting with DG3–L are shifted one place to the right by being entered directly into the operation revolver, and zeros are inserted in the DG10–U and DG11–U positions. Referring again to Fig. 75, the right shift gate is switched at 284 with the computer value signal and DG3–L to DG11–U timing pulse for recording the digits of the computer value in the operation revolver, thereby affecting the right shift since these digits will be read one digit time earlier than normal. The right shift gate is switched at 340 with zero, DG10–U and DG11–U timing pulses for recording zeros in the regeneration revolver in the DG10–U and DG11–U positions.

The above described cycle is repeated until the shift number complement has reached zero, at which time a carry from DG1–L is available to turn off the right shift unit 11–E. The resulting end right shift signal turns off the computer regeneration control unit 276, thereby restoring this unit to its regenerate condition.

Half-Correction

A half-correction operation is a modified right shift operation in which a special step (entry of "5" into the lowest order) is inserted prior to the final right shift cycle. When the shift number complement reaches "9," an appropriate signal is furnished for adding "5" to the lowest (DG2–L) computer digit. This digit is then shifted out of the computer in the final shift cycle, leaving a carry into the next order if the lowest digit had been 5 or greater, or no carry if it had been less than 5.

Figure 76:
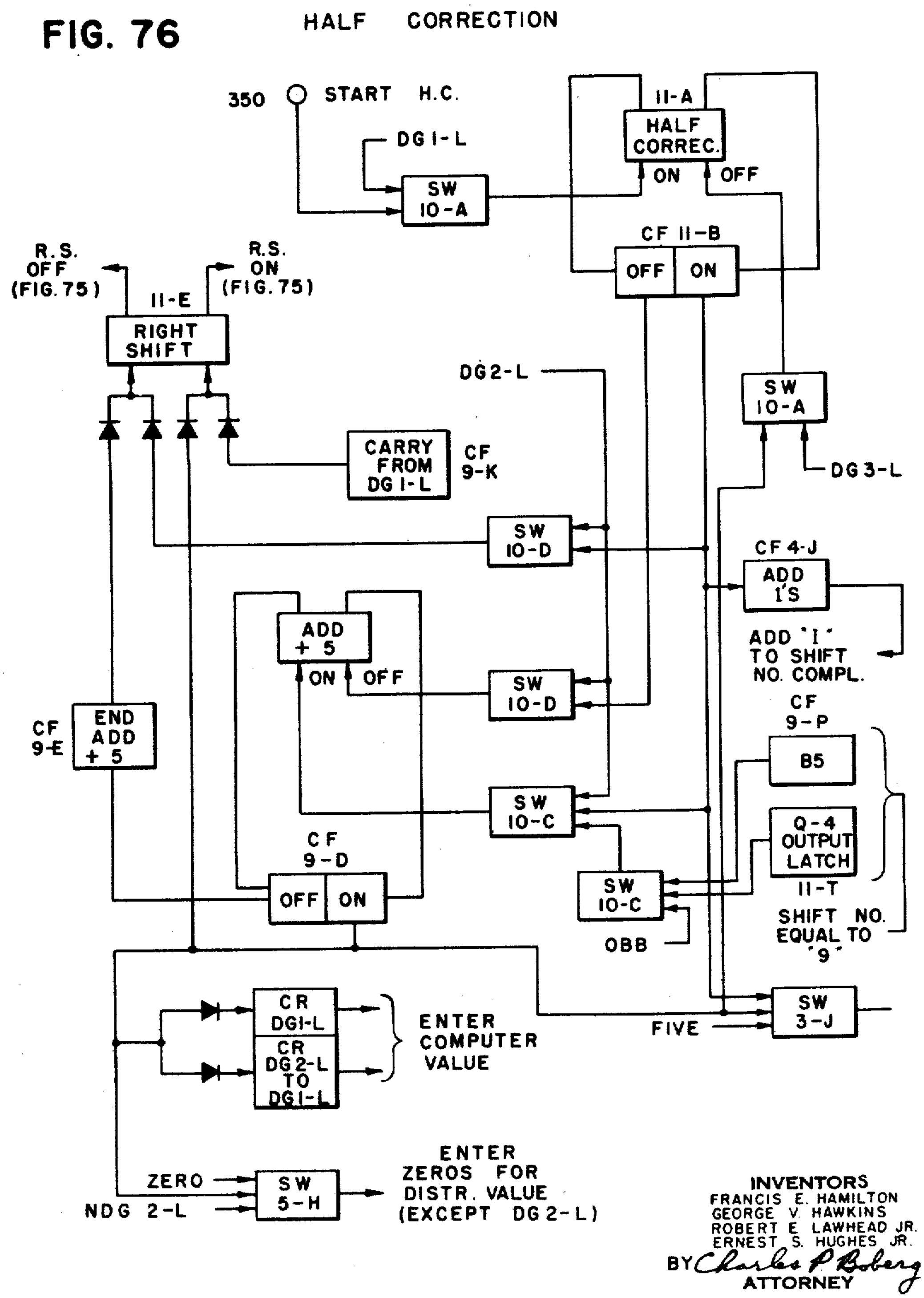

Referring to Fig. 76, a "start half-correction" signal is supplied by the operation selector whenever it is desired to shift right a designated number of places with a half-correction . the lowest order of the final value position. In these circumstances the start half-correction signal is used in place of a start right shift signal, since right shift is necessarily included in half-correction. The start half-correction signal, like the right shift signal, is used in conjunction with a shift number signal designating the number of shifts to be made (Fig. 73). As before, the shift number complement is entered into the computer at DG1–L time in the first cycle of the operation.

Referring again to Fig. 76, the start half-correction signal from terminal 350 is switched at 10–A with a DG1–L timing pulse to turn on the half-correction gate unit at 11–A. The half-correction "on" gate is switched at 10–D with a DG2–L timing pulse for turning on the right shift gate unit at 11–E. This initiates the right shift operation, as described above in connection with Fig. 75. This right shift operation proceeds in the usual manner, with "1" being added to the shift number complement at DG1–L each time a right shift is effected, until the shift number complement attains 9. A this stage an extra cycle is inserted for the performance of a half-correction.

At DG2–L time of the cycle wherein the shift number complement first reaches 9, signals representing the B5 and Q4 bits of the shift number complement become available at the units 9–P and 11–T (Fig. 76) in the adder matrix. These B5 and Q4 signals are switched at 10–C with a 0BB timing pulse, and the resultant signal is switched at 10–C with a DG2–L timing pulse and the half-correction "on" gate for turning on the add +5 unit 9–C. The add +5 gate from 9–D is switched at 3–J with the half-correction "on" gate and a "five" timing pulse to provide a signal for entering +5 in the adder at DG2–L time. At the same time, the add +5 gate turns off the right shift unit 11–E, thereby causing the computer value (read from the operation revolver) to pass through the adder instead of directly to the recording head associated with this revolver. In the adder, +5 is added to the digit which is read at DG2–L time. In a normal right shift this digit would be the DG3–L digit in the operation revolver, which becomes the DG2–L digit when recorded back again. In the present instance, however, this digit passes through the adder, where +5 is added to it, and this introduces a one-digit delay so that the resulting sum digit is recorded at the DG3–L position despite the fact that it was read at DG2–L time. This necessitates two more cycles in order to complete the final right shift.

At DG3–L time of the present cycle the add +5 gate is switched at 10–A with a DG3–L timing pulse for turning off the half-correction unit 11–A. The half-correction "off" gate thereupon is available at 11–B but does not take effect until the following cycle. Throughout the balance of the present cycle the add +5 unit 9–C remains on to effect entry of the computer value into the adder. It is effective also to enter zeros in place of a distributor value for all positions except DG2–L, which is handled specially as just noted.

In the next succeeding cycle, at DG2–L time, the half-correction "off" gate becomes effective through the switch at 10–D to turn off the add +5 unit 9–C. The resulting "end add +5" gate turns on the right shift unit 11–E. Hence, during this cycle, the computer value read from the operation revolver is recorded directly back into this revolver without passing through the matrix, thereby effecting a right shift which compensates for the one-digit delay that took place in the preceding cycle. In the present cycle the shift number complement remains at 9 inasmuch as both the half-correction gate and the right shift gate were off at DG1–L time. The compensating right shift just described has brought the lowest digit (that is, the digit which includes the +5 addition) into its proper relationship, so that when the next right shift occurs, this digit will be dropped. The following digit (which includes the carry, if any, resulting from the half correction in the lowest order) then becomes the lowest-order digit. In this final right shift cycle the shift number complement changes from 9 to 0, and the resulting carry from DG1–L turns off the right shift unit 11–E, Fig. 76.

End of Operation

As a final step in any of the operations described hereinabove, it is necessary to transfer whatever value stands in the computer operation revolver 11–B (Fig. 77) to the computer regeneration revolver 11–A. It may happen frequently that some of the digits in the computer value are stored in the regeneration revolver while other digits are stored in the operation revolver. The process which will now be described brings the two sets of digits together to furnish the complete computer value in the regeneration revolver.

Referring to Fig. 77, the operation gate unit 9–F, when unlatched by NVPL following the conclusion of an operation, furnishes an end operation signal which turns off regeneration control unit 276. By the time this occurs, the circuits for recording data in the computer operation revolver 11–B will have been disabled. The regeneration gate from 276 now is switched at 275 with the computer value signal coming from the read circuit 262 and associated devices shown in Fig. 77. The output of the switch 275 is fed to the circuits for recording in the computer regeneration revolver, as shown. Any value which might have been recorded in the operation revolver therefore is transferred to the regeneration revolver.

From this point on the value in question is circulated continuously through the regeneration revolver. If desired, the computer value may be read out from the terminal 271, Fig. 77, to a suitable indicating means such as that described above in connection with Fig. 47. The value which appears at the terminal 271 does not include the stored computer sign. If it is desired to include this stored sign, the value in the computer revolver must first be transferred to the distributor, in the manner explained above in the "Detailed description" under the heading "Computer readout." In the course of this transfer, the stored computer sign is converted to its equivalent digit (8 for minus or 9 for plus) and inserted at DG1–L in the distributor. The complete value then may be read out from the distributor terminal 225, Fig. 40F, as previously explained.

Special Features

The computing apparatus disclosed herein is both versatile and dependable, due to a number of novel features which have been incorporated therein. Among these many features there may be noted the following:

(*a*) The splitting of each computer revolver into upper and lower portions, with provisions for:

(1) Entering data selectively into the upper and/or lower portion, with or without a reset of the revolver.

(2) Selectively reading data out of the upper and/or lower portion.

(3) Selectively deleting data from upper or lower portion (this being accomplished by transferring the desired data to the distributor and re-entering the same into the computer with a reset of the latter).

(4) Handling two values having different signs in the same computer revolver. For instance, a remainder in a division operation may have a sign different from that of the quotient.

(5) Combining two values into one by recording them adjacent each other in the upper and lower computers without an intervening sign.

(*b*) The dynamic storage and handling of data throughout the machine. No static registers are employed (except for signs). Items of data entering the adder are supplied by two revolvers (distributor and computer). There is a continuous flow of information between the adder and the revolvers or between various revolvers.

(*c*) Various innovations in the arithmetic circuitry are specifically pointed out and claimed herein.

(*d*) The adding matrix itself has a number of novel aspects which are pointed out in detail hereinabove and in the following claims.

(*e*) Safety features such as overflow detection, which automatically functions whenever an attempt is made to add quantities in excess of the computer's capacity or whenever it is attempted to divide a quantity by zero, and check circuitry for automatically checking each digit position in the distributor or computer to insure that a bona fide digit representation is stored therein.

The foregoing and other features of importance have been described and pointed out in connection with the preferred embodiment of the invention herein disclosed, but of course it should be understood that such embodiment is capable of modification and variation in its form, details and mode of operation without departing from the true spirit of the invention. Therefore, it is the intention to be limited only as indicated by the scope of the following claims.

What is claimed is:

1. In a magnetic drum computer, a first portion for storing a first value manifestation, a second portion for storing a second value manifestation, an adder for concurrently receiving and adding two value manifestations, first entry means for enabling a value manifestation to enter said adder as a true value manifestation, second entry means for enabling a value manifestation to enter said adder as a complement manifestation, a first settable device adapted to be set when said first value manifestation is to enter said adder as a complement manifestation, a second settable device adapted to be set when said second value manifestation is to enter said adder as a complement manifestation, first switch means controlled by said first settable device for rendering said first entry means responsive to said second portion and for rendering said second entry means responsive to said first portion, and second switch means controlled by said second settable device for rendering said first entry means responsive to said first portion and for rendering said second entry means responsive to said second portion.

2. In a magnetic drum computer, a first portion for storing a first value manifestation, a second portion for storing a second value manifestation, an adder for concurrently receiving and adding two value manifestations, first entry means for enabling a value manifestation to enter said adder as a true value manifestation, second entry means for enabling a value to enter said adder as a complement manifestation, a first settable device adapted to be set when said first value manifestation is to enter said adder as a complement manifestation, a second settable device adapted to be set when said second value manifestation is to enter said adder as a complement manifestation, a third settable device adapted to be set when both of said first and second value manifestations are to enter said adder as true value manifestations, first switch means controlled by said first settable device for rendering said first entry means responsive to said second portion and for rendering said second entry means responsive to said first portion, second switch means controlled by said second settable device for rendering said first entry means responsive to said first portion and for rendering said second entry means responsive to said second portion, and third switch means controlled by said third settable device for rendering said first entry means responsive jointly to said first and second portions.

3. In a magnetic drum computer, a first portion for storing a first value manifestation, a second portion for storing a second value manifestation, an adder for concurrently receiving and adding two value manifestations, first entry means for enabling a value manifestation to enter said adder as a true value manifestation, second entry means for enabling a value manifestation to enter said adder as a complement manifestation, a first latch adapted to be turned on when said first value manifestation is to enter said adder as a complement manifestation, a second latch adapted to be turned on when said second value manifestation is to enter said adder as a complement manifestation, first diode switch means controlled by said first latch and effective when said first latch is turned on for rendering said first entry means responsive to said second portion and for rendering said second entry means responsive to said first portion, and second diode switch means controlled by said second latch and effective when said second latch is turned on for rendering said first entry means responsive to said first portion and for rendering said second entry means responsive to said second portion.

4. In a magnetic drum computer, a first portion for storing a first value manifestation, a second portion for storing a second value manifestation, an adder for concurrently receiving and adding two value manifestations, first entry means for enabling a value manifestation to enter said adder as a true value manifestation, second entry means for enabling a value manifestation to enter said adder as a complement manifestation, a first latch adapted to be turned on when said first value manifestation is to enter said adder as a complement manifestation, a second latch adapted to be turned on when said second value manifestation is to enter said adder as a complement manifestation, a third latch adapted to be turned on when both of said first and second value manifestations are to enter said adder as true value manifestations, first diode switch means effective when said first latch is turned on for rendering said first entry means responsive to said second portion and for rendering said second entry means responsive to said first portion, second diode switch means effective when said second latch is turned on for rendering said first entry means responsive to said first portion and for rendering said second entry means responsive to said second portion, and third diode switch means effective when said third latch is turned on for rendering said first entry means responsive jointly to said first and second portions.

5. In a magnetic drum computer, first storage means for storing a first value manifestation, second storage means for storing a second value manifestation, an adder for concurrently receiving and adding two value manifestations, first entry means for enabling a value manifestation to enter said adder as a true value manifestation, second entry means for enabling a value manifestation to enter said adder as a complement manifestation, a first settable device adapted to be set when said first value manifestation is to enter said adder as a complement manifestation, a second settable device adapted to be set when said second value manifestation is to enter said adder as a complement manifestation, first switch means controlled by said first settable device for placing said first entry means under the control of said second storage means and for placing said second entry means under the control of said first storage means, and second switch means controlled by said second settable device for placing said first entry means under the control of said first storage means and for placing said second entry means under the control of said second storage means.

6. In a magnetic drum computer, first storage means for storing a first value manifestation, second storage means for storing a second value manifestation, an adder for concurrently receiving and adding two value manifestations, first entry means for enabling a value manifestation to enter said adder as a true value manifestation, second entry means for enabling a value manifestation to enter said adder as a complement manifestation, a first settable device adapted to be set when said first value manifestation is to enter said adder as a complement manifestation, a second settable device adapted to be set when said second value manifestation is to enter said adder as a complement manifestation, a third settable device adapted to be set when both said first and second value manifestations are to enter said adder as true value manifestations, first switch means controlled by said first settable device for placing said first entry means under the control of said second storage means and for placing said second entry means under the control of said first storage means, second switch means controlled by said second settable device for placing said first entry means under the control of said first storage means and for placing said second entry means under the control of said second storage means, and third switch means controlled by said third settable device for placing said first entry means under the joint control of said first and second storage means.

7. In a magnetic drum computer, first storage means for storing a first value manifestation, second storage means for storing a second value manifestation, an adder for concurrently receiving and adding two value manifestations, first entry means for enabling a value manifestation to enter said adder as a true value manifestation, second entry means for enabling a value manifestation to enter said adder as a complement manifestation, a first latch adapted to be turned on when said first value manifestation is to enter said adder as a complement manifestation, a second latch adapted to be turned on when said second value manifestation is to enter said adder as a complement manifestation, first diode switch means controlled by said first latch and effective when said first latch it turned on for rendering said first entry means responsive to said second storage means and for rendering said second entry means responsive to said first storage means, and second diode switch means controlled by said second latch and effective when said second latch is turned on for rendering said first entry means responsive to said first storage means and for rendering said second entry means responsive to said second storage means.

8. In a magnetic drum computer, first storage means for storing a first value manifestation, second storage means for storing a second value manifestation, an adder for concurrently receiving and adding two value manifestations, first entry means for enabling a value manifestation to enter said adder as a true value manifestation, second entry means for enabling a value manifestation to enter said adder as a complement manifestation, a first latch adapted to be turned on when said first value manifestation is to enter said adder as a complement manifestation, a second latch adapted to be turned on when said second value manifestation is to enter said adder as a complement manifestation, a third latch adapted to be turned on when both of said first and second value manifestations are to enter said adder as true value manifestations, first diode switch means effective when said first latch is turned on for rendering said first entry means responsive to said second storage means and for rendering said second entry means responsive to said first storage means, second diode switch means effective when said second latch is turned on for rendering said first entry means responsive to said first storage means and for rendering said second entry means responsive to said second storage means, and third diode switch means effective when said third latch is turned on for rendering said first entry means responsive jointly to said first and second storage means.

9. In a computing device which is adapted for adding a first value to a second value in response to a plus operation signal and for subtracting a first value from a second value in response to a minus operation signal, each of said values comprising a numeric having a nominal algebraic sign associated therewith, the combination of a magnetic drum storage device having a first portion for storing a manifestation of said first value and a second portion for storing a manifestation of at least the numeric of said second value, sign storage means for storing a manifestation of the algebraic sign of said second value, an adder for concurrently receiving manifestations of and adding two numbers, either of which may be a complement, sign detecting means controlled by said first portion for detecting the nominal algebraic sign of said first value, selective switching means controlled by said sign detecting means and responsive to said operation signals for producing a signal representing the effective algebraic sign of said first value according to the relationship between the nominal algebraic sign thereof and the sign of the operation signal, first entry control means for causing the manifestations of the numerics of the values respectively stored in both said first and second portions to enter said adder as true number manifestations, second entry control means for causing the manifestations of the numerics of the values respectively stored in said first and second portions to enter said adder as a true number manifestation and a complement manifestation, respectively, third entry control means for causing the manifestations of the numerics of the values respectively stored in said first and second portions to enter said adder as a complement manifestation and a true number manifestation, respectively, and other selective switching means controlled by said sign storage means and responsive to said effective sign-representing signal for operating a selected one of said first, second and third entry control means in accordance with the manner in which said first and second value manifestations respectively, are to enter said adder.

10. In a computing device which is adapted for adding a first valve to a second valve in response to a plus operation signal and for subtracting a first value from a second value in response to a minus operation signal, each of said values comprising a series of numerical digits and a digit representing a nominal algebraic sign, the combination of a magnetic drum storage device having a first portion for serially storing manifestations of all the digits of said first value and a second portion for serially storing manifestations of the numerical digits of said second value, sign storage means for storing a manifestation of the sign digit of said second value, an adder for concurrently receiving manifestations of and adding two numbers, either of which may be a complement, sign detecting means synchronized with said first portion and responsive to the sign digit manifestation stored therein for providing a signal representing the nominal algebraic sign of said first value, selective switching means controlled by the signal from said sign detecting means and by the operation signal for producing a signal representing the effective algebraic sign of said first value according to the relationship between the nominal algebraic sign thereof and the sign of the operation signal, first entry control means for causing the manifestations of the numerical digits stored in both of said first and second portions to enter said adder as true number manifestations, second entry control means for causing the manifestations of the numerical digits stored in said first and second portions to enter said adder as true number manifestations and as complement manifestations, respectively, third entry control means for causing the manifestations of the numerical digits stored in said first and second portions to enter said adder as complement manifestations and as true number manifestations, respectively, and other selective switching means controlled by said sign storage means and responsive to said effective sign-representing signal for operating a selected one of said first, second and third entry control means in accordance with the manner in which the manifestations of the numerical digits of said first and second values, respectively, are to enter said adder.

11. In a computing device which is adapted for adding a first value to a second value in response to a plus operation signal and for subtracting a first value from a second value in response to a minus operation signal, each of said values comprising a numeric having a nominal algebraic sign associated therewith, the combination of a magnetic drum storage device having a first portion for storing a manifestation of said first value and a second portion for storing a manifestation of the numeric of said second value, sign storage means for storing a manifestation of the algebraic sign of said second value, an adder for concurrently receiving manifestations of and adding two numbers, either of which may be a complement, sign detecting means controlled by said first portion for detecting the nominal algebraic sign of said first value, selective switching means controlled by said sign detecting means and responsive to said operation signals for producing a signal representing the effective algebraic sign of said first value according to the relationship between the nominal algebraic sign thereof and the sign of the operation signal, first entry control means for causing the manifestations of the numeric of the values respectively stored in said first and second portions to enter said adder as a true number manifestation and a complement manifestation, respectively, second entry control means for causing the manifestations of the numerics of the values respectively stored in said first and second portions to enter said adder as a complement manifestation and a true number manifestation, respectively, and other selective switching means controlled by said sign storage means and responsive to said effective sign-representing signal for operating said first and second entry control means in accordance with the manner in which the manifestations of said first and second values, respectively, are to enter said adder.

12. In a computing device for adding a first value to a second value in response to a plus operation signal and for subtracting said first value from said second value in response to a minus operation signal, each of said values comprising a true number associated with a nominal algebraic sign, the combination of magnetic drum storage means for storing a manifestation of at least the true numerical portion of one of said values, first sign storage means for storing a manifestation of the nominal algebraic sign of said one of said values, a storage device for storing a manifestation of at least the true numerical portion of the other of said values, second sign storage means for storing a manifestation of the nominal algebraic sign of the other of said values, an adder, first entry control means for causing the manifestation of the true number stored in said magnetic drum storage means and a manifestation of the complement of the true number stored in said storage device to enter said adder, second entry control means for causing a manifestation of the complement of the true number stored in said magnetic drum storage means and the manifestation of the true number stored in said storage device to enter said adder, and selective switching means controlled by said first and second sign storage means and responsive to said operation signals for operating a selected one of said first and second entry control means according to the manifestations of the respective signs of the stored values and the signal of the respective sign of the operation.

13. In a computing device for adding a first value to a second value in response to a plus operation signal and for subtracting said first value from said second value in response to a minus operation signal, each of said values comprising a true number associated with a nominal algebraic sign, the combination of magnetic drum storage means for storing a manifestation of at least the true numerical portion of one of said values, first sign storage means for storing a manifestation of the nominal algebraic sign of said one value, a storage device for storing a manifestation of at least the true numerical portion of the other of said values, second sign storage means for storing a manifestation of the nominal algebraic sign of the other of said values, an adder, first entry control means for causing the manifestation of the true number stored in said magnetic drum storage means and a manifestation of the complement of the true number stored in said storage device to enter said adder, second entry control means for causing a manifestation of the complement of the true number stored in said magnetic drum storage means and the manifestation of the true number stored in said storage device to enter said adder, third entry control means for causing the manifestations of the true numbers respectively stored in said magnetic drum storage means and in said storage device to enter said adder directly, and selective switching means controlled by said first and second sign storage means and responsive to said operation signals for operating a selected one of said first, second and third entry control means according to the manifestations of the respective signs of the stored values and the signal of the respective sign of the operation.

14. A device for adding a pair of digits comprising means for storing manifestations of said two digits in accordance with a two-level code notation whereby each digit is expressed as a pair of bits respectively disposed in the upper and lower levels of the code notation, means for converting the stored digit manifestations concurrently into timed electrical pulses representing the respective bits, with the pulses for each digit manifestation being disposed respectively in two consecutive time intervals corresponding to the two levels of the code notation, and the numerical significance of each pulse being indicated by the time of its occurrence within its respective interval, a plurality of input storage devices each adapted to store a pulse pertaining to a particular bit and to furnish an output voltage representative threof, means for routing said pulses selectively to said input storage devices according to the respective times at which said pulses occur, an additional storage device for storing an indication of a carry from the lower level to the upper level and furnishing an output voltage representative thereof, and summation means including a plurality of sum bit storage devices each adapted to manifest a particular bit according to the code notation, coincidence switches responsive to coinciding output voltages from the lower-level input storage devices for selectively operating the lower-level manifesting devices and said additional storage device in accordance with the sum of the input digits, and other coincidence switches responsive to coinciding output voltages from the upper-level input storage devices and said additional storage device for selectively operating the upper-level sum bit storage devices in accordance with the sum of the input digits.

15. Adding device according to claim 14, in combination with a coincidence detecting means for detecting any two bit-representing pulses which coincide in time and for producing a double-value pulse in response thereto, and special storage devices controlled by said coincidence detecting means for storing the doubled-value pulses in the upper and lower levels, respectively, and for furnishing output voltages representative thereof, said summation means including coincidence switches responsive to the output voltages from said special storage devices and said input storage devices for selectively operating said sum bit storage devices and said additional storage device in accordance with twice the value of a stored bit in either level.

16. Adding device according to claim 14, wherein said routing means includes a first group of routing devices for enabling the pulses representing a digit to be stored in the input storage devices corresponding to the true value of said digit, and a second group of routing devices for enabling the pulses representing a digit to be stored in the input storage devices corresponding to the complement value of said digit.

17. Adding device according to claim 16 in combination with means for detecting when any two bit-representing pulses are routed respectively by the two groups of routing devices to the same input storage device, said detecting means including sampling devices one for each level each of which is rendered active for a limited time interval after the first pulse enters one of said input storage devices by way of either group of said routing devices, special coincidence switches responsive to said sampling device and to said routing means for detecting the entry of a second bit-representing pulse by way of the other group of said routing devices during a time interval in which said sampling device is active, and special storage devices, one for each level, for storing pulses which signify doubled values, said special coincidence switches controlling said special storage devices for causing a doubled-value pulse to be stored in the appropriate level if said second pulse occurs within said time interval.

18. A device for adding the digits of two values pair by pair in sequence, comprising means for storing manifestations of said two values in accordance with a two-level code notation whereby each digit is expressed as a pair of bits respectively disposed in the upper and lower levels of the code notation, means for converting the stored digit manifestations of each value serially and the digit manifestations in corresponding orders of the two values concurrently into timed electrical pulses representing the respective bits, with the pulses for each digit manifestation being disposed respectively in two consecutive time intervals corresponding to the two levels of the code notation, and the numerical significance of each pulse being indicated by the time of its occurrence within its respective interval, a plurality of input storage devices each adapted to store a pulse pertaining to a particular bit and to furnish an output voltage representative thereof, means for routing said pulses selectively to said input storage devices according to the respective times at which said pulses occur, an additional storage device for storing an indication of a carry from the lower level to the upper level and furnishing an output voltage representative thereof, and summation means including a plurality of sum bit storage devices each adapted to store a representation of a particular sum bit according to the code notation, coincidence switches responsive to coinciding output voltages from the lower-level input storage devices for selectively operating the lower-level sum bit storage devices and said additional storage device in accordance with the sum of the input digits, and other coincidence switches responsive to coinciding output voltages from the upper-level input storage devices and said additional storage device for selectively operating the upper-level sum bit storage devices in accordance with the sum of the input digits, said upper-level sum bit storage devices including a carry storage device for storing a carry into the next succeeding order.

19. A device for adding a plurality of digits respectively represented by electrical input pulses which are timed to have numerical significance, said device comprising a plurality of input storage devices each adapted to store an input pulse having a particular numerical significance and to furnish an output voltage representing the stored pulse, means for routing said input pulses selectively to said input storage devices according to the respective times at which said input pulses occur, and summation means including a plurality of coincidence switches and a plurality of sum digit storage devices, each of said switches being responsive to a plurality of coincident output voltages from a particular group of said input storage devices for operating said digit manifesting devices selectively to store a representation of the sum of the digits stored in that particular group of input storage devices, each of said storage devices comprising an electronic latch employing two cascaded inverters and a cathode follower, with the first of said inverters being arranged to receive a pulse for storage and the second of said inverters controlling said cathode follower, said cathode follower being connected to said second inverter to furnish the output voltage of the storage device and being so interconnected with said first and second inverters as to supply a feedback voltage to the first inverter for latching the storage device.

20. Adding device according to claim 19, characterized further in that each of said coincidence switches comprises a plurality of diodes, with each diode of the coincidence switches being driven by a respective one of said cathode followers.

21. Apparatus for performing an algebraic addition of two values each composed of a series of digits and an associated sign, said apparatus comprising an adding device adapted to receive manifestations of a pair of digits at a time and to furnish a manifestation of the sum of said digits as an output, said adding device including a first entry means for enabling digit manifestations to take effect in said adding device as their respective true numbers and a second entry means for enabling digit manifestations to take effect in said adding device as their respective complements, a first storage device for storing manifestations of the digits of the first one of said two values, a first sign storage device for storing a manifestation of the sign of said first value, a magnetic drum storage device for storing manifestations of the digits of the second one of said two values, a second sign storage device for storing a manifestation of the sign of said second value, said first storage device and said magnetic drum storage device respectively including reading devices for serially reading in unison manifestations of the respective digits of said two values, and selective switching means responsive to said first and second sign storage devices for causing the digit manifestations read by said reading devices to enter said adding device selectively under the control of said first entry means and said second entry means in accordance with the respective signs of said two values, said magnetic drum storage device also including a recording device for recording the output of said adding device to replace said second value therein.

22. Apparatus according to claim 21, wherein said second sign storage device comprises a plus sign storage unit and a minus sign storage unit, each of said sign storage units being adapted to assume alternative on and off conditions as determined by the sign of the second value.

23. Apparatus according to claim 22, in combination with a sign reset device adapted to turn off both of said plus and minus sign storage units when either of said value manifestations is entered as a complement manifestation into said adding device, and complement adjust means effective when the sum manifestation recorded in said magnetic drum storage device is a complement manifestation to turn on said minus sign storage unit and cause said sum manifestation to enter said adding device under the control of said second entry means, thereby to obtain the negative true value of said sum.

24. Apparatus in accordance with claim 23, characterized further by the provision of carry control means effective when the addition of said two value manifestations results in a carry from the highest order of the sum manifestation for turning on the plus sign storage unit, and no-carry control means effective when the addition of said two value manifestations does not result in a carry from the highest order of the sum manifestation for operating said complement adjust means, said carry control means and said no-carry control means being operative when either of said value manifestations is entered as a complement manifestation into said adding device.

25. Multiplying apparatus comprising a storage device for storing manifestations of the digits of the multiplicand, a revolver including a rotatable magnetic element having a track divided into a series of digit positions cooperating with magnetic recording and reading devices for recording digit manifestations serially upon said track and for reading said manifestations serially therefrom, certain of said digit positi ons being assigned to a first portion of said revolver for storing the digit manifestations of the multiplier and other digit positions being assigned to a second portion of said revolver for storing manifestations of the intermediate and final results of the multiplication, a reading device for serially reading the digit manifestations of the multiplicand stored in said storage device in synchronism with the reading of the digit positions in the second portion of said revolver by the first-mentioned reading device, an adding device adapted to receive entries of two digit manifestations concurrently from said reading devices and to furnish as an output thereof a manifestation of the sum of said two digits, said adding device having a first entry means through which the manifestations of the digits of the multiplicand can be effectively entered as their respective true values and a second entry means through which the manifestations of the digits of the multiplicand can be effectively entered as their respective complements, first control means operable to effect the entry of the multiplicand digit manifestations into said adding device by way of said first entry means as said digits are read, second control means operable to effect the entry of the multiplicand digit manifestations into said adding device by way of said second entry means as said digits are read, means for causing the digit manifestations read from the second portion of said revolver to enter said adding device by way of said first entry means, recording control means for operating said recording device to record the output of said adding device in said revolver, said adding device having an output portion adapted to store a manifestation of a digit in one order and an input portion adapted to store a manifestation of a digit in the next succeeding order, said recording control means including a shift means operable to effect a delayed recording of information in said revolver, thereby to effect a leftward digit position shift of the recorded information, and also including a shift nullifying means operable to prevent a shift of the recorded information in said revolver, and said recording control means also being responsive to the digit manifestations stored in the input and output portions of said adding device for selectively operating said shift means and said shift nullifying means in accordance with the values of the digits in the highest two orders of the multiplier, and governing means responsive to the digit manifestations stored in the respective input and output portions of said adding device for selectively operating said first control means and said second control means in accordance with the values of the digits in the highest two orders of the multiplier, thereby to determine whether the multiplicand shall be added to or subtracted from the value whose manifestation is read from the second portion of said revolver.

26. Apparatus in accordance with claim 25, characterized further in that said governing means also is capable of disabling both said first control means and said second control means and causing manifestations denoting zeros to enter said adding device in lieu of the multiplicand digit manifestations.

27. Apparatus in accordance with claim 26, characterized further by the provision of first additional control means effective when said first control means is operated for causing the value of the multiplier to be decreased by 1 as its manifestation passes through said adding device, and second additional control means effective when said second control means is operated for causing the value of the multiplier to be increased by 1 as its manifestation passes through said adding device.

28. Apparatus in accordance with claim 27, characterized further in that said recording control means and said governing means, in conjunction with said first additional control means and said second additional control means, are effective to perform multiplication in accordance with the following table:

| Multiplier digit in highest order | Multiplier digit in 2nd highest order | Add or subtract multiplicand | Add or subtract 1 in highest order of multiplier | Leftward digit position shift |
|---|---|---|---|---|
| 0 | Below 5 | No change | No change | Yes. |
| 1 | do | Add MC | do | Yes. |
| 2 to 4 | do | Add MC | Subt. 1 | No. |
| 5 to 8 | do | Subt. MC | Add 1 | No. |
| 9 | do | Subt. MC | No change | Yes. |
| 0 | 5 or above | Add MC | do | Yes. |
| 1 to 4 | do | Add MC | Subt. 1 | No. |
| 5 to 7 | do | Subt. MC | Add 1 | No. |
| 8 | do | Subt. MC | No change | Yes. |
| 9 | do | No change | do | Yes. |

29. Apparatus in accordance with claim 28 adapted to operate with biquinary code representations of the digits, with certain parts of said adding device being adapted to store manifestations of the binary parts of the input and output digits while other parts of said adding device are adapted to store manifestations of the quinary parts of the input and output digits, said recording control means and said governing means being responsive in particular to the manifestation of the binary part of the digit in the second highest order of the multiplier and to the manifestations of the binary quinary parts of the digit in the highest order of the multiplier.

30. Data storage apparatus of the type wherein characters are recorded upon a moving magnetic element in accordance with a two-level code which requires that each character be represented by one and only one recorded bit in each of two consecutive levels, and wherein the recorded bits are thereafter read sequentially by a magnetic reading device, said apparatus being characterized by the provision of error detection means for detecting the presence of more than one recorded bit in any one level, said error detection means comprising a pulse storage device having two stable conditions, a first coincidence switch partly controlled by the output of said pulse storage device, first pulsing means controlled by said reading device for supplying in sequence a voltage pulse to said first coincidence switch and then a voltage pulse to said pulse storage device in response to the presence of each recorded bit in the first of said two levels, with the pulse to said storage device being effective to place said device in its first stable condition if said device was previously in the second of its two stable conditions and being ineffective if said device is already in its first stable condition, said first coincidence switch being effective to pass the pulse from said pulsing means as an error signal only if such a pulse occurs while said storage device is in its first stable condition, thereby indicating the presence of a second recorded bit in the first level, a second coincidence switch partly controlled by the output of said pulse storage device, second pulsing means controlled by said reading device for supplying in sequence a voltage pulse to said second coincidence switch and then a voltage pulse to said pulse storage device in response to the presence of each recorded bit in the second of said two levels, with the pulse to said storage device being effective to place said device in its second stable condition if said device was previously in its first stable condition and being ineffective if said device was already in its second stable condition, said second coincidence switch being effective to pass the pulse from said second pulsing means as an error signal only if such a pulse occurs while said storage device is in its second stable condition, thereby indicating the presence of more than one recorded bit in the second level.

31. Apparatus according to claim 30, in combination with additional error detection means for detecting the complete absence of recorded bits in any of the levels, said additional error detection means comprising a third coincidence switch controlled by said pulse storage device and adapted to receive a timing pulse when the first level is about to be read for passing said timing pulse as an error signal if said storage device is already in its first stable condition, indicating the absence of a recorded bit in the preceding second level, and a fourth coincidence switch controlled by said pulse storage device and adapted to receive a timing pulse when the second level is about to be read for passing said timing pulse as an error signal if said storage device is already in its second stable condition, indicating the absence of a recorded bit in the preceding first level.

32. Apparatus for adding two multi-digit values comprising a storage means for storing a manifestation of the first of said values, a moving magnetic element in which is defined a series of digit positions, recording means operable to record magnetic manifestations of digits serially in said digit positions, means for operating said recording means initially to record manifestations of the digits of the second value serially in said magnetic element, reading means for serially reading the digit manifestations recorded in said magnetic element, an adding device adapted to receive electrical input pulses representing a pair of digits and to furnish an output representing the sum of said digits, entry control means responsive to said storage means and to said reading means for supplying to said adding device input pulses representing the digits of said two values, with the pulses representing digits in each of said values being entered serially and the pulses representing digits in corresponding orders of the two values being entered pair by pair into said adding device, first output control means for operating said recording means to record directly in said magnetic element a manifestation of the output of said adding device, said adding device including means to interpose a given time delay internally of said adding device between the entry of each pair of digits pulses therein and the furnishing of the respective sum output, thereby tending to shift the respective output digit manifestations recorded in said magnetic element into orders which are different from those that were occupied by the respective constituent digit manifestations of said second value, second output control means operable to advance the action of said recording means thereby to nullify the effect of the delay introduced by said adding device and cause said recording means to record said output digit manifestations in said magnetic element in the same respective orders as those which were occupied by the constituent digit manifestations of said second value, first shift control means for selectively operating said first and said second output control means according to whether or not a delay-type shift is desired, and second shift control means for supplying the output of said reading means directly to said second output control means without passing through said adding device, thereby causing the digit manifestations read from said magnetic element to be shifted in a direction opposite to that of the shift effected by said first output control means and said adding device.

33. Apparatus according to claim 32, in combination with shift counting means for registering a unit count each time a value manifestation is passed through said second output control means without passing through said adding device.

34. Apparatus for adding two multi-digit values comprising a storage means for storing a manifestation of the first of said values, a moving magnetic element in which is defined a series of digit positions, recording means operable to record magnetic manifestations of digits serially in said digit positions, means for operating said recording means initially to record manifestations of the digits of the second value serially in said magnetic element, reading means for serially reading the digit manifestations recorded in said magnetic element, an adding device adapted to receive electrical input pulses representing a pair of digits and to furnish an output representing the sum of said digits, entry control means responsive to said storage means and to said reading means for supplying to said adding device input pulses representing the digits of said two values, with the pulses representing digits in each of said values being entered serially and the pulses representing digits in corresponding orders of the two values being entered pair by pair into said adding device, first output control means for operating said recording means to record directly in said magnetic element a manifestation of the output of said adding device, said adding device including means to interpose a given time delay internally of said adding device between the entry of each pair of digits pulses therein and the furnishing of the respective sum output, thereby tending to shift the respective output digit manifestations recorded in said magnetic element into orders which are different from those that were occupied by the respective constituent digit manifestations of said second value, second output control means operable to nullify the effect of the delay in said adding device and to operate said recording means for recording said output digit manifestations in said magnetic element in the same respective orders as those which were occupied by the constituent digit manifestations of said second value, shift control means for selectively operating said first and second output control means according to whether or not a shift is desired, and shift counting means for registering a unit count each time a value manifestation is passed through said adding device while said first output control means is operative.

35. A device for adding a plurality of digits respectively represented by electrical input pulses each of which may occur at any of a plurality of distinct times within a given time cycle according to the digital bit significance of each pulse, said device comprising a plurality of input storage devices each adapted to store an input pulse occurring at a particular one of said distinct times and to furnish an output voltage representing the stored pulse, timed distributor means for applying to said input storage device within the same time cycle the differentially timed input pulses representing a pair of addend and augend digits, means for routing said input pulses selectively to said input storage devices according to the respective times at which said input pulses occur, whereby said input pulses are distributed among said input storage devices according to the digital bit significance of each individual pulse, and summation means including a plurality of coincidence switches and a plurality of sum digit storage devices, each of said switches being responsive to a plurality of coincident output voltages from a particular group of said input storage devices for operating said sum digit storage devices selectively in accordance with the sum of the digits stored in that particular group of input storage devices, said routing means including a first group of routing devices for enabling input pulses to enter the input storage devices corresponding to the respective true values of the digits represented by said pulses, and a second group of routing devices for enabling input pulses to enter the input storage devices corresponding to the respective complement values of the digits represented by said pulses.

36. An adding device according to claim 35 in combination with means for detecting when any two input pulses are routed respectively by the two groups of routing devices to the same input storage device, said detecting means including a sampling device which is rendered active for a limited time interval after the first input pulse enters one of said input storage devices by way of either group of said routing devices, special coincidence switches responsive to said sampling device and to said routing means for detecting the entry of a second input pulse by way of the other group of said routing devices during a time interval in which said sampling device is active, and a special storage device for storing a pulse which signifies a doubled value, said special coincidence switches controlling said special storage device for causing a doubled-value pulse to be stored therein if said second pulse occurs within said time interval.

37. Multiplying apparatus comprising a storage device for storing manifestations of the digits of the multiplicand, a revolver including a rotatable magnetic element having a track divided into a series of digit positions cooperating with magnetic recording and reading devices for recording digit manifestations serially upon said track and for reading said manifestations serially therefrom, certain of said digit positions being assigned to a first portion of said revolver for storing manifestations of the digits of the multiplier and other digit positions being assigned to a second portion of said revolver for storing manifestations of the intermediate and final results of the multiplication, a reading device for serially reading the manifestations of the digits of the multiplicand stored in said storage device in synchronism with the reading of the digit positions in the second portion of said revolver by the first-mentioned reading device, an adding device adapted to receive entries of two digit manifestations concurrently from said reading devices and to furnish as an output thereof a manifestation of the sum of said two digits, means for entering the digit manifestations of the multiplicand read from said storage device and the digit manifestations read from the second portion of said revolver into said adding device, recording control means for operating said recording device to record the output of said adding device in said revolver, said adding device also including means to introduce a predetermined time delay internally of said adding device between the entry of said input digits and the furnishing of said output, thereby tending to produce a shift in the output information recorded in said revolver, shift nullifying means controlled by said recording control means for nullifying the effect of said time delay when a shift is not desired, said shift nullifying means including a second revolver having a recording device which receives the digit manifestations from said adding device and a reading device which routes said manifestations from the second revolver to the recording device of the first-mentioned revolver, said second revolver having a construction substantially identical with that of said first-mentioned revolver except that the reading and recording devices of said second revolver are spaced from each other by a smaller amount than those of said first revolver so as to cancel the delay produced by said adding device, said first-mentioned revolver also having a predetermined digit position therein reserved for a shift count digit manifestation, and a shift numbering device controlled by said recording control means for causing a manifestation of the digit 1 to be entered into said adding device concurrently with the shift count digit manifestation read from said predetermined digit position of said revolver each time a shift occurs, thereby maintaining a count of the shifts which have taken place, said shift nullifying means being effective insofar as the shift count digit manifestation only is concerned to prevent said digit manifestation from being shifted out of said predetermined digit position.

38. Apparatus for performing division comprising a storage device for storing manifestations of the digits of the divisor, a revolver including a rotatable magnetic element having a track divided into a series of digit positions cooperating with magnetic recording and reading devices for recording digit manifestations serially upon said track and for reading said manifestations serially therefrom, certain of said digit positions being assigned to a first portion of said revolver and other digit positions being assigned to a second portion of said revolver wherein the digit manifestations of the dividend initially are stored, said revolver also having a predetermined digit postion reserved for a shift count digit manifestation, a reading device for serially reading the digit manifestations of the divisor stored in said storage device in synchronism with the reading of digit positions in the first portion of said revolver by the first-mentioned reading device, an adding device adapted to receive entries of two digit manifestations concurrently from said reading devices and to furnish as an output thereof a manifestation of the sum of said two digits, said adding device having a first entry means through which the manifestations of the digits of the divisor can effectively be entered as their respective true values and a second entry means through which the manifestations of the digits of the divisor can effectively be entered as their respective complement values, first control means operable to effect the entry of the divisor digit manifestations into said adding device by way of said first entry means as said digit manifestations are read, second control means operable to effect the entry of the divisor digit manifestations into said adding device by way of said second entry means as said digits are read, means for causing the digit manifestations read from said revolver to enter said adding device by way of said first entry means as said digit manifestations are read, said adding device including internal time delay means whereby the digits of the output are respectively produced in time delayed relation to the entry of the corresponding input digits into said adding device, recording control means for operating said recording device to record the output of said adding device in said revolver, said recording control means including means cooperating with said adder to provide a shift means operable to transfer the output of said adding device in its delayed condition to said recording device, thereby to effect a leftward digit position shift of the information recorded in said revolver due to the delay caused by said adding device, said recording control means also including a shift nullifying means operable to render such delay ineffective and thereby prevent a leftward digit position shift of the information recorded in said revolver, said second portion of said revolver being disposed in a continuing sequential relationship to said first portion so that the manifestations of the digits of the dividend are progressively shifted into said first portion as each leftward digit position shift is performed, starting means operable to render said second control means effective initially for causing the complement of the divisor to be added to the value whose manifestation is initially stored in the first portion of said revolver, no-carry control means responsive to the absence of a carry from the highest-order digit position in said revolver for operating said first control means to add the true value of the divisor to the value whose manifestation is currently stored in the first portion of said revolver, said no-carry control means also being effective to operate said shift means to produce a leftward digit position shift of the information recorded in said revolver, carry control means responsive to the presence of a carry from the highest-order digit position in said revolver for operating said second control means to add the complement of the divisor to the value whose manifestation is currently stored in the first portion of said revolver, said carry control means also being effective to operate said shift nullifying means for preventing a leftward digit position shift of the information recorded in said revolver, and a shift numbering device controlled by said first control means for causing the manifestation of a true 1 to be entered into said adding device concurrently with the shift count digit manifestation read from said predetermined digit positon, thereby maintaining a count of the shifts which have taken place, said shift nullifying means being effective insofar as the shift count digit manifestation only is concerned to prevent said digit manifestation from being shifted out of said predetermined digit position.

39. Apparatus according to claim 38 in combination with means responsive to the current shift count digit manifestation for terminating the division operation when a predetermined number of shifts have taken place.

40. Apparatus for performing division comprising a storage device for storing manifestations of the digits of the divisor, a revolver including a rotatable magnetic element having a track divided into a series of digit positions cooperating with magnetic recording and reading devices for recording digit manifestations serially upon said track and for reading said manifestations serially therefrom, certain of said digit positions being assigned to a first portion of said revolver and other digit positions being assigned to a second portion of said revolver wherein the digit manifestations of the dividend initially are stored, a reading device for serially reading the digit manifestations of the divisor stored in said storage device in synchronism with the reading of digit positions in the first portion of said revolver by the first-mentioned reading device, an adding device adapted to receive entries of two digit manifestations concurrently from said reading devices and to furnish as an output thereof a manifestation of the sum of said two digits, said adding device having a first entry means through which the manifestations of the digits of the divisor can effectively be entered as their respective true values and a second entry means through which the manifestations of the digits of the divisor can effectively be entered as their respective complement values, first control means operable to effect the entry of the divisor digit manifestations into said adding device by way of said first entry means as said digit manifestations are read, second control means operable to effect the entry of the divisor digits into said adding device by way of said second entry means as said digit manifestations are read, means for causing the digit manifestations read from said revolver to enter said adding device by way of said first entry means as said digit manifestations are read, said adding device including internal time delay means whereby the digits of the output are respectively produced in time delayed relation to the entry of the corresponding input digits into said adding device, recording control means for operating said recording device to record the output of said adding device in said revolver, said recording control means including means acting jointly with said adder to provide a shift means operable to transfer the output of said adding device in its delayed condition to said recording device thereby to effect a leftward digit position shift of the information recorded in said revolver due to the delay caused by said adding device, said recording control means also including a shift nullifying means operable to render such delay ineffective and thereby prevent a leftward digit position shift of the recorded information in said revolver, said second portion of said revolver being disposed in a continuing sequential relationship to said first portion so that the manifestations of the digits of the dividend are progressively shifted into said first portion as each leftward digit position shift is performed, starting means operable to render said second control means effective initially for causing the complement of the divisor to be added to the value whose manifestation is initially stored in the first portion of said revolver, no-carry control means responsive to the absence of a carry from the highest-order digit position in said revolver for operating said first control means to add the true value of the divisor to the value whose manifestation is currently stored in the first portion of said revolver, said no-carry control means also being effective to operate said shift means to produce a leftward digit position shift of the information recorded in said revolver, carry control means responsive to the presence of a carry from the highest-order digit position in said revolver for operating said second control means to add the complement of the divisor to the value whose manifestation is currently stored in the first portion of said revolver, said carry control means also being effective to operate said shift nullifying means for preventing a leftward digit position shift of the information recorded in said revolver, quotient forming means controlled by said second control means and effective whenever said second control means is operated two times in succession for entering a manifestation of a true 1 in said adding device concurrently with the entry of the digit manifestation read from a predetermined digit position of said revolver, the manifestation of the quotient being formed in the second portion of said revolver while the manifestation of the remainder is retained in the first portion of said revolver, selective readout means for operating the reading device of said revolver to read the quotient manifestation and the remainder manifestation independently of each other, first sign storage means for storing a manifestation of the sign of the divisor, second sign storage means for storing a manifestation of the sign of the dividend, and third sign storage means for storing a plus sign manifestation when said first two signs are alike and a minus sign manifestation when said first two signs are not alike, said selective readout means including provisions for associating the sign manifestation in said third sign storage means with the digit manifestations of the quotient and the sign manifestation in said second sign storage means with the digit manifestations of the remainder during readout.

41. Apparatus according to claim 40, further comprising selective readin means operable in conjunction with said selective readout means for causing the remainder manifestation read out from the first portion of said revolver to be stored in the second portion of said revolver as the dividend manifestation for a subsequent dividing operation.

42. Apparatus for performing division comprising a storage device for storing manifestations of the digits of the divisor, a revolver including a rotatable magnetic element having a track divided into a series of digit positions cooperating with magnetic recording and reading devices for recording digit manifestations serially upon said track and for reading said manifestations serially therefrom, certain of said digit positions being assigned to a first portion of said revolver and other digit positions being assigned to a second portion of said revolver wherein the digit manifestations of the dividend initially are stored, a reading device for serially reading the digit manifestations of the divisor stored in said storage device in synchronism with the reading of digit positions in the first portion of said revolver by the first-mentioned reading device, an adding device adapted to receive entries of two digit manifestations concurrently from said reading devices and to furnish as an output thereof a manifestation of the sum of said two digits, said adding device having a first entry means through which the manifestations of the digits of the divisor can effectively be entered as their respective true values and a second entry means through which the manifestations of the digits of the divisor can effectively be entered as their respective complement values, first control means operable to effect the entry of the divisor digit manifestations into said adding device by way of said first entry means as said digit manifestations are read, second control means operable to effect the entry of the divisor digits into said adding device by way of said second entry means as said digit manifestations are read, means for causing the digit manifestations read from said revolver to enter said adding device by way of said first entry means as said digit manifestations are read, said adding device including internal time delay means whereby the digits of the output are respectively produced in time delayed relation to the entry of the corresponding input digits into said adding device, recording control means for operating said recording device to record the output of said adding device in said revolver, said recording control means including means acting jointly with said adder to provide a shift means operable to transfer the output of said adding device in its delayed condition to said recording device thereby to effect a leftward digit position shift of the information recorded in said revolver due to the delay caused by said adding device, said recording control means also including a shift nullifying means operable to render such delay ineffective and thereby prevent a leftward digit position shift of the recorded information in said revolver, said second portion of said revolver being disposed in a continuing sequential relationship to said first portion so that the manifestations of the digits of the dividend are progressively shifted into said first portion as each leftward digit position shift is performed, starting means operable to render said second control means effective initially for causing the complement of the divisor to be added to the value whose manifestation is initially stored in the first portion of said revolver, no-carry control means responsive to the absence of a carry from the highest-order digit position in said revolver for operating said first control means to add the true value of the divisor to the value whose manifestation is currently stored in the first portion of said revolver, said no-carry control means also being effective to operate said shift means to produce a leftward digit position shift of the information recorded in said revolver, carry control means responsive to the presence of a carry from the highest-order digit position in said revolver for operating said second control means to add the complement of the divisor to the value whose manifestation is currently stored in the first portion of said revolver, said carry control means also being effective to operate said shift nullifying means for preventing a leftward digit position shift of the information recorded in said revolver, quotient forming means controlled by said second control means and effective whenever said second control means is operated two times in succession for entering a manifestation of a true 1 in said adding device concurrently with the entry of the digit manifestation read from a predetermined digit position of said revolver, and error detection means responsive to the incidence of a carry from said predetermined digit position to provide a signal indicative of an error.

References Cited in the file of this patent

UNITED STATES PATENTS

| | | |
|---|---|---|
| 2,609,143 | Stibitz | Sept. 2, 1952 |
| 2,611,813 | Sharpless | Sept. 23, 1952 |
| 2,614,169 | Cohen | Oct. 14, 1952 |
| 2,701,095 | Stibitz | Feb. 1, 1955 |
| 2,737,342 | Nelson | Mar. 6, 1956 |
| 2,749,037 | Stibitz | June 5, 1956 |
| 2,770,797 | Hamilton et al. | Nov. 13, 1956 |

OTHER REFERENCES

Progress Report #2 on the EDVAC, Moore School of Engineering, University of Pennsylvania, pages 4–24 to 4–30. Declassified February 13, 1947.

Proc. of National Electronic Conf., vol. III; March 17, 1948, "Storage of Numbers on Magnetic Tape," Coombs, pages 201 to 209.

"Description of Magnetic Drum Calculator," Annals of the Comp. Lab., Harvard Univ., vol. XXV, Harvard Press, Copyright August 22, 1952; pages 9 to 11, 21 to 25, 47 to 49, 88, 89, 91, 104 to 106 and 234.

UNITED STATES PATENT OFFICE

CERTIFICATE OF CORRECTION

Patent No. 2,901,166 August 25, 1959

Francis E. Hamilton et al.

It is hereby certified that error appears in the printed specification of the above numbered patent requiring correction and that the said Letters Patent should read as corrected below.

Column 72, line 31, claim 10, for "valve", both occurrences, read -- value --; column 74, line 53, claim 15, for "double-value" read -- doubled-value --.

Signed and sealed this 8th day of March 1960.

(SEAL)

Attest:

KARL H. AXLINE
Attesting Officer

ROBERT C. WATSON
Commissioner of Patents shift of the recorded information in said revolver, said second portion of said revolver being disposed in a continuing sequential relationship to said first portion so that the manifestations of the digits of the dividend are progressively shifted into said first portion as each leftward digit position shift is performed, starting means operable to render said second control means effective initially for causing the complement of the divisor to be added to the value whose manifestation is initially stored in the first portion of said revolver, no-carry control means responsive to the absence of a carry from the highest-order digit position in said revolver for operating said first control means to add the true value of the divisor to the value whose manifestation is currently stored in the first portion of said revolver, said no-carry control means also being effective to operate said shift means to produce a leftward digit position shift of the information recorded in said revolver, carry control means responsive to the presence of a carry from the highest-order digit position in said revolver for operating said second control means to add the complement of the divisor to the value whose manifestation is currently stored in the first portion of said revolver, said carry control means also being effective to operate said shift nullifying means for preventing a leftward digit position shift of the information recorded in said revolver, quotient forming means controlled by said second control means and effective whenever said second control means is operated two times in succession for entering a manifestation of a true 1 in said adding device concurrently with the entry of the digit manifestation read from a predetermined digit position of said revolver, and error detection means responsive to the incidence of a carry from said predetermined digit position to provide a signal indicative of an error.

References Cited in the file of this patent

UNITED STATES PATENTS

| | | |
|---|---|---|
| 2,609,143 | Stibitz | Sept. 2, 1952 |
| 2,611,813 | Sharpless | Sept. 23, 1952 |
| 2,614,169 | Cohen | Oct. 14, 1952 |
| 2,701,095 | Stibitz | Feb. 1, 1955 |
| 2,737,342 | Nelson | Mar. 6, 1956 |
| 2,749,037 | Stibitz | June 5, 1956 |
| 2,770,797 | Hamilton et al. | Nov. 13, 1956 |

OTHER REFERENCES

Progress Report #2 on the EDVAC, Moore School of Engineering, University of Pennsylvania, pages 4–24 to 4–30. Declassified February 13, 1947.

Proc. of National Electronic Conf., vol. III; March 17, 1948, "Storage of Numbers on Magnetic Tape," Coombs, pages 201 to 209.

"Description of Magnetic Drum Calculator," Annals of the Comp. Lab., Harvard Univ., vol. XXV, Harvard Press, Copyright August 22, 1952; pages 9 to 11, 21 to 25, 47 to 49, 88, 89, 91, 104 to 106 and 234.

UNITED STATES PATENT OFFICE

CERTIFICATE OF CORRECTION

Patent No. 2,901,166 August 25, 1959

Francis E. Hamilton et al.

It is hereby certified that error appears in the printed specification of the above numbered patent requiring correction and that the said Letters Patent should read as corrected below.

Column 72, line 31, claim 10, for "valve", both occurrences, read -- value --; column 74, line 53, claim 15, for "double-value" read -- doubled-value --.

Signed and sealed this 8th day of March 1960.

(SEAL)

Attest:

KARL H. AXLINE
Attesting Officer

ROBERT C. WATSON
Commissioner of Patents